United States Patent [19]
Mitchell et al.

[11] Patent Number: 5,724,272
[45] Date of Patent: Mar. 3, 1998

[54] METHOD AND APPARATUS FOR CONTROLLING AN INSTRUMENTATION SYSTEM

[75] Inventors: Bob Mitchell; Hugo Andrade; Jogen Pathak; Samson DeKey; Abhay Shah; Todd Brower, all of Travis County, Tex.

[73] Assignee: National Instruments Corporation, Austin, Tex.

[21] Appl. No.: 238,480

[22] Filed: May 4, 1994

[51] Int. Cl.$^6$ ................................................ G06F 19/00
[52] U.S. Cl. .............................................. 364/579; 395/674
[58] Field of Search ........................... 364/579, 580, 364/191; 395/62, 500, 700, 970, 674, 681–685

[56] References Cited

U.S. PATENT DOCUMENTS

| | | | |
|---|---|---|---|
| 5,337,262 | 8/1994 | Luthi et al. | 364/580 |
| 5,359,546 | 10/1994 | Hayes et al. | 364/579 |
| 5,361,336 | 11/1994 | Atchison . | |
| 5,390,325 | 2/1995 | Miller | 395/700 |

OTHER PUBLICATIONS

*Hewlett Packard SICL Standard Instrument Control Library for C Programming*, Lee Atchison, VXI Systems Division, Hewlett Packard Company, Jan. 21, 1994, Revision 3.9, pp. i–iii, 1–136, Index.

Marketing brochures and product literature for instrumentation systems produced by Bruel & Kjaer, including the Modular Test System Type 3538, available at the Auto TestCon instrumentation conference in 1991.

Slide presentation on the Bruel & Kjaer Modular Test system.

*Primary Examiner*—James P. Trammell
*Attorney, Agent, or Firm*—Conley, Rose & Tayon; Jeffrey C. Hood

[57] ABSTRACT

A method and apparatus for controlling instrumentation systems and for providing a user with the capability to develop instrument drivers and application software for controlling instrumentation systems. The present invention provides a system including a software architecture which defines the control and management of an instrumentation system. The method of the present invention utilizes a device resource independence approach whereby the individual capabilities of devices are broken down into a plurality of objects called resources and these resources are then used to develop instrument drivers or instrument control applications. The method of the present invention also uses object oriented technology which allows device resources to be easily combined to create higher level applications. The present invention is independent of I/O interface type, operating system, and programming language while also providing a common look and feel and consistent API to the user. The present invention includes novel methods for access control, event handling, resource management, and resource addressing, among others.

177 Claims, 40 Drawing Sheets

Microfiche Appendix Included
(6 Microfiche, 479 Pages)

Example VISA Configuration

Example VISA Distributed Configuration

Event Model Event Lifecycle

State Diagram for the Queuing Mechanism

State Diagram for the Callback Mechanism

Sample VISA, C Language-type Application (Message-Based)

VISA Resource Classes vs. VISA Resources

Example VISA Instrument Control Organizer
A group of resources consisting of the messaging portion within a particular system (from previous example) of a GPIB device with two trigger lines from a trigger controller

| Address 0 | Address 24 | Address 51 | Resource Classes Implemented |
|---|---|---|---|
| CPU | VXI Message Based Device | VXI Register Based Device | Read<br>Write<br>High Level Access<br>VXIbus Interrupt |

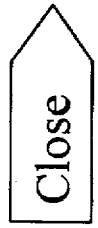
```
int main(void)
{
    char rdResponse[RESPONSE_LENGTH];
    int status;
    short id;
    id=ibfind("dev1");              ← Device Location
    status=ibpad(5);                ←
    status=ibwrt(id, "*IDN?", 5);
    ...
    status=ibrd(id, rdResponse, RESPONSE_LENGTH);   length returned
                                                     in ibcnt
    /* no closing mechanism, memory always allocated */
    return 0;
}
```
Sample Non-VISA, GPIB C Language Application (Message-Based)
Fig. 37

Fig. 38 Sample Non-VISA, VXI C Language Application (Message-Based)

Sample VISA, C Language-type Application (Message-Based)

Sample VISA, C Language-type Application (Register-Based)

```
status = viOpen(viDefaultRM, "VICO(GPIB1::5)", 0, 0, &vi);
status = viEnableEvent (vi, VI_EVENT_SERVICE_REQ, VI_QUEUE, VI_NULL);    ← Enable event for queuing
status = viWrite(vi, "VOLT:MEAS?", 10, &retCount);                        ← Perform operation which will generate event
status = viWaitOnEvent (vi, VI_EVENT_SERVICE_REQ, timeout, &context);     ← Wait on or dequeue event
if (status == VI_SUCCESS)
    status = viRead(vi, rdResponse, RESPONSE_LENGTH, &retCount);
```

Sample VISA, C Language-type Application (Event Queuing)

Fig. 41

```
status = viOpen(viDefaultRM, "VICO(VX12::20)", 0, 0, &vi);
status = viInstallHandler(vi, VI_EVENT_SERVICE_REQ, SRQHandlerFunc, VI_NULL);    ← Set callback function
status = viEnableEvent(vi, VI_EVENT_SERVICE_REQ, VI_HNDLR, VI_NULL);             ← Enable event for callback ViStatus SRQHandlerFunc(ViSession vi, ViEventType eventType,                      ← Callback
                        ViEvent context, ViAddr userHandle)
{
    /* user defined interrupt handler code*/
}
```

Sample VISA, C Language-type Application (Event Callbacks)

Fig. 42

METHOD AND APPARATUS FOR CONTROLLING AN INSTRUMENTATION SYSTEM

FIELD OF THE INVENTION

The present invention relates to I/O control software for instrumentation systems, and more particularly to I/O control software which utilizes a device resource independence model that is independent of instrument type, interface type, operating system, and programming language.

This application includes microfiche appendix, 6 sheets, 479 frames.

DESCRIPTION OF THE RELATED ART

An instrument is a device which collects data or information from an environment or unit under test and displays this information to a user. An instrument may also perform various data analysis and data processing on acquired data prior to displaying the data to the user. Examples of various types of instruments include oscilloscopes, digital multimeters, pressure sensors, etc., and the types of information which might be collected by respective instruments include voltage, resistance, distance, velocity, pressure, frequency of oscillation, humidity or temperature, among others.

In the past, many instrumentation systems comprised individual instruments physically interconnected with each other. Each instrument typically included a physical front panel with its own peculiar combination of indicators, knobs, or switches. A user generally had to understand and manipulate individual controls for each instrument and record readings from an array of indicators. Acquisition and analysis of data in such instrumentation systems was tedious and error prone. An incremental improvement in the manner in which a user interfaced with various instruments was made with the introduction of centralized control panels. In these improved systems, individual instruments were wired to a control panel, and the individual knobs, indicators or switches of each front panel were either preset or were selected to be presented on a common front panel.

A significant advance occurred with the introduction of computers to provide more flexible means for interfacing instruments with a user. In such computerized instrumentation systems, the user interacts with software executing on the computer system through the computer's video monitor rather than through a manually operated front panel to control one or more real world instruments. The software executing on the computer system can be used to simulate the operation of an instrument in software or to control or communicate with one or more real world instruments, these software created/controlled instruments being referred to as virtual instruments.

Therefore, modern instrumentation systems are moving from dedicated stand-alone hardware instruments such as oscilloscopes, digital multimeters, etc., to a concept referred to as virtual instrumentation. Virtual instrumentation comprises general purpose personal computers and workstations combined with instrumentation software and hardware to build a complete instrumentation system. In a virtual instrumentation system, a virtual instrument operating on a central computer controls the constituent instruments from which it acquires data which it analyzes, stores, and presents to a user of the system. Computer control of instrumentation has become increasingly desirable in view of the increasing complexity and variety of instruments available for use, and computerized instrumentation systems provide significant performance efficiencies over earlier systems for linking and controlling test instruments.

The various hardware interface options currently available for instrumentation systems can be categorized into four distinct types, including IEEE 488-controlled instruments (GPIB instruments), VXI bus instruments, plug-in data acquisition (DAQ) boards, and RS-232-controlled (serial) instruments. Background on these various hardware interface options is deemed appropriate.

The GPIB (general purpose interface bus) began as a bus designed by Hewlett-Packard in 1965, referred to as the Hewlett-Packard Interface Bus (HPIB), to connect their line of programmable instruments to their computers. National Instruments Corporation expanded the use of this bus to computers manufactured by companies other than Hewlett-Packard and hence the name General Purpose Interface Bus (GPIB) became more widely used than HPIB. The GPIB interface bus gained popularity due to its high transfer rates and was later accepted as IEEE standard 488-1975, and the bus later evolved to ANSI/IEEE standard 488.1-1987. In order to improve on this standard, two new standards were drafted, these being ANSI/IEEE 488.2-1987 and the SCPI (Standard Commands for Programmable Instruments) standard. The IEEE 488.2 standard strengthened the original standard by defining precisely how controllers and instruments communicated. The IEEE 488.2 standard removed ambiguities of the IEEE 488.1 standard by defining data formats, status reporting, a message exchange protocol, IEEE 488.2 controller requirements, and common configuration commands to which all IEEE 488.2 instruments must respond in a precise manner. Thus, the IEEE 488.2 standard created more compatible, more reliable systems that were simpler to program. In 1990, a new specification was developed referred to as the Standard Commands for Programmable Instruments (SCPI), which used the command structures defined in the IEEE 488.2 standard and formed a single, comprehensive programming command set that is used with any SCPI instrument. The SCPI standard simplified the programming process for manufacturers and users alike. Rather than having to learn a different command set for each instrument, the user could focus on solving the measurement tests of his or her application, thus decreasing programming time.

The VXI (VME eXtension for Instrumentation) bus is a platform for instrumentation systems that was first introduced in 1987 and was originally designed as an extension of the VME bus standard. The VXI standard has experienced tremendous growth and acceptance around the world and is used in a wide variety of traditional test and measurement and ATE applications. The VXI standard uses a mainframe chassis with a plurality of slots to hold modular instruments on plug-in boards. The VXI architecture is capable of interfacing with both message based instruments and register based instruments. A message based instrument is an instrument which is controlled by a string of ASCII characters, whereas a register based instrument is controlled by writing a bitstream of 1's and 0's directly to registers in the instrument hardware.

An instrumentation system using a data acquisition interface method typically includes transducers which sense physical phenomena from the process or unit under test and provide electrical signals to data acquisition hardware inside the computer system. The electrical signals generated by the transducers are converted into a form that the data acquisition board can accept, typically by signal conditioning logic positioned between the transducers and the data acquisition card in the computer system. A computer can also control an instrumentation system through the computer's serial or RS-232 port. There are currently thousands of instruments with an RS-232 interface.

Due to the wide variety of possible testing situations and environments, and also the wide array of instruments available, it is often necessary for a user to develop a program to control respective instruments in the desired instrumentation system. Therefore, implementation of such systems frequently require the involvement of a programmer to develop software for acquisition, analysis and presentation of instrumentation data.

The software architecture for a virtual instrumentation system comprises several components. The top level of the software architecture typically comprises an applications program used for high level control of the virtual instrument. Examples of high level applications programs for instrumentation control are LabVIEW and LabWindows from National Instruments Corp. Other examples of applications programs are HP VEE from Hewlett-Packard and Wavetest from Wavetek Corp. among others. These applications programs provide a user with the tools to control instruments, including acquiring data, analyzing data, and presenting data.

The applications programs mentioned above typically operate in conjunction with one or more instrument drivers to interface to actual physical instruments. For example, the LabVIEW and LabWindows applications software each include instrument libraries comprising drivers for more than three hundred GPIB, VXI, and RS-232 instruments from numerous manufacturers. The instrument drivers are designed to reduce a user's application development time by providing intuitive high level functions that relieve the user of complex low level instrument programming.

A software level referred to as driver level software is below the instrument driver level. Driver level software is used to interface the commands in the instrument driver to the actual hardware interface being used, such as a GPIB interface card, a data acquisition card, or a VXI card. In other words, driver level software handles the details of communication, i.e., the transfer of commands and data, over a physical connection between the computer and instruments. There have been many implementations of I/O control software, some of which were custom-developed by end users, while others were developed by vendors and sold along with interface hardware. Examples of driver level software include NI-488, NI-DAQ, and NI-VXI driver level software offered by National Instruments, Inc., which has become a de facto standard in the industry. Another example of driver level software is the Standard Instrument Control Library (SICL) offered by Hewlett-Packard.

A primary problem with current driver level software is that there generally is no common look and feel and no common programming constructs. For example, one problem with driver level software implemented by many vendors is that the software includes separate application programming interfaces for the different types of hardware interfaces, such as GPIB, VXI, and data acquisition. In many cases there are also significant differences in the API within the specific product lines of a company, i.e., features are not implemented or are implemented differently within the product line. Also, many times the driver level software includes separate utilities such as installation, configuration and interactive tools utilities within the same product line. Some utilities are incomplete or conflict with other utilities. Further, there are often no common programming styles or constructs, no common approaches to handling DMA and interrupt requests, no common method for interfacing to higher level application software, and no common graphical user interface tools.

One cause of this problem is that the driver level software for respective hardware interfaces is developed by independent teams of programmers, often resulting in inconsistencies. Each I/O control or driver level software designer has flexibility to address the respective users in his or her own way. For example, some designers may concentrate on high level simple tools with narrowly defined functionality to maximize ease of use for certain applications. On the other hand, other designers may emphasize complete functionality, i.e., low level flexibility and performance tuning capabilities for the knowledgeable users.

As a result of the above problems, the quality of driver level software is generally very product specific, and there are typically inconsistent implementations. Further, incorrect bug fixes can generate other bugs or go against the original intention of the product. These problems make it very difficult to update and port driver level software to other platforms. Also, since driver level software is generally created by different teams of programmers, there is typically no common look and feel of the software. Therefore, different implementations of driver level software have generally had dramatically different features and different user interfaces.

As discussed above, the instrument driver level of software is layered on top of the driver level software for every function call to an instrument for every instrument driver. Because of the inconsistencies in driver level software described above, developers of instrument driver software, who many times are non-professional software engineers, typically do not use the full platform capabilities available, such as interrupt handling, register based control, and triggers. Further, developers of instruments driver software often do not include centralized management of resources, and thus instrument drivers may conflict. As a result, various implementations of instrument driver soft-ware do not use the full functionality of the instrument being controlled. Also, there is no common creation mechanism or requirements, no common source code and no common testing criteria.

Software development is widely recognized as a major cost factor in the development, deployment, and maintenance of instrumentation control systems. Software design requires modularity in an attempt to simplify instrumentation programming. Software design for instrumentation has also inspired powerful new instrument programming tools and concepts, such as instrument driver software libraries and graphical development tools. However, due to the difficulties discussed above with regard to driver level software, software design has generally lagged behind hardware capabilities.

It would be highly desirable to provide instrumentation programmers with the ability to write software that is independent of hardware. For example, it would be highly desirable to allow instrumentation programmers to develop software that is independent of operating system and I/O interface. It would also be greatly desirable for the software API of an instrumentation system to have a common look and feel as well as more consistent implementations for cross-platform development and integration, cross-product development and integration, and the reusability of source code.

In addition to the above, various trends are occurring in instrumentation control systems which promise to place greater burdens on the software used to control these systems. One future trend in instrumentation control systems is the move from a one engineer-one project paradigm to a higher level of coordination, i.e., a move to a more highly complex and distributed environment. This trend toward distributed instrumentation systems includes systems where the instruments themselves are stand-alone in instruments with built-in network interfaces or modular VXI mainframes with multiple processors. These instruments are controlled over industry standard backplanes such as VXI and industry standard networks such as Ethernet. As VXI becomes a mainstream technology and distributed test system architectures become more and more popular, the I/O control software used by end users must be continuously improved.

Instrument drivers and applications software are encountering other new requirements, including the capability to interface with dynamic link libraries and shared objects. This requirement includes the ability to be used by other applications or application software packages, and also the ability to be changed or updated without recompilation of the user's application. There is also a need for instrument drivers to be able to support other languages as well as have more extensive error handling. Despite the need for new capabilities in instrumentation software, it is important that new I/O control software remain compatible with existing instrument drivers and applications software. Therefore, there is a need for an I/O control software architecture that not only provides access to new capabilities, but also bridges with the past and provides a smooth migration path for the installed base and huge investment in existing systems.

As mentioned above, an important requirement of I/O control software is referred to as I/O interface independence. When users write application software to control a specific set of instruments, they typically want their applications to work with a variety of hardware for a respective I/O interface, perhaps even supplied from different vendors. A user controlling GPIB instruments with a PC, for example, may want to use a plug-in GPIB card in one application and use an external SCSI-to-GPIB interface box in another application. A consistent I/O software interface for these two approaches would allow the user to do this without modifying his application software code.

It is noted that hardware interface independence for a respective I/O interface has been available for some time, principally within a particular I/O interface vendor's product line. Many of these product lines are very wide indeed, covering most of the market needs with a standardized I/O software interface that is even consistent across interfaces for different computer platforms. In addition, some interface hardware-only vendors have cloned the interface of the most popular products to achieve compatibility with the most popular I/O interface software on the market. This activity, in essence, established de facto standards for I/O interface software. Users who were not totally satisfied with these de facto standards have generally written their own I/O software layer to sit on top of specific I/O software interface libraries from different vendors. In this way, they decouple their application software from specific I/O interface products.

Another aspect of interface independence has become of interest to more and more users, especially those who are using VXI technology. Rather than simply developing software that is hardware independent for a respective I/O interface, i.e., software for a particular GPIB instrument that is independent of the computer-to-GPIB interface hardware used, many users desire the ability to write software that is also independent of the type of I/O interface used, such as whether GPIB, VXI, or some other type of connection is used between the computer and the instrument. For example, a user may want to write one piece of software to control an instrument that has options for both GPIB and RS-232 control. As another example, a user may want to write software to control a VXI instrument and have that software work whether the computer is embedded in the VXI chassis, connected to VXI through the MXIbus, or connected to VXI through a GPIB-to-VXI translator.

There are many ways to model driver level instrumentation control software. One common approach to creating software to control instrumentation systems at this level has been to create distinct, function-oriented, Application Programmer Interfaces (APIs) tailored to the specific systems and the specific hardware interfaces that they support. Many of these APIs offer unique performance and feature specific benefits. As system designers add new types of hardware interfaces, or their existing interfaces evolve in capability, it is often necessary to create new APIs or add new functions to an existing API. These APIs and their approaches are still a very effective means of programming instrumentation systems.

However, given the size and diversity of the hardware and the software within many instrumentation systems, several companies have made an effort over recent years to come up with alternative approaches to developing this level of instrumentation control software. The size and diversity of instrumentation systems has driven users to seek software that can control multiple types of instruments with a common software tool. Because of the fact that different hardware interfaces are used to connect instruments in a system, this is not an easy task.

Currently, most software tools solve the problem of adapting to the differences in systems at the application level. This is necessary due to the diversity in features of the hardware-level software APIs currently in the marketplace. It would be highly desirable to provide a common set of instrumentation features that support all currently available APIs for their corresponding environments. It would also be desirable for this common set of instrumentation features to be capable of being extended well into the future.

One attempt to create a software layer that is I/O interface independent is the Standard Instrument Control Library (SICL) developed by Hewlett-Packard Corp. SICL uses a methodology of creating APIs with interface independence that includes a purely top-down approach, which merges the capabilities of a group of hardware interfaces into a two-piece API. The first element of the API includes the overlap between all of the interfaces, referred to as the core, and the second element is the set of all of the interface-specific routines. Another attempt to create an I/O interface independent layer similar to SICL is EPconnect from Radisys Corp. EPconnect provides low level control of VXI systems at the hardware driver level. A companion product referred to as MDS is a software layer that is layered on top of EPconnect and NI-488 driver level software to provide interface independence.

The top down interface independence approach attempts to create a common API among two or more types of hardware interfaces. In other words, top down interface independence involves creating an API that uses the same set of functions for similar capabilities between different instrument control hardware, for example, making GPIB reads and writes use the same API functions as RS-232 reads and writes. The process of creating an interface independent API using the top-down approach involves determining the different hardware interfaces to combine, compiling a list of the capabilities of each of the hardware interfaces (read, write, abort, config, and so on), and merging these lists to create a list of overlapping, or core functionality.

In instrumentation control systems, the list of core functionality generally only includes message-based control commands, i.e., message read, message write, software trigger, get status, clear, and some form of asynchronous event handling. Most other functionality of instrumentation control systems would be placed into interface-specific functions or a catch-all function. This other functionality includes all interrupt handling (except possibly for service request), memory mapping, interface configuration, hardware-level triggering, and so on.

A common problem in creating interface-independent APIs using the top down approach is that capabilities may be incorrectly merged. This results in functions within the API that can have completely different results when acting on different interfaces even when the parameters are identical. For example, a user may specify a function reset which, acting on one interface simply resets the internal state of a particular interface type, while on another interface type results in rebooting the entire instrument and/or system. A specific example of this is the reset command specified to perform an IFC in a GPIB environment and the SYSRESET function in a VXI environment.

While the top down approach to interface independence has merits, it does not fulfill most expectations. One expectation programmers typically have is that they need only use the interface-independent functions for the vast majority of code written. For these programmers, interface independence is of great benefit to them only if they do not need to know any of the details about the interface being programmed. If even a single interface-specific function call is needed to make a particular application work (such as set serial port baud rate before doing a read or write operation), then the core functions were inadequate as interface-independent functions.

The top-down interface-independence approach has some benefits, including the fact that some aspects of the control of the system are made truly interface independent. For example, common services (such as formatted I/O for message-based devices) can be layered on top of the message-level API functions for the benefit of all supported interfaces, a common open/close mechanism is available, and one common interrupt installation and handling method can be created. Despite the above benefits, top down interface independence has significant drawbacks. For example, the top down interface independence approach assumes that programmers will be satisfied with the limited view of independence described above. Interface independence provides an interface to the user that is the intersection of all supported interfaces. It would be highly desirable to provide a common API for different types of interfaces which also provides the same view of the device features regardless of the interface features.

Another drawback is that interface independence is only a benefit when porting from one interface to another with exactly the same type of implementation (same messaging scheme, same interrupt generation, same trigger method). If any interface-specific configuration is performed through interface-specific calls, the benefits of portability and commonality of code are undermined.

Another drawback is that keeping only interface-independent calls in the API, with possibly some interface-specific functionality, can significantly limit feature benefits, and possibly limit performance benefits. Also, interface independence limits the extensibility of the API. If the initial set of supported interfaces have a feature that is specific to one interface, this feature is placed into an interface-dependent section and given an interface-specific name. After time, if a new interface is added that contains this feature, the new interface must be kept separate from the existing feature or named as if it were the feature of the other interface type. In addition, only a very limited number of interrupts are truly common to all interfaces, and thus most interrupts will be interface dependent.

Another drawback is that interface independence assumes that all aspects of the physical device or interface being controlled are to be controlled from a common source. In other words, different applications cannot manage individual parts of an interface such as interrupt or trigger lines at the same time. This presents problems on a distributed environment. Finally, interface independence cannot accommodate combining individual features of different interfaces or devices with a single logical reference. Many system consistency problems can occur unless all of the resources required to operate a particular application can be guaranteed to be allocated, deallocated, locked, and so on, i.e., resource management problems.

E-Systems is currently developing a product that is situated above the driver level software level that provides some measure of interface independence. However, since this product is layered above the driver level layer, this product suffers from the same drawbacks described above.

Therefore, a method and apparatus is desired which provides a consistent software architecture for control of instrumentations systems. A method and apparatus is desired for control of an instrumentation system which provides a more complete I/O interface independence. A method and apparatus is also desired which provides a more consistent mechanism for developing instrument drivers and instrumentation control software.

SUMMARY OF THE INVENTION

The present invention comprises a method and apparatus for controlling instrumentation systems and for providing a user with the capability to develop instrument drivers and application software for controlling instrumentation systems. The present invention provides a software architecture which defines the control and management of an instrumentation system. The method of the present invention utilizes a device resource independence approach whereby the individual capabilities of devices are broken down into a plurality of objects called resources and these resources are then used to develop instrument drivers or instrument control applications. The method of the present invention also uses object oriented technology which allows device resources to be easily combined to create higher level applications. The present invention is independent of I/O interface type, operating system, and programming language while also providing a common look and feel and consistent API to the user.

Thus the present invention provides a single I/O interface or library which enables a user to control all types of instruments using any of the various types of I/O interfaces. Due to its object oriented nature, the present invention can operate transparently in distributed environments. In addition, although the present invention offers a number of new capabilities for programming instruments, the present invention includes a method which allows backwards compatibility with the installed base of existing instrumentation software.

The preferred embodiment of the present invention includes a VISA Resource Template resource that operates as a base class resource from which all other resources receive their interface. The present invention also includes a runtime resource manager referred to as the VISA Resource Manager, which acts as the primary runtime resource manager. The present invention further includes a plurality of resource classes which each represent the smallest, logical, divisible capability of an instrument, and these resource classes act as building blocks for user applications. An instrumentation system according to the preferred embodiment also includes various utilities for installation and configuration, including a startup resource manager, a VISA Interactive Control utility for investigating the system, a configuration utility, a monitor utility, a resource generation utility, and an install utility.

A resource class generally is a definition of a particular capability of a device (such as read, write, trigger, etc.). A resource class is also the specific definition of how to create a resource, i.e., a template for the creation of resources. For example, a device might have a GPIB port that includes one or more read ports, write ports, status bytes, and so on, and/or the device could have a VXI port that provides control over individual TTL triggers, ECL triggers, VXI interrupt lines, as well as message-level communication. Each of these capabilities is a resource. Each resource can have a set of characteristics called attributes associated with it. For example, an individual GPIB write port resource would have an attribute of End of Transfer Mode (send EOI with the last byte of the transfer) while a VXI interrupt resource would have an attribute of enabled/disabled for reception.

A resource is a particular implementation or instance of a resource class. In general, the term "resource" is synonymous with the connotation of the word "object" in object-oriented architectures. Thus a resource is a particular implementation (or "instance" in object-oriented terms) of a resource class. More particularly, a resource is the particular instance of an instrument control resource class for a specific capability of a specific device in the system (e.g. a GPIB read port of a GPIB device at primary address 5). Resources fall into one of two general types, these being a basic resource and a compound resource. A basic resource is a wholly contained software module that does not require other resources for operation. A compound resource is a software module that utilizes one or more basic and/or compound resources to provide a higher level of operation.

A resource comprises three elements: a set of attributes associated with the resource, a set of events that are asynchronously received by the resource, and a set of operations that control the resource. For example, a commander read port for a device might have attributes such as end of string character, timeout value, and protocol; one event might be a user abort; the only operation other than basic template operations would be a read operation (with parameters of a buffer and a number of bytes to transfer).

A session is a term used to designate a communication channel between a user's application and a resource. In essence, a session is an instance of a resource, much the same way a resource is an instance of a resource class. Resources can have multiple sessions open to them. In addition, a resource can control one or more other resources.

The preferred embodiment includes a grouping of resource classes referred to as the instrument control resource classes for controlling GPIB, VXI, and serial instruments as well as data acquisition boards. The instrument control resource classes can be logically partitioned into common resource classes and device-specific resource classes. Common resource classes are those class definitions that have some commonality with one or more types of devices (e.g. both GPIB and VXI or both VXI and a trigger board) or that can be defined in a manner such that the resource class is independent of the device with which it is communicating (e.g. formatted I/O). Specific physical device resource classes (also called hardware-specific classes) are those resource classes that have no commonality with other types of resource classes and are used to control device and/or interface level features specifically for a single type of device.

The VISA Resource Template defines an interface including a well-defined set of services that is used by all resources, i.e., each VISA resource derives its interface from the VISA Resource Template. The VISA Resource Template defines a set of control services including location and searching, life cycle control, characteristic control, and access control. The location and search services include services for finding a resource in order to establish a communication link to the resource. The location and search service uses an operation referred to as viFindRsrc. The life cycle control services include the creation and deletion of sessions or links to resources and include operations referred to as viOpen, viClose, viAttachRsrc, viDetachRsrc, and viTerminate. The characteristic control services include operations which manipulate attributes to set and retrieve the status of resources, including operations referred to as viSetAttribute, viSetRsrcAttribute, viGetAttribute, and viGetRsrcAttribute. The access control services are used to control the types of accesses that can be made to resources, including operations referred to as viLock(), viLockRsrc(), viUnlock(), and viUnlockRsrc().

The VISA Resource Template also defines various communications services among resources and between applications and resources. The two methods of communication among resources and between applications are operation invocation, i.e., invoking operations on a resource, and the exchange of information through events. After establishing a session to a resource, an application can communicate with the resource by invoking operations on the resource. These operations include the operations defined in the VISA Resource Template described above as well as the operations supported by the particular resource. The resource and application exchange information through the parameters of the operations. The VISA Resource Template also defines event reporting, including callbacks, queueing, and waiting services for resources during system events, exceptions, and resource defined events.

The VISA Resource Manager derives its interface from the VISA Resource Template and is responsible for managing, controlling, and distributing resources within the system, including the instrument control resources. The VISA Resource Manager shields resource implementations from having to know about most details of resource management and distribution of instrument control resources within a system.

Applications use the VISA Resource Manager to create sessions with particular resources within a system. The VISA Resource Manager presents a common interface to all instrument control resources in the system regardless of their physical location. The VISA Resource Manager includes the following responsibilities: registration of resources (from the system point of view), un-registration of resources, locating resources (location search), management of session creation, modification and retrieval of resource attributes, operation invocation, event reporting, and access control, among others. The VISA Resource Manager includes an API for these management needs, and all defined resources may use these capabilities.

The VISA Resource Manager allows a user to open a session to any resource in the system, including only single device capabilities such as a single trigger line or single write port on a device. In one embodiment of the invention, the instrument control resources include a resource referred to as the VISA Instrument Control Organizer Resource (VICO) which allows for the creation of user-defined resource groupings (virtual instruments) of the instrument control resources. A virtual instrument, in this context, is a name given to a unique session to a resource to provide the functionality of a traditional, stand-alone instrument. VICO is included in this embodiment to provide a higher level user interface so that users can communicate with instrumentation at a higher level of abstraction. VICO is a resource similar to other resources in the system, but is unique, however, in the sense that it serves only one unique service specifically for the instrument control resources. Thus VICO encapsulates features of the resources for users who require a simple interface.

At startup of the system, a method is invoked which configures the instrumentation system. This method involves determining the respective hardware and instruments available within the system as well as determining the logical address of the respective instruments in this system. The method determines the classes available within the system and uses the determined classes and the hardware configuration to create or instantiate resources. These newly created resources are then registered with the VISA Resource Manager so that the VISA Resource Manager is aware of their presence. The registration process comprises providing entry points of the resource to the VISA Resource Manager, including a description of the operation, a description of the attributes, a description of the exit conditions, the location of the files, and a description of the files themselves. Due to the hierarchical nature in which some resources use other resources for their operation, the instantiation and registration process may require the creation and instantiation of other resources.

Once a plurality of resources have been created and registered with the VISA Resource Manager, these resources can be used to create instrument control applications. In the present disclosure, the user of a VISA system can either be a client or developer. A client uses the resources in a VISA system to create applications, such as instruments drivers, that are not themselves resources. A developer, on the other hand, uses resources as a client or incorporates functionality from the resources available in a VISA system to create higher level applications that are resources. A developer can create a higher level resource that uses other resources, much the same way that a client uses resources, or the developer can create a higher level resource that incorporates functionality from one or more resources. As an example of a higher level resource, a developer can develop a resource that embodies all of the functionality of a type of instrument, such as a voltmeter. This resource can then be used to control any type of voltmeter using any type of I/O interface.

As discussed above, the present invention utilizes a device resource independence approach which differs from the top down interface independence approach used in the prior art. One key difference between the device resource independence method of the present invention and the top down approach is that an instrumentation system with device resource independence is controlled by the user from the point of view of the individual capabilities of the devices themselves. In the interface-independent approach, the view is on the commonality of capabilities and control of the interfaces that control these devices. A key problem with the interface-independent model is that programmers actually create applications to control instrumentation systems from the point of view of the physical devices, not the interfaces that are connected to them. The present invention allows a programmer to be concerned only with the individual capabilities of the device itself—not with the interface type, how it supports individual features, or its proximity.

Some of the benefits of the device resource independence method of the present invention for controlling instrumentation systems vs. the top down interface independence method are as follows. First, even though interface independence allows some of the control of the system to be made truly interface independent, the device resource independence method of the present invention allows the features common to any devices to be independent, not just the features that are common to the interfaces. Device resource independence also allows common services to be layered on top of many more device capabilities, because more commonality exists. Further, device resource independence allows many elements to be the same regardless of I/O interface type. Thus, not only is the open/close mechanism the same but so are the means for configuring devices/resources, locating device capabilities, setting device capability attributes, and managing the device resources in general.

With device resource independence, the programmer sees the system from the point of view of the devices, rather than the interface. Thus, each feature that is common to a device but not to an interface is given independence. With interface independence, independence tends to be limited to message-based communication. The device resource independence model is based on individual device capabilities and is not restricted to the previous decisions made about the divisions of interface capabilities. With device resource independence, breaking down device capabilities into their smallest, logical divisions makes it possible to individually manage each device capability. Management capabilities include allocating, deallocating, locking, handling events, controlling attributes, and so on. This capability is not restricted to the sum total of the capabilities of the core functionality across interfaces or devices.

Therefore, the device resource independence model provides a significant number of benefits over the prior art top-down interface design. The benefits stem from the fact that the model views the system from the point of view of the individual device capabilities. The ability to control and manage each of these capabilities independently and group them in any combination achieves the greatest possible flexibility and independence.

BRIEF DESCRIPTION OF THE DRAWINGS

A better understanding of the present invention can be obtained when the following detailed description of the preferred embodiment is considered in conjunction with the following drawings, in which:

FIG. 37 illustrates a non-VISA C language application for a message based GPIB instrument;

FIG. 41 illustrates a VISA C language-type application using event queueing;

FIG. 42 illustrates a VISA C language-type application using event callbacks.

DETAILED DESCRIPTION OF THE PREFERRED EMBODIMENT

The preferred embodiment of the invention is adapted for instrumentation control systems. However, it is noted that the method and apparatus of the present invention discloses a software architecture model that has numerous other applications in any of a number of fields. The following disclosure describes the preferred embodiment of the invention in an instrumentation control system application.

Appendices

The present application includes two microfiche Appendices labelled Appendix 1 and Appendix 2. Appendix 1 is the specification of a VISA system according to the preferred embodiment of the present invention, by which one skilled in the art could make and use a VISA system according to the preferred embodiment of the present invention. Appendix 2 discloses the manner in which a non-VISA application, specifically an application conforming to the Standard Instrument Control Library (SICL), maps to a VISA system according to the preferred embodiment of the present invention. Appendices 1 and 2 comprise part of this specification as though fully and completely set forth herein. Appendices 1 and 2 are included as a microfiche appendix to the present application.

Instrumentation I/O Interface Options

Figure 1:
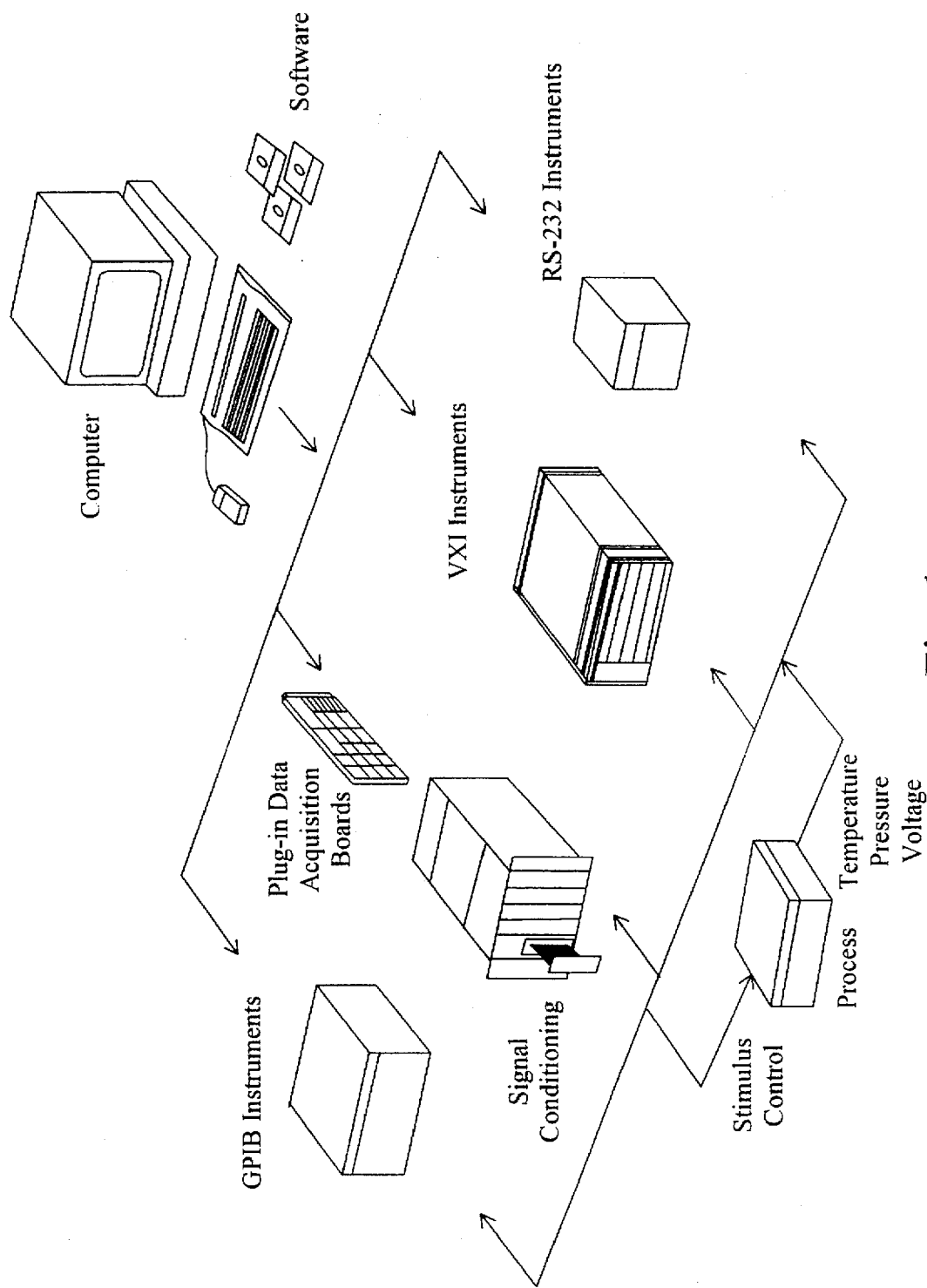
FIGS. 1 and 2 illustrate representative instrumentation control systems of the present invention including various I/O interface options.
Figure 2:
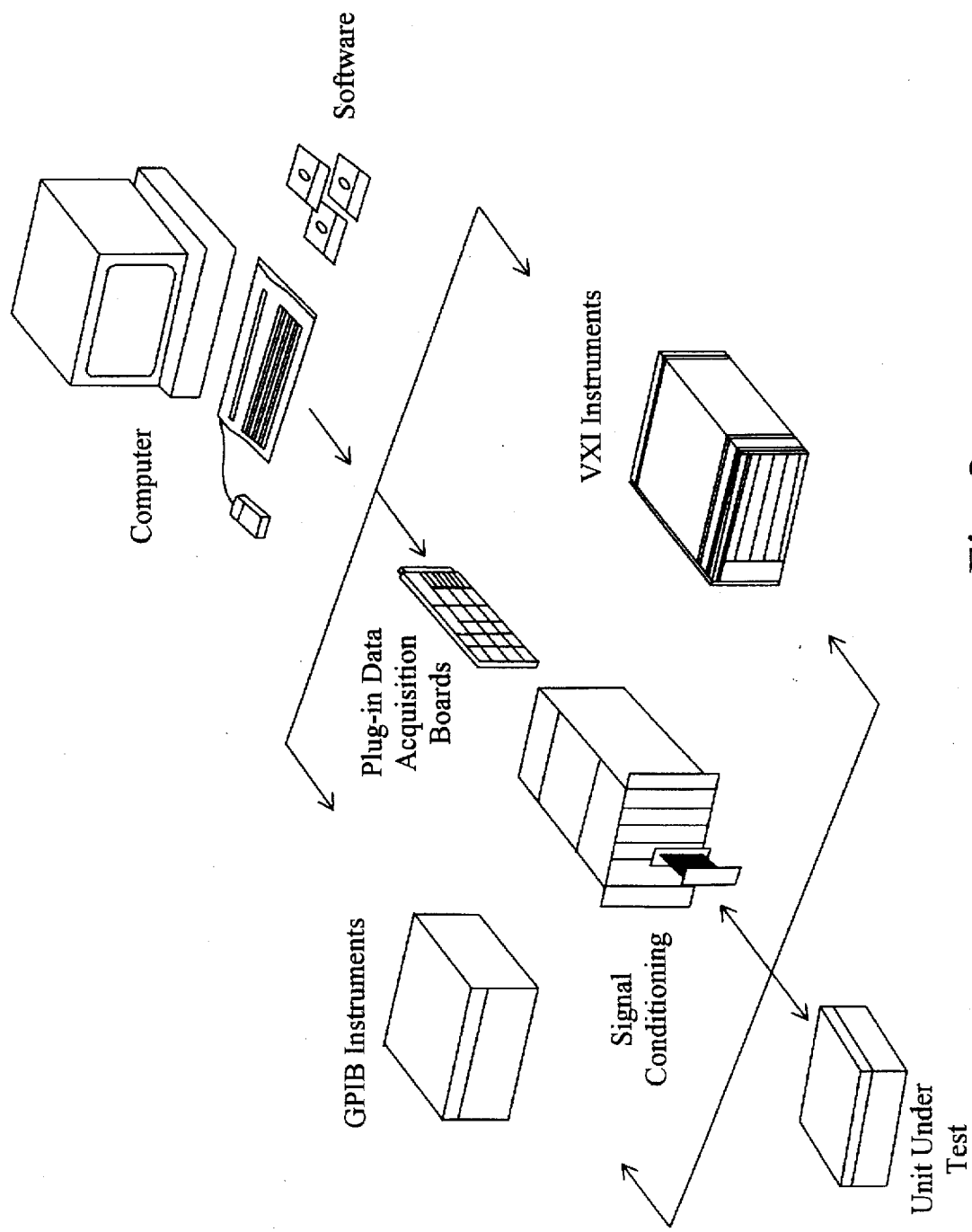

Referring now to FIGS. 1 and 2, the various hardware I/O interface options currently available for instrumentation systems are shown. FIG. 1 illustrates the choices available in a data acquisition and control application, and FIG. 2 illustrates the choices available in a test and measurement application. As shown, a computer system can interface with a process or unit under test using a number of methods, including IEEE 488-controlled instruments (GPIB instruments), plug-in data acquisition (DAQ) boards, RS-232-controlled (serial) instruments, and VXI bus instruments.

Computer System Block Diagram

Figure 3:
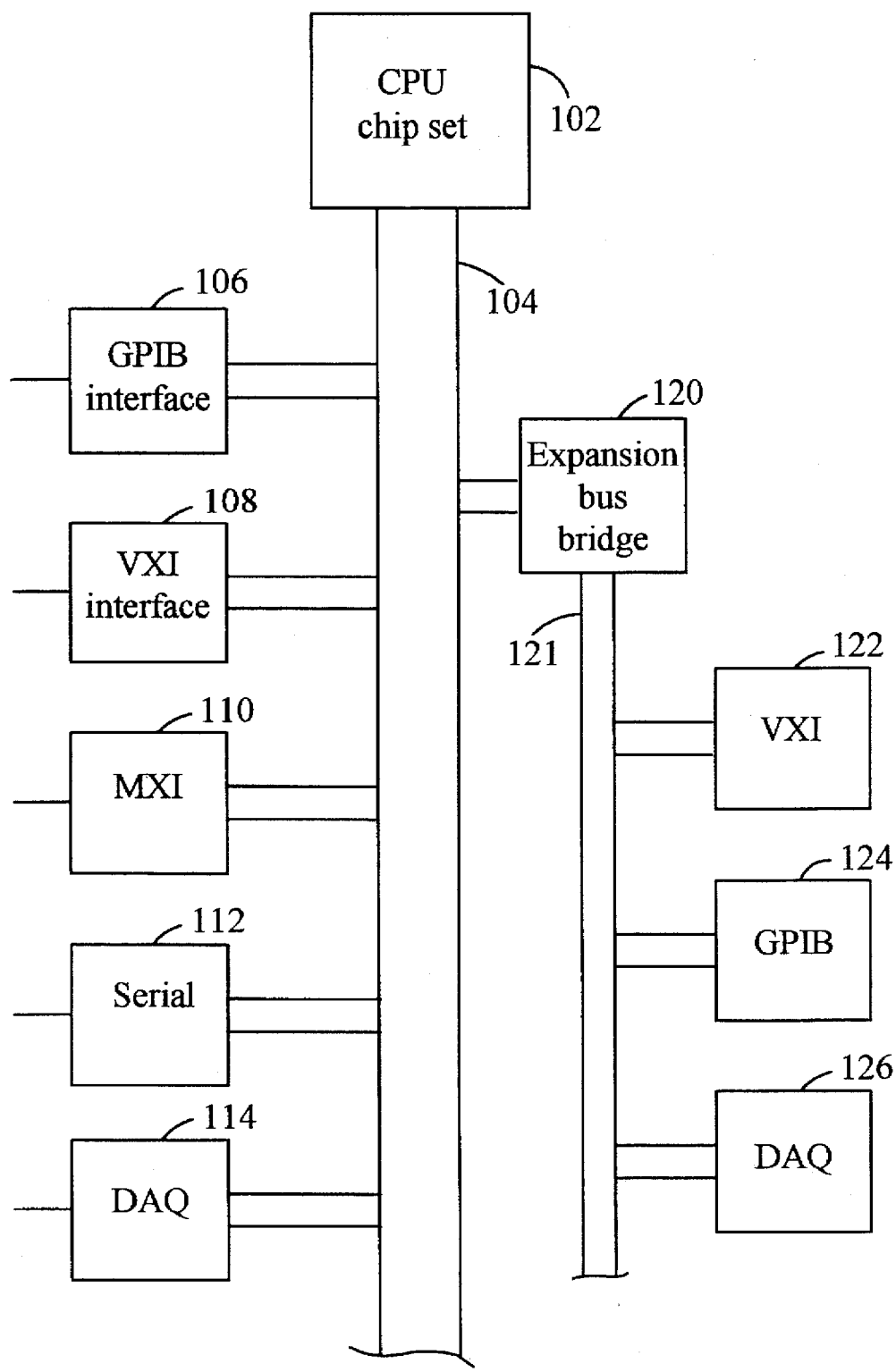
FIG. 3 is a block diagram of a computer system used to control an instrumentation system.

Referring now to FIG. 3, a block diagram of the computer system illustrated in FIGS. 1 and 2 is shown. It is noted that any type of computer system configuration can be used as desired, and FIG. 3 illustrates a representative embodiment. It is also noted that the computer system may be a general purpose computer system as shown in FIGS. 1 and 2, a computer implemented on a VXI card installed in a VXI chassis, or other types of embodiments. As shown, the computer system includes a central processing unit (CPU) 102 which includes a CPU bus 104. The CPU bus 104 is preferably a Peripheral Component Interconnect (PCI) bus, although other types of buses may be used. A GPIB control block 106 connects to the CPU bus 104 and interfaces the CPU 102 to one or more GPIB instruments, as desired. The GPIB control block 106 is preferably the TNT4882 chip produced by National Instruments Corp. A VXI control block 108 couples between the CPU bus 104 and one or more VXI instruments. A MXI interface 110 interfaces the CPU 102 to one or more MXI instruments and a serial interface 112 interfaces to one or more serial instruments. A data acquisition card 114 receives data from a device or unit under test (UUT) and provides this data to the CPU 102. An expansion bus bridge 120 is coupled between the CPU bus 104 and an expansion bus 121. The expansion bus 121 may be any of a number of types, including an AT or ISA (Industry Standard Architecture) bus, MCA (MicroChannel Architecture) bus, EISA (Extended Industry Standard Architecture) bus, NuBus, etc. A VXI interface 122, GPIB interface 124, and DAQ interface 126 are preferably coupled to the expansion bus 121, as shown.

Software Architecture (prior art)

Figure 4:
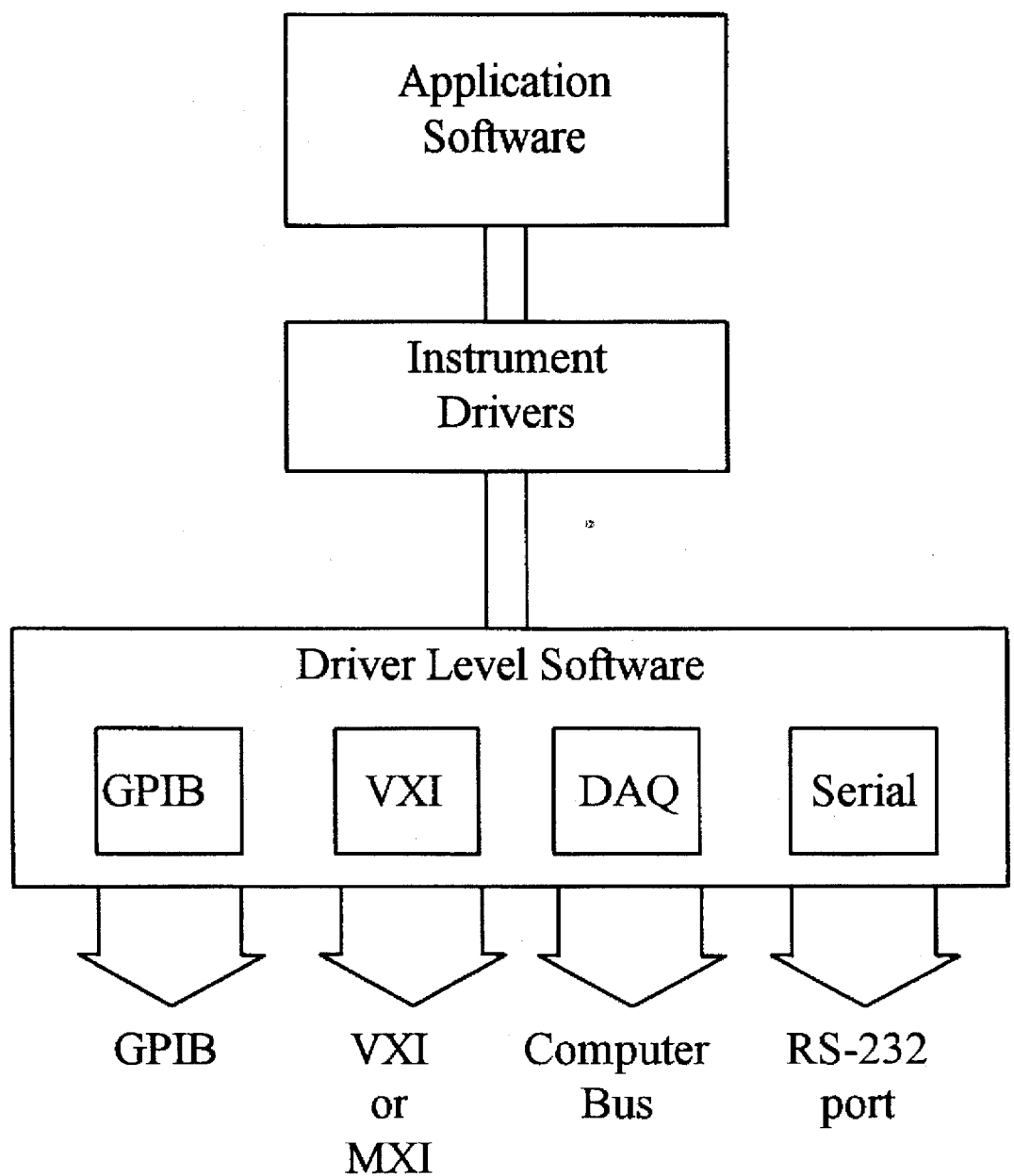
FIG. 4 illustrates the current software architecture for instrumentation systems.

Referring now to FIG. 4, a diagram illustrating a representative software architecture for an instrumentation system is shown. As discussed in the background section, the top level of the software architecture typically comprises an applications program used for high level control of the virtual instrument. The applications programs typically operate in conjunction with one or more instrument drivers to interface to actual physical instruments. The instrument drivers are designed to reduce a user's application development time by providing intuitive high level functions that relieve the user of complex low level instrument programming.

A software level referred to as driver level software or I/O control software is below the instrument driver level. Driver level software is used to interface the commands in the instrument driver to the actual hardware interface being used, such as a GPIB interface card, a data acquisition card, or a VXI card. In other words, driver level software handles the details of communication, i.e., the transfer of commands and data, over a physical connection between the computer and instruments.

Software Architecture of the Present Invention

Figure 5:
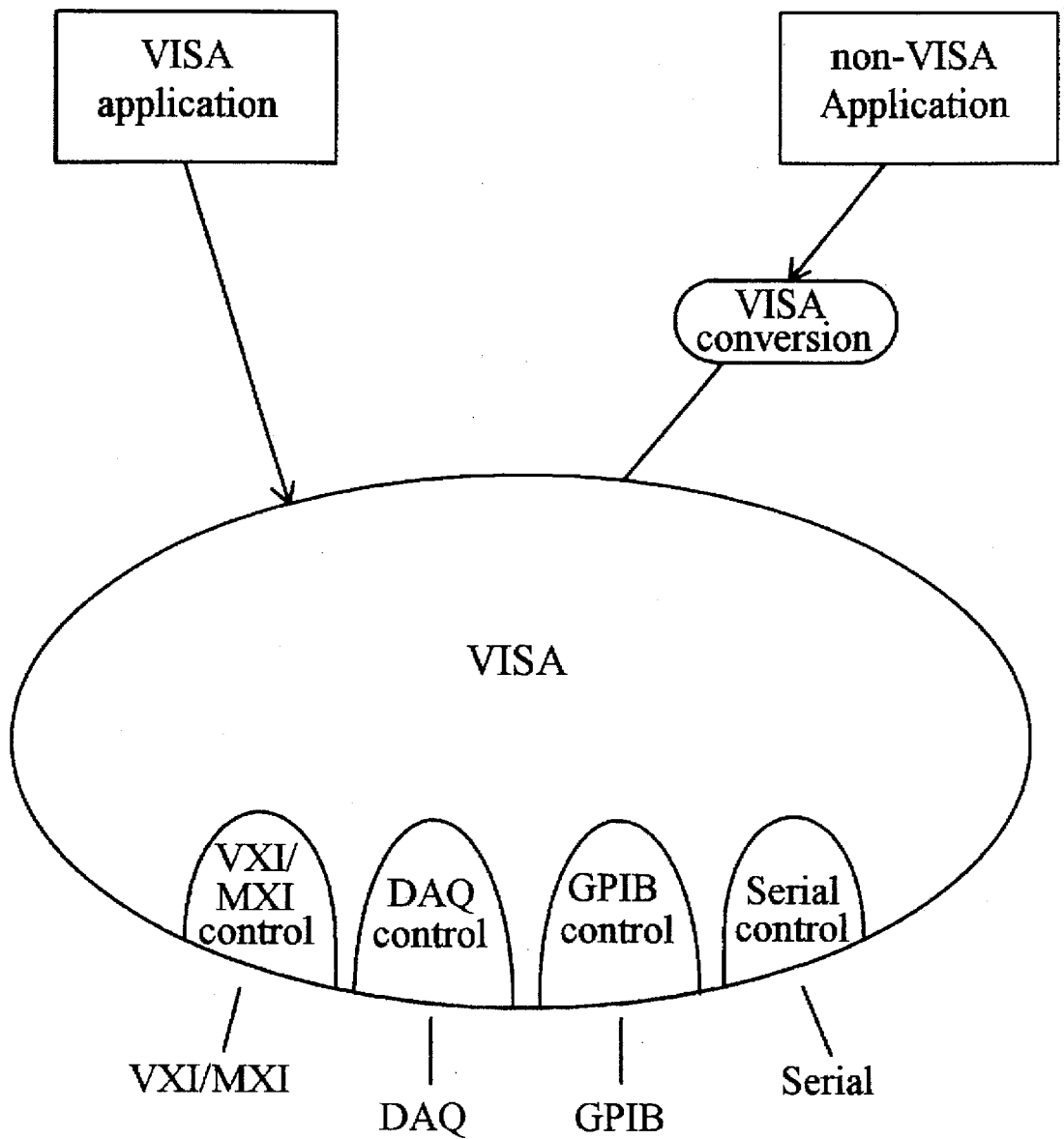
FIG. 5 illustrates the VISA software architecture of the present invention.

The present invention comprises a method and apparatus which performs I/O control or driver level control of an instrumentation system. The method and apparatus of the present invention is also preferably used as building blocks for the creation of instrument drivers and applications software, as described below. In the present disclosure, the present invention is based on a software architecture referred to as the Virtual Instrument Software Architecture (VISA), and a system developed according to the present invention can be referred to as a VISA system. Referring now to FIG. 5, a diagram illustrating the software architecture of the preferred embodiment of the present invention is shown. As shown, an application created according to the method of the present invention, referred to as a VISA application, interfaces directly to a VISA system which in turn interfaces directly to hardware. FIG. 5 also illustrates a non-VISA application, i.e., a software application which was not developed according to the method and apparatus of the present invention. A non-VISA application can comprise an application developed to conform to other driver level software standards, including NI-VXI, NI-488, and NI-DAQ from National Instruments Corp., or the Standard Instruments Control Library (SICL) from Hewlett-Packard, among others. A non-VISA application interfaces to a VISA system through a VISA conversion method according to the present invention. A VISA conversion method which converts SICL application commands to VISA commands according to the present invention is described in Appendix 2.

The present invention utilizes a device resource independence model which involves breaking a device down into its individual, nonoverlapping (orthogonal) capabilities. The present invention also uses object oriented concepts to simplify the creation of higher level applications. The device resource independence model and its object oriented nature enable the present invention to be independent of I/O interface type, operating system, and programming language. Thus the present invention provides a single I/O interface or library which enables a user to control all types of instruments using any of the various types of I/O interfaces. Due to its object oriented nature, the present invention can operate transparently in distributed environments. In other words, the object oriented nature of VISA provides a direct mechanism for the distribution of I/O control software modules across any type of network. Also, the programming model of the present invention is the same regardless of the location of a piece of VISA I/O control software and/or the location of the corresponding instrumentation hardware that the software controls. Further, the object oriented nature of the present invention allows a user to use the objects or resources provided to construct higher level resources, such as instrument drivers and/or applications software, as desired. In addition, although the present invention offers a number of new capabilities for programming instruments, the present invention includes a method which allows backwards compatibility with the installed base of existing instrumentation software.

A VISA system according to the present invention utilizes a model based on elements or objects referred to as resources that encapsulate virtual instrumentation functionality. Each resource provides services to its client, wherein the client can either be another resource or an end-user application. A VISA system includes elements referred to as resource classes which are used to classify or organize resources according to the type of functionality they provide. This enables VISA resources to provide these services in a consistent and efficient manner. A resource instance, on the other hand, provides access to a particular instance of this class resource in the system. A resource class specifies the interface for a resource instance, including its creation and destruction mechanism. A metaclass resource defines the way in which the interface to a class is defined.

A resource class generally refers to the definition of a particular capability of a device (such as read, write, trigger, etc.). A resource class can also be defined as the specific definition of how to create a resource, i.e., a template for the creation of resources.

A resource is a particular implementation (or "instance" in object-oriented terms) of a resource class. In general, the term "resource" is synonymous with the connotation of the word "object" in object-oriented architectures. In the preferred embodiment of the invention, every defined software module is a resource. In the preferred embodiment, a resource is defined as the smallest, logical, divisible capability of an instrumentation device controllable through its external connections. For example, a device might have a GPIB port that includes one or more read ports, write ports, status bytes, and so on, and/or the device could have a VXI port that provides control over individual TTL triggers, ECL triggers, VXI interrupt lines, as well as message-level communication. Each of these capabilities is a resource. Each resource has a set of characteristics called attributes associated with the resource. For example, an individual GPIB write port resource would have an attribute of End of Transfer Mode (send EOI with the last byte of the transfer) while a VXI interrupt resource would have an attribute of enabled/disabled.

Resources fall into one of two general types, these being a basic resource and a compound resource. A basic resource is a wholly contained software module that does not require other resources for operation. A compound resource is a software module that hierarchically utilizes one or more basic and/or compound resources to provide a higher level of operation. An example of a basic resource is the Trigger Resource, which is directly associated with an individual hardware or software trigger and does not require other resources for operation. An example of a compound resource is the High Level Access Resource, which utilizes the Low Level Access Resource to perform its operations.

Therefore, a resource class in the preferred embodiment is essentially a definition of a particular capability of a device, i.e., the specific definition of how to create one or more particular instrument control resources. A resource is the particular instance of an instrument control resource class for a specific capability of a specific device in the system. Thus one difference between a resource and a resource class is that a resource class does not control device capabilities. A resource class is used to create resources that control device capabilities. More specifically, a resource class is a template for the creation of resources that are bound to the control of individual device's specific device capabilities. An example of a resource class is a class that can be used to create a resource that can control any particular GPIB device's read port. An example of a resource created from this resource class is the read port within a particular GPIB system on a particular GPIB device at a particular GPIB primary address (e.g. a GPIB read port of a GPIB device at primary address 5). At any point in time, there is one resource for each capability of each device in the system.

A resource comprises three elements: a set of attributes associated with the resource, a set of events that can asynchronously act on the resource or be generated from the resource, and a set of operations that control the resource. As an example, a commander read port for a device might have attributes such as end of string character, timeout value, and protocol; one event might be a user abort; and the only operation would be a read operation (with parameters of a buffer and a number of bytes to transfer).

An attribute is a value within a resource which reflects a characteristic of the operational state of the resource. A user's application reads an attribute value to determine the current state of the resource, for example, how the resource is processing an operation, or how the resource should operate when something occurs. A user application sets an attribute to change the way in which the resource operates. For example, if a user's application desires to use a command or write resource and wants to use a direct memory access (DMA) method, the user's application would set the attribute transfer mode to DMA and then perform the write operation. In this manner, an attribute changes the characteristics in which a resource operates.

An event is an asynchronous occurrence that can arrive independently of normal sequential execution of the process running in a system. Examples of events include, but are not limited to items such as hardware interrupts, signals, and system messages (i.e., a system failure notification). The events that can occur in a VISA system include local events that are received by only a single resource and global events that can effect more than one resource. In the preferred embodiment, local events are handled by the resource that receives them, and global events are handled by the VISA Resource Manager resource. In a VISA system, events allow information exchange.

An operation is an action defined by a response that can be performed on a resource and operations are the primary method of communication among resources and between applications. After a session is established between an application and a resource, the application can communicate with the resource by invoking operations on the resource. Each resource describes the operations which it supports (which are described further below) and the resource and the application exchange information through the parameters of the operations.

A session is a term used to designate a communication channel between a user's application and a resource. In other words, a session is a communication channel that binds an application and a resource. In essence, a session is an instance of a resource, much the same way a resource is an instance of a resource class.

In the C++ programming language, a resource class is preferably implemented as a C++ class. A resource instance or resource is implemented in C++ as an instance of the class. A session is preferably implemented by creating a data structure that mirrors the resource instance and also includes references to local data that is local to the session. This involves allocating memory for a new structure, creating a mirror of the resource and providing the session with a reference to local data that is local to the session.

Resource Attribute and Operation Data Types

The present invention uses a "Data Type" concept whereby the term Data Type is very similar to data types used in programming languages, for example, "int" in the C language, but is language independent. Any particular language mapping to a VISA system preferably has the concept of 8-, 16-, and 32-bit integers. A user's application or system creates concepts such as strings, pointers, and structures in a language-specific manner. Symbolic data type names are used to show logical association with data types from varying resources, attributes, or operations. The preferred embodiment of the invention includes two types of data types referred to as Basic Data Types and Complex Data Types. The data types used in the present invention and their logical meanings are described below.

| | Data Type Description |
|---|---|
| Basic Data Types | |
| ViChar | An 8-bit unsigned integer |
| ViString | A type for which the value represents the location of a series of NULL-terminated 8-bit unsigned integers |
| ViPString | The location of a ViString |

-continued

| | Data Type Description |
|---|---|
| ViBoolean | A type for which the value can be only VI_TRUE or VI_FALSE |
| ViInt8 | An 8-bit signed integer |
| ViInt16 | A 16-bit signed integer |
| ViInt32 | A 32-bit signed integer |
| ViInt64 | A 64-bit signed integer |
| ViUInt8 | An 8-bit unsigned integer |
| ViUInt16 | A 16-bit unsigned integer |
| ViUInt32 | A 32-bit unsigned integer |
| ViUInt64 | A 64-bit unsigned integer |
| ViPInt8 | The location of an 8-bit signed integer |
| ViPInt16 | The location of a 16-bit signed integer |
| ViPInt32 | The location of a 32-bit signed integer |
| ViPInt64 | The location of a 64-bit signed integer |
| ViPUInt8 | The location of an 8-bit unsigned integer |
| ViPUInt 16 | The location of a 16-bit unsigned integer |
| ViPUInt32 | The location of a 32-bit unsigned integer |
| ViPUInt64 | The location of a 64-bit unsigned integer |
| Complex Data Types | |
| ViSession | A defined type that contains a reference to all information necessary for the architect to manage a Communication channel with a resource |
| ViPSession | The location of a ViSession |
| ViStatus | An architect-defined type that contains values corresponding to VISA-defined Completion and Error termination codes |
| ViRsrc | A ViString type that is further restricted to adhere to the addressing grammar for resources as presented in Section 3: VISA Resource Manager Resource. |
| ViRsrcList | The location of a list (linear series) of ViRsrc types |
| ViClass | A ViString type that is further restricted to adhere to the class naming conventions of VISA |
| ViVersion | An architect-defined type that contains a reference to all information necessary for the architect to represent the current version of a resource |
| ViAttr | A ViString type that is further restricted to adhere to the list of known attribute name definitions |
| ViAccessMode | A defined type that specifies the different mechanisms that control access to a resource |
| ViAttrState | A value unique to the individual type of an attribute |
| ViPAttrState | The location of a ViAttrState |
| ViLock | A defined type that contains a reference to all information necessary for the architect to manage the association of a thread or process and session with a lock on a resource |
| ViEvent | A defined type that encapsulates the information necessary to generate or process an event |
| ViHndlr | A value representing an entry point to an operation (for use in callback-type operations) |
| ViPHndlr | The location of a ViHndlr |
| ViBuf | The location of a block of data |
| ViPBuf | The location of a ViBuf |
| ViVAList | The location of a variable list of parameters of differing types |
| ViJobId | A defined type that contains a reference to all information necessary for the architect to encapsulate the information necessary for a posted operation request |
| ViPJobId | The location of a particular ViJobId |
| ViJobStatus | A defined type that contains a reference to all information necessary for the architect to encapsulate the information necessary for the status of a posted operation request |
| ViPJobStatus | The location of a particular ViJobStatus |
| ViPhysAddr | A type that represents device/interface specific information concerning physical location within a system |
| ViSigPMask | A defined type that contains a reference to all information necessary for the architect to filter a range of signals from the set of all signals |
| ViSigMask | A defined type that contains a reference to all information necessary for the architect to filter a range of signals from the set of all signals |
| ViIntrMask | A defined type that contains a reference to all information necessary for the architect to filter a range of interrupts from the set of all interrupts |
| ViBusAddress | A type that represent the system dependent physical address |
| ViBusSize | A type that represent the system dependent physical address size |
| ViAddr | A type that references another data type, in cases where the other data type may vary depending on a particular context |

RESOURCE ADDRESS STRUCTURE

In order to be able to locate a resource and initiate a session to an available resource, the system of the present invention provides the capability to uniquely identify a resource and then establish a communication link to the resource. The present invention uses a consistent addressing scheme throughout the system for uniquely identifying a given resource in the system. In the preferred embodiment, each resource has a unique identifier to enable the addressing scheme to function correctly. This consistent addressing scheme enables a VISA system to search and locate resources in the VISA system regardless of where the resource is residing, i.e., the resource can be local to the host machine or in a distributed system, the resource can be located in a remote machine.

In the preferred embodiment, a Resource String is used for uniquely identifying a given resource in the system. A Resource String comprises an optional host identifier and a Resource Name. The grammar for forming a Resource Name, Resource String and host identifier is described below.

Resource Name

The resource name is the symbolic name associated with the resource and is usually the name of the resource class (e.g. WR for Write Resource Class) preceded by identifiers to distinguish the resource from other resources of the same class. The rules to form a Resource Name and to refer to a resource available in a VISA system are described below.

Special Characters and Literals

The special characters and literals used in the grammar of the present disclosure are described below.

The following character constants are defined in the present invention. The third column depicts their normal usage.

| Character | Description | Symbol |
|---|---|---|
| NL/LF | New Line/Line Feed | "\n" |
| HT | Horizontal Tab | "\t" |
| CR | Carriage Return | "\r" |
| FF | Form Feed | "\f" |
| SP | Blank Space(s) | " " |

The definitions of the character constants do not require any specified implementation, and it is noted that language or industry standards can be followed as appropriate.

Literals

| Literal | Definition |
|---|---|
| white_space | NL,LF,HT,CR,FF,SP |
| digit | "0","1" ... "9" |
| letter | "a","b" ... "z","A","B" ... "Z" |
| underscore | "_" |

Resource Name Grammar

Following is the grammar for the Resource Name. The rules are given in Bakus-Naur Form (BNF).

```
resourceName :=
              id|
              id :: resourceName
id :=
              nameId|
              numId
nameId :=
              character (character|digit|underscore)*
numId :=
              digit+
```

Examples of Resource Name

| Resource Name | Description |
|---|---|
| VXI0::1::WR | A Write Resource of the VXI device at logical address 1 in VXI interface VXI0. |
| VXI0::1::RD | A Read Resource of the VXI device at logical address 1 in VXI interface VXI0. |
| GPIB0::5::WR | A Write Resource of the GPIB device at primary address 5 in GPIB interface GPIB0. |

Resource String

In a distributed system, the Resource Name alone may not be sufficient to uniquely identify resources in the system. Resource String is a string comprising an optional host identifier (hostId) and a Resource Name. Every resource in a VISA system can be uniquely identified by a Resource String. This section specifies the rules to form a Resource String to refer to a resource available in a VISA system. It is noted that each resource in a VISA system has a Resource String that uniquely identifies that resource.

Resource String Grammar

The grammar for the Resource String is described below. The rules are given in Bakus-Naur Form (BNF).

```
resourceString :=
                 [::hostId::] resourceName
hostId :=
                 id|
                 id.hostId
resourceName :=
                 id|
                 id :: resourceName
id :=
                 nameId|
                 numId
nameId :=
                 character (character|digit|underscore)*
numId :=
                 digit+
```

Examples of Resource Name

| Resource Name | Description |
|---|---|
| VXI0::1::WR | A Write Resource of the VXI device at logical address 1 in VXI interface VXI0. |
| ::host0::VXI0::1::RD | A Read Resource of the VXI device at logical address 1 in VXI interface VXI0 in machine host0. |
| ::host0.network0::GPIB0::5::WR | A Write Resource of the GPIB device at primary address 5 in GPIB interface GPIB0 in machine host0 in network network0. |

In one embodiment of the invention, a double colon within an identifier indicates that the resource is located within the same host as the VISA resource manager, and a single colon within an identifier indicates that the resource is located on a different host, i.e., a different computer system.

RESOURCE DESCRIPTION

The following details the manner in which resources are described in the present application, i.e., the manner in which the attributes, events, and operations of resources are described in the application.

Attributes

The present application uses an Attribute Table and associated Descriptions to describe the attributes specific to individual resources. Attributes referred to as required attributes are implemented in the preferred embodiment. Attributes referred to as optional attributes are not required to be implemented in the preferred embodiment, but may be implemented as desired. The optional attributes are included in certain embodiments when a resource is implemented for a specific environment (e.g. GPIB, VXI) in order to guarantee consistent operation within a particular environment. The Attribute Table includes fields for the Symbolic Name, Access Privilege, Data Type, and Range.

The Symbolic Name column lists symbolic names that are used to designate a unique attribute when performing operations that reference the attribute, for example, retrieving or changing an attribute's value. The actual programmatic value of this name within a particular environment is environment specific.

The Access Privilege column denotes the modes in which an attribute can be accessed. The first column contains either "R/W" or "RO". R/W denotes that the attribute is both readable, i.e., its value retrievable, and writable, i.e., its value modifiable. RO denotes that this attribute can only be read and its value can be changed only as part of the general operation of the resource. The second column contains either "Local" or "Global" to denote whether the attribute is private to an individual session to the resource or public to all sessions of the resource, respectively. For example, if an attribute is RO and Global, then an individual session can only query the value of the attribute (RO), but cannot change the value of the attribute. Also, this attribute value is guaranteed to be common to all sessions to this resource, i.e., Global. If an attribute is both R/W and Local, then an individual session can retrieve or change its respective value related to operations on this resource without affecting other sessions that are also controlling this resource.

The Data Type column denotes a logical association of programming language data types in a non-programming, language-specific manner. Bindings to actual programming languages such as C and ADA are not part of this document.

The Range column designates the possible value that the sum of all of the implementations of a resource of this type can implement. The actual supported range values are specified by rules within the resources themselves. A standard error code is required for any unsupported values that are not required (VI_ERROR_ATTR_NSUP). In the case of symbolic names for range values, these names designate unique values compliant with the associated attribute data type.

Events

The present disclosure describes the events of a resource by specifying individual events implemented by the resource. In the preferred embodiment, a VISA system that implements a particular resource implements all events defined for the resource.

Operations

The present disclosure describes the operations of a resource using the following format:

1. Name (with Formal Parameter Names)

This portion of the operation description includes the name of the operation and a list of the formal parameter names.

2. Purpose and Description Statement

This field generally describes the operation, including a discussion of the functionality of the operation, the functionality of individual parameters, and the interrelation of particular sets of parameters.

3. Parameters

A table is included for each operation which lists each of the parameters for an operation with relevant information for the parameter. The Parameters table includes information regarding the Name, Direction, and Type of the parameter as well as a description of the parameter.

The Name column designates a symbolic name that is used when referencing actions/qualities about the associated parameter. The Direction column indicates whether the parameter is for Input and/or Output, i.e., whether the invoker of the operation supplies the value of the parameter (Input) and/or whether the invoker supplies the location to place a resultant value (Output). Input values are always passed by value and output values are passed by reference or by their location depending on the final language binding. The Type column designates the parameter as one of the predefined VISA data types as defined earlier. The type field provides a common place to perform one-to-one mappings to particular language bindings. The Description column simply gives a short description for the specific meaning of the data passed through the corresponding parameter.

Return Status

The return status comprises three sections: the Type section, Completion codes, and Error codes. The Type section is supplied to make it implicit as to the type of the variable returned from the corresponding operation. Although this type can be of any type, the current VISA specification generally returns only a single type, ViStatus, from all operations. Returning a single type with a single format provides a high level of consistency between operations. All Completion codes and Error codes follow one of the following formats:

The VI_SUCCESS* return code indicates that the operation completed in one of its non-error return states.

The VI_WARN* return code indicates that the operation did not complete but did not cause an error (e.g. when a parameter indicates to abort the operation if the operation cannot be completed immediately), or the operation completed but resulted in some erroneous condition that can indicate a problem.

The VI_ERROR* return code indicates that the operation did not complete successfully.

An asterisk (*) indicates that more characters may follow in the symbolic name. For a complete list of return codes, see Appendix 1, and more particularly Appendix C of Appendix 1 titled Resource Summary Information.

VISA SYSYTEM

Figure 6:
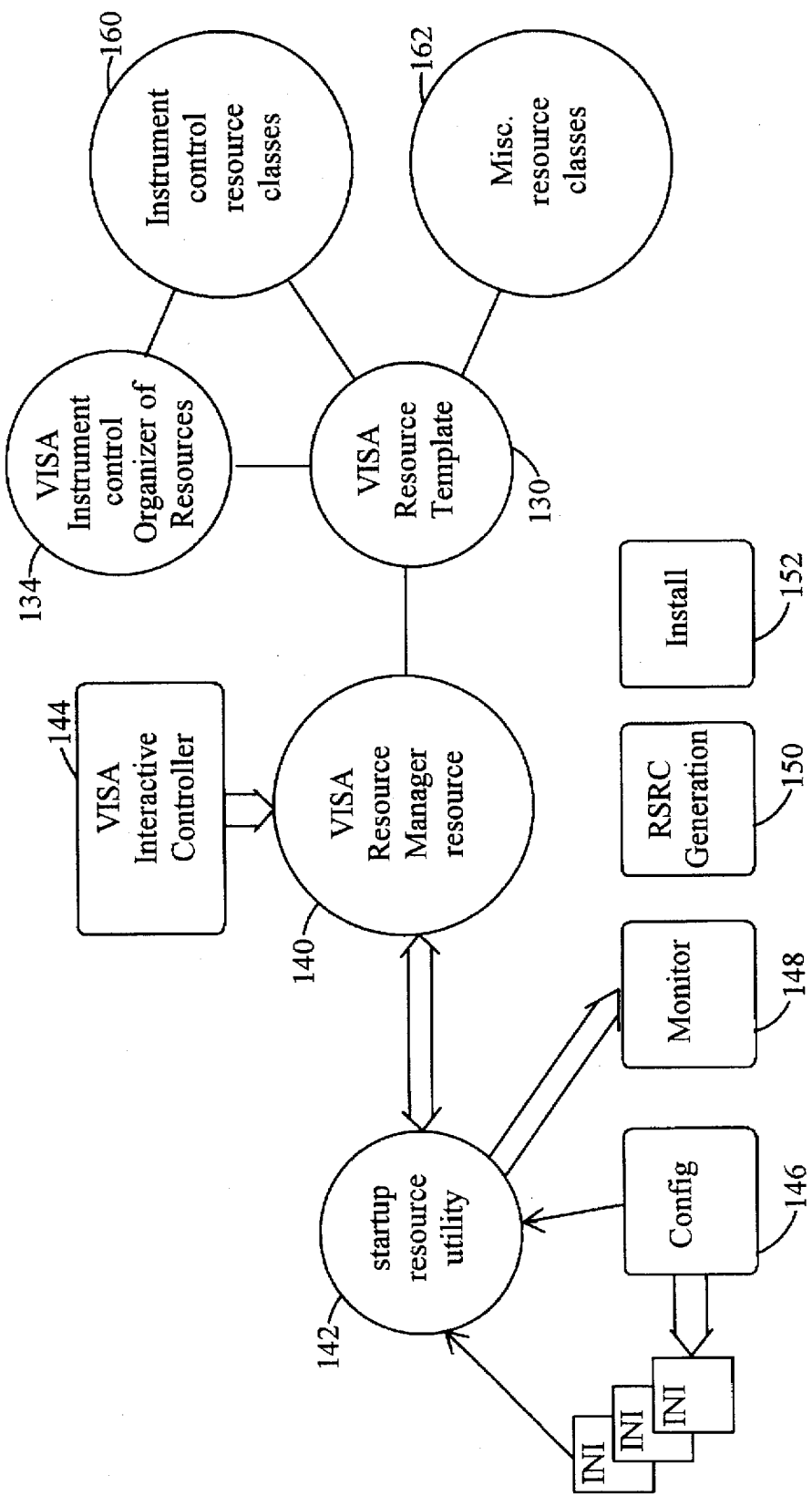
FIG. 6 illustrates the components of a VISA system according to the present invention.

Referring now to FIG. 6, the various elements comprising the preferred embodiment of the present invention are shown, including various utilities for installation and configuration. As shown, a VISA system includes a VISA Resource Template 130, a VISA Resource Manager resource 140, which acts as the primary or runtime resource manager, a startup resource utility 142, a VISA interactive controller 144, a configuration utility 146, a monitor utility 148, a resource generation utility 150, and an install utility 152. In addition, an instrumentation system according to the present invention includes a plurality of instrument control resource classes 160 as well as other resource classes 162, as desired.

which preferably incorporate their interface from the VISA Resource Template 130. The present invention may further include a VISA Instrument Control Organizer (VICO) resource 134 that incorporates its interface from the VISA Resource Template 130 and can be used to control the instrument control resource classes 160.

The instrument control resources 160 and other resources 162 act as building blocks for user applications. In the present disclosure the term "user" is intended to include a client which uses the available resources to create client applications as well as a developer who either uses or incorporates the available resources to develop new, possibly higher level, resources. It is noted that the present invention can include one or more additional runtime resource managers as well as additional groupings of resource classes for additional functionality, as desired.

The VISA Resource Template 130 is essentially a base class from which all new resources derive their interface. Each resource in a VISA system includes a set of basic capabilities, i.e., basic attributes, operations and events. The VISA Resource Template 130 allows a developer of new resources to reuse these basic capabilities which each resource requires.

In one embodiment of the invention, a VISA system includes a VISA Resource Metaclass (not shown) which defines the default manner in which resource classes are defined in a VISA system. In other words, the VISA Resource Metaclass defines the standard way in which resources are instantiated and destroyed.

The VISA Resource Manager 140 is responsible for managing, controlling, and distributing resources within the system, including instrument control resources. Applications use the VISA Resource Manager 140 to create sessions with particular resources within a system. In the present application, a session is defined as a communication channel with a resource within the system and a session designates a reference to an individual resource being controlled. The VISA Resource Manager 140 presents a common interface to all instrument control resources in the system regardless of their physical location. The VISA Resource Manager 140 includes the following responsibilities: creation and deletion of resources, finding resources (location search), session creation, modification and retrieval of individual resource attributes, operation invocation, event reporting, and concurrency control (locking), among others. The VISA Resource Manager 140 includes an API for these management needs and all defined resources may use these capabilities. The VISA Resource Manager 140 shields resource implementations from needing to know about most details of resource management and distribution of instrument control resources within a system. The VISA Resource Manager 140 is the runtime resource manager. In contrast, the startup resource utility 142 is invoked at startup and its function is to register the resources in the system with the VISA Resource Manager 140. The various operations, attributes, and events of the VISA Resource Manager resource 140 are discussed further below.

In the preferred embodiment, the instrument control resource classes 160 comprise resource classes for controlling GPIB, VXI, and serial instruments, as well as data acquisition (DAQ) boards. The instrument control resource classes can be logically partitioned into common resource classes and device-specific or interface-specific resource classes. Common resource classes are those class definitions that have some commonality with one or more types of devices (e.g. both GPIB and VXI or both VXI and a trigger board) or that can be defined in a manner such that the resource class is independent of the device or interface with which it is communicating (e.g. formatted I/O). Device-specific or interface-specific instrument control resource classes (also called hardware-specific resource classes) are those resource classes that have no commonality with other types of resource classes and are used to control specific devices and/or interface level features because the capabilities of the bus or connection to the device cannot be separated from the individual device. An example is the Interface clear line on the GPIB bus, which is a line that is bussed across the entire GPIB bus and thus affect other devices. The resource classes 162 may comprise classes for process control, among others.

A session is a term used to designate a communication channel between a user's application and a resource. A function call or operation on the VISA Resource Manager 140 referred to as viOpen instructs the VISA Resource Manager 140 to create a session between a resource and a user's application, which may also be a resource. In many instances it is desirable for more than one application to be able to control an instrument. In these instances it is necessary to have more than one communication channel to the respective resource that controls the respective capability of the instrument. The session is the mechanism used to project the interface for a resource out to the user application. Thus, a session is a communication channel that binds an application and a resource. In essence, a session is an instance of a resource, much the same way a resource is an instance of a resource class. Resources can have multiple sessions open to them. In addition, a resource can control one or more other resources. The VISA Resource Manager 140 allows a user to open a session to any resource in the system, including single device capabilities such as a single trigger line or a single write port on a device.

In one embodiment of the invention, a VISA system includes a resource referred to as the VISA Instrument Control Organizer (VICO) 134 which allows for the creation of user-defined resource groupings (virtual instruments). A virtual instrument, in this context, refers to a unique session to a resource to provide the functionality of a traditional, stand-alone instrument. The VICO 134 is included in this embodiment to provide a higher level user interface so that users can communicate with instrumentation at a higher level of abstraction. The VICO 134 is a resource similar to other resources in the system. VICO 134 is unique, however, in the sense that it serves only one unique service specifically for instrument control resources. With VICO 134, applications can create sessions that can communicate with any number and type of Instrument control resources. In other words, a single VICO session can control all aspects of one or more complete devices. Thus VICO 134 encapsulates features of the resources for users who require a simple interface.

The startup resource utility 142 registers and unregisters resources with the VISA Resource Manager 140 at startup, monitors VISA Resource Manager events, and provides the capability to monitor resources and events. The resource monitor utility 148 monitors the resources that are registered to the VISA Resource Manager 140 and also monitors active instantiations of resources to the VISA Resource Manager 140. The resource monitor 148 also monitors for specific events occurring in the VISA Resource Manager 140, and maintains a log or history of user specified VISA actions. The configuration utility 146 operates to modify default attributes for resources as directed by a user, as well as modify hardware information needed by the resource to find the hardware. The configuration utility 146 also notifies the resource manager of new resources in the system, creates aliases for groupings of resources, and informs the resource manager of these aliases.

The VISA interactive control utility 144 interactively and dynamically finds resources and executes methods of those resources. The VISA interactive control utility 144 also simulates VISA actions/events. It is noted that the capabilities of this utility are derived from the VISA application programming interface. The resource generation utility generates a resource usable by the configuration utility and the resource manager utility from a user defined set of entry points and structures. The Install utility 152 provides a common look and feel to installation of components within the VISA system.

EXAMPLE VISA SYSTEM

Figure 7:
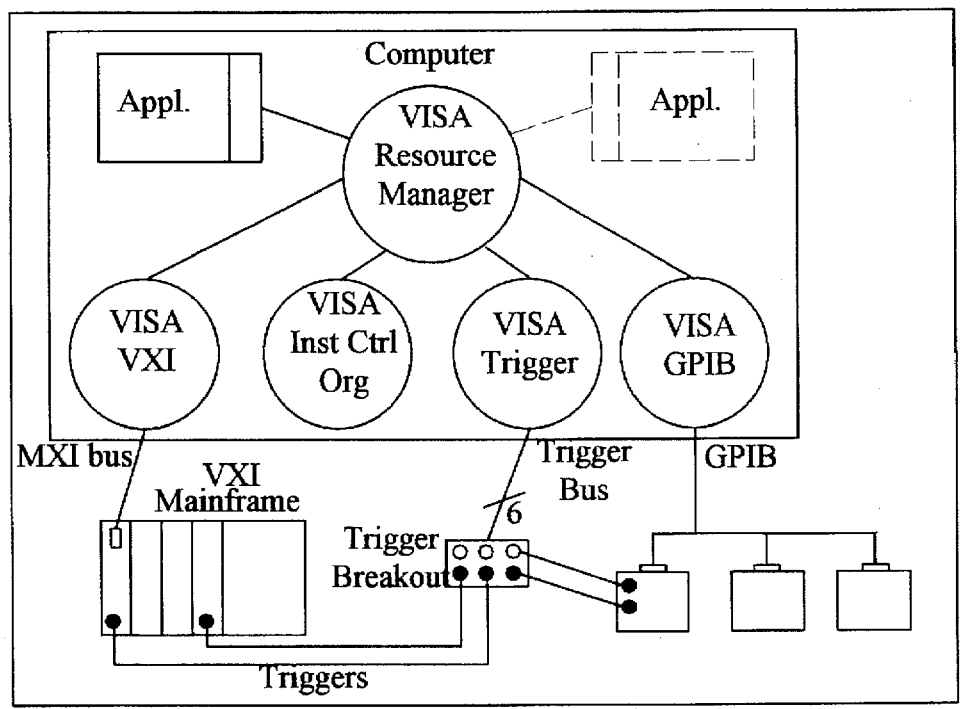
FIGS. 7 and 8 illustrate two examples of a VISA instrumentation system in a nondistributed and distributed environment, respectively.
Figure 8:
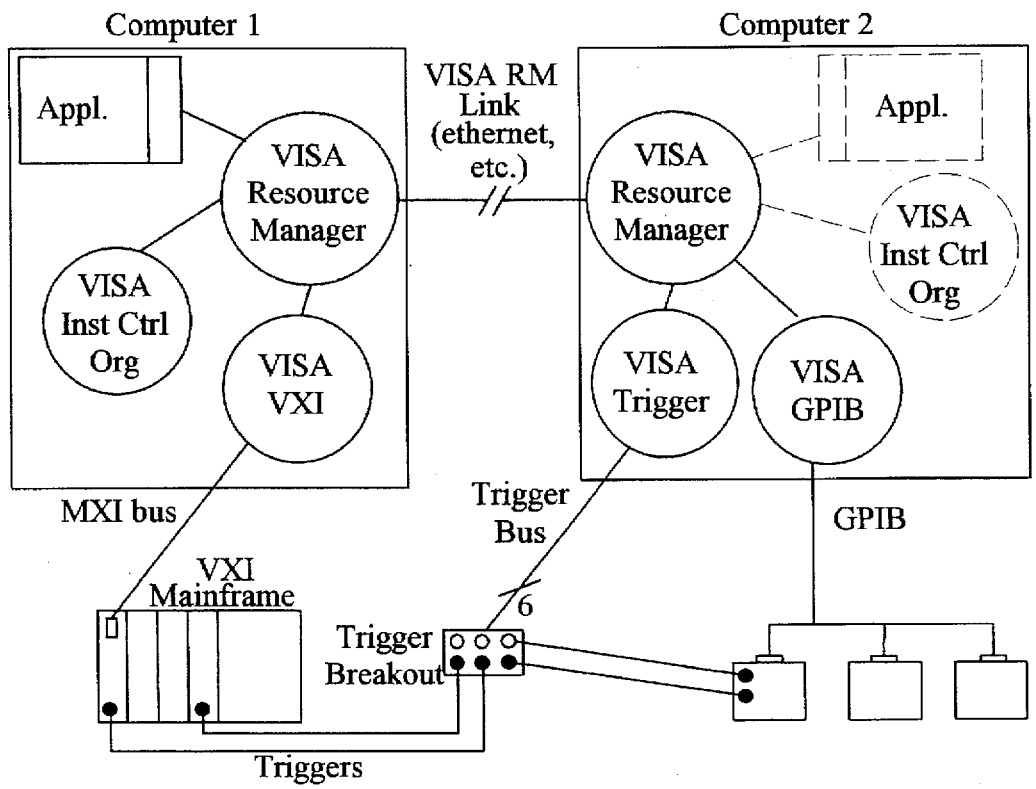

Referring now to FIGS. 7 and 8, block diagrams illustrating various embodiments of a VISA system of the present invention are disclosed. FIG. 7 shows a VISA system where one or more applications control various resources, such as a VXI resource, a trigger resource, and a GPIB resource through the VISA Resource Manager 140. The applications also use the VICO 134 to aid in the creation and use of these resources. As shown, the VXI resource controls the VXI mainframe through an MXI bus. The trigger resource controls a trigger breakout device through a trigger bus and the GPIB resource controls one or more GPIB instruments through the GPIB bus.

FIG. 8 illustrates an embodiment of a VISA system according to the present invention in a distributed environment. As discussed further below, the device resource independent and object oriented nature of the present invention allows for the method of the present invention to be readily adapted to distributed environments. FIG. 8 illustrates an embodiment where two or more computers in different physical locations are used to control a single instrumentation system. As shown, computer 1 includes an application which controls one or more resources. As shown, the application controls a VXI resource and VICO 134 through the VISA Resource Manager 140. Computer 2 includes an application that also controls one or more resources through a second VISA Resource Manager 140, in this example, a trigger resource and a GPIB resource, as well as VICO 134. Computer 1 communicates with computer 2 through a VISA Resource Manager link such as a network connection such as Ethernet. As shown in Computer 2, the dashed lines around VICO 134 and the application indicate that the application and VICO 134 are not necessary in computer 2, and the application in conjunction with the VISA Resource Manager 140 in computer 1 can control all of the resources and the VISA Resource Manager 140 in computer 2, as desired.

VISA RESOURCE TEMPLATE

A VISA system according to the present invention includes an architecture comprising many resources that encapsulate device functionality. Each resource provides specialized services to the application or to other resources, and thus the various resources require a high level of consistency and interoperability. The operation of VISA resources necessarily includes a high level of consistency that is achieved through a precisely defined, extensible interface, which provides a well-defined set of services. In order to increase the compatibility and extensibility of resources within a VISA System, each VISA resource incorporates portions of its interface from a common base class resource. This allows a VISA system to make certain assumptions about each resource and the way in which resources can communicate with each other. This common base class resource is referred to as the VISA Resource Template 130. Each VISA resource derives its interface from the VISA Resource Template 130, and the Template 130 provides standard services for the resource. This increases reusability, testability, and maintainability of the resource. These basic services include the following:

Finding resources (Location Search)

Creating and deleting resources (Life Cycle control)

Modifying and retrieving individual resource characteristics called Attributes (Characteristic Control)

Allowing or disallowing access to a particular resource (Access control)

Performing basic communication services (Operation Invocation and Event Reporting)

Registering and unregistering resources

VISA Template Services

1. Control Services

The VISA Resource Template provides all the basic resource control services to applications. These basic services include searching for the location of resources, controlling the life cycle of sessions to resources, and manipulating resource characteristics. These services are summarized below and are also described in more detail below A. Location and Search These services are used to find a resource in order to establish a communication link to it. The search is based on a unique symbolic name. Applications can request these services using the viFindRsrc() operation.

B. Life Cycle

The VISA Resource Template 130 includes functionality which controls the life cycle of the session to resources established on request by applications, i.e., creates and deletes sessions or links to a resource. Applications can request these services using viOpen() and viClose() operations. The system has responsibility of freeing up all the associated system resources whenever an application closes the session or an application becomes dysfunctional.

C. Characteristic Control

Resources generally have attributes associated with them. Some attributes depict the instantaneous state of the resource and some define alterable parameters to modify behavior of the resources. The VISA Resource Template 130 defines attribute manipulation operations to set and retrieve status of resources. These attributes are defined by individual resources. A VISA system also allows resource attributes initialization (setup) while creating sessions to the resources. The operation for modifying attributes is viSetAttribute() and the operation that retrieves the attributes is viGetAttribute().

D. Access Control

Applications can also set up access modes to resources in a VISA system. The viLock() and viUnlock() operations control the type of access to the resources.

E. Registration Services

The registration services allow applications to register and unregister resources with the VISA Resource Manager 140.

2. Communication Services

Applications access resources by opening sessions to them. The primary method of communication among resources and between applications and resources is operation invocation. A VISA system also allows information exchange through events. Applications are not restricted to any predefined set of operations or data transfer mechanisms for communication.

A. Operation Invocation

After establishing a session to a resource, an application can communicate with the resource by invoking operations on the resource. Every resource supports the operations described in this template. In addition, each resource describes the operations supported by itself. The resource and application exchange information through the parameters of the operations.

B. Event Reporting

A VISA system provides callback, queueing, and waiting services that inform sessions about system events and resource defined events. A VISA system also provides a callback service that informs sessions about exceptions in a given resource.

VISA Resource Template Description

Figure 9:
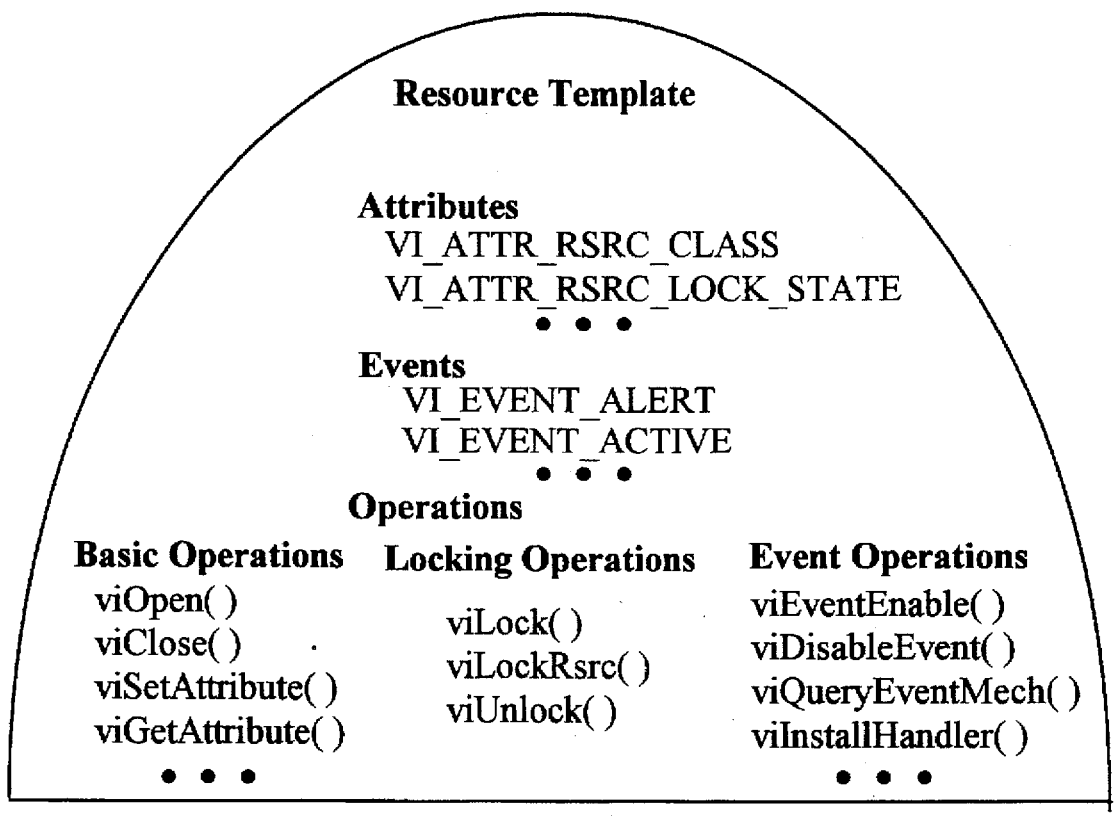
FIG. 9 illustrates the various attributes, events and operations defined in the VISA Resource Template of FIG. 6.

Referring now to FIG. 9, a diagram illustrating the interface of the VISA Resource Template 130 is shown. As shown the VISA Resource Template 130 includes a plurality of attributes, events, and operations. The following is a description of the attributes, events and operations comprised within the VISA Resource Template resource 130. The following description follows the format of describing attributes, events, and operations recited above under the heading "Resource Descriptions".

VISA RESOURCE TEMPLATE ATTRIBUTES

The VISA Resource Template resource includes the following attributes: VI_ATTR_RSRC_NAME VI_ATTR_RSRC_VERSION, VI_ATTR_RSRC_CLASS, VI_ATTR_RSRC_LOCK_STATE, VI_ATTR_MAX_QUEUE_LENGTH, VI_ATTR_QUEUE_TRIP_POINT, and VI_ATTR_USER_DATA. In the preferred embodiment, all resources include these attributes. A table describing these attributes is included below.

The attribute VI_ATTR_RSRC_LOCK_STATE controls the locking state of the resource. The resource can be locked with a nonexclusive access mode or an exclusive access mode, or the resource can be unlocked.

The attribute VI_ATTR_MAX_QUEUE_LENGTH specifies the maximum number of events that can be queued at any time on the given session.

The attribute VI_ATTR_QUEUE_TRIP_POINT specifies a trip point in the event queue.

The attribute VI_ATTR_USER_DATA is for data used privately by the application for a particular session. This data is not used by a VISA system for any purposes and is provided to the application for its own use.

VISA RESOURCE TEMPLATE EVENTS

The VISA Resource Manager resource includes the following events:

VI_EVENT_ALERT
VI_EVENT_RSRC_ACTIVE
VI_EVENT_RSRC_INACTIVE
VI_EVENT_RSRC_LOCK_CHANGED
VI_EVENT_QUEUE_FULL
VI_EVENT_QUEUE_TRIP
VI_EVENT_RSRC_AVAILABLE

The event VI_EVENT_ALERT informs the application that a session or resource has been aborted, reset, or killed.

The event VI_EVENT_RSRC_ACTIVE informs the application that the resource has been activated and has services available to applications and other resources.

The event VI_EVENT_RSRC_INACTIVE informs the applications that the resource has been deactivated and thus has no services available to applications and other resources.

The event VI_EVENT_RSRC_LOCK_CHANGED informs the application that the state of the lock has been updated.

The event VI_EVENT_QUEUE_FULL informs the application that the queue that is used to manage the wait operations is full.

The event VI_EVENT_QUEUE_TRIP informs the application that the queue that is used to manage the wait operations has reached the trip point.

| Symbolic Name | Access Privilege | | Data Type | Range |
|---|---|---|---|---|
| VI_ATTR_RSRC_CLASS | RO | Global | ViClass | N/A |
| VI_ATTR_RSRC_NAME | RO | Global | ViString | N/A |
| VI_ATTR_RSRC_VERSION | RO | Global | ViVersion | N/A |
| VI_ATTR_RSRC_LOCK_STATE | RO | Global | ViUInt16 | VI_NO_LOCK VI_NON_EXCLUSIVE_LOCK; VI_EXCLUSIVE_LOCK |
| VI_ATTR_MAX_QUEUE_LENGTH | R/W | Local | ViUInt32 | N/A |
| VI_ATTR_QUEUE_TRIP_POINT | R/W | Local | ViUInt32 | N/A |
| VI_ATTR_USER_DATA | R/W | Local | ViAddr | N/A |

Attribute Descriptions

The attribute VI_ATTR_RSRC_CLASS is a unique identifier that identifies the class to which the resource belongs.

The attribute VI_ATTR_RSRC_NAME is a unique identifier for a resource compliant with the address structure described above.

The attribute VI_ATTR_RSRC_VERSION indicates the version of the resource. This attribute uniquely identifies each of the different revisions or implementations of a resource.

The event VI_EVENT_RSRC_AVAILABLE informs the application that a particular resource has become available within the VISA system.

VISA RESOURCE TEMPLATE OPERATIONS

The VISA Resource Template resource includes the following operations, and these operations are described fully below.

viFindRsrc (vi, expr, accessLink)
viOpen (sesn, rsrcName, accessMode, timeout, vi)

viClose (vi)
viTerminate (vi, target, degree, jobId, immediate, flagFlushData)
viAttachRsrc (vi, refName, rsrcName)
viDetachRsrc (vi, refName)
viSetAttribute (vi, attribute, attrState)
viSetRsrcAttribute (vi, rsrcName, attribute, attrState)
viGetAttribute (vi, attribute, attrState)
viGetRsrcAttribute (vi, rsrcName, attribute, attrState)
viLock (vi, lockType, shareType, timeout, lockId)
viLockRsrc (vi, rsrcName, lockType, shareType, timeout, lockId)
viUnlock (vi, lockId)
viUnlockRsrc(vi, rsrcName, lockId)
viEnableEvent(vi, eventType, mechanism, context)
viDisableEvent(vi, eventType, mechanism)
viQueryEventMech(vi, eventType, mechanism)
viInstallHandler(vi, eventType, handler, userHandle)
viUninstallHandler(vi, eventType, handler, userHandle)
viQueryHandlers(vi, eventType, handlers, userHandle)
viAcknowledgeEvent(vi, eventType, context)
viWaitOnEvent(vi, eventType, timeout, outContext)
viWaitOnMultipleEvents(vi, eventTypeList, timeout, outContext, outEventType)
viDiscardEvents(vi, eventType, mechanism)
viGetEventInfo(vi, eventType, context, rsrcName, info)
viRaiseEvent(vi, eventType, context, target)

Handler Prototype

An application that defines a handler that is to be registered with VISA's event management system preferably defines this handler by the prototype:

viEventHandler(vi, eventType, context, usrContext).

LOCATION AND SEARCH SERVICES

A VISA system provides the ability to search and locate resources in a VISA system regardless of where the resource is residing (i.e. the resource can local to the host machine or in a distributed system, the resource can be in a remote machine). In order to be able to locate a resource in a VISA system, it is essential to be able to uniquely identify the given resource throughout the system. As discussed above, a Resource String is used for uniquely identifying a given resource in the system. A Resource String comprises an optional host identifier and a Resource Name. The grammar for forming a Resource Name, Resource String and host identifier was described above.

Resource Name

The resource name is the symbolic name associated with the resource and is usually the name of the resource class (e.g. WR for Write Resource Class) preceded by identifiers to distinguish the resource from other resources of the same class. The rules to form a Resource Name and to refer to a resource available in a VISA system were also discussed above.

viFindRsrc(vi, expr, accessLink)

The viFindRsrc() operation queries a VISA system to locate a resource. More specifically, the viFindRsrc() operation matches the value specified in the expr parameter with available resource names. Upon successful completion, this operation returns a complete list of resources whose names match a specified expression. Applications can use any returned value in the accessLink parameter to establish a session to that resource.

Parameters

| Name | Direction | Type | Description |
|---|---|---|---|
| vi | IN | ViSession | Unique logical identifier to a session. |
| expr | IN | ViString | When an incomplete name or class identifier of a resource is specified in this parameter, this operation searches for resources with names of resources matching the expr parameter. This expression represents a regular expression over a grammar that specifies a host name followed by a resource name. |
| accessLink | OUT | ViRsrcList | Returns a list of strings identifying the location of resources and additional information. Strings can then be passed to viAttachRsrc() or viOpen() operations to establish a session to the given resource. |

Return Values

Return values have the type ViStatus and are used to return the operational return status. The return value returns either a completion code or an error code as follows.

| | Description |
|---|---|
| Completion Code | |
| VI_SUCCESS | Resource(s) found. |
| Error Codes | |
| VI_ERROR_INV_SESSION | The given vi does not identify a valid session. |
| VI_ERROR_RSRC_LOCKED | Specified operation could not be performed as the resource identified by vi has been locked for this kind of access. |
| VI_ERROR_INV_EXPR | Unrecognizable expression specified for search. |
| VI_ERROR_RSRC_NFOUND | Specified expression does not match any resource name. |

Also, the In the preferred embodiment, the data structure returned in the accessLink parameter has the number of matches found and all the resource name strings matching the expr parameter. Operation is successful regardless of the locking state of the resource that is being searched.

LIFESTYLE SERVICES

A VISA system provides facilities to create and delete sessions to resources. viOpen() is used for creating sessions and viClose() is used to deleting or closing sessions to resources. In order to be able to open a session to a resource in a VISA system, it is essential to be able to uniquely identify the given resource throughout the system. In addition, viOpen() allows resource attributes to be initialized and additional resources to be mounted to the resource opened. The Address String defined in the following section satisfies all three requirements of unique identification, attribute initialization and mounting.

1. Address String

An address string is similar to a resource sting in that it uniquely identifies a resource. However, an address string has additional capabilities of specifying an attribute initialization list to initialize the attributes of the resource and also of mounting a list resources to the resource identified. The address string is used in the viOpen() operation.

Special Characters and Literals

Refer above to the section "Special Characters and Literals" for the definition of special characters and literals.

Address String Grammar

| | |
|---|---|
| addressString := | [::hostId::] resourceInstance [{mountingList}] |
| hostId := | id\|<br>id.hostId |
| resourceInstance := | resourceName [(initList)] |
| resourceName := | id\|<br>id :: resourceName |
| mountingList := | addressString\|<br>addressString ; mountingList |
| initList := | attributeId = value\|<br>attributeId = value , initList |
| attributeId := | nameId |
| value := | nameId\|<br>numId |
| id := | nameId\|<br>numId |
| nameId := | character (character\|digit\|underscore)* |
| numId := | digit+ |

Explanation of Address String Grammar

| Symbol | Explanation |
|---|---|
| addressString | Address Strings (addressString) are required to have a resource instance (resourceInstance), with optional host identifier (hostId) and mounting list (mountingList). |
| resourceInstance | A resource instance is a resource name (resourceName) with and optional attribute initialization list (initList). |
| resourceName | Resource Name is describe fully above in the section titled "Resource Name." |
| hostId | The host identifier (hostId) identifies a particular host machine in a distributed system. In a stand-alone system, the hostId is generally not required. A large distributed system can have a hierarchy of networks and sub-networks. For example, hostId can be host0.subnet0.network0, which identifies a host machine (host0) on a sub-network (subnet0) of a larger network (network0). |
| initList | The attribute initialization list (initList) is a list of ordered pairs, comprising attributes name and the value to initialize the attribute with. An example of an initialization list is VI_ATTR_TMO_UNIT = VI_MILLI_SEC, VI_ATTR_TMO_VALUE = 2000 |
| mountingList | The mounting list (mountingList) is used to specify the list of resources to be mounted to another resource. Some resources can have a number of resources mounted to it. An example of that is the VISA Instrument Control Organizer (VICO). Of course, not all resources can have other resources mounted to it, and specifying a mounting list for that resource will cause the operation taking the address string (e.g. viOpen()) to fail. |

Examples of Address Strings

| Address String | Description |
|---|---|
| VXI0::1::WR | A write resource of the VXI device at logical address 1 in VXI interface VXI0. |
| host0::VXI0::1::WR | A write resource of the VXI device at logical address 1 in VXI interface VXI0 in machine host0. |
| network0.host0::VXI0::1::WR | A write resource of the VXI device at logical address 1 in VXI interface VXI0 in machine host0 network network0. |
| VXI0::1::WR(VI_ATTR_TMO_UNIT = VI_MILLI_SEC, VI_ATTR_TMO_VALUE = 2000) | A write resource of the VXI device at logical address 1 in VXI interface VXI0 with its time out unit attribute to be set to milliseconds and its time out value attribute to be set to 2000. |
| VICO{GPIB0::5::WR,VXI0::1::RD} | A VISA Instrument Control Organizer Resource (VICO) with a read resource of the GPIB device at primary address 5 in GPIB interface GPIB0 and a read resource of the VXI device at logical address 1 in VXI interface VXI0. |

Resources in a system can be grouped together to create a logical resource. A resource identified by the numeric identifier 10 in the following table is such a resource. Similarly, if the system includes a Logic Analyzer, it can be identified through the alphanumeric identifier Logic_Analyzer.

| Address | Description |
|---|---|
| 10 | A device in a VISA system uniquely identified by a numeric value 10. This resource shall have pertinent resources (Read Resource, Write Resource, etc.) attached to it. |
| Logic_Analyzer | A device in a VISA system uniquely identified as Logic_Analyzer. This resource shall have pertinent resources (Read Resource, Write Resource, etc.) attached to it. |

OPERATIONS viOpen (sesn, rsrcName, accessMode, timeout, vi)
viClose (vi)
viAttachRsrc (vi, rsrcName, refName)
viDetachRsrc (vi, refName)
viTerminate (vi, degree, target, jobId, immediate, flagFlushData)

viOpen(sesn, rsrcName, accessMode, timeout, vi)

The viOpen() operation opens a session to the specified resource and returns a session identifier that can be used to call any other operations of that resource. viOpen also allows applications to open sessions and lock the resources simultaneously. The access mode is specified in the accessMode parameter. A VISA system defines a default session value referred to as viDefaultRM to communicate with the Default VISA Resource Manager resource.

| Name | Direction | Type | Description |
|---|---|---|---|
| sesn | IN | ViSession | Unique logical identifier reference to a session (usually a VISA Resource Manager session). |
| rsrcName | IN | ViRsrc | Unique symbolic name of a resource, with the appropriate initialization. |
| accessMode | IN | ViAccessMode | Value describing the access modes to this resource. |
| timeout | IN | ViUInt32 | Amount of time in milliseconds that this operation will wait for the resource to become unlocked. |
| vi | OUT | ViPSession | Unique logical identifier reference to a session. |

Return Values

Returns values have the type ViStatus and are used to return the operational return status. The return value returns either a completion code or an error code as follows.

| | Description |
|---|---|
| Completion Code | |
| VI_SUCCESS | Session opened successfully. |
| Error Codes | |
| VI_ERROR_INV_SESSION | The given sesn does not identify a valid session |
| VI_ERROR_INV_RSRC_NAME | Invalid resource reference specified. Parsing error. |
| VI_ERROR_RSRC_LOCKED | Specified operation could not be performed as the resource identified by sesn has been locked for this kind of access. |
| VI_ERROR_INV_ACC_MODE | Invalid access mode. |
| VI_ERROR_NSUP_ACC_MODE | Access mode not supported. |
| VI_ERROR_RSRC_NFOUND | Insufficient location information or resource not present in the system. |
| VI_ERROR_TMO | Time specified before the resource became unlocked. | viClose(vi)

The viClose() operation closes a session to a resource.

Parameters

| Name | Direction | Type | Description |
|---|---|---|---|
| vi | IN | ViSession | Unique logical identifier to a session. |

Return Values

Return values have the type ViStatus and are used to provide the operational return status. The return value returns either a completion code or an error code as follows.

| | Description |
|---|---|
| Completion Code | |
| VI_SUCCESS | Session closed successfully. |

| | Description |
|---|---|
| Error Code | |
| VI_ERROR_INV_SESSION | The given vi does not identify a valid session. |
| VI_ERROR_CLOSING_FAILED | Unable to deallocate the previously allocated data structures corresponding to this session. | viAttachRsrc(vi, rsrcName, refName)

The viAttachRsrc() operation commands a resource to open a session to another resource for its usage. In other words, the viAttachRsrc() operation is used to command a resource that controls other resources to open a session to a given resource. A unique reference name is specified in the refName parameter to locally refer to the resource being attached. If VI_NULL is specified in the refName parameter, the system specifies an appropriate reference name. All of the attributes and operations of the attached resource are then accessible to the resource whose session is described by vi.

It is noted that if the resource that is to be attached through a viAttachRsrc() can be controlled by the resource on which this operation is being performed, the resource attempts to attach it. A resource that does not control any other resource may refuse to attach another resource by returning the error VI_ERROR_ATTACH_REFUSED. If the resource that is to be attached through a viAttachRsrc() cannot be controlled by the resource on which this operation is being performed, the operation may refuse with error VI_ERROR_ATTACH_REFUSED.

Parameters

| Name | Direction | Type | Description |
|---|---|---|---|
| vi | IN | ViSession | Unique logical identifier to a session. |
| rsrcName | IN | ViRsrc | Unique logical identifier of a resource to be attached. |
| refName | IN OUT | ViPRsrc | Unique logical alias for resource to be attached. If VI_NULL is specified, the system assigns and returns a new value. The user is responsible for freeing up memory associated with the string of the assigned refName parameter. |

Return Values

Return values have the type ViStatus and are used to return the operational return status. The return value returns either a completion code or an error code as follows.

| | Description |
|---|---|
| Completion Code | |
| VI_SUCCESS | Resource attached successfully. |
| Error Codes | |
| VI_ERROR_INV_SESSION | The given vi does not identify a valid session. |
| VI_ERROR_INV_RSRC_NAME | Invalid resource name specified in rsrcName parameter |

| | Description |
|---|---|
| VI_ERROR_RSRC_LOCKED | Specified operation could not be performed as the resource identified by vi has been locked for this kind of access. |
| VI_ERROR_DUPLICATE_REF_NAME | A reference name already exists as specified in the refName parameter. |
| VI_ERROR_ATTACH_REFUSED | This resource refused to attach the specified resource. | viDetachRsrc(vi, refName)

The viDetachRsrc() operation removes an access link to a resource and thus detaches an available resource from a controlling resource. Once a resource is detached, all of its available services are no longer accessible to the resource and its applications.

Parameters

| Name | Direction | Type | Description |
|---|---|---|---|
| vi | IN | ViSession | Unique logical identifier to a session. |
| refName | IN | ViRsrc | A logical reference to the resource to be detached from the current session. This identifier should be one of the refName identifiers returned by a successfull viAttachRsrc() operation. |

Return Values

Return values have the type ViStatus and are used to return the operational return status. The return value returns either a completion code or an error code as follows.

| | Description |
|---|---|
| Completion Code | |
| VI_SUCCESS | Resource detached successfully. |
| Error Codes | |
| VI_ERROR_INV_SESSION | Invalid session specified or session does not exist. |
| VI_ERROR_RSRC_LOCKED | Specified resource is currently locked and therefore cannot be detached. |
| VI_ERROR_RSRC_NFOUND | Resource specified in refName parameter has not been attached. |
| VI_ERROR_INV_REF_NAME | Invalid resource reference name specified in refName parameter. Parsing error. | viTerminate (vi, target, degree, jobId, immediate, flagFlushData)

The viTerminate operation requests a VISA resource to terminate normal execution with one or all of its sessions.

Parameters

| Name | Direction | Type | Description |
|---|---|---|---|
| vi | IN | ViSession | Unique logical identifier to a session. |
| target | IN | ViBoolean | Specifies target of the request. The VISA model specifies VI_RSRC and VI_SESSION as valid targets. |
| degree | IN | ViUInt16 | Specifies type of request. The valid requests are VI_ABORT, VI_RESET, VI_FAIL, and VI_KILL. |
| jobId | IN | ViJobId | Specifies the operation identifier when a request to terminate operations is received. |
| immediate | IN | ViBoolean | Specifies whether request should be effective immediately or should allow completion of operations. This is specified by VI_TRUE and VI_FALSE respectively. This parameter is ignored when a request to terminate operations is made. |
| flagFlushData | IN | ViBoolean | Specifies whether the resource should discard application data. (e.g. write buffer specified by applications, etc.). The valid flag values are VI_FLUSH and VI_NFLUSH for discarding and keeping data. |

Return Values

Return values have the type ViStatus and are used to return the operational return status. The return value returns either a completion code or an error code as follows.

| | Description |
|---|---|
| Completion Code | |
| VI_SUCCESS | Request serviced successfully. |
| VI_SUCCESS_STATE_UNKNOWN | Request serviced successfully. The resource may be in an inconsistent state. |
| Error Codes | |
| VI_ERROR_INV_SESSION | The given vi does not identify a valid session. |
| VI_ERROR_RSRC_LOCKED | Specified operation could not be performed as the resource identified by vi has been locked for this kind of access. |
| VI_ERROR_INV_DEGREE | Invalid request. |
| VI_ERROR_INV_JOB_ID | Specified operation type or job identifier is invalid. |

As discussed above, this operation requests a resource to terminate normal execution with one or all of its resources. The action request is further distinguished by the degree parameter. Resources implement follow up actions based on the description of the degree. The type of degrees are defined in the following table.

Termination Request Description Table (Session Termination)

| Degree | Description |
|---|---|
| VI_ABORT | Request to abort operation(s) specified in the jobId parameter. |
| VI_RESET | Request termination of all the pending operations |

-continued

| Degree | Description |
|---|---|
| | of the session. All the system resources associated with the session are relinquished. The resource reinitializes the specified session to its default state. |
| VI_FAIL | NÅ |
| VI_KILL | Request the session to cease functioning. All the system resources associated with the session should be freed up on the request. |

Termination Request Description Table (Resource termination)

| Degree | Description |
|---|---|
| VI_ABORT | Request to abort operation(s) specified in the jobId parameter. |
| VI_RESET | Request termination of all the pending operations of the resource. All the system resources associated with the target are relinquished. The resource reinitializes itself to its default state. |
| VI_FAIL | Request the resource to cease normal functioning. Data kept by the failed target in response to service requests by applications is recoverable. System resources associated with the resource are not relinquished. |
| VI_KILL | Request the resource to cease functioning. All the system resources associated with the resource should be freed up on the request. |

The target of the action is specified in the target parameter. VISA resources or sessions opened to VISA resources are valid targets for the requested action and are denoted by VI_RSRC and VI_SESSION respectively. When a resource is specified as target, the action terminates normal execution of the operations for all its sessions. Before terminating, the resource generates the VI_EVENT_ALERT event on all the other sessions with a field specifying the degree. However, if a session is specified then the effect is restricted to the session specified by the vi parameter.

If the request pertains to operations, applications can request to terminate a specific operation associated with a job identifier. The job identifier is specified in the jobId parameter. The VISA model also allows the termination of all the asynchronous operations by specifying VI_ASYNC, all the synchronous operations by specifying VI_SYNC, or all the operations by specifying VI_ALL.

The immediate parameter specifies whether resource should allow completion of pending operations of the target before reinitialization. Applications can specify to wait until all the operations of the target are completed using VI_FALSE or can specify VI_TRUE for immediate action. This parameter is ignored when a request to terminate operations is made through VI_ABORT.

Many times resources have data stored for applications. For example, a resource may store data into a buffer whenever a read request is made by applications. This data is discarded when flagFlushData is set to VI_FLUSH. If the data is not flushed, as denoted by VI_NFLUSH, then it can be retrieved by applications as defined by individual resources.

CHARACTERISTIC CONTROL SERVICES

Resources have attributes associated with them. Some attributes depict the instantaneous state of the resource and some define alterable parameters to modify behavior of the resources. The present invention includes attribute manipulation operations to set and retrieve status of resources. These attributes are defined by individual resources. A VISA system also allows resource attributes initialization (setup) while creating sessions to a resource. This section describes the operations used to set and retrieve the value of individual attributes.

Operations viSetAttribute(vi, attribute, attrState)
viSetRsrcAttribute(vi, rsrcName, attribute, attrState)
viGetAttribute(vi, attribute, attrState)
viGetRsrcAttribute(vi, rsrcName, attribute, attrState)

viGetAttribute(vi, attribute, attrState)

viGetRsrcAttribute(vi, rsrcName, attribute, attrState)

The viGetAttribute and viGetRsrcAttribute operations retrieve the state of a resource attribute. These operations retrieve the state of the attributes in the attrState parameter. The viGetAttribute() operation is used mainly on sessions to individual resources. The viGetRsrcAttribute() operation can be invoked on a resource that controls another resource, in order to find the value of global attributes on the controlled resource. In one embodiment, the viGetRsrcAttribute() operation is targeted toward a resource specified in the rsrcName parameter to retrieve attributes of resources without opening a session to them. In most of these cases, the viGetRsrcAttribute() operation is invoked on the VISA Resource Manager. If a VI_ATTR_MULTIPLE value is specified, operations return a list of resource attributes and their current values. Individual resources define the name of each attribute and implement the attributes and related actions.

In the preferred embodiment, resource attributes that do not modify the global state of a resource are available to this operation regardless of the locking state of the resource. Also, resource attributes that do not modify the global state of a resource are not available for modification through the viGetRsrcAttribute() operation. In the preferred embodiment, a resource defines only attributes that do not modify the global state of a resource.

Parameters

| Name | Direction | Type | Description |
|---|---|---|---|
| vi | IN | ViSession | Unique logical identifier to a session. |
| rsrcName | IN | ViRsrc | Unique symbolic name of a resource. |
| attribute | IN | ViAttr | Resource attribute for which the state query is made. |
| attrState | OUT | ViPAttrState | The state of the queried attribute for a specified resource. The interpretation of the returned value is defined by the individual resource. |

Return Values

Return values have the type ViStatus and are used to return the operational return status. The return value returns either a completion code or an error code as follows.

|  | Description |
|---|---|
| Completion Code | |
| VI_SUCCESS | Resource attribute retrieved successfully. |
| Error Codes | |
| VI_ERROR_INV_SESSION | The given vi does not identify a valid session. |
| VI_ERROR_INV_RSRC_NAME | Invalid resource name specified in rsrcName parameter. |
| VI_ERROR_RSRC_LOCKED | Specified operation could not be performed as the resource identified by vi has been locked for this kind of access. |
| VI_ERROR_NSUP_ATTR | The specified attribute is not defined by the referenced resource. | viSetAttribute(vi, attribute, attrState)

viSetRsrcAttribute(vi, rsrcName, attribute, attrState)

The viSetAttribute and viSetRsrcAttribute() operations set the state of a resource attribute. These operations set the state of the attributes to values specified in the attrState parameter. The viSetAttribute() operation is used primarily on sessions to individual resources. The viSetRsrcAttribute() operation can be invoked on a resource that can control another resource, in order to set the value of global attributes on the controlled resource. If a VI_ATTR_MULTIPLE value is specified, operations set values of resource attributes to the corresponding values specified in the attrState parameter. Individual resources define the name of each attribute and implement the attributes and related actions.

In the preferred embodiment, if the resource is locked and the attribute specified in a viSetAttribute() operation is a global, then the viSetAttribute() operation returns the error VI_ERROR_RSRC_LOCKED. If the resource is not locked and the attribute is specified in a viSetAttribute() operation, then the viSetAttribute() operation sets the attribute to the given value. If the viSetAttribute() operation fails to set any of the attribute values in the specified attribute list, then all the values are restored to their original states.

Parameters

| Name | Direction | Type | Description |
|---|---|---|---|
| vi | IN | ViSession | Unique logical identifier to a session. |
| rsrcName | IN | ViRsrc | Unique symbolic name of a resource. |
| attribute | IN | ViAttr | Resource attribute for which the state is modified. |
| attrState | IN | ViPAttrState | The state of the attribute to be set for the specified resource. The interpretation of the individual attribute value is defined by the resource. |

Return Values

Return values have the type ViStatus and are used to return the operational return status. The return value returns either a completion code or an error code as follows.

|  | Description |
|---|---|
| Completion Code | |
| VI_SUCCESS | All attribute values set successfully. |
| Error Codes | |
| VI_ERROR_INV_SESSION | The given vi does not identify a valid session. |
| VI_ERROR_INV_RSRC_NAME | Invalid resource name specified in rsrcName parameter. |
| VI_ERROR_RSRC_LOCKED | Specified operation could not be performed as the resource identified by vi has been locked for this kind of access. |
| VI_ERROR_NSUP_ATTR | The specified attribute is not defined by the referenced resource. |
| VI_ERROR_ATTR_STATE_NSUP | The specified state of the atrribute is not supported as defined by resource. |
| VI_ERROR_ATTR_READONLY | The specified attribute is read only. |

ACCESS CONTROL SERVICES (Locking)

The present invention allows multiple sessions to a resource to function simultaneously, i.e., a VISA system can handle the concurrent execution of operations. Client applications can open multiple sessions to a resource simultaneously and can access the resource through the different sessions concurrently. Although many resource operations can be carried out concurrently, in certain cases, applications accessing a resource will need to restrict access to that resource from other sessions. For example, an application that needs to perform successive write operations on a resource may require that, during the sequence of writes, no other operation can be invoked through another session. The present invention includes a locking mechanism that defines a scheme to restrict accesses to VISA resources. The present invention implements a mechanism to restrict accesses to resources using different locking modes. The basic locking mechanism and the access modes defined by a VISA system according to the present invention are discussed below.

Locking Mechanism

The VISA locking mechanism enforces arbitration of accesses to resources on a persession basis. If a session locks a resource, operations invoked on the resource through other sessions are serviced, suspended or returned with an error depending on the operation and the type of lock used.

If a resource is not locked by any of its sessions, all sessions have full privilege to invoke any operation and update any global attributes of the resource. Sessions are not required to have locks in order to invoke operations or update global attributes. However, if some other session has already locked the resource, then attempts to invoke operations or update globals on the resource will fail. Locking a resource restricts access from other sessions and guarantees that operations will not fail due to other sessions acquiring a lock on that resource. This is because locking a resource precludes other sessions from acquiring an exclusive lock.

A VISA system includes two different types, or modes, or lock referred to as the exclusive and non-exclusive lock, these being denoted by the terms VI_EXCLUSIVE_LOCK and the VI_NON_EXCLUSIVE_LOCK, respectively. A VISA system also includes a mechanism to share locks among multiple sessions. Operations referred to as viLock()

and viLockRsrc() are used to acquire a lock on a resource, and the viUnlock() and viUnlockRsrc() operations are used to release locks.

If a session acquires a non-exclusive lock to a resource, other sessions are precluded from obtaining an exclusive lock on the resource, but can still obtain a non-exclusive lock. If a session acquires an exclusive lock on a resource, other sessions are precluded from obtaining any lock, exclusive or non-exclusive, on the resource. Lock sharing, described below, removes some of the restrictions on obtaining a lock.

The following table shows the types of lock that can be acquired under various conditions.

| Lock | If Other Sessions Acquired: | | |
|---|---|---|---|
| Requested | No Locks | Non-exclusive Lock | Exclusive Lock |
| Exclusive | Yes | No | No |
| Non-exclusive | Yes | Yes | No |

Figure 10:
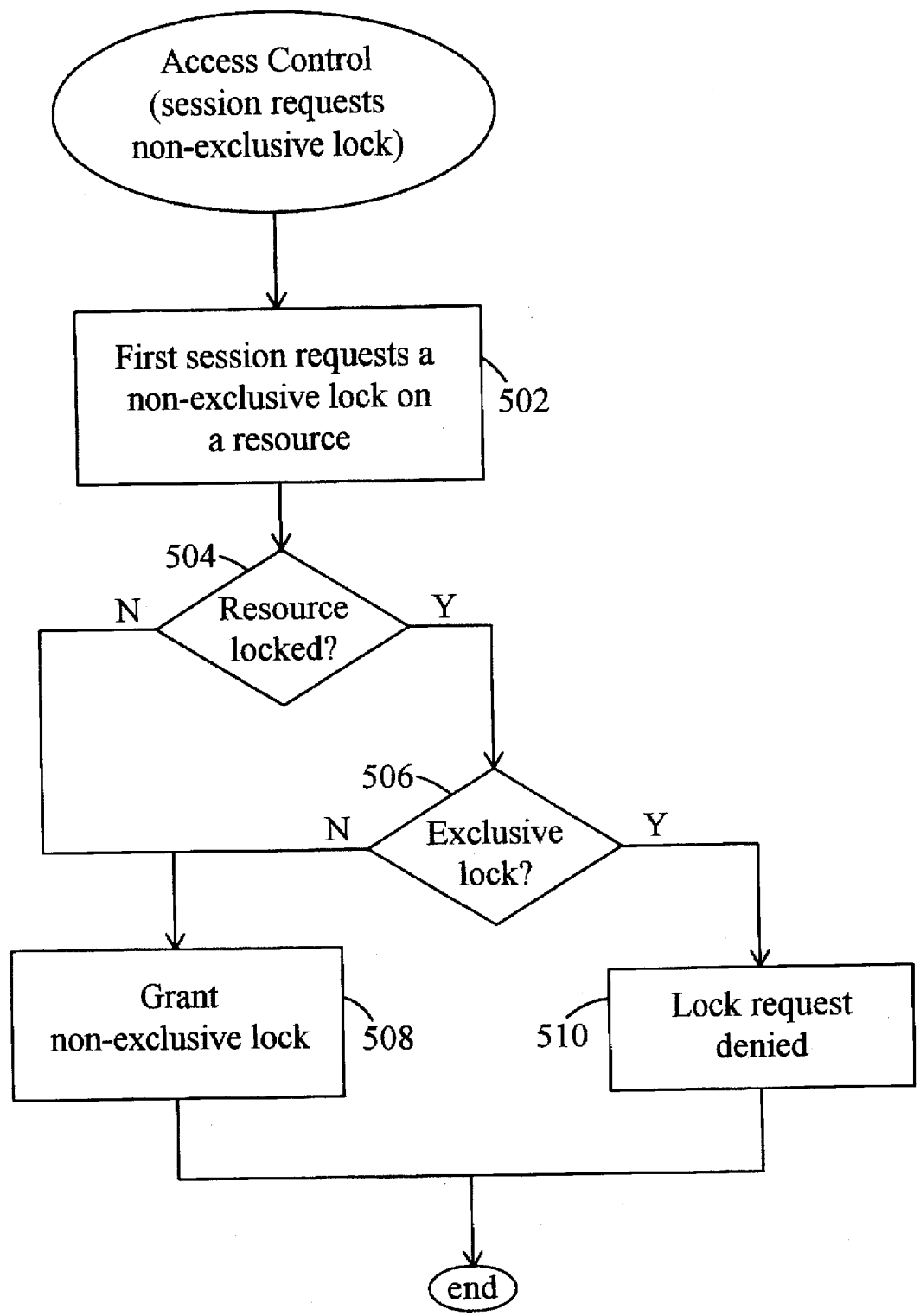
FIGS. 10-15 are flowchart diagrams illustrating the access control features oft he present invention.
Figure 11:
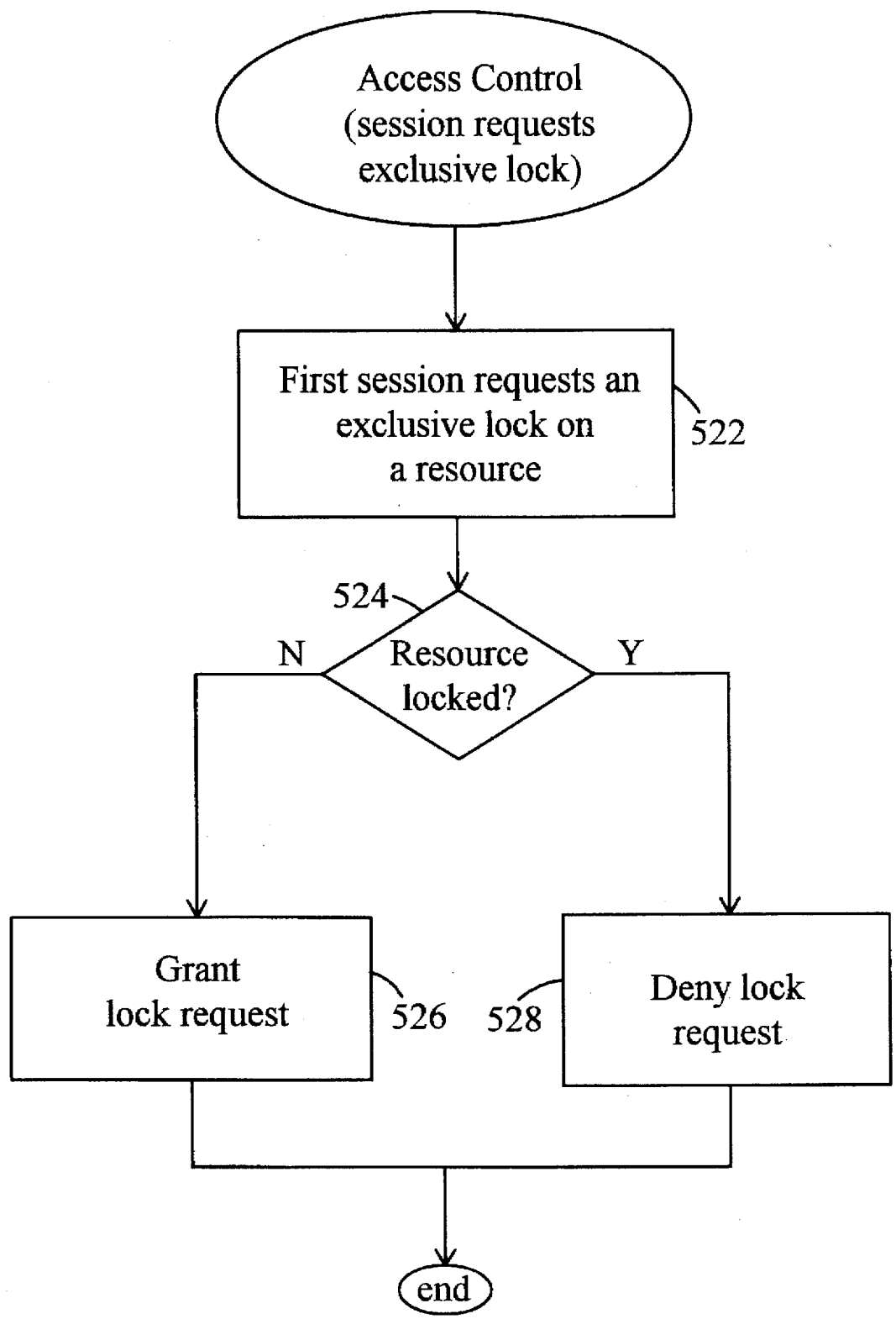

Referring now to FIGS. 10 and 11, flowchart diagrams illustrating a session attempting to acquire a non-exclusive lock and an exclusive lock, respectively are shown. Referring now to FIG. 10, a session requesting a non-exclusive lock is shown. In step 502 a session referred to as "first session" requests a non-exclusive lock on a resource. In step 504 the resource determines whether the resource locked. If the resource is determined to not be locked in step 504, then the first session is granted a non-exclusive lock to the resource. If the resource is determined to be locked by another session in step 504, then if another session has an exclusive lock on the resource in step 506 the lock request is denied in step 510. If the other session has a nonexclusive lock in step 506, the non-exclusive lock request is granted to the first session.

Referring now to FIG. 11, a session requesting an exclusive lock is shown. In step 522 a session referred to as "first session" requests an exclusive lock on a resource. In step 524 the resource determines whether the resource locked. If the resource is determined to not be locked in step 524, then the first session is granted an exclusive lock to the resource. If the resource is determined to be locked by another session in step 524, then the lock request is denied in step 528.

If a session acquires a non-exclusive lock on a resource, other sessions are precluded from modifying the global attributes on the resource, but can still invoke operations on the resource and get attributes form the resource. If a session acquires an exclusive lock, other sessions are precluded from modifying global attributes or invoking operations on the resource, but other sessions can still get attributes.

The following tables show which access is permitted through a sessions under various conditions.

Current Session Has No Lock

| | Any Other Sessions Has: | | |
|---|---|---|---|
| Access | No Locks | Non-exclusive Lock | Exclusive Lock |
| Get Attributes | Yes | Yes | Yes |
| Set Local Attributes | Yes | Yes | Yes |
| Set Global Attributes | Yes | No | No |
| Operations | Yes | Yes | No |

Current Session Has Non-Exclusive Lock

| | Any Other Session Has: | | |
|---|---|---|---|
| Access | No Locks | Non-exclusive Lock | Exclusive Lock |
| Get Attributes | Yes | Yes | * |
| Set Local Attributes | Yes | Yes | * |
| Set Global Attributes | Yes | No | * |
| Operations | Yes | Yes | * |

An asterisk (*) indicates that these cases will not arise because the lock types are incompatible.

Current Session Has Exclusive Lock

| | Any Other Session Has: | | |
|---|---|---|---|
| Access | No Locks | Non-exclusive Lock | Exclusive Lock |
| Get Attributes | Yes | * | * |
| Set Local Attributes | Yes | * | * |
| Set Global Attributes | Yes | * | * |
| Operations | Yes | * | * |

An asterisk (*) indicates that these cases will not arise because the lock types are incompatible.

The table above lists the general rule for what is and is not permitted under various locking conditions. If nothing contrary to the above tables is stated in the description of a given attribute or operation, then the above table is held to be true for the attribute or operation. However, there can be exceptions to the rule, e.g. some operations may be permitted even when there is an exclusive lock on the resource or some global attributes may not be read when there is any kind of lock on the resource, and these exceptions are mentioned in the description of the individual operations and attributes.

Figure 12:
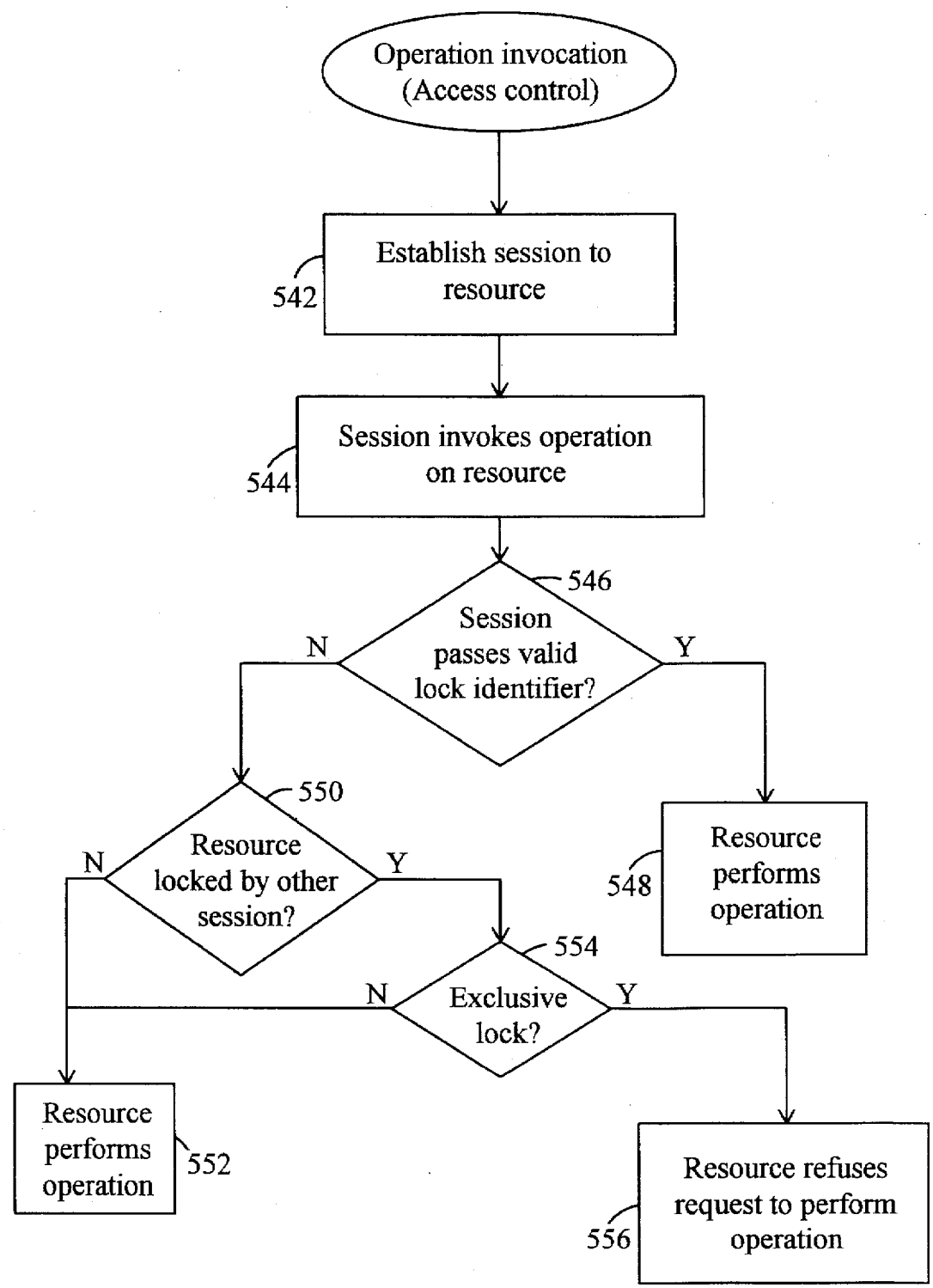
Figure 13:
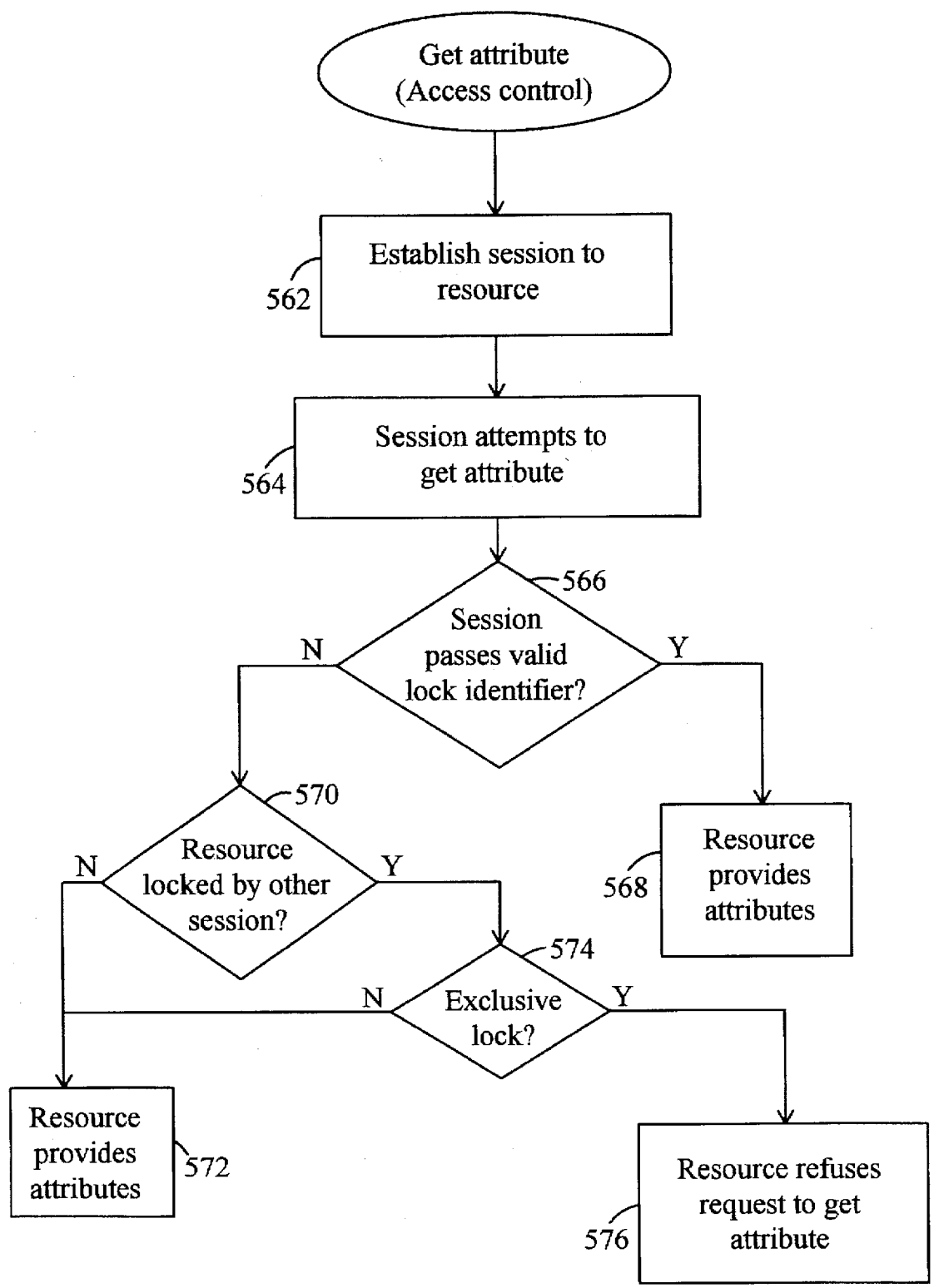
Figure 14:
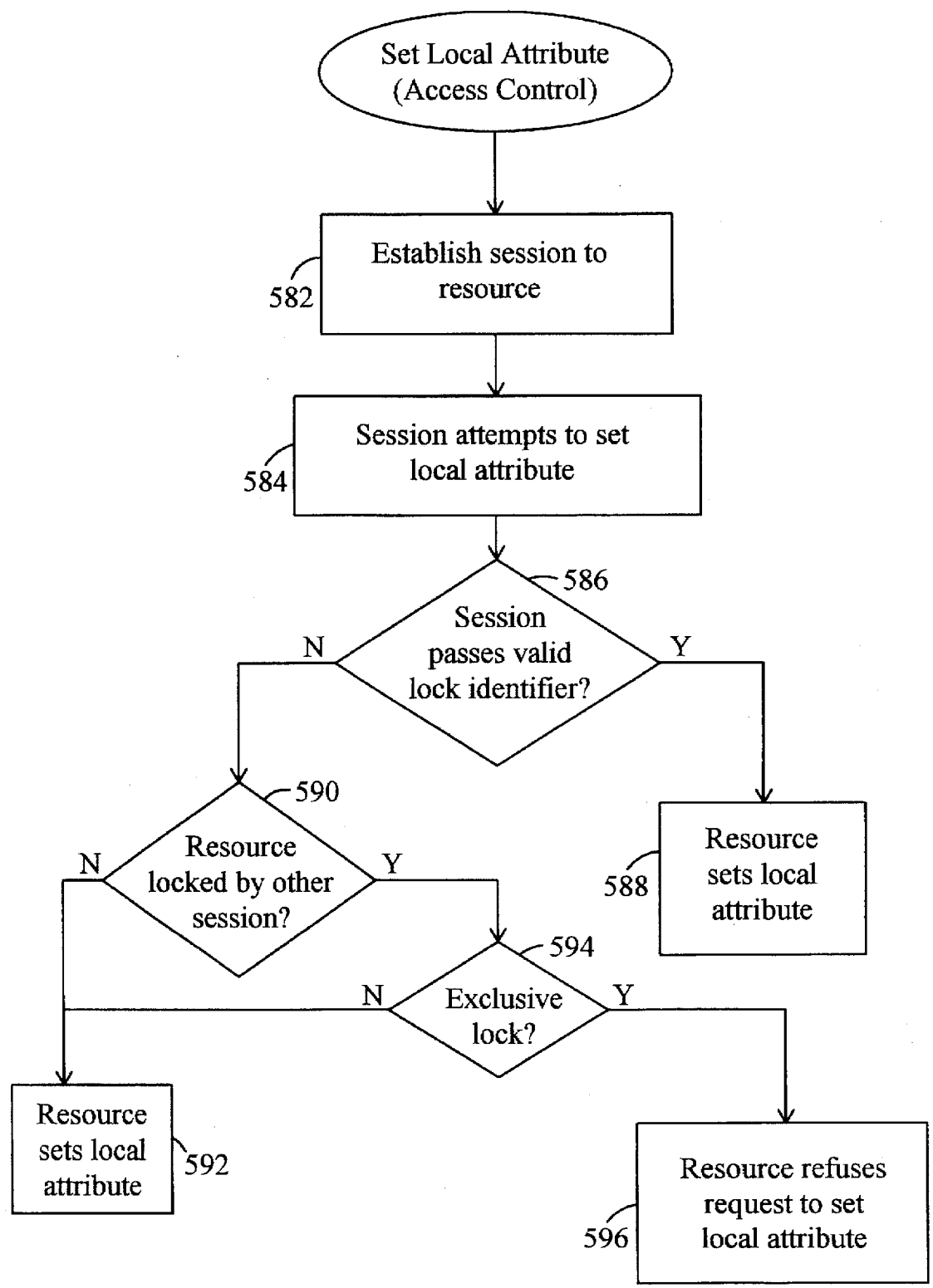
Figure 15:
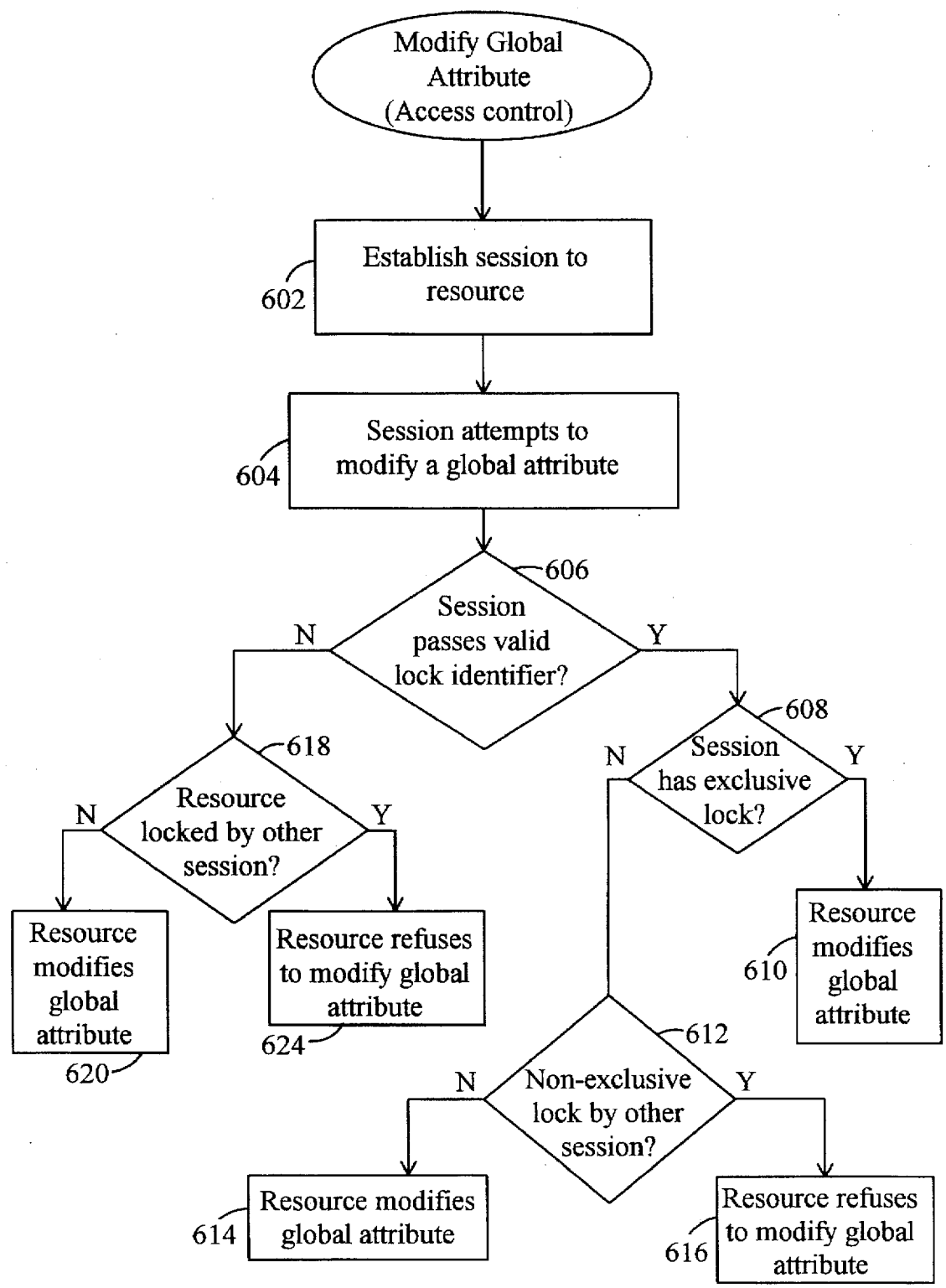

Referring now to FIGS. 12–15, flowchart diagrams illustrating the types of access permitted through a current session under various conditions are shown. FIG. 12 illustrates the access control associated with a session invoking an operation on a resource. FIG. 13 illustrates the access control associated with a session getting an attribute of a resource. FIG. 14 illustrates the access control associated with a session setting or modifying a local attribute of a resource, and FIG. 15 illustrates the access control associated with a session setting or modifying a global attribute of a resource. These flowcharts essentially describe the access control described in the tables above.

Referring now to FIG. 12, a session begins by first establishing a session to a resource in step 542, and then attempts to invoke an operation on a resource in step 544. If the session passes a valid lock identifier in step 546, i.e., if the session has either an exclusive or non-exclusive lock on the resource, then the resource performs the operation in step 548. If the session does not pass a valid lock identifier in step 546, then if the resource is not locked by another session in step 550, the resource performs the operation in step 552. If the resource is locked by another session and that lock is a non-exclusive lock in step 554, then the resource performs the operation in step 552. If another session has an exclusive lock on the resource in step 554, then the resource refuses to perform the requested operation in step 556.

Referring now to FIG. 13, the access control associated with a session getting an attribute of a resource is shown. A session begins by first establishing a session to a resource in step 562, and then attempts to get an attribute of the resource in step 564. If the session passes a valid lock identifier in step 566, i.e., if the session has either an exclusive or non-exclusive lock on the resource, then the resource provides the requested attribute in step 568. If the session does not pass a valid lock identifier in step 566, then if the resource is not locked by another session in step 570, the resource performs the operation in step 572. If the resource is locked by another session and that lock is a non-exclusive lock in step 574, then the resource provides the requested attribute in step 572. If another session has an exclusive lock on the resource in step 574, then the resource refuses to provide the requested attribute in step 576.

Referring now to FIG. 14, the access control associated with a session setting a local attribute of a resource is shown. A session begins by first establishing a session to a resource in step 582, and then attempts to set a local attribute of the resource in step 584. If the session passes a valid lock identifier in step 586, i.e., if the session has either an exclusive or non-exclusive lock on the resource, then the resource sets or modifies the local attribute in step 588. If the session does not pass a valid lock identifier in step 586, then if the resource is not locked by another session in step 590, the resource sets the local attribute in step 592. If the resource is locked by another session and that lock is a non-exclusive lock in step 594, then the resource sets or modifies the local attribute in step 592. If another session has an exclusive lock on the resource in step 594, then the resource refuses to set the local attribute in step 596.

Referring now to FIG. 15, the access control associated with a session setting a global attribute of a resource is shown. A session begins by first establishing a session to a resource in step 602, and then attempts to set or modify a global attribute of the resource in step 604. If the session passes a valid lock identifier in step 606 and has an exclusive lock in step 608, then the resource sets or modifies the global attribute in step 610. If the session passes a valid lock identifier in step 606 and the session has a non-exclusive lock, if another session has a non-exclusive lock in step 612, the resource refuses to modify the global attribute. If the session passes a valid lock identifier in step 606 and the session has a non-exclusive lock, if no other session has a lock in step 612, the resource modifies the global attribute. If the session does not pass a valid lock identifier in step 906, then if the resource is not locked by another session in step 618, the resource sets the global attribute in step 620 If the resource is locked by another session in step 618, then the resource refuses to set the global attribute in step 616.

LOCK SHARING

As noted above, the locking mechanism in VISA is session based, and thus multiple threads sharing a session which has locked a resource have the same privileges for accessing the resource, some applications, through, might have separate sessions to a resource for different threads, and the application may want all the session in that application to enjoy the same privilege as the session that locked the resource. In other cases, there might be a need to share locks among sessions in different applications. Essentially, sessions that acquire a lock to a resource may share the lock with other sessions considered to be trustworthy, but nevertheless exclude other sessions from access.

A non-exclusive lock, by nature, is sharable, e.g. if a session acquires a non-exclusive lock to a resource, other sessions can also acquire a non-exclusive lock to that resource, and no explicit lock sharing mechanism is needed. The section discusses the mechanism that allows sharing of exclusive locks.

Locks are shared by passing the lock identifier, which allows other sessions to acquire locks even when the resource is already locked. When an application calls either the viLock() or the viLockRsrc() operation, a lock identifier is returned in the lockId parameter of the operation upon successful locking. The application can make this lock identifier available to other applications for sharing services of the locked resource. Before the other applications can access the locked resource through a session, they need to acquire the lock using the same lock identifier in the lockId parameter of the viLock () or the viLockRsrc () operation on that session.

Normally, if a resource is locked with exclusive lock, any subsequent viLock () or viLockRsrc() calls that attempt to lock that resource will fail. However, if the subsequent viLock() or viLockRsrc() calls pass in the lock identifier of the original lock, the subsequent calls succeed. If the lock request is successful, the resource returns a different lock identifier. In a VISA system, sessions release the locks independently and the resource is unlocked when all the sessions release the lock.

When a session requests an exclusive lock with viLock () or viLockRsrc (), the session specifies whether that lock is sharable or not. If the session requests a sharable lock on a resource, then the session can pass the lock identifier to other sessions, allowing the other sessions to acquire a lock to the same resource and thereby share the lock. If the session requests a non-sharable lock, other sessions cannot acquire a lock to the same resource even if other sessions have the lock identifier. This minimizes the possibility of some "malicious" sessions obtaining locks fraudulently by faking lock identifiers.

Furthermore, when a session requests an exclusive lock that is sharable, the session specifies whether it can be used to obtain an exclusive lock or non-exclusive lock. For example, if session A acquires an exclusive lock that is sharable and can be used to obtain an exclusive lock (VI_SHARABLE_EXCLUSIVE), session A can pass the lock identifier to session B, and session B can use that lock identifier to obtain either an exclusive lock or non-exclusive lock. However, if session A acquires an exclusive lock that is sharable but can be used only to obtain a non-exclusive lock (VI_SHARABLE_NON_EXCLUSIVE), session A can pass the lock identifier to B, and session B can only use that lock identifier to obtain a non-exclusive lock.

ACCESS PRIVILEGES

If a session acquires an exclusive lock to a resource, the session can perform any operation and update any global attribute in that resource, regardless of what type of lock other sessions have on that resource.

Current Session Has Exclusive Lock

| Access | Any Other Sessions Has: | | |
|---|---|---|---|
| | No Locks | Non-exclusive Lock | Exclusive Lock |
| Get Attributes | Yes | Yes | Yes |
| Set Local Attributes | Yes | Yes | Yes |
| Set Global Attributes | Yes | Yes | Yes |
| Operations | Yes | Yes | Yes |

It is noted that the above table is similar to the table "Current Session Has Exclusive Lock" with the second and third column filled up. Lock sharing makes it possible for a session to have an exclusive lock while another session has a non-exclusive or exclusive lock.

If a session acquires a non-exclusive lock to a resource, the following table outlines what it can do under different locking conditions.

Current Session Has Non-Exclusive Lock

| Access | Any Other Session Has: | | |
|---|---|---|---|
| | No Locks | Non-exclusive Lock | Exclusive Lock |
| Get Attributes | Yes | Yes | Yes |
| Set Local Attributes | Yes | Yes | Yes |
| Set Global Attributes | Yes | No | No |
| Operations | Yes | Yes | Yes |

It is noted that the above table is similar to the table "Current Session Has Non-Exclusive Lock" with the third column filled up. With lock sharing it is now possible for a session to have an exclusive lock while another session has a non-exclusive lock.

CHANGING LOCK TYPES

It is useful for a session to have the ability to change a non-exclusive lock to an exclusive lock and to change an exclusive lock to a non-exclusive lock. Normally, this can be done with a viUnlock() or viUnlockRsrc() operation followed by a viLock() or viLockRsrc() call. The drawback of that approach is that there is a period between the execution of viUnlock() or viUnlockRsrc() and the viLock() or viLockRsrc() operation where some other sessions could obtain a lock, thereby causing viLock() to fail. In a VISA system, viLock() or viLockRsrc() can be used to change locks in one operation to prevent this problem.

To change a non-exclusive lock to an exclusive lock, the lock identifier of the non-exclusive lock is passed and VI_EXCLUSIVE_LOCK is specified in the lockType parameter of the viLock() or viLockRsrc() operation. The operation succeeds if no other session has a lock, exclusive or non-exclusive, on the resource. Otherwise, the operation fails. If the operation succeeds, the non-exclusive lock is relinquished automatically and a new exclusive lock is obtained, with its lock identifier returned in the lockId parameter. If the operation fails, the non-exclusive lock is retained and the user can call viUnlock() or viUnlockRsrc() to relinquish the non-exclusive lock.

To change an exclusive lock to a non-exclusive lock, the lock identifier of the exclusive lock is passed and VI_NON_EXCLUSIVE_LOCK is specified in the lockType parameter of the viLock () or viLockRsrc() operation. The operation to change exclusive lock to non-exclusive lock always succeeds. The exclusive lock is relinquished automatically and a new non-exclusive lock is obtained, with its lock identifier returned in the lockId parameter.

If is noted that changing an exclusive lock to a non-exclusive lock always succeeds. Also, if the change is successful, the old lock is relinquished automatically.

ATTRIBUTES

| Symbolic Name | Access Privilege | Data Type | Range |
|---|---|---|---|
| VI_ATTR_RSRC_LOCK_STATE | RO | Global | ViUInt16 | VI_NO_LOCK VI_NON_EXCLUSIVE_LOCK VI_EXCLUSIVE_LOCK |

The VI_ATTR_RSRC_LOCK_STATE attribute is the locking state of the resource. The resource can be locked with an exclusive lock or a non-exclusive lock, or the resource can be unlocked.

EVENTS

VI_EVENT_RSRC_LOCK_CHANGED

The event VI_EVENT_RSRC_LOCK_CHANGED informs the application that the state of the lock has been updated

LOCKING OPERATIONS

The locking operations defined to support the locking scheme of the present invention are as follows:

viLock(vi, lockType, shareType, timeout, lockId)
viLockRsrc(vi, rsrcName, lockType, shareType, timeout, lockId)
viUnlock(vi, lockId)
viUnlockRsrc(vi, rsrcName, lockId)

viLock(vi, lockType, lockId)

viLockRsrc(vi, rsrcName, lockType, shareType, timeout, lockId)

The viLock and viLockRsrc() operations establish an access mode to the specified resource and are used to obtain a lock on the specified resource. The caller specifies the type of lock requested (exclusive or non-exclusive lock), the sharing mode of the lock (either sharable, sharable for obtaining exclusive or shamble for obtaining non-exclusive locks), and how long the operation will suspend while waiting to acquire the lock before timing out. This operation additionally allows for the sharing of locks and changing of locks, i.e., upgrading or downgrading of locks.

Parameters

| Name | Direction | Type | Description |
|---|---|---|---|
| vi | IN | ViSession | Unique logical identifier to a session. |
| rsrcName | IN | ViRsrc | Unique logical identifier of a resource. |
| lockType | IN | ViUInt16 | Specifies the type of lock requested, which can be VI_EXCLUSIVE_LOCK or VI_NON_EXCLUSIVE_LOCK |
| shareType | IN | ViUInt16 | Specifies the sharing mode of the lock, which can be VI_NON_SHARABLE, VI_SHARABLE_EXCLUSIVE or VI_SHARABLE_NON_EXCLUSIVE. This parameter is ignored if the type of lock requested is non-exclusive. |
| timeout | IN | ViUInt32 | Absolute time period in time units a |

| Name | Direction | Type | Description |
| --- | --- | --- | --- |
|  |  |  | resource waits for getting unlocked by the locking session before returning this operation with an error. The time unit is specified in the attribute of the resource. |
| lockId | IN/OUT | ViPLock | A resource returns a unique identifier for the lock if the operation succeeds. The lock identifier is used in viUnlock() to relinquish the lock. This parameter is used to allow the sharing of exclusive locks by passing in the lockId of a previously acquired sharable lock. This parameter is also used for upgrading or downgrading locks. If the resource is not locked, the parameter is treated as a purely output parameter, i.e., the input value is ignored. |

Return Values

Return values have the type ViStatus and are used to return the operational return status. The return value returns either a completion code or an error code as follows.

|  | Description |
| --- | --- |
| Completion Code |  |
| VI_SUCCESS | Specified access mode is successfully acquired. |
| VI_SUCCESS_SHARED_LOCK | Specified access mode is successfully acquired and it is shared with multiple sessions. |
| Error Codes |  |
| VI_ERROR_INV_SESSION | The given vi does not identify a valid session. |
| VI_ERROR_INV_RSRC_NAME | Invalid resource name specified in rsrcName parameter. |
| VI_ERROR_RSRC_LOCKED | Specified type of lock cannot be obtained because the resource is already locked with a lock type incompatible with the lock requested. |
| VI_ERROR_INV_LOCK_TYPE | The specified type of lock is not supported by this resource. |
| VI_ERROR_INV_LOCK_ID | The lockId value passed in is not a valid lock identifier to the specified resource. |
| VI_ERROR_NON_SHARABLE | The lockId value passed in specified a non-sharable lock. |
| VI_ERROR_UPQRADE_FAILED | Changing a non-exclusive lock to an exclusive lock failed because another session has locked the resource. |

It is noted that if a value specified in the lockId parameter does not correspond to a valid lock identifier for the resource, then the operation fails. If a session is closed and the session has lock(s) to the resource, then the resource locked through that session is unlocked before viClose() returns. If the viLock() or viLockRsrc() operation is used to acquire a on-exclusive lock, then the shareType parameter is ignored. If the viLock() or viLockRsrc() operation cannot acquire the lock immediately, then the operation waits for at least the time period specified in the timeout parameter before returning with an error.

viUnlock(vi, lockId)
viUnlockRsrc(vi, rsrcName, lockId)

These operations relinquish a lock for the specified resource, i.e., these operations relinquish the lock previously obtained and specified by the lockId parameter.

Parameter

| Name | Direction | Type | Description |
| --- | --- | --- | --- |
| vi | IN | ViSession | Unique logical identifier to a session. |
| rsrcName | IN | ViRsrc | Unique logical identifier of a resource. |
| lockId | IN | ViLock | A unique identifier for the lock. |

Return Values

The return values have the type ViStatus and are used to return the operational return status. The return value returns either a completion code or an error code as follows.

|  | Description |
| --- | --- |
| Completion Codes |  |
| VI_SUCCESS | Lock successfully relinquished. |
| VI_WARN_NON_EXCLUSIVE_LOCKED | Call succeeded, but resource is still locked with VI_NON_EX-CLUSIVE_LOCK. |
| VI_WARN_EXCLUSIVE_LOCKED | Call succeeded, but resource is still locked with VI_EXCLU-SIVE_LOCK. |
| Error Code |  |
| VI_ERROR_INV_SESSION | The given vi does not identify a valid session. |
| VI_ERROR_INV_LOCK_ID | Invalid lock identifier specified. |
| VI_ERROR_LOCK_NOWNER | lockId specifies a valid lock but the lock did not originate from the specified session vi. |

If a session still has a non-exclusive lock on the resource after the lock associated with the lockId parameter in the viUnlock() or viUnlockRsrc() operation is relinquished, then the operation returns VI_WARN_NON_EXCLUSIVE_LOCKED. If a session still has an exclusive lock on the resource after the lock associated with the lockId parameter in the viUnlock() or viUnlockRsrc() operation is relinquished, then the operation returns VI_WARN_EXCLUSIVE_LOCKED.

If the lockId parameter specifies a valid lock identifier for a lock that originates from the session specified in the vi parameter of the viUnlock() operation, then the viUnlock() operation relinquishes the lock and returns VI_SUCCESS. If the lockId parameter specifies a valid lock identifier and the rsrcName parameter specifies a valid resource name, then the viUnlockRsrc() operation returns VI_SUCCESS. If the lockId parameter specifies a valid lock identifier for a lock that did not originate from the session specified in the vi parameter of the viUnlock() operation, then the viUnlock() operation returns VI_ERROR_LOCK_NOWNER and does not relinquish the lock.

REGISTRATION SERVICES

The registration services allow developers to register and unregister newly created resources with a resource manager, preferably the VISA Resource Manager 140.

viRegisterRsrc (rsrcName, idList, operations)

viRegisterRsrc() registers a server-type resource into the VISA Resource Manager resource repository. This operation also registers server's aliases and operations publicly available from the resource. This information is used by the VISA Resource Manager 140 to resolve location and other service requests from clients.

Parameters

| Name | Direction | Type | Description |
|---|---|---|---|
| rsrcName | IN | ViRsrc | Unique logical identifier of a VISA resource. |
| idList | IN | ViRsrcList | A list of identifier aliases for given resource. |
| operations | IN | ViOps | A list of duplex containing operation identifier, and invocation method. |

Return Values

Return values have the type ViStatus and are used to return the operational return status. The return value returns either a completion code or an error code as follows.

| | Description |
|---|---|
| Completion Codes | |
| SUCCESS | Returns SUCCESS on successfull registration of a resource. |
| Error Codes | |
| ERROR_DUPLICATE_NAME | Invalid resource name reference. |
| ERROR_DUPLICATE_ID | Resource name conflict. |
| ERROR_FAILED_TO_LOCATE | Insufficient location information. | viUnregisterRsrc (resource)

viUnregisterRsrc() is used to remove an available resource or unregister it from a resource manager, such as the VISA Resource Manager. This operation closes all existing sessions from the caller to the resource. If there are other active sessions to the resource, then this operation fails.

Parameter

| Name | Direction | Type | Description |
|---|---|---|---|
| resource | IN | ViRsrc | Unique logical identifier of a VISA resource. |

Return Values

Return values have the type ViStatus and are used to return the operational return status. The return value returns either a completion code or an error code as follows.

| | Description |
|---|---|
| Completion Codes | |
| SUCCESS | Returns SUCCESS if resource is successfully unregistered from the VISA Resource Manager domain |
| Error Codes | |
| ERROR_INV_REFERENCE | Invalid resource reference. |

In the preferred embodiment, a resource is freed when there is no active session to the resource.

EVENTS

The VISA Resource Template 130 defines a common mechanism for an application to become aware of an occurrence of certain conditions. These occurrences are referred to as events. Typically, events occur because of a condition requiring the attention of applications, the beginning or ending of activity, or an abnormal condition in the system. An event is a means of communication between a VISA resource and its applications. Events in a VISA system cover a broad scope and can carry information about the following conditions:

Conditions arising in hardware requiring attention of applications. For example, an application needs to be alerted when a device that it is controlling requests service, such as an SRQ in GPIB.

Conditions arising in hardware requiting immediate response of applications. For example, an application needs to know when a hardware line indicating system failure is being driven, such as the SYSFAIL line in VXI.

Conditions of error in normal execution sequence. For example, an application wants a uniform way of determining when an operation does not succeed.

The beginning and ending of an activity pertaining to a resource. For example, an application is interested in knowing when certain system services are brought online or offline.

An abnormal state condition. For example, a resource transits into an invalid state and it has to terminate normal execution.

Error conditions in the normal execution sequence. For example, an application wants a uniform way of determining when an operation does not succeed.

A VISA system includes a mechanism for receiving events into an application called the event handling/processing mechanism. This section describes how a VISA application receives, acknowledges and creates events. The functional view of the events that include receiving, acknowledgment, and creation of events is discussed in the general event model in the section titled "Event Model." A VISA system classifies events depending upon the information of the condition. Different classes of events used in the present invention are discussed in the section titled "Event Classification and Representation." The operations that support the event model in VISA are defined in the section titled "Event Handling Operations and Handler Prototype." VISA events cover the notification of certain conditions only. As such, events do not cover the assertion of hardware conditions, such as the driving of a trigger line, or the assertion of an interrupt. The assertion of hardware conditions is handled by operations of the individual resources.

Event Model

Figure 16:
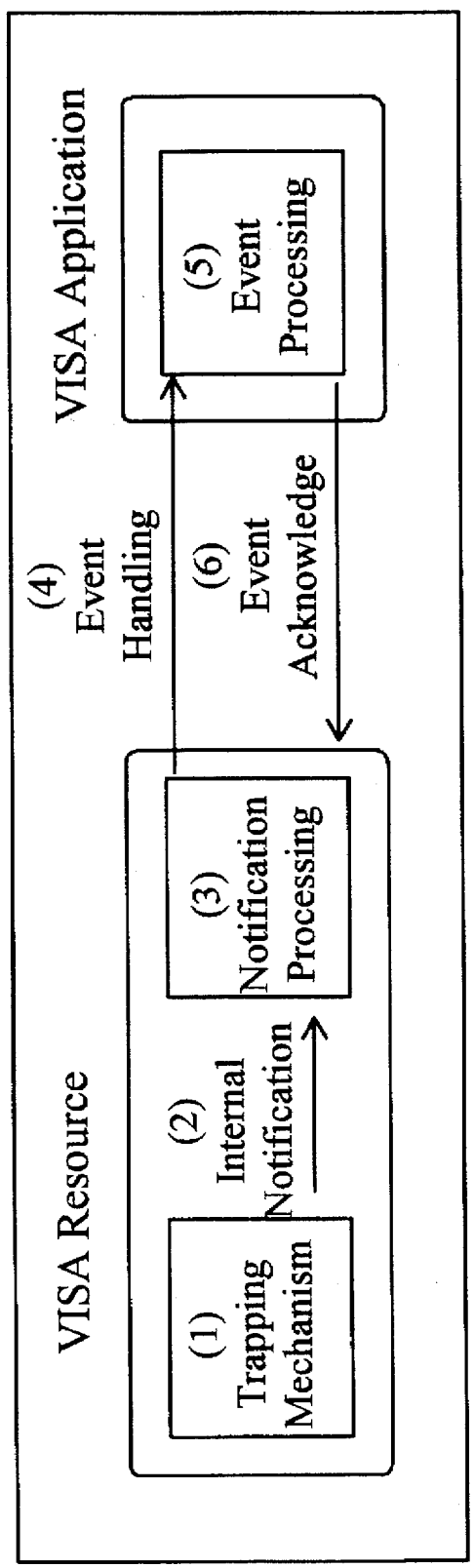
FIG. 16 illustrates the operation of event processing in the present invention.

Referring now to FIG. 16, the VISA event model according to the present invention includes three aspects: trapping and notification, handling and processing, and acknowledgment. Event trapping and notification involves a resource becoming aware of the event and passing the event to sessions that are enabled to receive the event. This aspect is discussed in the section "Event Trapping and Notification." Handling and processing involve an application being informed that an event has occurred. In a VISA system, there are several ways that an application can request to receive events, and these are discussed in the section titled "Event Handling and Processing." Event acknowledgment is necessary for certain protocols that may require some form of handshaking. This is discussed in the section titled "Event Acknowledgment."

EVENT MODEL AND ORDER/SEQUENCE

Event Model Overview

Figure 17:
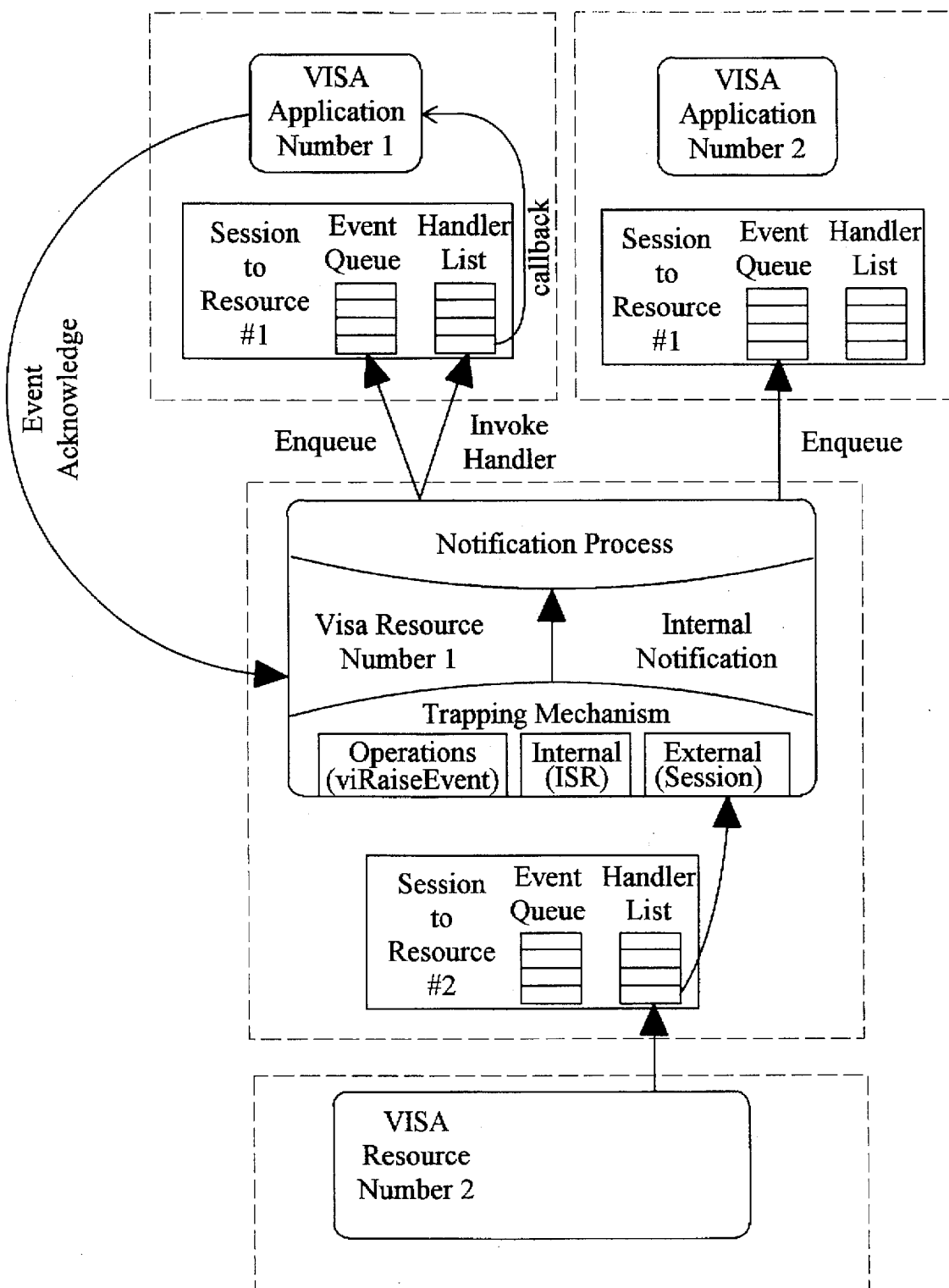
FIG. 17 is a more detailed diagram illustrating event processing according to the present invention.

This section introduces the event model using an example of a resource's implementation of the VISA event model. This section also covers the event model from an application's point of view as well as how a resource would implement it internally. FIG. 17 is a detailed overview of the VISA event model.

Overview of Event Model

The application's view of the event handling mechanisms is as follows. An application can open multiple sessions to a resource and can then enable each session to receive events of a specified type using either the callback or the queuing mechanism, or both. This can be done using the viEnableEvent() operation. Before enabling for the callback mechanism, the application must install at least one handler using the viInstallHandler() operation. Once enabled, the resource will maintain for each session both a list of handlers to be invoked for an event type and the session's event queues.

A resource's implementation of the event model uses a three-step process that includes trapping events as well as notifying the applications. The resource obtains information of an event occurrence through the trapping mechanism. Once an event is trapped, the resource notifies the handling mechanism of the event occurrence using the resource's internal notification mechanism. Finally, the handling mechanism notifies the applications of the event occurrence. These three steps are described in more detail below.

The trapping mechanism allows a resource to be informed of an event occurrence in three possible ways: internal trapping, external trapping, and operations.

Once a resource traps an event (either internally or externally), the event is transmitted to the resource's notify mechanism. The means of transmitting is internal notification of event occurrence and is described by the arrow in the diagram from the trapping mechanism to the notify mechanism. Once the resource's handling mechanism is made aware of the event occurrence, the handling mechanism uses the algorithm specified below for invoking the callback handlers and/or queueing the event occurrence for each enabled session.

Event Notification Algorithm

```
For this specific event type
    For sessions enabled for callback mechanisms
        For all handlers in the handler list
            Invoke handler
    For each session waiting on this event
        Unblock wait
    For all other* sessions enabled for queuing mechanism on this event
        Queue the event occurrence.
```

*Other sessions are those on which a wait operation is not unblocked

Sometimes, an application's session may need to acknowledge the receipt of an event to the source of event. The session can do so using the acknowledgment mechanism provided by a VISA system. An application can use the viAcknowledgeEvent() operation to acknowledge the source of event notification. This is denoted by the lines from the application to the notification mechanism in FIG. 17, Overview of Event Model.

Event Trapping and Notification

Internal trapping means that the need for the event was generated internally and the event occurrence was constructed within the resource. An example of receiving events internal to a resource is VI_EVENT_QUEUE_FULL. One method by which internal trapping of events can occur is by using an interrupt service routine. External trapping means that the event was received from another resource. Examples of receiving events externally from other resources are an alert condition such as a system failure (VI_EVENT_ALERT) and a resource coming on line (VI_EVENT_RSRC_ACTIVE). For trapping external event occurrences, the resource can either install callback routines or enable the queueing mechanism on other resources as described in the section titled "Event Handling and Processing." This allows the event handling mechanism to be consistent for a user application as well as to any other resource in the VISA system. Finally, the third method in a VISA system for trapping events is through the use of operations to programmatically generate an event within that resource. The VISA Resource Template defines an operation viRaiseEvent() for this specific purpose.

There are three possible ways for a VISA resource to be informed of the occurrence of an event: internal trapping, external trapping, and operations. Internal trapping means that the event is first constructed in that resource. Examples of internal trapping include interrupt service routines (ISRs) and parameter validation errors or the overflow of queue in a session. External trapping means that the event was received from another resource. A resource can receive events from other resources in exactly the same fashion as an application does. Finally, a resource may define operations by which an application can programmatically generate an event within that resource. One such operation defined by VISA is viRaiseEvent().

Once a resource has trapped an event, it passes the event to its notification mechanism. The notification mechanism then informs whichever sessions are enabled to receive that event, using each event handling mechanism for which the session is currently enabled.

An application can use the viRaiseEvent() operation to cause a resource to signal its sessions that an event has occurred. Through this operation, it is possible to target the notification of the event toward a specific session (the one on which the operation is invoked) or all the sessions of the resource. The VISA model requires every VISA resource to support programmatic event notification for all the events that it supports.

Once a resource has trapped an event, the resource passes the event to its notification mechanism. The notification mechanism then informs the respective sessions that are enabled to receive that event, using each event handling mechanism for which the session is currently enabled. The passing of the event from the trapping mechanism to the notify mechanism is represented by the arrow in FIG. 17.

Every VISA resource allows programmatic event notification for all the event types that it supports. By allowing programmatic event notification, the VISA event model can be used to simulate events such as the occurrence of an interrupt.

Event Handling and Processing

The VISA event model provides two different ways for an application to receive event notification, these being event queueing and event callbacks. The first method is to place all the occurrences of a specified event type in a session-based queue, wherein there is one event queue per session. The application can receive the event occurrences later by dequeueing them with either the viWaitOnEvent() or the viWaitOnMultipleEvents() operation. The other method is to call the application directly, invoking a function which the application installed prior to enabling the event. A callback handler is invoked on every occurrence of the specified event. There can be multiple handlers installed on the same session.

Every VISA resource preferably implements both the queueing and callback event handling mechanisms. The queueing and callback mechanisms are suitable for different programming styles. The queuing mechanism is generally useful for non-critical events that do not need immediate servicing. The callback mechanism, on the other hand, is useful when immediate responses are needed. These mechanisms work independently of each other, and both can be enabled at the same time. By default, a session is not enabled to receive any events by either mechanism. The viEnableEvent() operation can be used to enable a session to respond to a specified event type using either the queueing mechanism, the callback mechanism, or both. Similarly, the viDisableEvent() operation can be used to disable one or both mechanisms for receiving events. Because the two methods work independently of each other, one can be enabled or disabled regardless of the current state of the other. The viQueryEventMechanism() operation can be used to get the currently enabled event handling mechanisms for a specific event.

The queueing mechanism is discussed in the section titled "Queueing Mechanism." The callback mechanism is described in the section titled "Callback Mechanism."

Queuing Mechanism

The queueing mechanism in a VISA system gives an application the flexibility to receive events only when it requests them. When a session is enabled for queueing, events for that session are placed in a priority queue. Each event defines its own priority. The priority queue allows the highest priority events to be put ahead of lower-priority events that are already in the queue. Events of the same priority are put in FIFO order. A separate event queue is maintained for each individual session.

Each event which is to be placed on a queue is queued in the order of its priority. If an event is to be placed on a queue, and there are events on the queue of equal priority, then the event to be queued is placed in the queue such that it is dequeued after all the existing events.

An application retrieves event information by using either the viWaitOnEvent() operation or the viWaitOnMultipleEvents() operation. If the specified event (s) exist in the queue, these operations retrieve the event information and return immediately. Otherwise, the application thread is blocked until the specified event(s) occur or until the timeout expires, whichever happens first. When an event occurrence unblocks a thread, the event is not queued for the session on which the wait operation was invoked. Using the viWaitOnEvent() or viWaitOnMultipleEvents() operations does not mandate that the session be enabled for receiving events. For more information about these operations, see the section titled "Event Operations."

Using the viWaitOnEvent() and viWaitOnMultipleEvents() operations without being enabled for the queueing event handling mechanism may result in events being lost. Any event which arrives just before the wait operation is invoked would not be trapped and returned.

Figure 18:
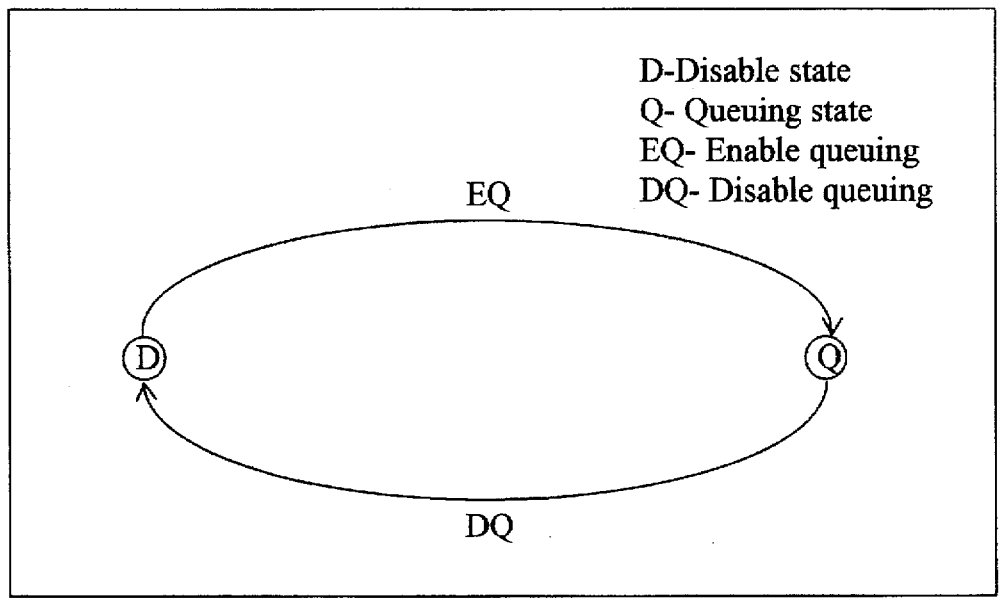
FIG. 18 illustrates a state diagram of the queueing mechanism of the present invention.

Referring now to FIG. 18, a state diagram for the queuing mechanism is shown. This state diagram includes the enabling and disabling of the queuing mechanism and the corresponding operations. The queuing mechanism of a particular session can be in one of two different states: Disabled or Queuing (enabled for queuing). A session can transition between these two states using the viEnableEvent() or viDisableEvent() operation. Once a session is enabled for queuing (EQ transition to the Q state), all the event occurrences of the specified event type are queued. When a session is disabled for queuing (DQ transition to D state), any further event occurrences are not queued, but event occurrences that were already in the event queue are retained. The retained events can be dequeued at any time using either of the wait operations. An application can explicitly clear (flush) the event queue for a specified event type using the viDiscardEventQueue() operation.

If there are any events in a session's queue, and the queueing mechanism transitions between states, then the resource does not discard any events from the queue.

The following table lists the state transitions and the corresponding values for the mechanism parameter in the viEnableEvent() and viDisableEvent() operations.

TABLE

| State Transitions for the Queuing Mechanism | | |
|---|---|---|
| Destination State | Paths Leading to Destination State | Value of mechanism parameter |
| Q | EQ | VI_QUEUE, VI_ENABLE_ALL_MECH |
| D | DQ | VI_DISABLE, VI_DISABLE_ALL_MECH |

Every VISA resource provides two attributes for use in configuring and maintaining session queues. The VI_ATTR_MAX_QUEUE_LENGTH attribute specifies the maximum number of events that can be queued at any time on the given session. The VI_ATTR_QUEUE_TRIP_POINT attribute specifies a trip point in the event queue. The purpose of this trip point is to warn the application when the event queue contains the specified number of events. For example, if an application needs to know if its queue is ever more than half full, this attribute value should be set to half of whatever value the attribute VI_ATTR_MAX_QUEUE_LENGTH is set to.

Once the trip point is set and the queue fills up to the trip point, the application receives a warning through the event VI_EVENT_QUEUE_TRIP_POINT. The application also receives a warning status on the next dequeue of an event. After receiving this warning, an application can take appropriate actions such as increasing the queue size or removing events from the queue. Also, if the event queue fills up to the value set in VI_ATTR_MAX_QUEUE_LENGTH, the application receives the system event VI_EVENT_QUEUE_FULL. Once a queue becomes full, existing event occurrences may be lost when newer events are received. Any new event occurrence is placed in the order of its priority, and the event with the lowest priority and minimum timestamp (that is, the oldest event) is discarded.

Event Attributes

| Symbolic Name | Access Privilege | Data Type | Range |
|---|---|---|---|
| VI_ATTR_MAX_QUEUE_LENGTH | R/W | Local | ViUInt16 | N/A |
| VI_ATTR_QUEUE_TRIP_POINT | R/W | Local | ViUInt16 | N/A |

Every VISA resource supports both the VI_ATTR_MAX_QUEUE_LENGTH and VI_ATTR_QUEUE_TRIP_POINT attributes as well as both the VI_EVENT_QUEUE_FULL and the VI_EVENT_QUEUE_TRIP_POINT events.

If a queue is full, and a new event is to be placed on the queue, then the event with the lowest priority and the minimum timestamp is discarded, and the resource causes an internal trap of VI_EVENT_QUEUE_FULL. If a queue is filled to the trip point value, and a new event is to be placed on the queue, then the resource causes an internal trap of VI_EVENT_QUEUE_TRIP_POINT.

Callback Mechanism

The VISA event model also allows applications to install functions which can be called back when a particular event type is received. The viInstallHandler() operation can be used to install handlers to receive specified event types. These handlers are invoked on every occurrence of the specified event, once the session is enabled for the callback mechanism. At least one handler must be installed before a session can be enabled for sensing using the callback mechanism.

If no handler is installed for an event type, and an application calls viEnableEvent(), and the mechanism parameter is VI_HNDLR, then the viEnableEvent() operation returns the error VI_ERROR_HNDLR_NINSTALLED.

A VISA system allows applications to install multiple handlers for an event type on the same session. Multiple handlers can be installed through multiple invocations of the viInstallHandler() operation, where each invocation adds to the previous list of handlers. If more than one handler is installed for an event type, each of the handlers is invoked on every occurrence of the specified event(s). VISA specifies that the handler installed last is the first to be invoked, then the one installed just before it, and so on.

A VISA resource allows multiple handlers to be installed for each event type for each session. If multiple handlers are installed for an event type on the same session, then the handlers are invoked in the reverse order of the handlers installation (LIFO order). When a handler is invoked, the VISA resource provides the event context as a parameter to the handler. By default, the event context is filled in by the resource. Applications can also fill certain parts of the context while enabling the event by filling the context structure passed to viEnableEvent(). The context fields filled by an application are passed unchanged to the handlers when they are invoked.

Besides filling the event context, an application can also supply a reference to any application-defined value while installing handlers. This reference, or pointer, is passed back to the application as the userHandle parameter, to the callback routine during handler invocation. This allows applications to install the same handler with different application-defined contexts. For example, an application can install a handler with a fixed value 0x1 on a session for an event type. An application can install the same handler on the same session with a different value, say 0x2, for the same event type. The two installations of the same handler are different from each other. Both the handlers are invoked when the event of the given type occurs. However, in one invocation the value passed to userHandle is 0x1 and in the other it is 0x2. Thus, VISA event handlers are uniquely identified by a combination of the handler address and user context pair. This identification is particularly useful when different handling methods need to be performed depending on the user context data. Refer to the viEventHandler() prototype for more information.

An application may install the same handler on multiple sessions. In this case, the handler is invoked in the context of each session for which it was installed. If a handler is installed on multiple sessions, then the handler is called once for each installation when an event occurs.

An application can uninstall any of the installed handlers using the viUninstallHandler() operation. This operation can also uninstall multiple handlers from the handler list at one time. The viQueryHandlers() operation can be used to query the currently installed handlers on an event type.

Figure 19:
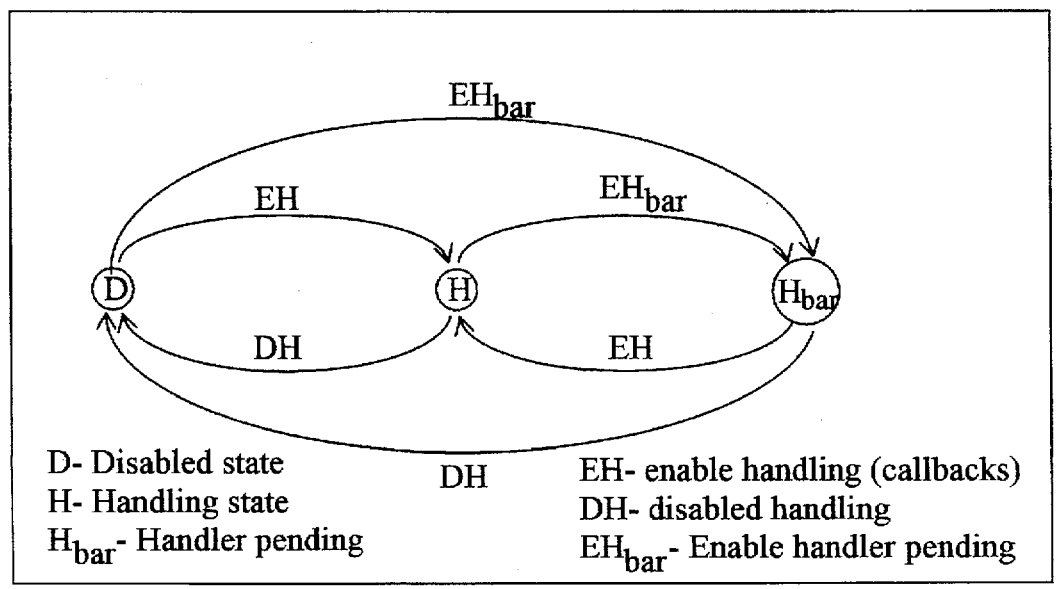
FIG. 19 illustrates a state diagram of the callback mechanism of the present invention.

Referring now to FIG. 19, a state diagram of a resource implementing a callback mechanism is shown. This state diagram includes the enabling and disabling of the callback mechanism in different modes and also briefly describes the operations that can be used for state transitions. The table immediately below lists different state transitions and parameter values for the viEnableEvent() and viDisableEvent() operations.

The callback mechanism of a particular session can be in one of three different states: Disabled, Handling, or Suspended handling. When a session transitions to the handling state (EH transition to H state), the callback handler is invoked for all the occurrences of the specified event type. When a session transitions to the suspended handling state ($EH_{bar}$ transition to $H_{bar}$), the callback handler is not invoked for any new event occurrences, but occurrences are kept in a suspended handler queue. The handler is invoked later, when a transition to the handling state occurs. When a session transitions to the disabled state (DH transition to the D state), the session is desensitized to any new event occurrences, but any pending occurrences are retained in the queue. In the suspended handling state, a maximum of the VI_ATTR_MAX_QUEUE_LENGTH number of event occurrences are kept pending. If the number of pending occurrences exceeds the value specified in this attribute, the lowest-priority and oldest events are discarded as described in the section titled "Queueing Mechanism."

If the number of pending occurrences equals to the VI_ATTR_QUEUE_FULL value, and a new event arrives, then the event with the lowest priority and the minimum timestamp is discarded. Also, if the number of pending occurrences equals to the VI_ATTR_QUEUE_FULL value, and a new event arrives, then the resource causes an internal trap of VI_EVENT_QUEUE_FULL.

If the number of pending occurrences equals to the VI_ATTR_QUEUE_TRIP_POINT value, and a new event arrives, then the resource causes an internal trap of VI_EVENT_QUEUE_TRIP_POINT.

The following table lists the state transition diagram for the callback mechanism and the corresponding values for the mechanism parameter in the viEnableEvent() or viDisableEvent() operations.

As described above, VISA resources specify whether occurrences of an event type require acknowledgment, depending upon the protocol they implement. However, an application can overwrite this requirement specified by the resource. In the viEnableEvent() operation, the application can specify whether it will acknowledge occurrences of the

TABLE

State Transition Table for the Callback Mechanism

| Destination State | Source State | Paths Leading to Destination State | Value of Mechanism Parameter |
| --- | --- | --- | --- |
| H | D | EH | VI_HNDLR, VI_ENABLE_ALL |
| H | $H_{bar}$ | EH | VI_HNDLR, VI_ENABLE_ALL |
| $H_{bar}$ | D | $EH_{bar}$ | VI_SUSPEND_HNDLR |
| $H_{bar}$ | H | $EH_{bar}$ | VI_SUSPEND_HNDLR |
| D | H | DH | VI_DISABLE, VI_DISABLE_ALL |
| D | $H_{bar}$ | DH | VI_DISABLE, VI_DISABLE_ALL |

If the callback mechanism mode for event handling is changed from VI_SUSPEND_HNDLR to VI_HNDLR, then all the pending events for the event type specified in eventType parameter of viEnableEvent() are handled before viEnableEvent() completes.

It is noted that the queuing mechanism and the callback mechanism operate independently of each other. In a VISA system, sessions keep information for event occurrences separate for both mechanisms. If one mechanism reaches its predefined limit for storing event occurrences, it does not directly affect the other mechanism.

Event Acknowledgment

Many event types defined by VISA require an acknowledgment. A typical example is that of two VXI devices implementing the Asynchronous Trigger protocol, which requires an acknowledgment from the receiving VXI device to the triggering VXI device.

A VISA system allows applications to acknowledge the receipt of events using the viAcknowledgeEvent() operation. Whenever an event is received for which acknowledgment is required, an application should acknowledge the event occurrence using this operation. To determine whether an acknowledgment is required, an application can check the viEventAckReqr field in the event context structure. The event context passed to the viAcknowledgeEvent() operation should be the same event context which was received with the event notification, in order to uniquely identify the event occurrence in the operation.

As described in the section titled "Event Handling," multiple sessions can be enabled for an event type. When a resource finds out that an event has occurred (for example, through an interrupt), the resource notifies all its sessions of the event occurrence. If the event type requires acknowledgment, all the listening sessions must acknowledge this event occurrence. The resource performs necessary actions only after receiving acknowledgments from all the listening (enabled) sessions. In VISA, the necessary actions typically include acknowledging a source of the interrupt in hardware, freeing other system resources allocated for the event occurrence, and so on. VISA system resources often participate in standard protocol implementations. Therefore, the VISA event model requires resources to wait until they have received acknowledgment from all the listening sessions.

specified event type. The section titled "Event Context" includes a description of how an application can specify its intention of acknowledgment by filling the viEventAckReqr field. When an application specifies that it will acknowledge occurrences of an event type, the resource waits until the application invokes the viAcknowledgeEvent() operation. If there are multiple sessions to a resource, each session can individually specify whether it will acknowledge a given event type. The resource acknowledges the source of the event immediately after it has received acknowledgment from all the sessions that have specified their desire to acknowledge events.

A resource acknowledges an occurrence of an event to the event source only after receiving acknowledgments from all the sessions that are enabled to both receive and acknowledge the event. A resource does not wait for an acknowledgment from all the sessions that have specified not to acknowledge the event. The queueing of event occurrences may cause a delay in acknowledging the source of an event. Queueing time-critical event types may cause unpredictable behavior in applications and lower the overall system performance.

Event Classification and Representation

Each event defined by a VISA resource has well-defined behavior. If multiple resources in a VISA system support one type of event, the behavior of the event is similar on all resources. A VISA system divides events into three broad classes based on the operational environment: system events, resource-specific events, and exceptions (a type of event).

System events are useful for exchanging information between a resource and its applications. Two examples of system events are VI_EVENT_ALERT and VI_EVENT_ACTIVE. The resource-specific events are defined by individual resources. For example, the GPIB Bus Interface resource defines the VI_EVENT_GPIB_ATN event to notify applications whenever the attention line is asserted. Refer to individual resource descriptions for information on resource-specific events. Exceptions are generated because of errors in a predetermined sequence of execution. Typical examples of these errors include VI_ERROR_BUS_ERROR indicating that the transfer did not complete because a bus error occurred, and VI_ERROR_PRIV_NSUP indicating that an access with specified privilege is not supported by underlying hardware. These errors cause exceptions in VISA when they are enabled.

In a VISA system, different classes of events are represented in the same way. The event representation includes information for uniquely identifying event types and also includes other related information about the events. The representation of events is referred to as event context, or context. The context is further discussed below in the section titled "Event Information and Context Structure."

Event Information and Context Structure

In a VISA system event types are uniquely identified by explicitly specifying the type of event in the parameters of VISA defined operations. Event contexts contain information to uniquely identify occurrences of events, the class of the event, and other information related to specific events. The representation of all the event types is similar, and a VISA system defines context structure for all events to represent information about events.

The context information of each event is divided into generic and specific context information. The generic context information describes information fields common to all the events. The fields are the same for every VISA system event, although the values contained in the fields may vary. A VISA system requires each resource to report the generic event context at the beginning of the event context. A VISA system defines the ViEvent data type, which represents the complete event context. Specific context is a unique extension of the generic context for a specific event type. The context-specific structure can be found in the description of each event defined as a part of resource definition.

All the events defined in a VISA system include the generic event information as the initial information of the event context. The generic event context includes the event class, acknowledge requirement information, and so on and is described in the following table.

TABLE

| Generic Event Context Fields | | | |
| --- | --- | --- | --- |
| Generic Context Field Name | Type | Range | Default |
| viEventClass | ViUInt16 | VI_SYS_EVENT VI_RSRC_EVENT VI_EXCEPTION | N/A |
| viEventAckReqr | ViBoolean | VI_TRUE VI_FALSE | VI_FALSE |
| viEventQueueStatus | ViStatus | N/A | N/A |

The following paragraphs describe the fields in more detail.

The viEventClass field contains the class of the event. A VISA system defines three classes of events: system events, resource specific events, and exceptions. They are denoted as VI_SYS_EVENT, VI_RSRC_EVENT, and VI_EXCEPTION, respectively.

The viEventAckReqr field is used by the resource generating the event to specify whether it requires acknowledgment of this event. Applications can indicate that they will not acknowledge an event type when they enable a session for the event type. The value specified by an application overwrites normal behavior of the event acknowledgment for the session. Refer to the section titled "Event Acknowledgment" for further discussion.

The viEventQueueStatus field indicates the state of the queue. Refer to the return codes of the viWaitOnEvent() and the viWaitOnMultipleEvents() operations for descriptions of values returned in this field. The return codes returned in this field are: VI_SUCCESS_QUEUE_EMPTY, VI_WARN_QUEUE_FULL, VI_WARN_QUEUE_OVERFLOW, and VI_WARN_QUEUE_TRIP.

System Events

System events include information about the operational state of VISA resources, availability of their services, or other information that may affect the normal execution sequence of applications. In general, any information that affects normal execution of applications is carried from VISA resources to the applications through system events. As described in the section titled "Event Handling," recipients of these events get event-specific information either as a part of an input parameter, if the callback mechanism is used, or as part of the output parameter in the viWaitOnEvent() operation. The following section defines system events in VISA. Each event description includes a corresponding event-specific context.

VI_EVENT_ALERT

This event notifies the receiver about an alert condition. The announced occurrence is further distinguished in the viDegree attribute. Applications receiving this event should implement follow-up actions based on the description of the occurrence type. The queuing of this event type may result in unpredictable behavior.

Event Fields

| Field Name | Type | Range | Default |
| --- | --- | --- | --- |
| viDegree | ViUInt16 | VI_ABORTED VI_RESET VI_FAILED VI_KILLED | N/A |
| viTarget | ViBoolean | VI_SESSION VI_RSRC | VI_SESSION |
| viJobId | ViJobId | VI_ASYNC VI_SYNC VI_ALL Any valid job identifier. | VI_ALL |
| viFlagFlushData | ViBoolean | VI_TRUE VI_FALSE | VI_TRUE |

Event Fields Description

The viDegree field notifies receiver about the degree of alert using one of the following degrees:

The VI_ABORTED degree notifies a receiver that all the pending operations of the type indicated in viOperType are aborted.

The VI_RESET degree notifies a receiver that all the pending operations of a target are aborted and that it has also relinquished all the associated system resources. After aborting the operations, the target is reinitialized to its default state.

The VI_FAILED degree notifies a receiver that a resource has ceased functioning, but the data (kept by the failed resource in response to service requests by applications) may be recoverable. Associated system resources used by the resource are not relinquished.

The VI_KILLED degree notifies a receiver that a resource has ceased functioning and has relinquished all the associated system resources. All the system resources should be freed up, when the notification of the event at this degree is received.

The VI_KILLED and the VI_FAILED degrees can be generated by a resource itself or any other resource managing or monitoring the resource.

The viTarget degree specifies whether the specified occurrence indicates an action on a session (VI_SESSION) or on a resource (VI_RSRC).

The viJobId degree indicates the types of the aborted operations or the operation referred by job identifier. The types of operations supported by VISA resources are the synchronous (VI_SYNC), the asynchronous (VI_ASYNC), or both (VI_BOTH).

The viFlagFlushData degree specifies whether data was flushed before the operations were aborted. The valid values are VI TRUE and VI FALSE.

A resource relinquishes all the system resources used by the operations that are aborted after notifying applications and all the system resources used by the sessions or resources that are being reset after notifying applications.

A resource also relinquishes all the system resources used by the sessions or resources that are killed after notifying applications. However, a resource does not relinquish any system resource used by the sessions or resources that have failed.

VI_EVENT_RSRC_ACTIVE

This event notifies applications using VISA resource that the source of the event is operational. Applications can invoke operations on the resource after it becomes active.

Event Fields

This event does not define any event-specific field.

VI_EVENT_RSRC_INACTIVE

This event notifies applications using VISA resource that the source of the event will not be operational after the time specified in the viTimeBeforeInactive field. After the resource becomes inactive, applications cannot invoke operations on the resource. All of the operations invoked on the resource are terminated or returned with an error before the resource becomes inactive. When the resource becomes active, it sends the VI_EVENT_RSRC_ACTIVE event.

Event Fields

| Field Name | Type | Range | Default |
|---|---|---|---|
| viTimeBeforeInactive | ViUInt32 | 0-FFFFFFFFh | VI_IMMEDIATE |

Event Fields Description

The viTimeBeforeInactive field specifies the time, in milliseconds, after which the resource will become inactive.

VI_EVENT_RSRC_LOCK_CHANGED

When a session has locked a VISA resource, no other session can invoke operations on that resource successfully. Applications, which do not have the access to the resource when it is locked, may want to receive notification when the lock mode transitions from one mode to another. The valid modes of lock are VI_EXCLUSIVE_LOCK and VI_NON_EXCLUSIVE_LOCK. The unlocked state of the resource is specified by VI_NOLOCK. This event can be handled using both event handling mechanisms. Operations to enable or disable this event type succeed regardless of the lock state of a VISA resource. Applications can also install and uninstall handlers for the event when a resource is locked.

Event Fields

| Field Name | Type | Range | Default |
|---|---|---|---|
| viNewLockType | ViUInt16 | VI_EXCLUSIVE_LOCK VI_NON_EXCLUSIVE_LOCK VI_NOLOCK | N/A |
| viPrevLockType | ViUInt16 | VI_EXCLUSIVE_LOCK VI_NON_EXCLUSIVE_LOCK VI_NOLOCK | N/A |

Field Description viNewLockType is the mode of the lock that a resource has transitioned into.

viPrevLockType is the mode of the lock that a resource has transitioned from.

Operations to enable or disable this event type succeed regardless of the lock state of a VISA resource.

Applications can also install and uninstall handlers for the event when a resource is locked.

Applications can start listening to VI_EVENT_RSRC_LOCK_CHANGED in any locking mode. This allows an application to get notification when the resource gets unlocked. If the application requires service of the resource that is unlocked, then the application can wait for resource to get unlocked or continue normal execution and poll whether handlers installed to listen to this event have executed. Whenever the resource changes the mode of the lock, the application can decide whether the required service is available after the mode change.

VI_EVENT_QUEUE_FULL

In VISA resources, the size of the queue for the queuing mechanism and number of pending occurrences for the callback mechanism in a session are limited. Applications can specify the number of maximum occurrences that are not handled in VI_ATTR_QUEUE_LEN, after which session starts discarding events. Whenever the maximum limit is reached for either mechanism, applications using the session are notified using this event.

Event Fields

| Field Name | Type | Range | Default |
|---|---|---|---|
| viMechanism | ViUInt16 | VI_QUEUE VI_SUSPEND_HNDLR | N/A |

Event Fields Description viMechanism is an event handling mechanism specified by either the VI_QUEUE or the VI_SUSPEND_HNDLR, for which the maximum limit of occurrences that are not handled has reached.

VI_EVENT_QUEUE_TRIP_POINT

In VISA resources, the size of the queue for the queuing mechanism and number of pending occurrences for the callback mechanism in a session are limited. Applications can specify the trip point number for occurrences that are not handled in VI_ATTR_QUEUE_TRIP_POINT, after which the session notifies the application. Whenever the trip point is reached for either mechanism, applications using the session are notified using this event.

Event Fields

| Field Name | Type | Range | Default |
|---|---|---|---|
| viMechanism | ViUInt16 | VI_QUEUE VI_SUSPEND_HNDLR | N/A |

Event Fields Description viMechanism is an event handling mechanism specified by either the VI_QUEUE or the VI_SUSPEND_HNDLR, for which the trip limit of occurrences that are not handled has reached.

VI_EVENT_RSRC_AVAILABLE

This event notifies a VISA Resource Manger when it becomes available in the system for the first time after the VISA Resource Manager is operational.

Event Fields

This event does not define any event-specific field.

Exceptions

In VISA, when an error occurs while executing an operation, the normal execution of a VISA resource halts. The resource notifies the error condition to the application, invoking the operation, through the exception event. The notification includes sufficient information for the application to know the cause of the error. If the application can programmatically correct the error condition, the operation can resume normal execution. Otherwise, the application specifies to terminate further execution of the operation. VISA provides this functionality through the exception event, or exceptions. The facility to handle exceptions is referred to as the exception handling mechanism in this document. In VISA, each error condition defined by operations of resources can cause exception events. With the exception handling mechanism, an application can try to correct the error condition. If unable to do so, the application can instruct the VISA resource to terminate the executing operation, kill the session, reset the session, or fail the session. If the error is corrected, the application can instruct to continue the execution of the operation.

In VISA, exceptions are defined as events. Exceptions are handled as events; however, the operating environment poses some restrictions. Therefore, exception handling model is restricted compared to the event handling model. The restrictions on the event handling model are described in the following section titled "Exception Handling Model," which includes an application showing how to use the exception handling mechanism. The section titled "Generating an Error Condition" defines a method for programmatic generation of errors on resources. Exceptions are defined as events and therefore, they are represented with an event context. The description of the exception context can be found in the section titled "Exception-specific Context."

Exception Handling Model

This section describes the exception handling model in a VISA system. In the VISA system, exceptions follow the event model presented in the section titled "Event Handling," though certain restrictions apply. As described in the event handling model, it is possible to install a callback handler which is invoked on an error. This installation can be done using the viInstallHandler() operation on a session. Installing a callback handler automatically enables the session for the exception handling mechanism. Whenever an error occurs, the handler is invoked in the context of the calling thread, the thread which called the operation that generated the error. Also, the handler has access to the state of the resource at the time of the exception occurrence. The viGetEventInfo() operation can be used to obtain attributes and parameter values at the time of the exception. The list of attribute values available may vary with each error.

As described in the callback mechanism discussion, the exception handler is executed synchronously; the operation that caused the exception will block until the exception handler has completed its execution. This block allows the operation to continue from the point of exception, if the problem is corrected. If the error condition cannot be corrected, the handler may instruct the exception operation to terminate execution. Depending on the severity of the error, it may also instruct it to terminate or kill the session. An exception handler can specify its intention of continuing or terminating the execution through the return codes of the handler. Refer to the definitions of the prototype of the handler and the viEventHandler(), for more information.

As stated above, an exception operation will block until the exception handler execution is completed. The exception operation waits for the completion of a handler execution. The thread on which the handler executes may be different than the thread of the exception operation. In such cases, the handler terminates prematurely without completion. Then it becomes necessary to acknowledge the exception operation to ensure clean termination. The handler can terminate prematurely to exit the thread or to use an exception handling scheme native to the operating environment (for example, the C++ language exception handling scheme). In multitasking (multiple processes) and distributed systems the operation causing the exception, and the exception handler, execute on two different threads. Therefore, in all such cases, an exception handler should acknowledge the blocking operation in order to guarantee data consistency. If the blocking operation is not acknowledged, the application may hang or the resource may be placed into an inconsistent state. The results are not predictable in this scenario.

If the thread executing an exception handler prematurely terminates the handler, it does so only after acknowledging the exception.

An exception handler can acknowledge the blocking thread using the viAcknowledgeEvent() operation. Refer to the section titled "Event Operations" for more information.

VISA allows the operating system and language-specific exception handling facility to work coherently with the VISA-defined exception handling mechanism. In such a case, all restrictions of the specific environment apply. For example, the C++ try/catch mechanism allows an exception to be thrown from an operation. Once an exception is thrown in C++, the context of the operation causing the exception is lost and execution cannot continue. Therefore, before throwing an exception in C++, the exception handler must acknowledge the VISA resource in order to ensure data consistency. This acknowledgment ensures resource state and data (stack frame) consistency in VISA.

Comparison of Exception Handling and Event Handling Models

The exception handling model closely follows the event handling model, and it uses the same operations used for event handling. viInstallHandler(), viUninstallHandler(), AcknowledgeEvent(), viQueryEventHandlers(), viGetEventInfo(), and viRaiseEvent() can be used for exception events with the same behavior. The following list describes the restrictions on the exception handling model over the general event model:

- Contrary to event handling, where multiple handlers can be set for an event type on a session, only one handler can be set for exception handling on a session. The exception handling model does allow multiple sessions to a single resource. The same handler or different handlers can be installed on these sessions.
- The exception handling model does not allow queuing or waiting on an exception event. Thus, VISA does not allow an application to call either the viWaitForEvent() or the viWaitForMultipleEvents() operations for the exception event.
- The pending handler mode for the callback mechanism is not supported. Because exception handling supports only direct callbacks, it is not necessary to enable the exception handling mechanism using the viEnableEvent() operation. Installing a callback handler automatically enables the exception handling mechanism.

The following example illustrates how to use the VISA exception handling mechanism in an application.

An Example of Exception Handling

An application installs an exception handler to be invoked after successfully opening a session to a GPIB resource. If an error occurs during the subsequent operations, the handler is invoked in the context of the exception operation, which in this example is viWrite(). The exception handler can check for the error code, and depending on the code, it can take corrective action and continue or terminate the operation.

```
int main(void) //UserApplication
{
ViStatus status;
ViUInt32 retcount;
ViVisor *visorId = 0;
ViSession *vi;
    status = viOpen(visorId, "VISN{GPIB1::5}", , "", &vi)
    status  =   viInstallHandler(vi,   VI_EXCEPTION,
except ionHandler,       NULL);
    //Do processing.
    status = viWrite(vi, "IDN?", 5, &retcount);
    //The above operation causes an error and the handler
installed by the.
    //application is invoked. The handler code is shown
below.
    status = viRead(vi,   rdResponse,   RESPONSE_LENGTH,
&retcount);
    status = viClose(vi);
    return 0;
}
```

SAMPLE VISA, C LANGUAGE-TYPE APPLICATION (Normal Execution Thread)

As shown in the following handler code, the handler first determines the type of error. The error is VI_ERROR_IN_PROGRESS, which indicates that another operation is currently executed by the resource and therefore, it cannot execute the requested operation. In this case, the handler may decide to wait for the operation to complete and then request the resource to continue. If so, it delays for a fixed time and then returns from the handler with the VI_SUCCESS return value. However, if the handler cannot correct the error condition, it may choose to terminate the operation generating the exception. In this case, it returns the VI_ABORT. The handler may choose to return any other code to take corresponding action depending on the application requirement. The return values can abort all operations of the session, fail the session, or kill the session. Refer to the description of the viEventHandler () for a description of the return values and the corresponding behavior defined by VISA.

```
ViHndlr ExceptionHandler( vi, eventType, context, usrContext)
ViSession *vi;
ViUInt16 eventType;
ViEvent context;
ViAddr usrContext;
{
    switch(context.errorCode)//determine the error type
    {
        case VI_ERROR_IN_PROGRESS:
        //Check for completion of the operation currently
executed by the resource.
        //If the operation is completed, return
VI_SUCCESS. Otherwise, return
        //an error condition.
        if (ERROR_CORRECTED)
            return SUCCESS;
        else
            return ABORT;
        case VI_ERROR_RSRC_LOCKED:
        //wait for rsrc to get unlocked;
        //other error processing
    }
}
```

Sample VISA, C Language-type Application (Handler)

Generating an Error Condition

It may be necessary for an application to generate an error condition on a resource. Applications can simulate an error occurrence on a resource. VISA resource may propagate an error condition to another VISA system resource after partially handling an exception, and allow the other resource to complete the exception handling. The viRaiseEvent() operation can be used to propagate exceptions to resources in VISA. This operation can be called from the exception handler to regenerate the exception with specified context on any other resource. If a callback routine was specified, it is invoked when the exception is generated. Otherwise, the error context for the last error is set to the one specified in the viRaiseEvent() operation. This context can be retrieved using the viGetEventInfo() with the event type set to VI_EXCEPTION.

Exception-Specific Context

This section defines the exception context that must be passed to its handler along with the exception. The description of the fields is given in the following table titled Exception-Specific Context. The generic event context is also passed with the exception specific context. The generic context will always precede the exception specific context. Refer to the section titled "Event Information and Context Structure" on event context for more information about the generic part of the exception context.

TABLE

Exception-Specific Context

| Field Name | Type | Range | Default |
|---|---|---|---|
| viErrorCode | ViUInt32 | N/A | N/A |
| viHandled | ViBoolean | VI_TRUE VI_FALSE | VI_FALSE |
| viContinuable | ViBoolean | VI_TRUE VI_FALSE | VI_FALSE |
| viAckAction | ViUInt16 | VI_ABORT VI_RESET VI_KILL VI_FAIL | VI_ABORT |

Description viErrorCode: viErrorCode is the error code returned from the operation. The error codes are defined for individual operations. Each error in VISA may cause an exception, if an exception handler is installed.

viHandled: viHandled should be set to VI_TRUE when an exception is rethrown to another resource for handling. If a resource has handled the exception partially and wants another resource to continue with the error correction, it can set this field in the context before generating the exception.

viContinuable: Depending on the severity of errors, it may be possible to continue with execution after handling the exception. If viContinuable is set to VI_FALSE, the operation cannot continue, even after corrective actions. In this case, the exception handler can clean up data structures allocated by the application.

viAckAction: If a handler needs to acknowledge the exception operation so that the handler thread can terminate (see "Exception Handling Model"), the acknowledgment should also specify the action to be taken by the blocking operation. This field is filled by the exception handler routine before acknowledging the exception operation. The following table lists the actions that can be specified. It is preferably not to specify the VI_RESET, VI_KILL or VI_FAIL action values, because they also affect the execution of other sessions.

TABLE

Acknowledgment Action Description

| viAckAction value | Description |
|---|---|
| VI_ABORT | Request to abort a pending operation that generated the exception. |
| VI_RESET | Request termination of all the pending operations of the target resource. The target resource will be initialized and any system resources used by the target will be relinquished. |
| VI_FAIL | Request a resource to terminate normal functioning of the target. The data kept by the failed resource may be recoverable. System resources associated with the target are not relinquished. |
| VI_KILL | Request a resource associated with a specified session to cease functioning. All the system resources associated with the target should be freed up on the request. |

EVENT HANDLING OPERATIONS AND HANDLER PROTOTYPE

Operations viEnableEvent(vi, eventType, mechanism, context)
viDisableEvent(vi, eventType, mechanism)
viQueryEventMech(vi, eventType, mechanism)
viInstallHandler(vi, eventType, handler, userHandle)
viUninstallHandler(vi, eventType, handler, userHandle)
viQueryHandlers(vi, eventType, handlers, userHandle)
viAcknowledgeEvent(vi, eventType, context)
viWaitOnEvent(vi, eventType, timeout, outContext)
viWaitOnMultipleEvents(vi, eventTypeList, timeout, outContext, outEventType)
viDiscardEvents(vi, eventType, mechanism)
viGetEventInfo(vi, eventType, context, rsrcName, info)
viRaiseEvent(vi, eventType, context, target)

HANDLER PROTOTYPE viEventHandler(vi, eventType, context, usrContext)

viEnableEvent(vi, eventType, mechanism, context)

viEnableEvent enables notification of an event identified by the eventType parameter for mechanisms specified in the mechanism parameter. The specified session can be enabled to queue events by specifying VI_QUEUE. Applications can enable the session to invoke a callback function to execute the handler by specifying VI_HNDLR. The applications are required to install at least one handler to be enabled for this mode. Specifying VI_SUSPEND_HNDLR enables the session, but the invocation of the handler is deferred to a later time. Successive calls to this operation replace the old mode with the callback mechanism. Specifying the "bit-wise OR" value of VI_QUEUE and one of the mode values for the callback mechanism enables both the queuing and callback mechanisms simultaneously.

Parameters

| Name | Direction | Type | Description |
|---|---|---|---|
| vi | IN | ViSession | Unique logical identifier to a session. |
| eventType | IN | ViEventType | Logical event identifier. |
| mechanism | IN | ViUInt16 | Specifies event handling mechanisms to be enabled. The queuing mechanism can be enabled by specifying VI_QUEUE, and the callback mechanism can be enabled by specifying VI_HNDLR or VI_SUSPEND_HNDLR. It is possible to enable both mechanisms simultaneously by specifying "bit-wise OR" of VI_QUEUE and one of the two mode values for the callback mechanism. |
| context | IN | ViEvent | Information specified by applications while enabling an event given in the eventType parameter. Each event type in VISA defines its context structure. |

Return Values

Return values have the type ViStatus and are used to return the operational return status. The return value returns either a completion code or an error code as follows.

|  | Description |
| --- | --- |
| Completion Codes | |
| VI_SUCCESS | Event enabled successfully. |
| VI_SUCCESS_EVENT_EN | Specified event is already enabled for at least one of the specified mechanisms. |
| Error Codes | |
| VI_ERROR_INV_SESSION | The given vi does not identify a valid session. |
| VI_ERROR_RSRC_LOCKED | Specified operation could not be performed because the resource identified by the vi has been locked for this type of access. |
| VI_ERROR_INV_EVENT | Specified event does not exist or is not supported. |
| VI_ERROR_INV_MECH | Invalid context information specified for the event. |
| VI_ERROR_HNDLR_NINSTALLED | A handler is not currently installed for the specified event. The session cannot be enabled for the VI_HNDLR mode of the callback mechanism. |

If the event handling mode is switched from VI_SUSPEND_HNDLR to VI_HNDLR for an event type, then handlers that are installed for the event are called for every occurrence of that event pending in the session before switching the modes.

A session enabled to receive events can start receiving them before the viEnableEvent() operation returns. In this case the handlers set for an event type are executed before the completion of the enable operation.

If the event handling mode is switched from VI_HNDLR to VI_SUSPEND_HNDLR for an event type, handler invocation for occurrences of the event type is deferred to a later time.

If no handler is installed for an event type then request to enable the callback mechanism for the event type returns VI_ERROR_HNDLR_NINSTALLED.

viDisableEvent(vi, eventType, mechanism)

viDisableEvent () disables notification of an event type by the specified mechanisms. This operation disables servicing of an event type by the mechanisms specified in the mechanism parameter. The session can be disabled to queue events by specifying VI_QUEUE. Applications can disable the session for the callback mechanism by specifying either VI_HNDLR or VI_SUSPEND_HNDLR. Specifying the "bit-wise OR" value of the VI_QUEUE value and one of the mode values for the callback mechanism disables both the queuing and callback mechanisms.

Parameters

| Name | Direction | Type | Description |
| --- | --- | --- | --- |
| vi | IN | ViSession | Unique logical identifier to a session. |
| eventType | IN | ViEventType | Logical event identifier. |
| mechanism | IN | ViUInt16 | Specifies event handling mechanisms to be disabled. The queuing mechanism can be disabled by specifying VI_QUEUE, the callback mechanism can be disabled by specifying V_HNDLER or VI_SUSPEND_HNDLR. It is possible to disable both mechanisms simultaneously by specifying VI_DISABLE_ALL_MECH. |

Return Values

Return values have the type ViStatus and are used to return the operational return status. The return value returns either a completion code or an error code as follows.

|  | Description |
| --- | --- |
| Completion Codes | |
| VI_SUCCESS | Event disabled successfully. |
| VI_SUCCESS_EVENT_DIS | Specified event is already disabled for at least one of the specified mechanisms. |
| Error Codes | |
| VI_ERROR_INV_SESSION | The given vi does not identify a valid session. |
| VI_ERROR_RSRC_LOCKED | Specified operation could not be performed because the resource identified by the vi has been locked for this type of access. |
| VI_ERROR_INV_EVENT | Specified event does not exist or is not supported. |
| VI_ERROR_INV_MECH | Specified event handling mechanism is not supported for the specified event type. |

If a request to disable an event handling mechanism is made for a session, then the events pending or queued in the session remain pending or queued, respectively, in the session.

viQueryEventMech(vi, eventType, mechanism)

Queries the event handling mechanisms for an event type. This operation returns currently enabled handling mechanisms for an event type. If a session is disabled to handle an event type, VI_NENABLED is returned. Otherwise, all the mechanisms enabled for handling the specified event type are returned as a "bit-wise OR" value of the values denoting individual mechanisms.

Parameters

| Name | Direction | Type | Description |
| --- | --- | --- | --- |
| vi | IN | ViSession | Unique logical identifier to a session. |
| eventType | IN | ViEventType | Logical event identifier. |
| mechanism | OUT | ViUInt16 | Returns currently enabled mechanisms for the specified event. If a session does not handle an event type, no mechanism is enabled for the session. Therefore, VI_NENABLED is returned. It only the queuing mechanism is enabled, VI_QUEUE is returned. If the callback mechanism is enabled, then VI_HNDLR or |

-continued

| Name | Direction | Type | Description |
|------|-----------|------|-------------|
| | | | VI_SUSPEND_HNDLR, denoting the mode of the callback mechanism, is returned. This operation returns two enabled mechanisms by supplying "bit-wise OR" of VI_QUEUE and one of the two modes values for the callback mechanism. |

Return Values

Return values have the type ViStatus and are used to return the operational return status. The return value returns either a completion code or an error code as follows.

| | Description |
|---|---|
| Completion Codes | |
| VI_SUCCESS | Event queried successfully. |
| Error Codes | |
| VI_ERROR_INV_SESSION | The given vi does not identify a valid session. |
| VI_ERROR_RSRC_LOCKED | Specified operation could not be performed because the resource identified by the vi has been locked for this type of access. |
| VI_ERROR_INV_EVENT | Specified event does not exist or is not supported. | viInstallHandler(vi, eventType, handler, userHandle)

Installs handlers for event callbacks. This operation allows applications to install handlers on sessions. The handler specified in the handler parameter is installed along with previously installed handlers for the specified event. Applications can specify a value in the userHandle parameter that is passed to the handler on its invocation. VISA identifies handlers uniquely using the handler reference and this value. If VI_RSRC_EVENT, VI_SYS_EVENT, or VI_EXCEPTION is specified in the eventType parameter, a specified handler is set for the corresponding class of event types. If VI_ALL_EVENTS is specified in the event type parameter, the specified handler is set for all three classes of events.

Parameters

| Name | Direction | Type | Description |
|------|-----------|------|-------------|
| vi | IN | ViSession | Unique logical identifier to a session. |
| eventType | IN | ViEventType | Logical event identifier. |
| handler | IN | ViHndlr | Interpreted as a valid reference to a handler to be installed by a client application. |
| userHandle | IN | ViAddr | A value specified by an application that can be used for identifying handlers uniquely for an event type. |

Return Values

Return values have the type ViStatus and are used to return the operational return status. The return value returns either a completion code or an error code as follows.

| Description |
|---|
| Completion Codes |
| VI_SUCCESS — Event handler installed successfully. |
| Error Codes |
| VI_ERROR_INV_SESSION — The given vi does not identify a valid session. |
| VI_ERROR_RSRC_LOCKED — Specified operation could not be performed because the resource identified by the vi has been locked for this type of access. |
| VI_ERROR_INV_EVENT — Specified event is not defined by the resource. | viUninstallHandler(vi, eventType, handler, userHandle)

The viUninstallHandler() operation allows client applications to uninstall handlers for events on sessions. Applications should also specify the value in the handle parameter that was passed while installing the handler. VISA identifies handlers uniquely using the handler reference and this value. All the handlers, for which the handler reference and the value matches, are uninstalled. The following tables list all the VISA-defined values and corresponding actions of uninstalling handlers.

Parameters

| Name | Direction | Type | Description |
|------|-----------|------|-------------|
| vi | IN | ViSession | Unique logical identifier to a session. |
| eventType | IN | ViEventType | Logical event identifier. |
| handler | IN | ViHhdlr | Interpreted as a valid reference to a handler to be installed by a client application. |
| userHandle | IN | ViAddr | A value specified by an application that can be used for identifying handlers uniquely in a session for an event. |

Return Values

Return values have the type ViStatus and are used to return the operational return status. The return value returns either a completion code or an error code as follows.

TABLE

VISA-Defined Special Values for eventType Parameter of the Operation

| Completion Codes | Description |
|---|---|
| VI_SUCCESS | Event handler successfully uninstalled. |
| Error Codes | Description |
| VI_ERROR_INV_SESSION | The given vi does not identify a valid session. |
| VI_ERROR_RSRC_LOCKED | Specified operation could not be performed because the resource identified by the vi has been locked for this type of access. |
| VI_ERROR_INV_EVENT | Specified event eventType did |

TABLE-continued

VISA-Defined Special Values for eventType Parameter of the Operation

| | |
|---|---|
| VI_ERROR_INV_HNDLR_REF | not occur or does not exist. Either the specified handler reference or the user context value (or both) does not match any installed handler. |

| VISA-Defined Value | Action Description |
|---|---|
| VI_RSRC_EVENT | Uninstall all the handlers for the resource specific class of event types. |
| VI_SYS_EVENT | Uninstall all the handlers for the system event types. |
| VI_ALL_EVENTS | Uninstall all the handlers for the system event types, resource specific event types, and exceptions. |

TABLE

VISA-Defined Special Values for handler Parameter of the Operation

| VISA-Defined Value | Action Description |
|---|---|
| VI_ANY_HNDLR | Uninstall all the handlers with the matching value in the userHandle parameter. |

TABLE

VISA-Defined Special Values for userHandle Parameter of the Operation

| VISA-Defined Value | Action Description |
|---|---|
| VI_ANY_HANDLE | Uninstall all the handlers with the matching handler reference. |

It is noted that any combination of VISA-defined values for different parameters of the operation is also supported.

If no handler is installed for an event type as a result of this operation, and a session is enabled for the callback mechanism in the VI_HNDLR mode, then the callback mechanism for the event type is disabled for the session before this operation completes.

The userHandle value is used by the resource to uniquely identify the handlers along with the handler reference. Applications can use this value to process an event differently based on the value returned as a parameter of handler. This allows applications to install the same handler multiple times and distinguish events from multiple resources in the same handler.

viQueryHandlers(vi, eventType, handlers, userHandle)

The viQueryHandlers() operation returns all the handlers installed for an event type on the specified session. This operation returns a list of installed handlers for the corresponding class of event types, if VI_RSRC_EVENT, VI_SYS_EVENT, and VI_ALL_EVENTS are specified.

Parameters

| Name | Direction | Type | Description |
|---|---|---|---|
| vi | IN | ViSession | Unique logical identifier to a session. |
| eventType | IN | ViEventType | Logical event identifier. |
| handlers | OUT | ViPHndlr | Returns currently installed handlers for the specified event. If multiple handlers are installed, a list of all the installed handlers is returned. |
| userHandle | OUT | ViAddr | A value specified by an application that is used for identifying handlers uniquely in a session for an event. |

Return Values

Return values have the type ViStatus and are used to return the operational return status. The return value returns either a completion code or an error code as follows.

| | Description |
|---|---|
| Completion Codes | |
| VI_SUCCESS | Query completed successfully. |
| Error Codes | |
| VI_ERROR_INV_SESSION | The given vi does not identify a valid session. |
| VI_ERROR_RSRC_LOCKED | Specified operation could not be performed because the resource identified by the vi has been locked for this type of access. |
| VI_ERROR_INV_EVENT | Specified event does not exist or is not supported. | viAcknowledgeEvent(vi, eventType, context)

The viAcknowledgeEvent() operation allows applications to acknowledge a reported event occurrence. The occurrence is uniquely identified by the context structure. The resource acknowledges the source of the event after receiving acknowledgments from sessions to which the occurrence was reported.

Parameters

| Name | Direction | Type | Description |
|---|---|---|---|
| vi | IN | ViSession | Unique logical identifier to a session. |
| eventType | IN | ViEventType | Logical event identifier. |
| context | IN | ViEvent | The context specified here corresponds to an occurrence of an event. The context uniquely identifies event occurrence reported by the resource. Each event type in VISA defines its context structure along with resource definitions. |

Return Values

Return values have the type ViStatus and are used to return the operational return status. The return value returns either a completion code or an error code as follows.

| | Description |
|---|---|
| Completion Codes | |
| VI_SUCCESS | Event acknowledged successfully. |
| Error Codes | |
| VI_ERROR_INV_SESSION | The given vi does not identify a valid session. |
| VI_ERROR_RSRC_LOCKED | Specified operation could not be performed because the resource identified by the vi has been locked for this type of access. |
| VI_ERROR_INV_EVENT | Specified event eventType did not occur or does not exist. |
| VI_ERROR_INV_CONTEXT | Specified event context does not identify a valid occurrence of the event type. |

A resource acknowledges a notification of an event after receiving acknowledgments from all the recipients of the notification.

viWaitOnEvent(vi, eventType, timeout, outContext)

viWaitOnMultipleEvents(vi, eventTypeList, timeout, outContext, outEventType)

The viWaitOnEvent() operation suspends execution of a thread of application and waits for an event eventType for a time period not to exceed that specified by timeout. Applications can specify more than one event in the viWaitOnMultipleEvents() operation. The operation suspends execution of a thread and waits for an occurrence of any one of the specified events in the eventTypeList parameter. It waits for a time period not to exceed the value specified in timeout parameter. If multiple events of the same or different type occur, only one of the event occurrences is returned, in the outContext parameter. The type of the event is returned in the outEventType parameter. Refer to individual event descriptions for context structure definitions. If the specified timeout value is VI_MAX_TIMEOUT, the operations are suspended indefinitely, and they wait for an occurrence of any one of the event types.

Parameters

| Name | Direction | Type | Description |
|---|---|---|---|
| vi | IN | ViSession | Unique logical identifier to a session. |
| eventType | IN | ViEventType | Logical event identifier. |
| eventTypeList | IN | ViPUInt16 | Logical event identifier list. |
| timeout | IN | ViUInt32 | Absolute time period in time units that the resource shall wait for a specified event to occur before returning the time elapsed error. The time unit is specified in the attributes of the resource. |
| outContext | OUT | ViPEvent | Event specific information returned in the notification of an event received during the wait. |
| outEventType | OUT | ViEventType | Logical event identifier returned in the notification of an event received during the wait. |

Return values

Return values have the type ViStatus and are used to return the operational return status. The return value returns either a completion code or an error code as follows.

| | Description |
|---|---|
| Completion Code | |
| VI_SUCCESS | Wait terminated successfully on receipt of an event notification. There are multiple event occurrences available in the session. |
| VI_SUCCESS_QUEUE_EMPTY | Wait terminated successfully on receipt of an event occurrence. The queue is empty. |
| VI_WARN_QUEUE_TRIP | Wait terminated successfully on receipt of an event occurrence. The queue has more events than trip value. |
| VI_WARN_QUEUE_FULL | Wait terminated successfully on receipt of an event occurrence. The queue is full. |
| VI_WARN_QUEUE_OVERFLOW | Wait terminated successfully on receipt of an event occurrence. The queue has overflown and events have been lost. |
| Error Codes | |
| VI_ERROR_INV_SESSION | The given vi does not identify a valid session. |
| VI_ERROR_RSRC_LOCKED | Specified operation could not be performed because the resource identified by the vi has been locked for this type of access. |
| VI_ERROR_INV_EVENT | Specified event eventType, or at least one of the events in the eventTypeList parameter, is not supported by the resource. |
| VI_ERROR_INV_CONTEXT | Specified event context, or at least one of the context of the event in the inContextList parameter, is invalid. |
| VI_ERROR_TMO | Specified event did not occur within the specified time period. |
| VI_ERROR_QUEUE_TRIP | Specified event did not occur within the specified time period and the queue has |

-continued

| | Description |
|---|---|
| VI_ERROR_QUEUE_FULL | more events than trip value. Specified event did not occur within the specified time period and the queue is full. |
| VI_ERROR_QUEUE_OVERFLOW | Specified event did not occur within the specified time period and event occurrences are lost. |

If the VI_INFINITE value is specified in the timeout parameter of viWaitOnEvent() or viWaitOnMultipleEvents (), then the execution thread is suspended indefinitely to wait for an occurrence of an event.

The viWaitOnEvent() operation on a resource succeeds for the VI_EVENT_RSRC_LOCK_CHANGED event, regardless of the lock state of the resource.

If value zero (0) is specified in the timeout parameter of viWaitOnEvent() or viWaitOnMultipleEvents(), then application execution is not suspended.

It is noted that these operations can be used to dequeue events from an event queue by setting the timeout value to zero.

viDiscardEvents(vi, eventType, mechanism)

viDiscardEvents() flushes event occurrences for specified event type and mechanisms in a session. This operation discards an event queue or event occurrences pending, for the callback mechanism from the specified session. The information about all the occurrences of the event, that are not handled, is discarded. This operation is useful to remove event occurrences from the queue that do not have any useful information for applications. This operation allows applications to specify VI_ALL_EVENTS, VI_SYS_EVENT, and VI_RSRC_EVENT to specify a class of event types.

Parameters

| Name | Direction | Type | Description |
|---|---|---|---|
| vi | IN | ViSession | Unique logical identifier to a session. |
| eventType | IN | ViEventType | Logical event identifier. |
| mechanism | IN | ViUIntl6 | Specifies the mechanisms for which the events are to be discarded. The VI_QUEUE value is specified for the queuing mechanism and the VI_SUSPEND_HNDLR value is specified for the pending events in the callback mechanism. It is possible to specify both mechanisms by specifying "bit-wise OR" of the VI_QUEUE and the VI_SUSPEND_HNDLR value. |

Return Values

Return values have the type ViStatus and are used to return the operational return status. The return value returns either a completion code or an error code as follows.

| | Description |
|---|---|
| Completion Code | |
| VI_SUCCESS | Event queue flushed successfully. |
| VI_SUCCESS_QUEUE_EMPTY | Operation completed successfully, but the queue was empty. |
| Error Code | |
| VI_ERROR_INV_SESSION | The given vi does not identify a valid session. |
| VI_ERROR_SESSION_LOCKED | Specified operation could not be performed because the session identified by the vi has been locked for this type of access. |
| VI_ERROR_INV_EVENT | Specified event eventType did not occur or does not exist. |
| VI_ERROR_INV_MECH | Invalid mechanism specified. |

The event occurrences discarded by applications are not available to a session at a later time. This operation causes loss of event occurrences.

viGetEventInfo(vi, eventType, context, rsrcName, info)

viGetEventInfo() gets event context information about a previous event occurrence. This operation can be used to retrieve information about the handled occurrence of a specified event type during the handler execution. Outside the handler execution, only the last dequeued occurrence of an event type can be retrieved. This operation also returns the name of the resource causing the occurrence in the rsrcName parameter. If the event type is an exception, applications can retrieve the state of the resource and other contextual information. The structure for each exception passed in the info parameter is defined with the resource definition.

Parameters

| Name | Direction | Type | Description |
|---|---|---|---|
| vi | IN | ViSession | Unique logical identifier to a session. |
| eventType | IN | ViEventType | The event type for which to retrieve the information. |
| context | IN/OUT | ViEvent | Reference to an event context structure. To retrieve the last event occurrence notified by the session, the corresponding context structure should be initialized to the VI_NULL value. |
| rsrcName | OUT | ViString | Reference to a string containing the logical identifier of the source of the event. |
| info | OUT | ViAddr | If event type is an exception, the list has the number of bytes in this structure followed by a structure |

Return Values

Return values have the type ViStatus and are used to return the operational return status. The return value returns either a completion code or an error code as follows.

| | Description |
|---|---|
| Completion Codes | |
| VI_SUCCESS | Command transfer successfully completed. |
| Error Codes | |
| VI_ERROR_INV_SESSION | The given vi does not identify a valid session. |
| VI_ERROR_RSRC_LOCKED | Specified operation could not be performed because the resource identified by the vi has been locked for this type of access. |
| VI_ERROR_INV_EVENT | Specified event eventType did not occur or does not exist. | viRaiseEvent(vi, eventType, context, target)

The purpose of this operation is to notify a resource or session of the occurrence of an event. This operation can be used for any type of event, including an exception. The resource must determine whether to add the event to a queue or pass it to a user's callback handler, based on how each session to the resource is enabled for sensing.

The eventType and context parameters together define the actual event. Both values are passed to the sessions which receive the event, either through the queue or callback mechanism.

The target parameter specifies whether all sessions attached to the resource are notified, or only the session which is invoking the operation. An error results if target is VI_SESSION and the specified session has not been enabled for sensing.

If the event is to be queued, its priority is inherent from the eventType parameter. If the event is targeted at a specific session, and there is no room in the queue (its priority is lower than any event on the queue), this operation returns VI_ERROR_QUEUE_FULL. If the event is targeted at the resource, it is irrelevant whether a given session's queue is full (although the resource may take appropriate actions), so this operation returns VI_SUCCESS.

Parameters

| Name | Direction | Type | Description |
|---|---|---|---|
| vi | IN | ViSession | Unique logical identifier to a session. |
| eventType | IN | ViEventType | Logical event identifier. |
| context | IN | ViEvent | Event specific information. |
| target | IN | ViBoolean | Specifies target of the request. The event can be directed to all sessions associated with the resource (VI_ALL_RSRC_SESSIONS) or only the session specified by the vi parameter (VI_SESSION). |

Return Values

Return values have the type ViStatus and are used to return the operational return status. The return value returns either a completion code or an error code as follows.

| | Description |
|---|---|
| Completion Code | |
| VI_SUCCESS | Event notification handled successfully. |
| Error Codes | |
| VI_ERROR_INV_SESSION | The given vi does not identify a valid session. |
| VI_ERROR_RSRC_LOCKED | Specified operation could not be performed because the resource identified by the vi has been locked for this type of access. |
| VI_ERROR_INV_TARGET | Specified target of the operation is invalid. |
| VI_ERROR_INV_EVENT | Specified event eventType does not exist or the resource does not support it. |
| VI_ERROR_INV_CONTEXT | Specified event context is invalid. |
| VI_ERROR_QUEUE_FULL | The session queue is full, and this event's priority was lower than any on the queue. Therefore, this event was not queued. This value can only be returned if the target parameter is VI_SESSION. |
| VI_ERROR_NENABLED | Specified session is not currently enabled for sensing of this type of event. This value can only be returned if the target parameter is VI_SESSION. | viRaiseEvent() can also be used to internally notify event occurrences. This operation can be used to simulate an event. If an event is targeted to all the sessions of a resource, it may cause unpredictable results for the applications receiving the event through other sessions.

viEventHandler(vi, eventType, context, userHandle)

viEventHandler() is an event service handler procedure prototype. This operation is called whenever a session receives an event and is enabled for handling events in the VI_HNDLR mode. The handler services the event arid returns VI_SUCCESS on completion. If the handler fails to service a particular event or services the event only partially, the handler returns different error codes to notify the resource to perform cleanup actions on the session. The error codes are currently only valid for the VI_EXCEPTION event.

Parameters

| Name | Direction | Type | Description |
|---|---|---|---|
| vi | IN | ViSession | Unique logical identifier to a session. |

| Name | Direction | Type | Description |
|---|---|---|---|
| eventType | IN | ViEventType | Logical event identifier. |
| context | IN | ViEvent | A structure specifying context of an event. Each event type defines its context structure. |
| userHandle | IN | ViAddr | A value specified by an application that can be used for identifying handlers uniquely in a session for an event. |

Return Values

Return values have the type ViStatus and are used to return the operational return status. The return value returns either a completion code or an error code as follows.

| Completion Code | Description |
|---|---|
| VI_SUCCESS | Event handled successfully. |

| Error Code | Description |
|---|---|
| VI_ERROR_ABORT | Event is not handled successfully. Terminate the operation causing the exception. |
| VI_ERROR_RESET | Event is not handled successfully. Terminate all the operations of the session and reinitialize the session to the default state. |
| VI_ERROR_FAIL | Event is not handled successfully. Terminate all the operations of the session. No operation can be invoked on the session except the viClose( ) operation. |
| VI_ERROR_KILL | Event is not handled successfully. Terminate all the operations of the session and then terminate the session. |

If multiple handlers are installed on a session and one of the handlers specifies to terminate the normal execution sequence, then the normal execution is terminated after all the handlers of the session complete execution.

REGISTRATION SERVICES viRegisterRsrc (rsrcName, idList, operations)

viRegisterRsrc() registers a server-type resource into the VISA Resource Manager resource repository. This operation also registers server's aliases and operations publicly available from the resource. This information is used by the VISA Resource Manager to resolve location and other service requests from clients.

Parameters

| Name | Direction | Type | Description |
|---|---|---|---|
| rsrcName | IN | ViRsrc | Unique logical identifier of a VISA resource. |
| idList | IN | ViRsrcList | A list of identifier aliases for given resource. |
| operations | IN | ViOps | A list of duplex containing operation identifier, and invocation method. |

Return Values

Return values have the type ViStatus and are used to return the operational return status. The return value returns either a completion code or an error code as follows.

| Completion Codes | Description |
|---|---|
| SUCCESS | Returns SUCCESS on successful registration of a resource. |

| Error Codes | Description |
|---|---|
| ERROR_DUPLICATE_NAME | Invalid resource name reference. |
| ERROR_DUPLICATE_ID | Resource name conflict. |
| ERROR_FAILED_TO_LOCATE | Insufficient location information. | viUnregisterRsrc (resource)

viUnregisterRsrc() is used to remove an available resource or unregister it from a resource manager, such as the VISA Resource Manager. This operation closes all existing sessions from the caller to the resource. If there are other active sessions to the resource, then this operation fails.

Parameter

| Name | Direction | Type | Description |
|---|---|---|---|
| resource | IN | ViRsrc | Unique logical identifier of a VISA resource. |

Return Values

Return values have the type ViStatus and are used to return the operational return status. The return value returns either a completion code or an error code as follows.

| Completion Codes | Description |
|---|---|
| SUCCESS | Returns SUCCESS if resource is successfully unregistered from the VISA Resource Manager domain |

| Error Codes | Description |
|---|---|
| ERROR_INV_REFERENCE | Invalid resource reference. |

In the preferred embodiment, a resource is freed when there is no active session to the resource.

VISA RESOURCE MANAGER

The VISA Resource Manager 140 is a runtime resource manager that controls resources in a VISA system. The VISA Resource Manager 140 is also itself a resource, and includes attributes, operations and events like any other resource. The VISA Resource Manager 140 provides the mechanisms in a VISA system to control and manage resources. This includes but is not limited to the assignment of unique resource addresses, unique resources ID's, operation invocation, and event management. The VISA Resource Manager resource 140 is a resource like all other resources in the system and it derives its interface from the VISA Resource Template 130 but does not expand upon this interface. The VISA Resource Manager resource 140 provides connectivity to all of the VISA resources registered with it. The VISA Resource Manager 140 gives applications control and access to individual resources and provides the services described below. The VISA Resource Manager 140 utilizes the resources available to it to service requests from the applications and other resources requiring service of a given resource.

The VISA Resource Manager 140 provides access to all of the resources that are registered with it. The VISA Resource Manager 140 is therefore at the root of a subsystem of connected resources. There could be more than one root level resource manager resource in a complete system, and each descendent could itself act as a resource manager of its own. Each of these resource managers has the capability to cover multiple host computers and can be a distributed entity over the network on which the subsystem is being implemented. Currently, there is one such entity available by default to a VISA application after initialization: the VISA Default Resource Manager, also referred to as the VISA Resource Manager. This identifier is used in the opening of resources, finding of available resources, and other operations at the resource level. Within each subsystem the naming of resources follows the convention described above.

It is noted that a VISA system includes at least one resource manager resource that is available to the rest of the system. In the preferred embodiment, this resource manager is the VISA Resource Manager 140, also referred to as the Default Resource Manager 140. The VISA Resource Manager 140 (Default Resource Manager) is referenced as viDefaultRM (viDRM) in the viOpen() operation. In the present disclosure the terms "VISA Resource Manager" and "Default Resource Manager" and "viDRM" are used interchangeably.

Referring again to FIGS. 7 and 8, the VISA Resource Manager 140 plays a key role in bringing all the components of a VISA subsystem together. One of the most important characteristics of the VISA Resource Manager 140 is that the partitioning imposed by a resource manager can be performed recursively. This allows very granular control of components.

Figure 21:
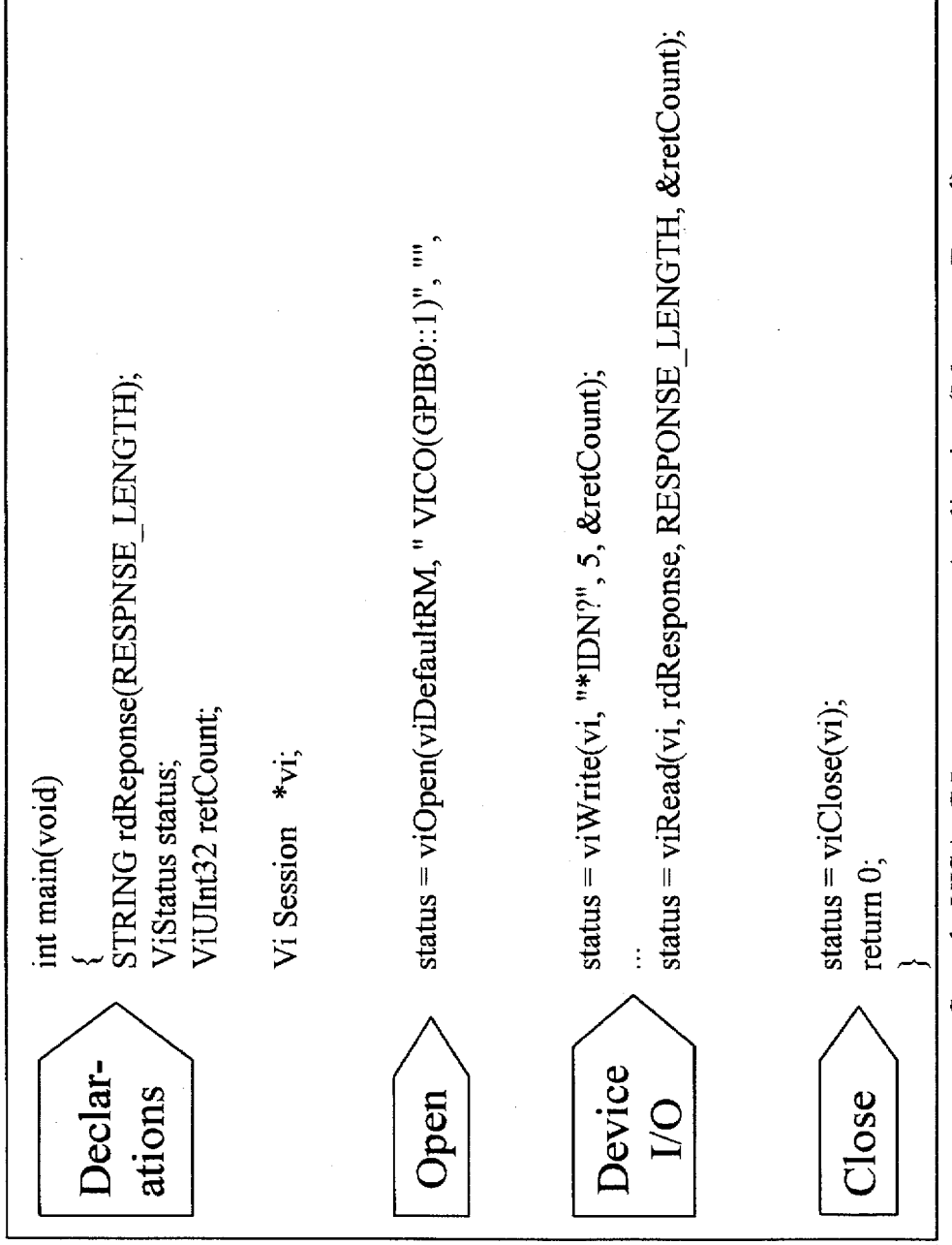
FIG. 21 illustrates a sample VISA C language-type application

The interface to viDRM is derived from the VISA Resource Template 130 and is not expanded any further. viDRM does, however, add semantics to the Template interface by providing a well known root from which all the registered resources can operate and can be operated upon. The example in FIG. 21 shows the relation of the viDRM to the an underlying resource. In this example the resource "VICO{GPIB::1}" is accessed by first opening a session to the resource. This is accomplished by locating the resource first within the space defined by viDefaultRM. Once access to the individual resource session is achieved, an application can communicate with the resource directly, since all the knowledge and history of the connection is kept within the session id.

An application can use the VISA Resource Manager 140 as a monitoring point for a particular subsystem by enabling the generation of events on the system defined events, which include the notification of resources or sessions being killed or becoming inactive. Resource level control of attributes allows an application to set and retrieve global attributes without having to open a session to this resource.

The VISA Resource Manager 140 handles all system events that occur in a VISA system, and the attributes comprised within the VISA Resource Manager resource 140 comprise global attributes about the version of the system and the characteristics of the system. The majority of operations that are included within the VISA Resource Manager resource 140 and which can be used to act upon the VISA Resource Manager 140, such as get and set attribute, generate event, etc. are also on the majority of instrument control resources 160 and miscellaneous resources 162. Thus, the VISA Resource Manager 140 follows the resource model of the resources it controls, i.e., the resource manager follows its own constraints. For example, in one embodiment, an additional resource is provided which acts in a similar manner to the VISA Resource Manager 140. This resource is used to control subnetworks of resources, with the VISA Resource Manager 140 managing the created resource which acts similarly to the VISA Resource Manager 140.

Figure 20:
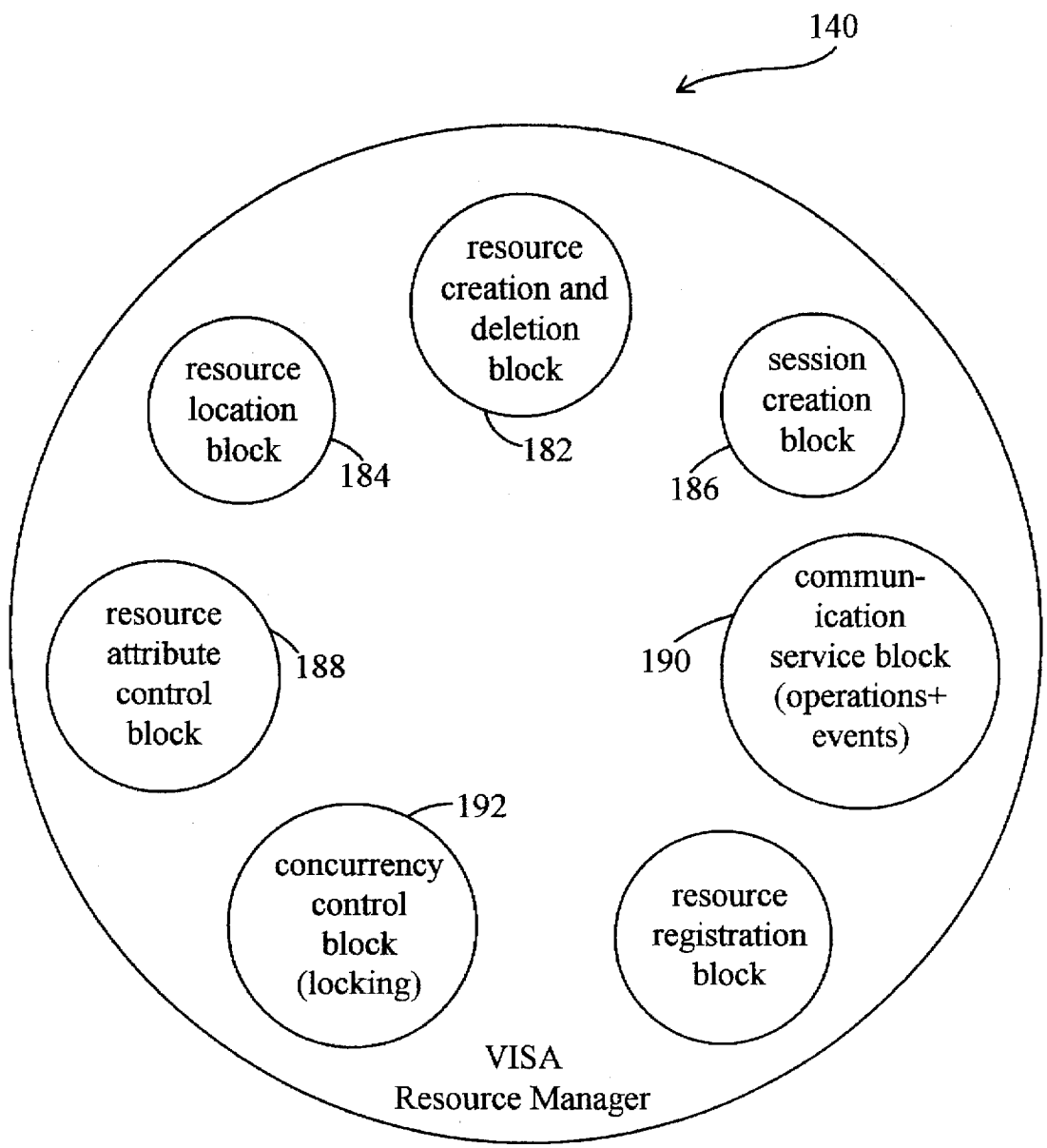
FIG. 20 illustrates the components of the VISA Resource Manager.

Referring now to FIG. 20, a diagram illustrating the various components which comprise the VISA Resource Manager 140 is shown. As shown, the VISA Resource Manager 140 includes a resource creation and deletion block 182, a resource location block 184, a session creation block 186, a resource attribute control block 198, a communication service block 190, a concurrency control block 192, and a miscellaneous function block 194. These blocks comprised within the VISA Resource Manager 140 provide basic resource control and communication services to applications.

The resource creation and deletion block 182 is involved with creating and deleting resources. The resource location block 184 finds a resource in order to establish a communication link to the resource. This search is based on a unique symbolic name. The session creation block 186, also referred to as the life cycle control block, controls the life cycle of sessions to resources established by the requests of applications, i.e., this block creates and deletes sessions to a resource. Applications request these services using operations referred to as viOpen() and viClose(), as discussed below. VISA Resource Manager also frees up all the associated system resources whenever an application closes the respective session or the respective application becomes dysfunctional.

The resource attribute control block 188 includes attribute manipulation operations to set and retrieve the status of resources. This block also performs the initialization or setup of resource attributes while creating sessions to respective resources. The operation in VISA Resource Manager for modifying attributes is viSetAttribute() and the operation in VISA Resource Manager that retrieves the value of an attribute is viGetAttribute(). The resource attribute control block 188 also allows applications to set up access modes to resources. Operations referred to as viLock(), viLockRsrc(), and viUnlock() control the type of access to resources. VISA Resource Manager defines two generic types of locking mechanisms referred to as the read lock and the write lock. Each resource defines the required action to be taken on a lock or unlock request. Applications can use the resource attribute control block to request resources to change lock states to a specified mode.

The communication service block 190 manages sessions between applications and resources. The primary method of communication among resources and between applications and resources is referred to as operation invocation, i.e., invoking an operation on the respective resource to direct the resource to perform the desired function. The communication service block 190 also allows the exchange of information through events. It is noted that, in the preferred embodiment applications are not restricted to any predefined set of operations or data transfer communication mechanisms.

Operation Invocation refers to communication between an application and a resource using operations defined in the resource. After establishing a session to a resource, an application can communicate with the resource by invoking operations on the resources. Each resource describes the operations supported by the resource and the resource and application exchange information through the parameters of the operations.

As discussed above, in a VISA system an event is defined as an asynchronous occurrence which can be generated either in hardware or in software. The communication service block 190 in VISA Resource Manager traps all the system events that require system-wide action. The system events can be generated either by resources or by other external occurrences. These events are then reported back to the application. An application can be notified on occurrence of an event by two different mechanisms, as described below. In case of exceptions, the events are reported back only to the application thread causing the exception.

RESOURCE CLASSES

Figure 22:
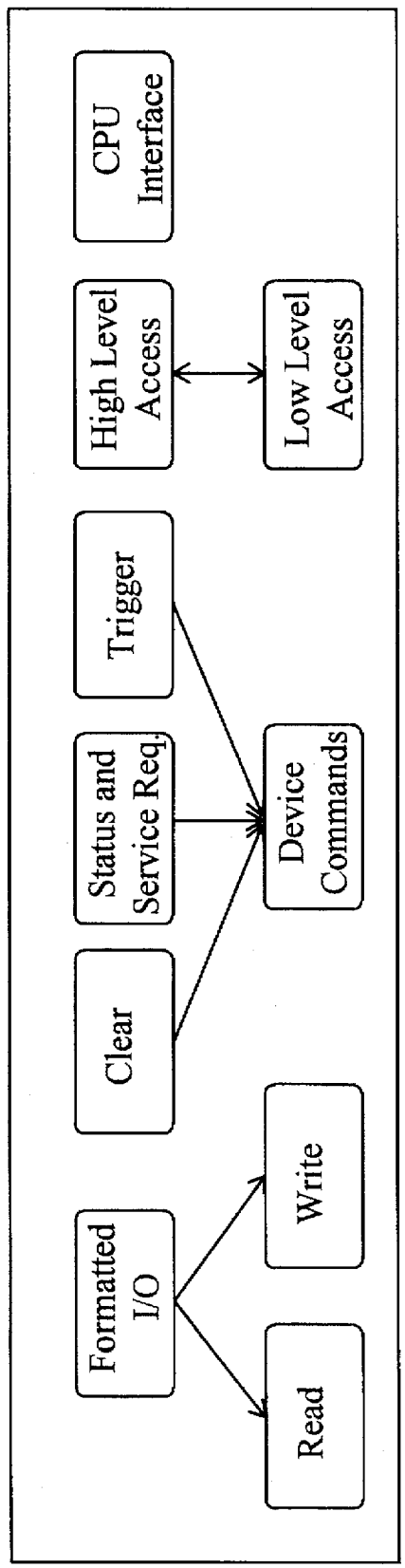
FIG. 22 illustrates the common instrument control resource classes.
Figure 23:
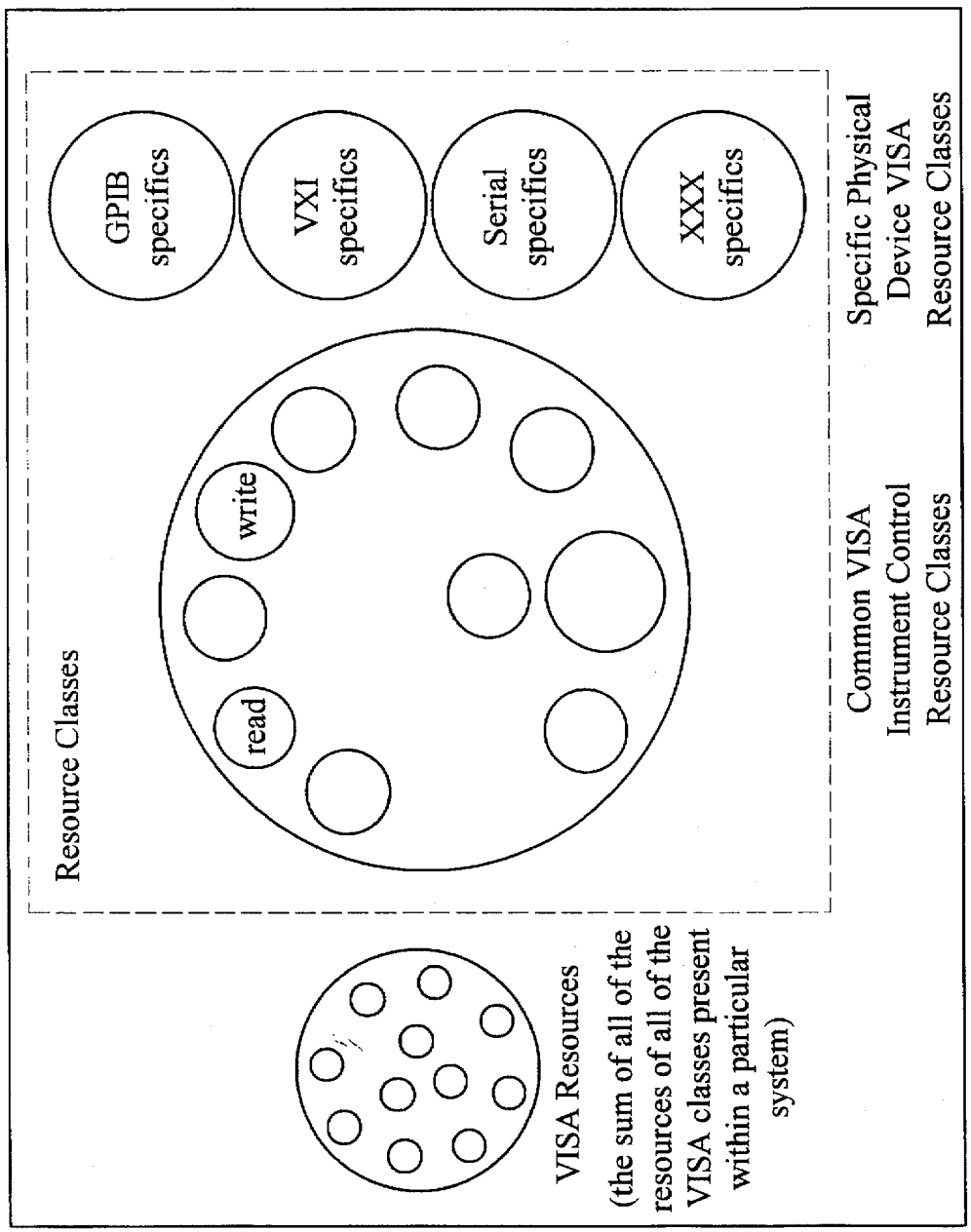
FIG. 23 illustrates the common instrument control resource classes and specific physical device VISA resource classes and corresponding VISA resources.
Figure 24:
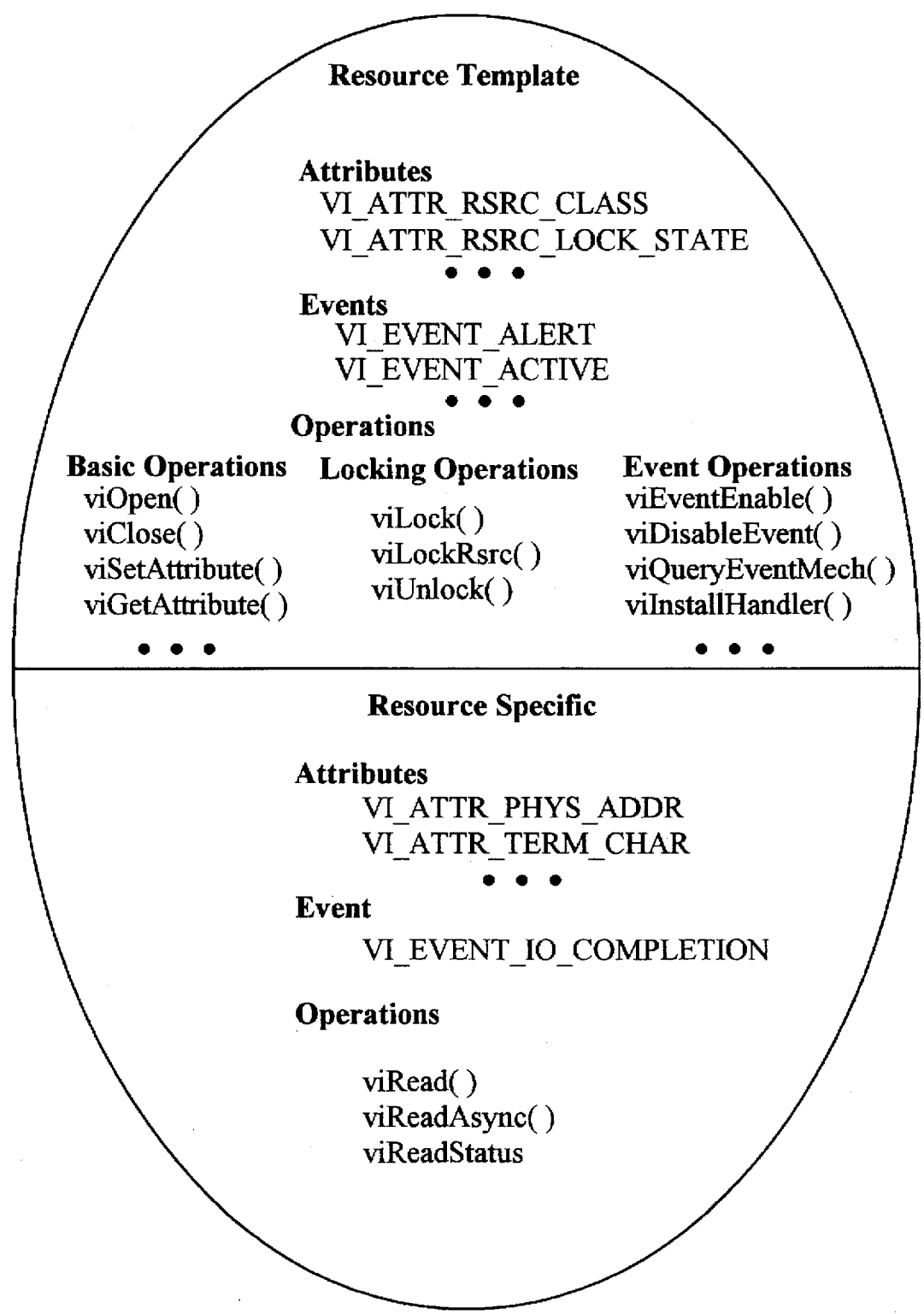
FIG. 24 illustrates the organization of an instrument control resource class.

FIGS. 22 and 23 illustrate the resource classes comprised in the instrument resource classes block 160. The instrument control resource classes 160 are provided to encapsulate the various operations of a device, including reading, writing, trigger, and so on. A VISA instrument control resource, like any other resource, is defined by the basic operations, attributes, and events of the VISA Resource Template 130. For example, modifying the state of an attribute is performed via the operation viSetAttribute(), which is defined in the VISA Resource Template 130. Although the instrument control resource classes 160 do not have viSetAttribute() listed in their operations, they provide this operation because it is defined in the VISA Resource Template. Likewise, the instrument control resource classes 160 provide all of the operations included in the VISA Resource Template 130 because they are defined in the VISA Resource Template 130. As shown in FIG. 24, from this basic interface, i.e., this basic set of attributes, events, and operations, each resource class adds its specific operations, attributes and events, which allow the class to act as a template for resources which perform the dedicated task of the class, such as sending a string to a message-based device.

FIG. 23 illustrates the instrument control resource classes comprised in a VISA system. FIG. 23 also shows that the sum of all the VISA instrument control resource classes is comprised of the common instrument control resource classes and the specific device (interface or hardware specific) instrument control resource classes. The distinction between common and device specific resource classes was described above.

FIG. 22 illustrates the common resource classes, these being: Formatted I/O, Read, Write, Clear, Status and Service Request, Trigger, Device Commands, High Level Access, Low Level Access, and CPU Interface. FIG. 22 also shows the hierarchy or relationship of the common instrument control classes. As shown, the Formatted I/O resource class relies on the Read and Write resource classes for its operation. Thus, when a resource from the Formatted I/O resource class is instantiated, the resource opens sessions to the appropriate Read and Write resources. Likewise, the Clear, Status and Service Request, and Trigger resource classes rely on the Device Commands resource class for their operation. The High Level Access resource class relies on the Low Level Access resource class for its operation. Some resources, such as the CPU Interface resource, have no inter-relation with any other instrument control resource. This does not imply that the resource cannot be used with the other resources, but that it does not use, and is not used by, any other instrument control resource.

The common instrument control resource classes are shown in FIG. 22 and are discussed in detail in Chapter 5 of Appendix 1. As shown in Chapter 5 of Appendix 1, each of the common instrument control resource classes include a number of attributes, operations, and events for implementing respective capabilities of instruments. FIG. 23 illustrates the manner in which the instrument control resource classes include the common instrument control resource classes and the specific physical device instrument control resource classes. As shown, the specific physical device resource classes include GPIB specific, VXI specific, and serial specific resource classes. The hardware specific or device specific resource classes are discussed in detail in appendix A of Appendix 1. As shown in appendix A of Appendix 1, these resource classes each include numerous attributes, operations and events. Chapter 5 and appendix A of Appendix 1, are fully incorporated herein as though fully and completely set forth herein.

These instrument control resource classes, including the common resource classes and the hardware specific resource classes, are also listed below.

| Resource Class | Abbr. Name | Standard Name |
| --- | --- | --- |
| VISA Resource Manager Resource | VRM | VI_RSRC_VISA_RM |
| VISA Instrument Control Organizer | VICO | VI_RSRC_VISA_IC_ORG |
| Write Resource | WR | VI_RSRC_WR |
| Read Resource | RD | VI_RSRC_RD |
| Formatted I/O Resource | FIO | VI_RSRC_FMT_IO |
| Trigger Resource | TRIG | VI_RSRC_TRIG |
| Clear Resource | CLR | VI_RSRC_CLR |
| Status/Service Request Resource | SRQ | VI_RSRC_SRQ |
| High Level Access Resource | HLA | VI_RSRC_HL_ACC |
| Low Level Access Resource | LOLA | VI_RSRC_LL_ACC |
| Device Specific Commands Resource | DBVC | VI_RSRC_DBV_CMD |
| CPU Interface Resource | CPUI | VI_RSRC_CPU_INTF |
| GPIB Bus Interface Control Resource | GBIC | VI_RSRC_GPIB_INTF |
| VXIbus Device Configuration Resource | VXDC | VI_RSRC_VXI_DBV_CONF |
| VXIbus Interface Control Resource | VXIC | VI_RSRC_VXI_INTF |
| VXIbus Slot 0 Resource | VXS0 | VI_RSRC_VXI_SLOT_0 |
| VXIbus System Interrupts Resource | VXSI | VI_RSRC_VXI_SYS_INTR |
| VXIbus Signal Processor Resource | VXSP | VI_RSRC_VXI_SIG_PROCESSOR |
| VXIbus Signal Resource | VXS | VI_RSRC_VXI_SIG |
| VXIbus Interrupt Resource | VXIN | VI_RSRC_VXI_INTR |
| VXIbus Extender Interface Resource | VXBI | VI_RSRC_VXI_EXTDR |
| Asynchronous Serial Bus Interface Control Resource | ASIC | VI_RSRC_ASRL_INTF |

As discussed above, the attributes, operations, and events for each of the resource classes above is discussed in Appendix 1 at chapter 5 and at appendix A. Each resource also includes a default value. These default values are listed in appendix B of Appendix 1. A configuration utility is also provided to provide the user with a simple method of changing the default values.

Referring again to FIG. 24, a diagram illustrating the organization of one of the instrument control resources 160 is shown. As previously noted, each resource within a VISA system, including the instrument control resources 160, derive functionality from the VISA Resource Template 130. FIG. 24 illustrates the manner in which each instrument control resource 160 includes a portion (upper portion) that derives its interface from the VISA Resource Template 130 and a portion (lower portion) that comprises an interface that is specific to that particular resource.

Figure 25:
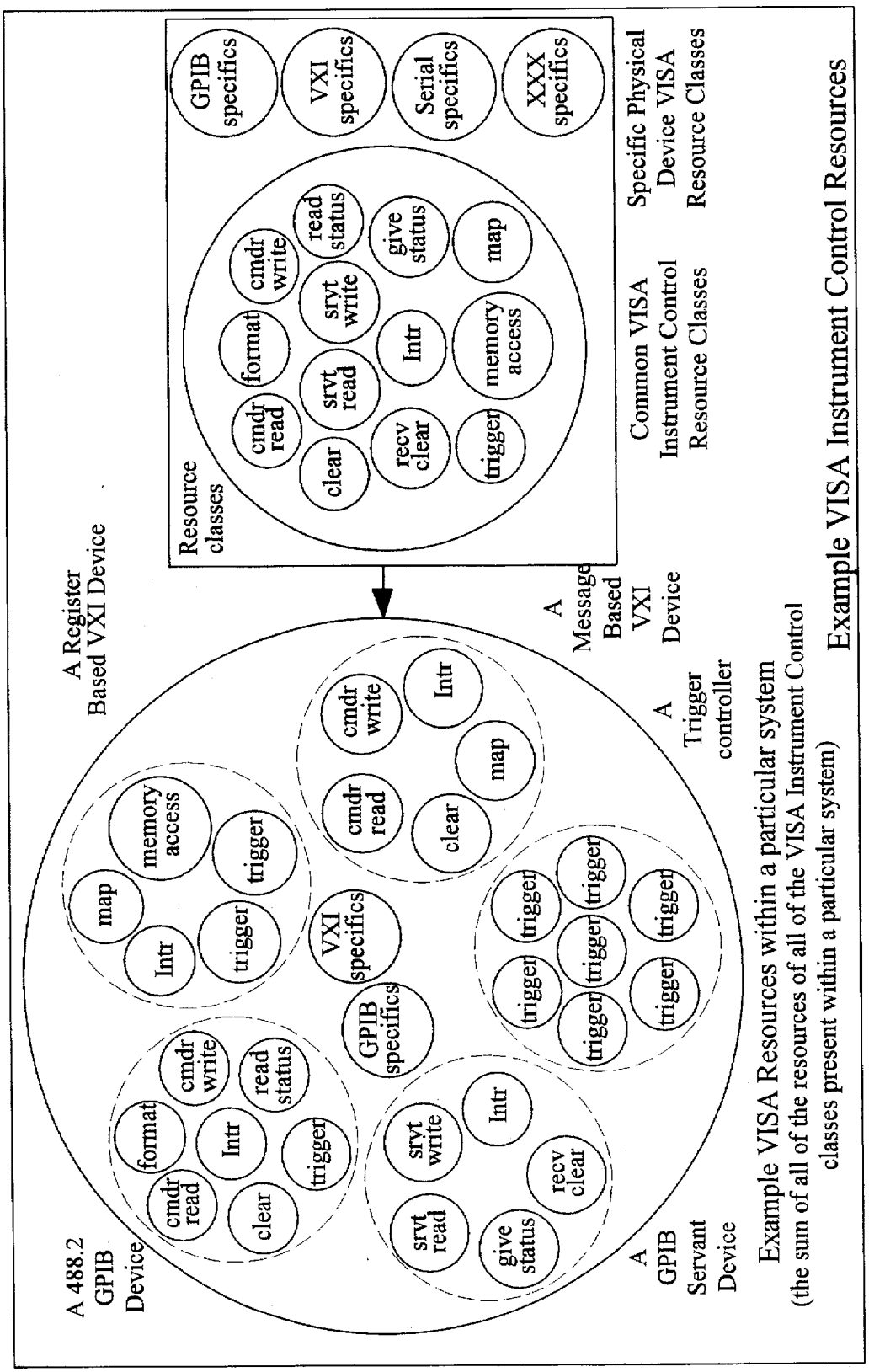
FIG. 25 illustrates example VISA instrument control resources.

FIG. 25 shows an example of the resources that might be created when a system has been powered up and in use. The resources in this example are based loosely on the example configuration shown in FIGS. 7 and 8. In this example, resources are created for the VXI system, the GPIB system, and the trigger controller. It is noted that only the device capabilities that each device has are reflected in the set of resources in the system. It is also noted that the medium size circles are provided around groupings of resources simply as a visual grouping organization, and these circles are not intended to connote any meaning regarding system operation or usage of resources. From the standpoint of the VISA Resource Manager, each resource in the system is treated exactly the same.

VICO

In one embodiment of the invention, a VISA system includes a resource referred to as the VISA Instrument Control Organizer of Resources. VICO allows for the creation of user-defined resource groupings (virtual instruments) of the instrument control resources. A virtual instrument, in this context, is a name given to a unique session to a resource to provide the functionality of a traditional, stand-alone instrument. VICO is included in this embodiment to provide a higher level user interface so that users can communicate with instrumentation at a higher level of abstraction. VICO is a resource similar to other resources in the system, but is unique, however, in the sense that it serves only one unique service specifically for the instrument control resources. Thus VICO encapsulates features of the resources for users who require a simple interface. With VICO, applications can create sessions that can communicate with any number and type of instrument control resources. In other words, a single VICO session can control all aspects of one or more complete devices.

Figure 26:
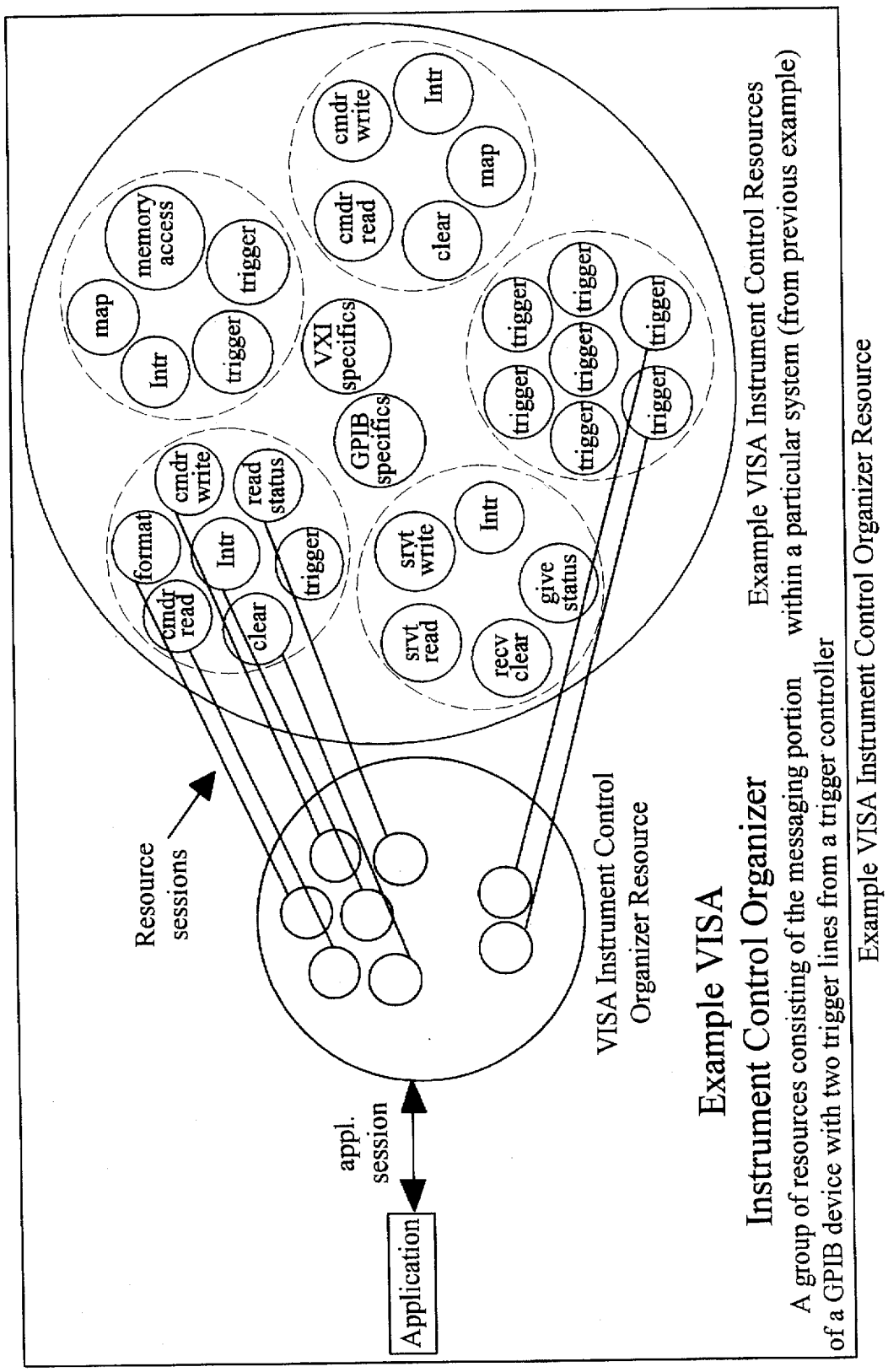
FIG. 26 illustrates an example VISA Instrument Control Organizer (VICO) resource.

FIG. 26 illustrates an example of the operation of the VICO resource as applied to the example in FIG. 25. As shown, the VICO resource comprises the logical grouping of one or more instrument control resources. In the example shown in FIG. 26, the VICO resource has been directed to make a VISA Instrument Control Organizer resource that maps the message-based part of a GPIB device with two trigger lines from a trigger control to form a logical device entity. This entity can be controlled through a single application session. All of the operations of the resources that are under the VISA Instrument Control Organizer's control are available to the application session. As an example, this includes simply invoking operations such as viRead() and viWrite() to perform message-based communication, and viTrigger() to perform complex trigger operations.

The VISA Instrument Control Organizer, as the name indicates, is an organizer of the VISA Instrument Control resources 160. An organizer is a mechanism for grouping multiple resources together so that they can be referenced through a single session. In the case of the VISA Instrument Control Organizer, these resources are the VISA Instrument Control resources.

A session can be opened to the VISA Instrument Control Organizer resource in the same manner as opening a session to any other resource. As part of the initialization of this resource, the user can specify which VISA Instrument Control resources this organizer will manage. The user can then access all of the attributes and operations of the VISA Instrument Control Organizer as well as those of the resources grouped together (members) of the organizer.

As with any other resources, the VISA Instrument Control Organizer (VICO) resource has access to all VISA Resource Manager operations. viAttachRsrc() is used to add a resource to an already established VISA Instrument Control Organizer. With this operation a resource can be registered with a given VISA Instrument Control Organizer. This resource can then be detached from this VISA Instrument Control Organizer through viDetachRsrc(). In addition, the operation viFindRsrc() can be used, given a search expression, to find the reference names of resources that match this expression.

Under certain conditions it is useful to have direct (session level) access to a resource contained in the organizer. The VISA Instrument Control Organizer provides the viGetRsrcSession() operation to return a session to one of the resources it controls. This session represents the given resource from the point of view of the specified VISA Instrument Control Organizer.

The VISA Instrument Control Organizer is a resource just like any other resource in the system. However, it is special in that, through its operations, it provides accessibility to the operations of the resources that become grouped under it. Therefore, in addition to the attributes and operations listed in this section, all the attributes and operations listed in the VISA Instrument Control Resource classes section can be accessed or invoked through a VISA Instrument Control Organizer session.

VISA Instrument Control Organizer Attributes

| Symbolic Name | Access Privilege | Data Type | Range |
|---|---|---|---|
| VI_ATTR_ACC_MODE | R/W | Global ViAccessMode | N/A |
| VI_ATTR_RESOURCES | RO | Global ViRsrcList | N/A |

VI_ATTR_ACC_MODE is the mode of operations and specifies the mode in which all the sessions to the member resources are to be open. This applies both to initially attached resources and subsequently attached resources.

VI_ATTR_RESOURCES is a list of reference names of the resources managed by the VISA Instrument Control Organizer.

Events

There are no events directly generated from the VISA Instrument Control Organizer. However, each resource under VICO can generate and receive resources particular to that resource.

VICO Operations viGetRsrcSession (sesn, refName, accessMode, vi)

viGetRsrcSession (sesn, refName, accessMode, vi)

This operation is used to gain access to a resource from within an available VISA Instrument Control Organizer session sesn. Unique resource references are specified in the refName parameter. The newly opened session is then accessible using vi.

Parameters

| Name | Direction | Type | Description |
|---|---|---|---|
| sesn | IN | ViSession | Unique logical identifier to a VISA Instrument Control Organizer session. |
| refName | IN | ViRsrc | Unique logical reference to resource to which a session is to be opened. |
| accessMode | IN | ViAccessMode | Access modes use in opening the session to the referenced resource. |
| vi | OUT | ViSession | Unique session identifier to the resource referenced in refName. |

Return Values

Return values have the type ViStatus and are used to return the operational return status. The return value returns either a completion code or an error code as follows.

| Completion Code | Description |
|---|---|
| VI_SUCCESS | Resource attached successfully. |

| Error Codes | Description |
|---|---|
| VI_ERROR_INV_SESSION | The given sesn does not identify a valid session. |
| VI_ERROR_RSRC_LOCKED | The specified operation could not be performed as the resource identified by sesn has been locked for this kind of access. |
| VI_ERROR_ABORT | User abort occurred during transfer. |
| VI_ERROR_INV_REF_NAME | The specified reference name is not valid. |

The implementation of viClose() on a VISA Instrument Control Organizer resource implicitly invokes a viClose() operation on all sessions currently opened via viGetRsrcSession() for the corresponding VISA Instrument Control Organizer resource.

VISA SYSTEM OPERATION

Figure 27:
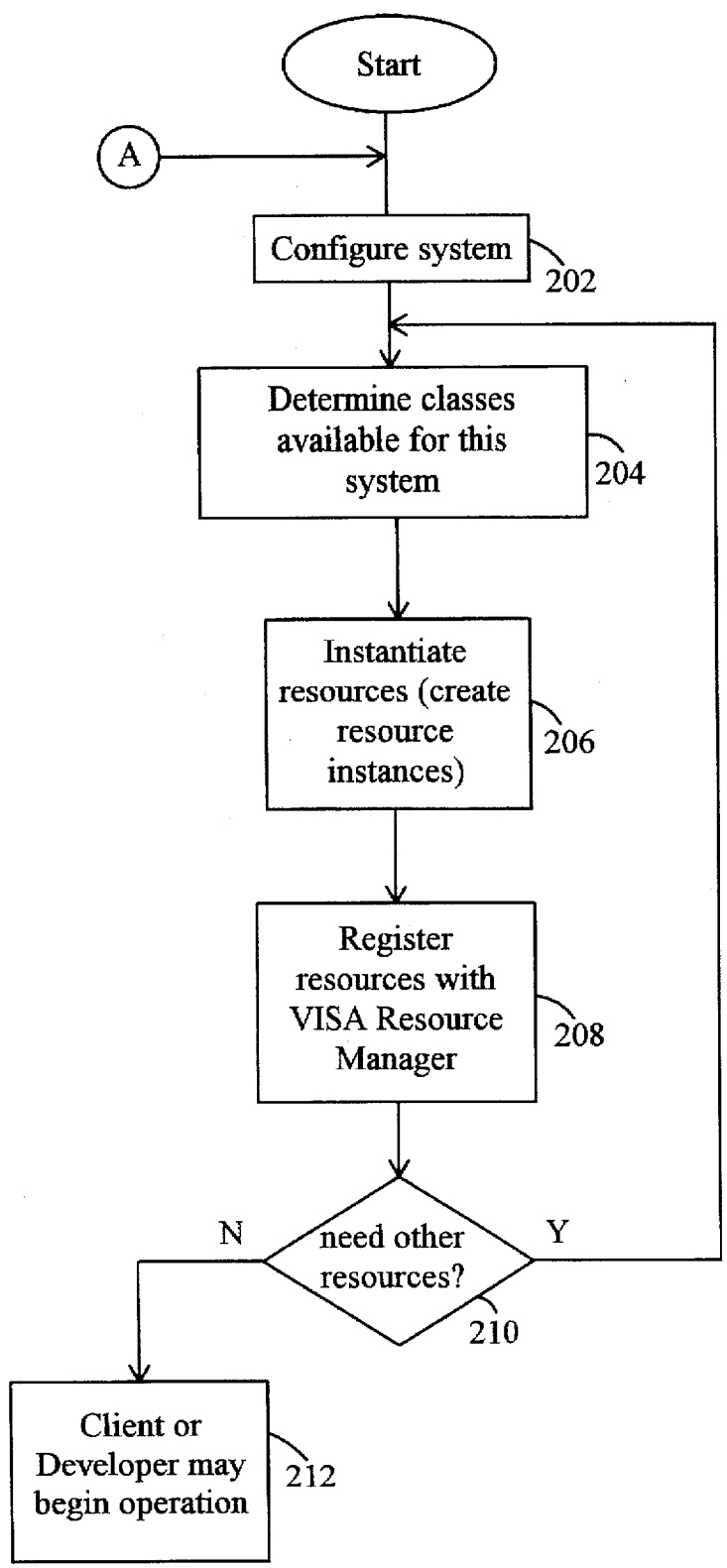
FIG. 27 is a flowchart diagram illustrating the configuration steps performed by a VISA system.
Figures 28, 29:
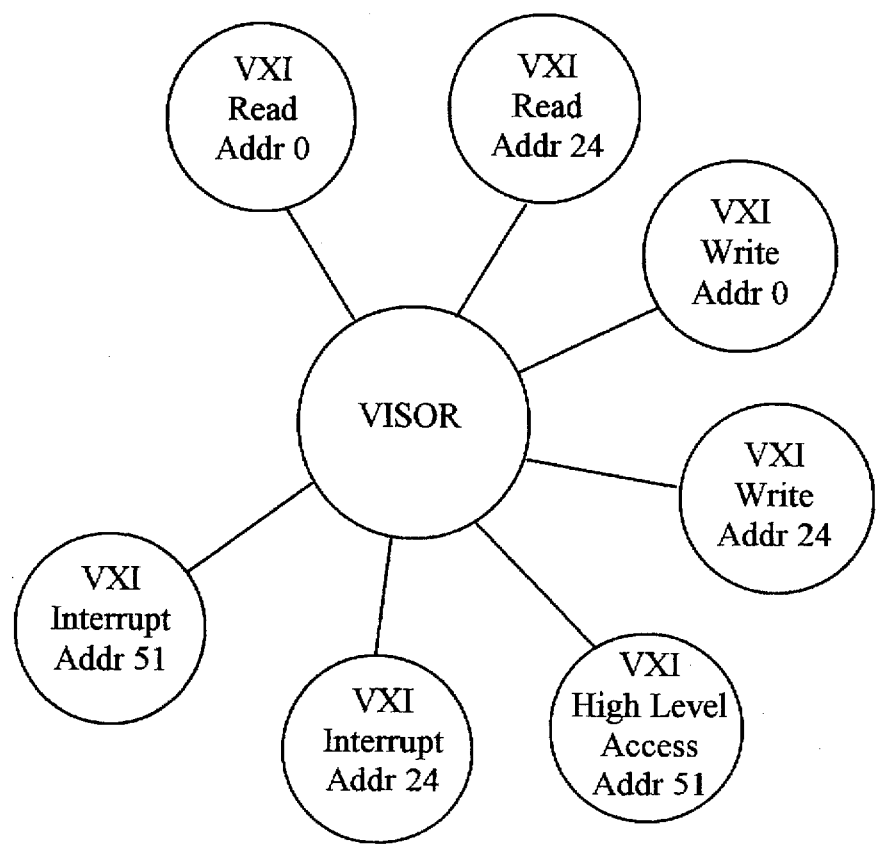
FIG. 28 illustrates an example of instrument devices and resource classes implemented in an example VISA system.
FIG. 29 illustrates the resources created by the configuration method of FIG. 27 for the example VISA system of FIG. 28.

Referring now to FIG. 27, a diagram illustrating operation of the present invention at power up is shown. This operation is described in conjunction with a simple instrumentation system which is shown in FIGS. 28 and 29. As shown in FIG. 28, the example instrumentation system includes a VXI chassis including a CPU card, a message based device card and a register based device card. The CPU card has an address of 0, the message based device has an address of 24, and the register based device has an address of 51. The resource classes available in this example are Read, Write, High Level Access, and VXIbus Interrupt.

Referring again to FIG. 27, in step 202 a method is invoked which configures the instrumentation system. This method involves determining the respective hardware and instruments available within the system as well as determining the logical address of the respective instruments in this system. In the present example, in step 202 the method would determine that there is a VXI CPU card having address 0, a respective message based device having an address of 24, and a respective VXI register based device having an address of 51 comprised within the system. In step 204 the method determines the classes available within the system. In the present example, the method would determine that the classes available are Read, Write, High Level Access, and Interrupt. In step 206 the method uses the classes determined in step 204 and the hardware configuration determined in step 202 to create resources.

Referring now to FIG. 29, a diagram illustrating the resources that are generated in this example are shown. As shown, the resources created include a VXI Read of address 0, a VXI Read of address 24, a VXI Write of address 0, a VXI Write of address 24, a High Level Access at address 51, a VXI Interrupt at address 51, and a VXI Interrupt at address 24. The startup resource utility 142 instantiates or creates these resources in step 206. The step of instantiating or creating resources in step 206 involves creating an instance which includes code that is inherited or incorporated from the class determined in step 204. The example shown in FIG. 28 includes a read resource class. In order to create an instance of that class, for example a VXI read instance, the method creates an instance which inherits from the interface of the read class. The method may also overwrite a portion of this inherited code with new code that actually implements the specific reads for the interface, in this example the VXI interface.

In step 208 the startup resource manager registers these resources with the VISA Resource Manager 140. In other words, the application programming interface of the resource is provided to the VISA Resource Manager 140, and the resource is provided with a unique name or identifier. The registration process comprises providing entry points regarding the resource, including a description of the operations, a description of the attributes, a description of the exit conditions, the location of the files, and a description of the files themselves.

Upon completion of step 208, the method determines in step 210 if other resources are needed to register the resources in step 208 that were created in step 206. Due to the hierarchical nature in which some resources require other resources for operation as discussed above with regard to FIG. 22, it may be necessary for other resources to be created and registered with the VISA Resource Manager 140. If other resources are determined to be necessary in step 210, then operation returns to step 204. If other resources are not required in step 210, then startup operation has completed and operation is turned over to the user.

Figure 30A:
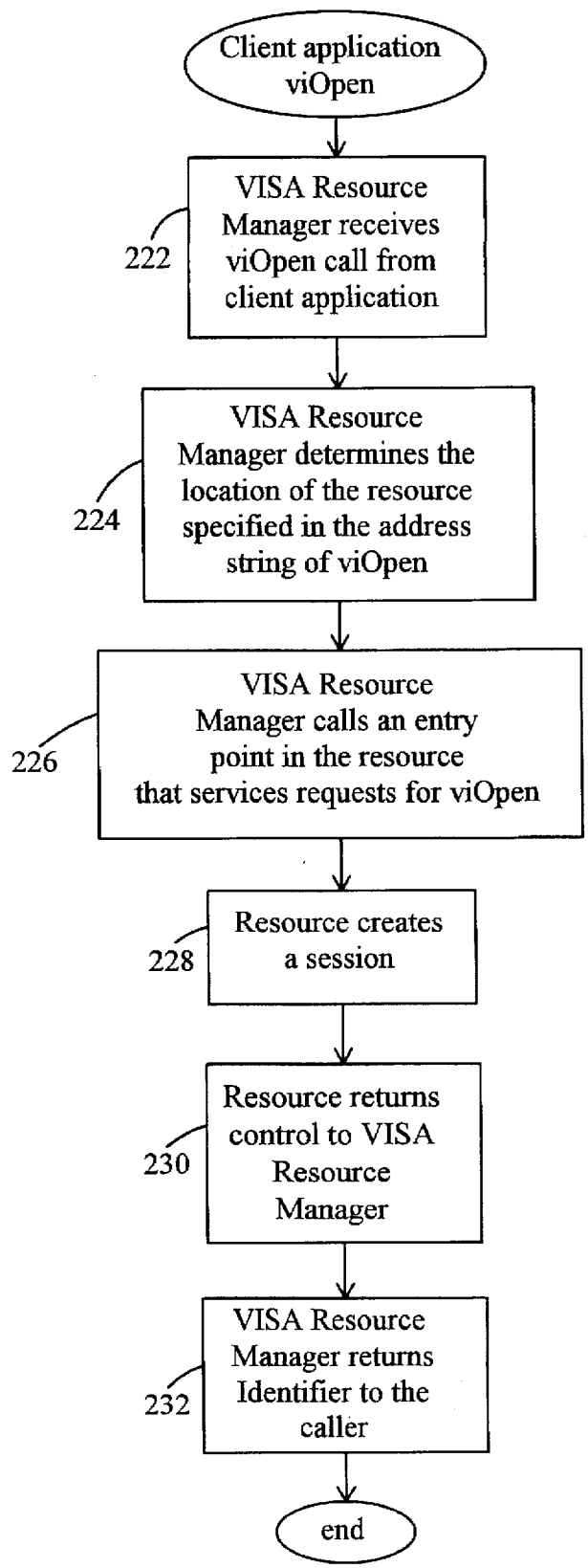
FIG. 30A is a flowchart diagram illustrating the steps performed by a VISA system when a client application uses the viOpen operation.
Figure 30B:
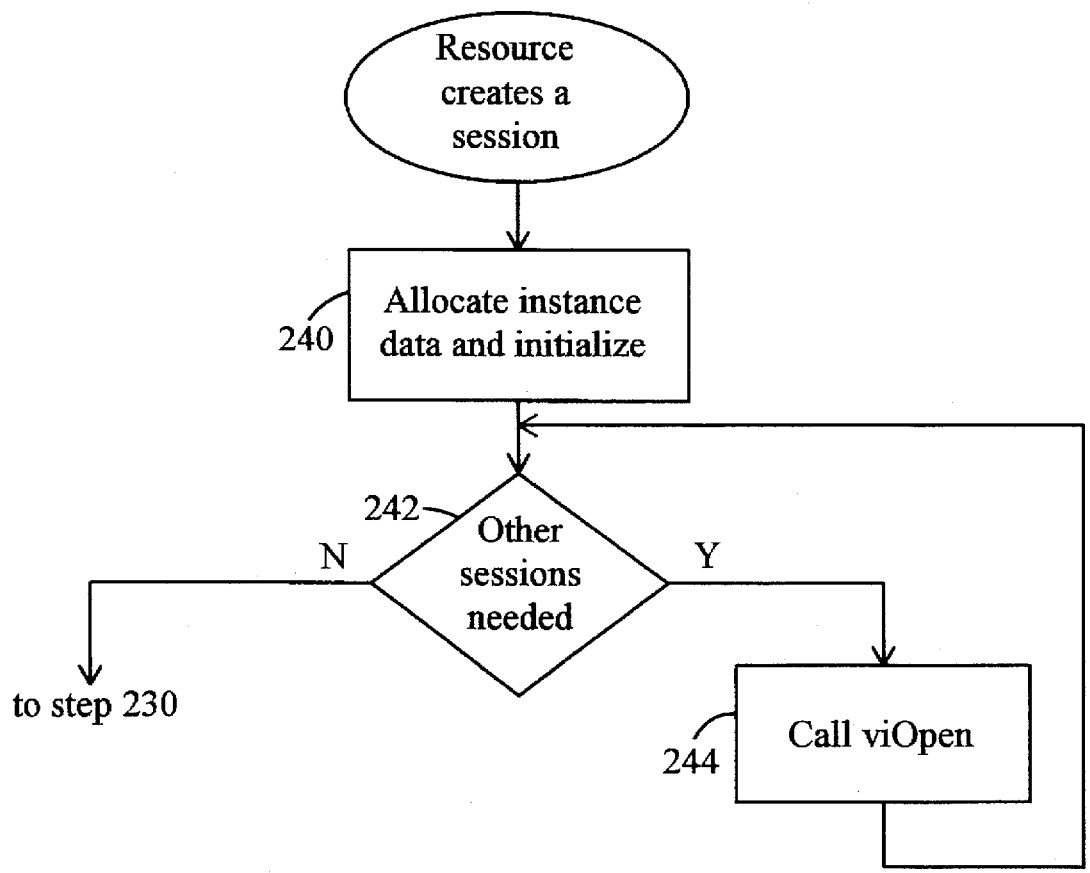
FIG. 30B is a flowchart diagram of a resource creating a session performed in step 228 of FIG. 30A.
Figure 43:
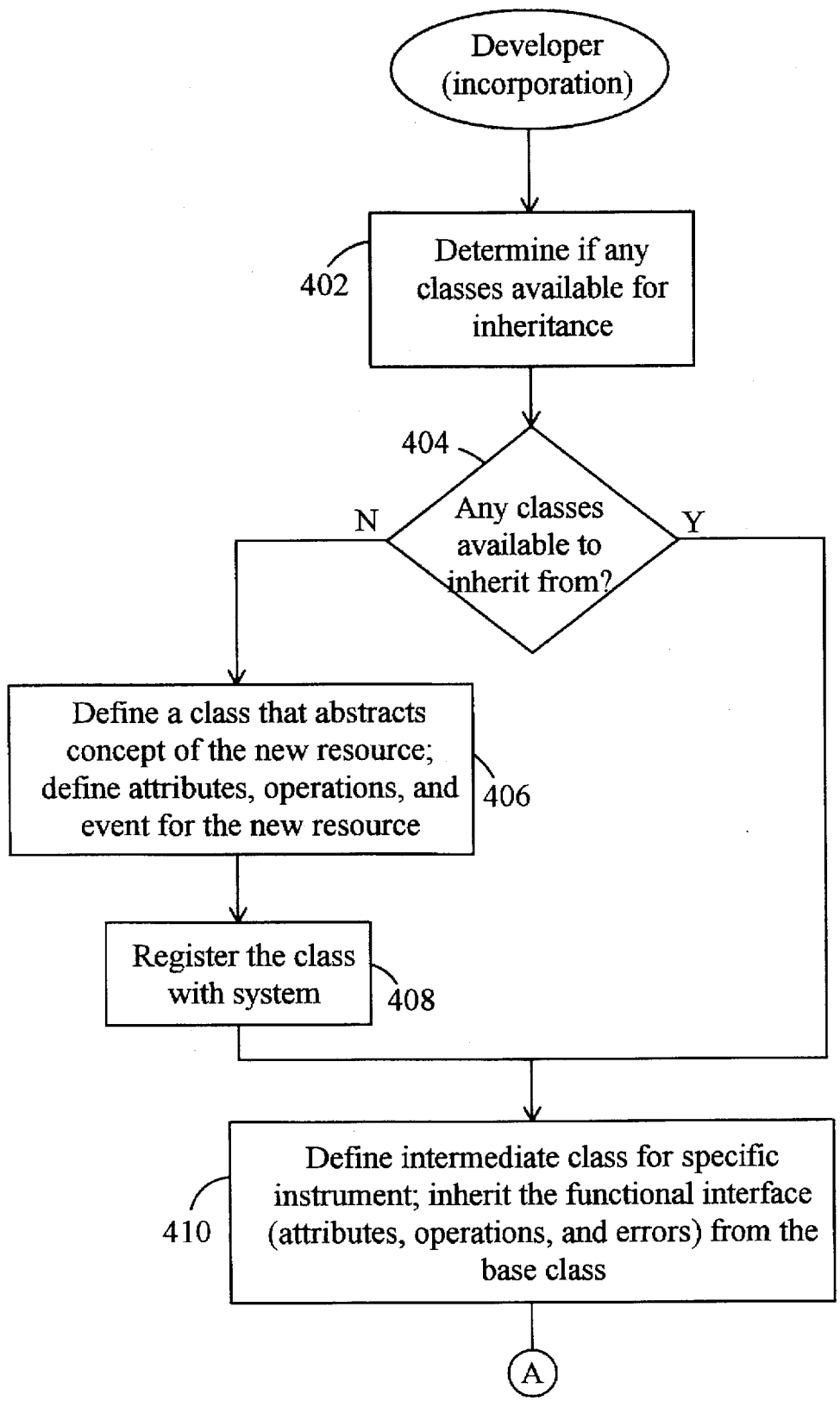
FIG. 43 illustrates the steps performed by a developer in creating a resource by incorporating functionality from other resources, if desired.

It is noted that a user of a VISA system may be either a client or a developer. A client creates applications which use sessions to the various resources to control an instrumentation system as desired. A developer utilizes the various resources within a VISA system to create new resources which provide additional functionality. A developer may use the resources of the present invention to create higher level resources which embody greater functionality, such as instrument drivers or high level applications, as described further below. A developer may also incorporate functionality from other resources to create new resources. FIGS. 30A–B illustrates operation when a client begins using a VISA system to develop an application according to the present invention. FIG. 43 illustrates the method implemented by a developer in developing new resources within a VISA system by incorporating functionality from other resources according to the present invention.

OPERATION FLOWCHART DESCRIPTIONS viOpen Operation

Referring now to FIGS. 30A–B, a diagram illustrating operation of the present invention when a viOpen instruction is received from a client application is shown. A client begins an application or session with a viOpen instruction, and an example of a viOpen instruction is shown at FIGS. 39-42.

Figure 31:
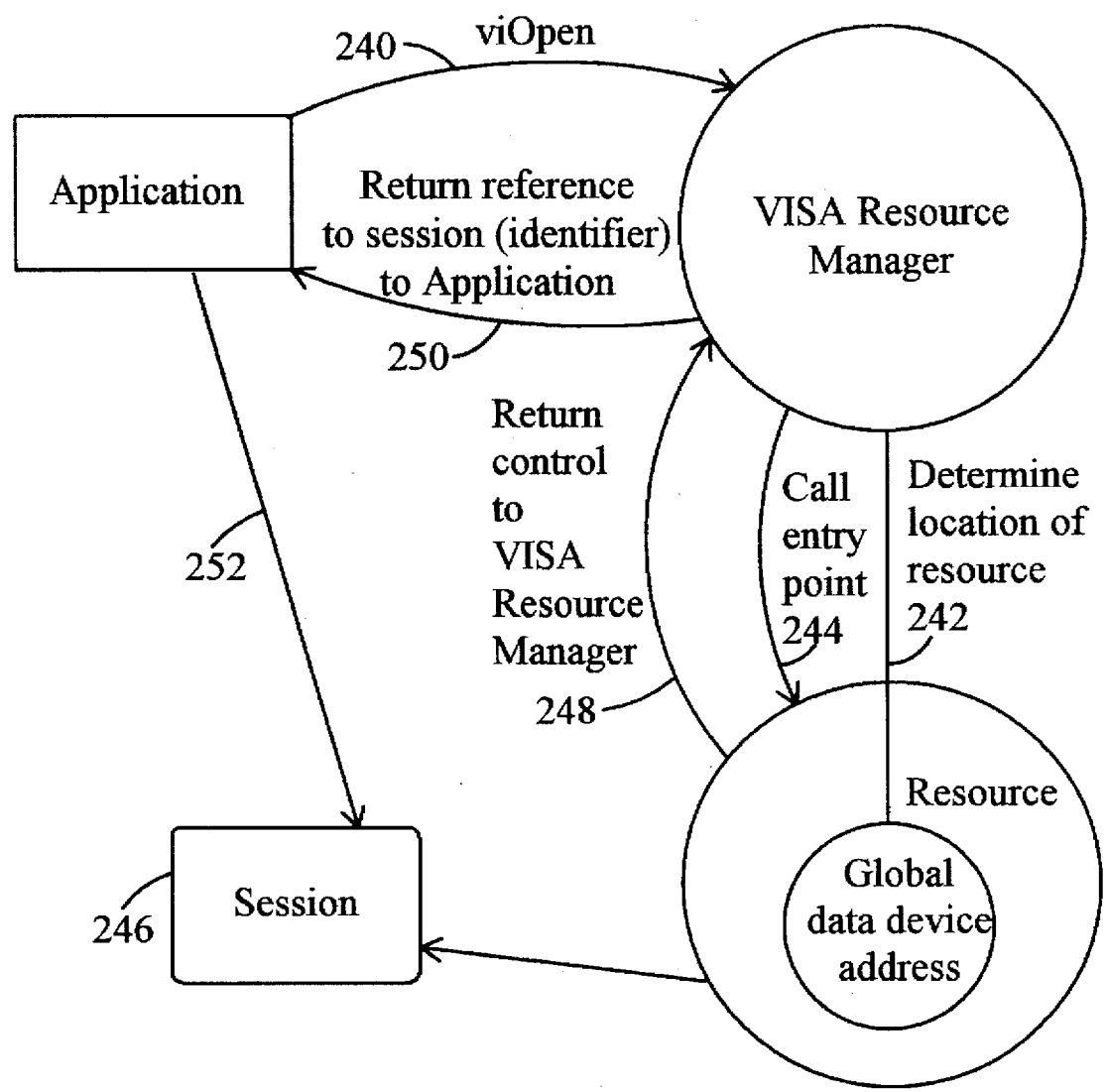
FIG. 31 illustrates the steps performed in FIG. 30A when a viOpen operation is used.

The viOpen instruction instructs the VISA Resource Manager 140 to connect the user's application to a desired resource. The operation of the viOpen operation illustrated in FIG. 30A is discussed in conjunction with FIG. 31. When a system according to the present invention receives a viOpen instruction in step 222, then in step 224 the VISA Resource Manager 140 determines the location of the resource specified in the address string of the viOpen instruction. In FIG. 31, the client application performing a viOpen operation on VISA Resource Manager is shown at 240, and step 124 where the VISA Resource Manager 140 determines the location of the resource is shown at 242. In step 226 the VISA Resource Manager 140 calls an entry point in the resource that services requests for the viOpen operation. This step is illustrated at 244 in FIG. 31. In step 228 the resource creates a session, this session being shown at 246 in FIG. 31. As described above, a session is essentially an instance of a resource. Creating a session involves creating data that is needed for a particular instance of that resource.

In step 230 the resource returns control to the VISA Resource Manager 140, and this is shown at 248 in FIG. 31. In step 232 the VISA Resource Manager 140 returns a reference or identifier to the user's application. This reference is provided in the variable "session i.d." to the user application, as shown at 250 in FIG. 31. The application can then use this session i.d. value to communicate with the resource, as shown at 252 in FIG. 31.

FIG. 30B illustrates more detail regarding how a resource creates a session in step 228 of FIG. 30A. As shown, when a resource creates a session the resource allocates instance data and initializes the session in step 240. In step 242 the resource determines if other sessions are needed in step 242. If so, then viOpen is called on those other resources in step 244 and control returns to step 242. If other sessions are not needed, then control advances to step 230 in FIG. 30A. It is noted that, if sessions to other resources are needed, when those sessions are actually created is indeterminate. If in order to create the data for a particular session it is first necessary to first open sessions to other resources, then these sessions are opened prior to the particular session. However, if in order to open these sessions it is necessary to first define how much space is available to create data, then these sessions may be opened after opening the particular session.

Figure 32:
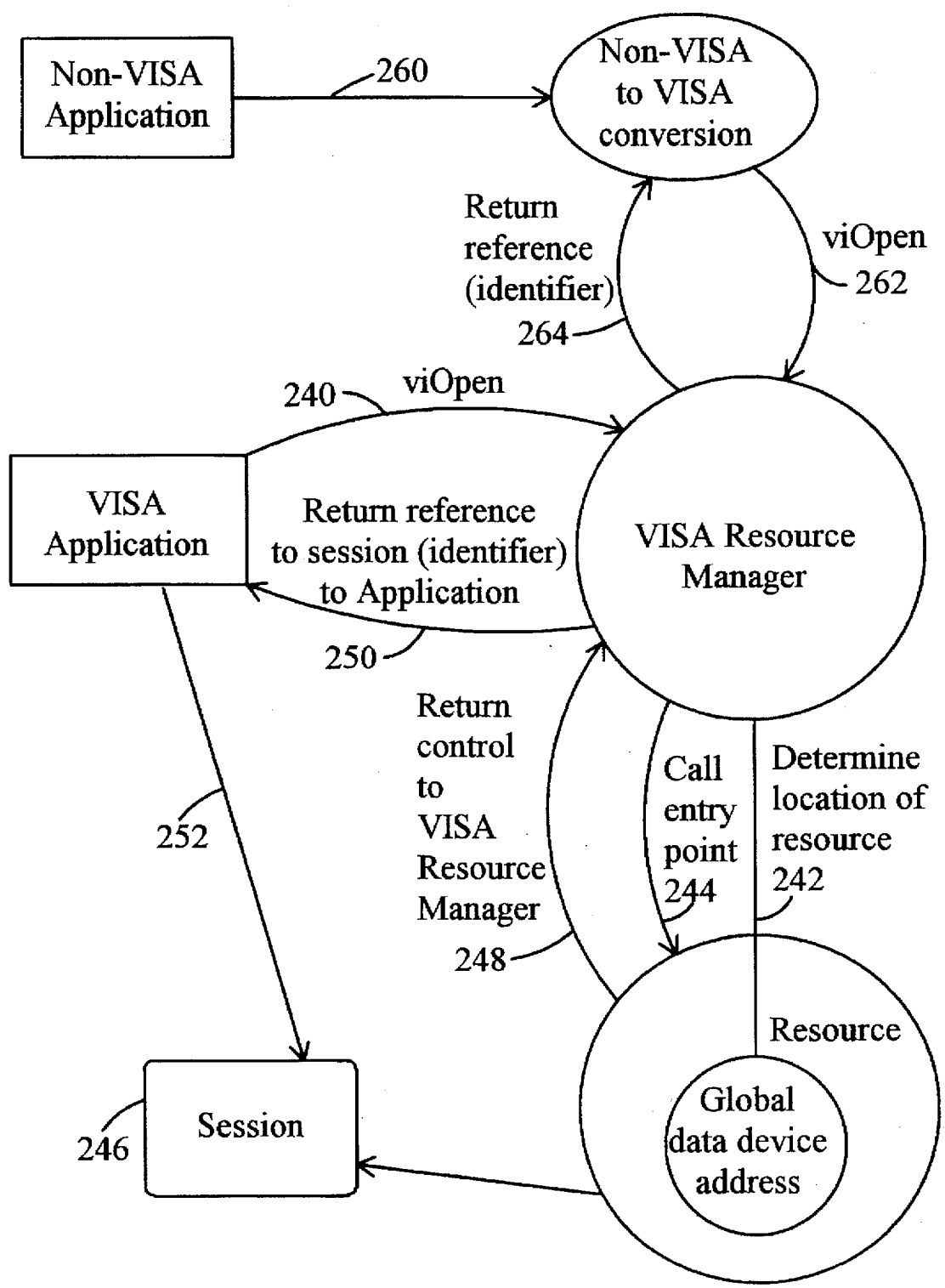
FIG. 32 is similar to FIG. 31 but also illustrates a Non-VISA to VISA conversion.

FIG. 32 is a diagram similar to FIG. 31, but also shows how a non-VISA application undergoes a conversion that enables it to talk to a VISA system. As shown, a non-VISA application which was developed according to a different software architecture can communicate and use the resources within a VISA system by means of the non-VISA to VISA conversion block, as shown. A non-VISA application could be an application developed according to NI-488, NI-VXI, or NI-DAQ software developed by National Instruments, the Standard Instrument Control Library (SICL) from Hewlett-Packard, or other software environments, as desired. The non-VISA to VISA conversion block receives instructions from the non-VISA application and transmits various operations to the VISA Resource Manager 140 to implement the steps in the non-VISA application. The operation of the non-VISA to VISA conversion block in converting applications based on the Standard Instrument Control Library (SICL) into equivalent VISA functions is shown at Appendix 2.

viClose() Operation

Figure 33:
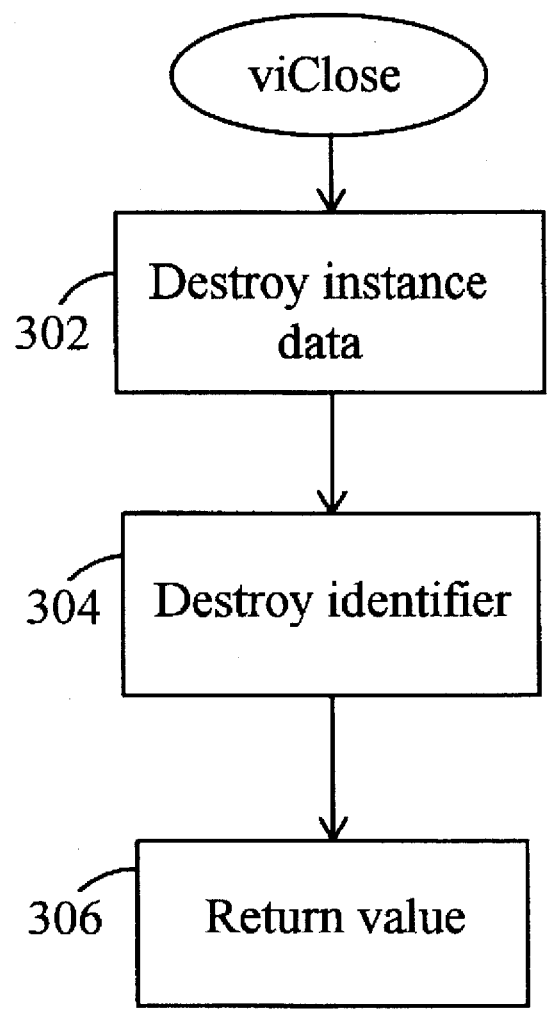
FIG. 33 is a flowchart diagram illustrating the viClose operation.

Referring now to FIG. 33, a flowchart diagram illustrating operation of the viClose() operation is shown. As shown, when a viClose() operation is received then in step 302 the VISA Resource Manager 140 destroys any instance data for the session being closed. In step 304 the VISA Resource Manager 140 destroys the identifier for the session being closed. In step 306 the VISA Resource Manager 140 returns a completion code if the session closed successfully or an error code if the session did not close successfully.

viFindRsrc

Figure 34:
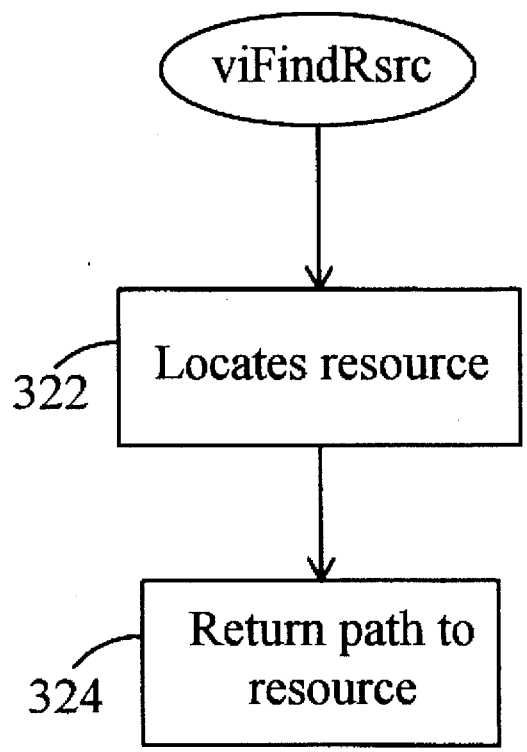
FIG. 34 is a flowchart diagram illustrating the viFindRsrc operation.

Referring now to FIG. 34, a flowchart diagram illustrating operation of the viFindRsrc() operation is shown. As shown, when a viFindRsrc() operation is received then in step 322 the VISA Resource Manager 140 locates the resource and in step 324 returns a path to the resource.

viGetAttribute()

Figure 35:
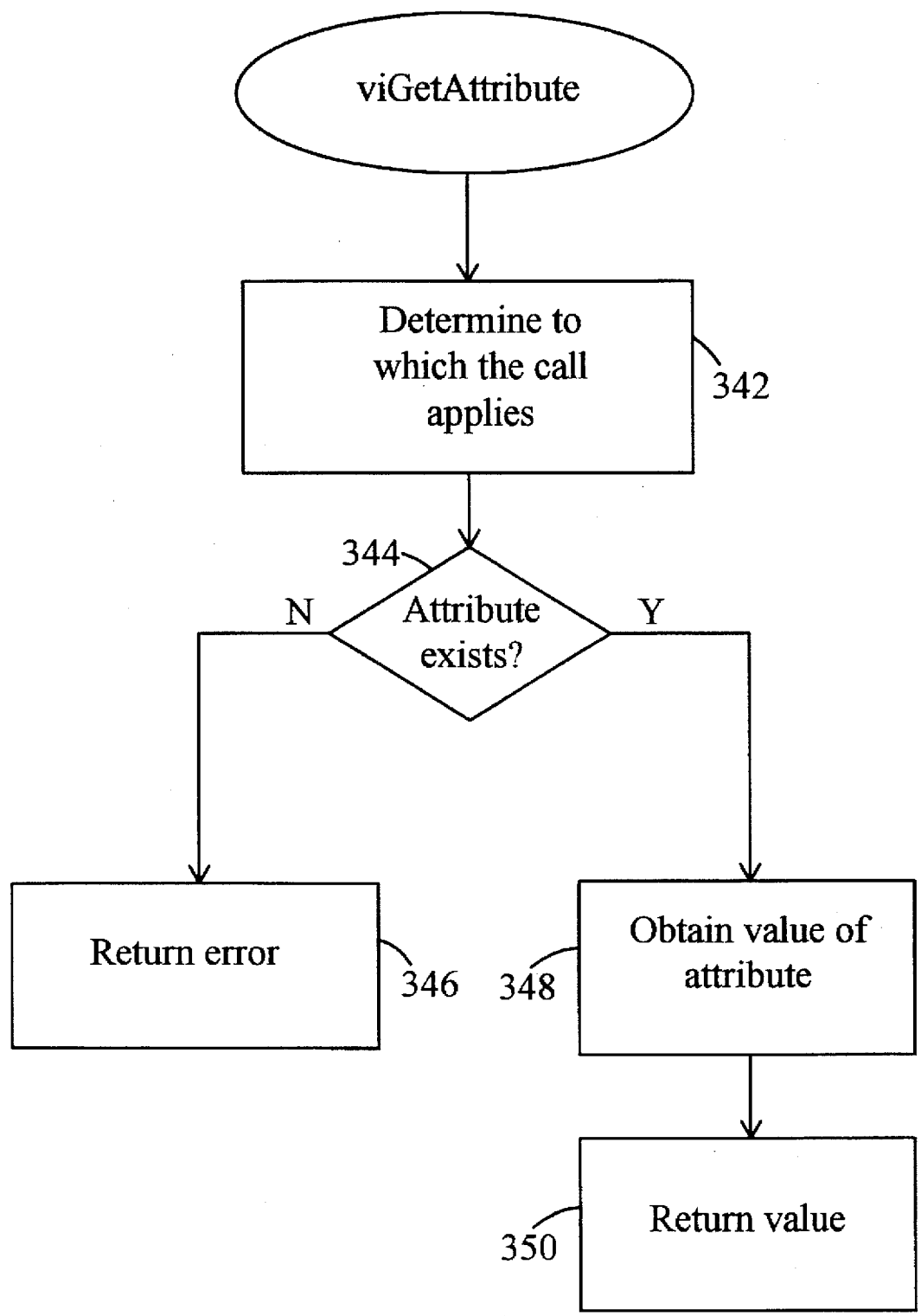
FIG. 35 is a flowchart diagram illustrating the viGetAttribute operation.

Referring now to FIG. 35, a flowchart diagram illustrating operation of the viGetAttribute() operation is shown. As shown, when a viGetAttribute() operation is received then in step 342 the VISA Resource Manager 140 determines the particular attribute to which the call applies. In step 344 the VRM determines if the attribute exists. If the attribute is determined to not exist in step 344, the VRM returns an error in step 346. If the attribute does exist, then in step 348 the VRM obtains the value of the attribute and in step 350 returns the value to the requesting application.

viSetAttribute()

Figure 36:
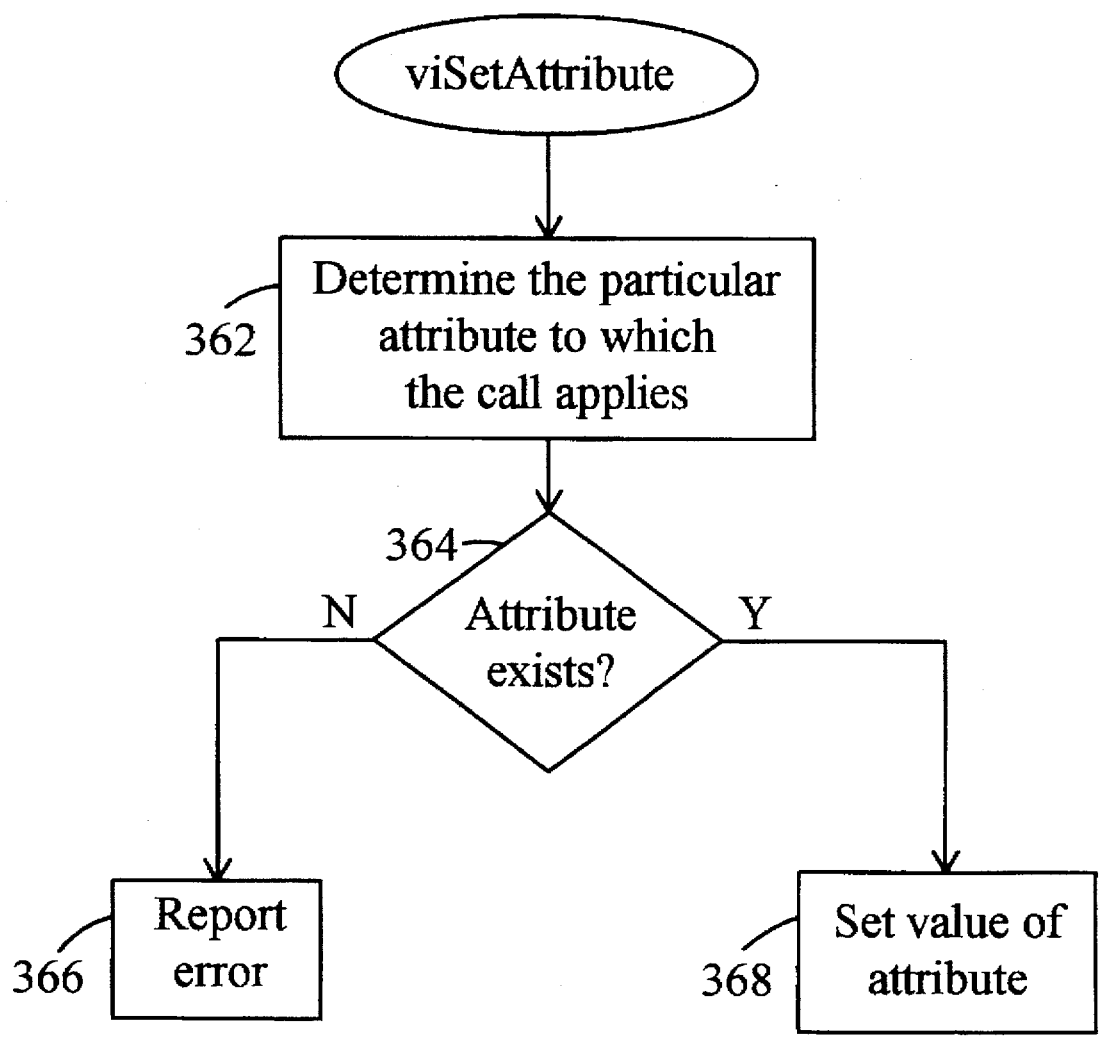
FIG. 36 is a flowchart diagram illustrating the viSetAttribute operation.

Referring now to FIG. 36, a flowchart diagram illustrating operation of the viSetAttribute() operation is shown. As shown, when a viSetAttribute() operation is received then in step 362 the VISA Resource Manager 140 determines the particular attribute to which the call applies. In step 364 the VRM determines if the attribute exists. If the attribute is determined to not exist in step 364, the VRM returns an error in step 366. If the attribute does exist, then in step 368 the VRM sets the value of the attribute.

CLIENT PROGRAMMING EXAMPLES

Historical Instrument Programming Examples

In order to understand the VISA model, it is helpful to review examples of how instrument control software has typically been written according to the prior art. This is intended to show that the interface used in creating applications using a VISA system is similar in many ways to how existing I/O control libraries are used. This also shows that a VISA system is used by end users in a very similar fashion to that of existing I/O control libraries. Even though the application development interface is similar, the present invention includes many capabilities that are not found in the prior art. Many of the unique new capabilities provided by a VISA system according to the present invention build upon the object-oriented internal architecture of the VISA I/O library coupled with the device resource independence model used by the present invention.

The unique new capabilities provided by a VISA system, while very powerful for the sophisticated user, do not require a dramatic change in the way an end user programs his instruments. A VISA system is very straightforward and easy to use for the casual user, much like existing I/O libraries. A VISA system according to the present invention also provides capabilities far beyond existing I/O control libraries for more advanced users. These capabilities enable a VISA system to be much more flexible, extensible, and configurable than any I/O library previously in existence for instrument control.

Figure 38:
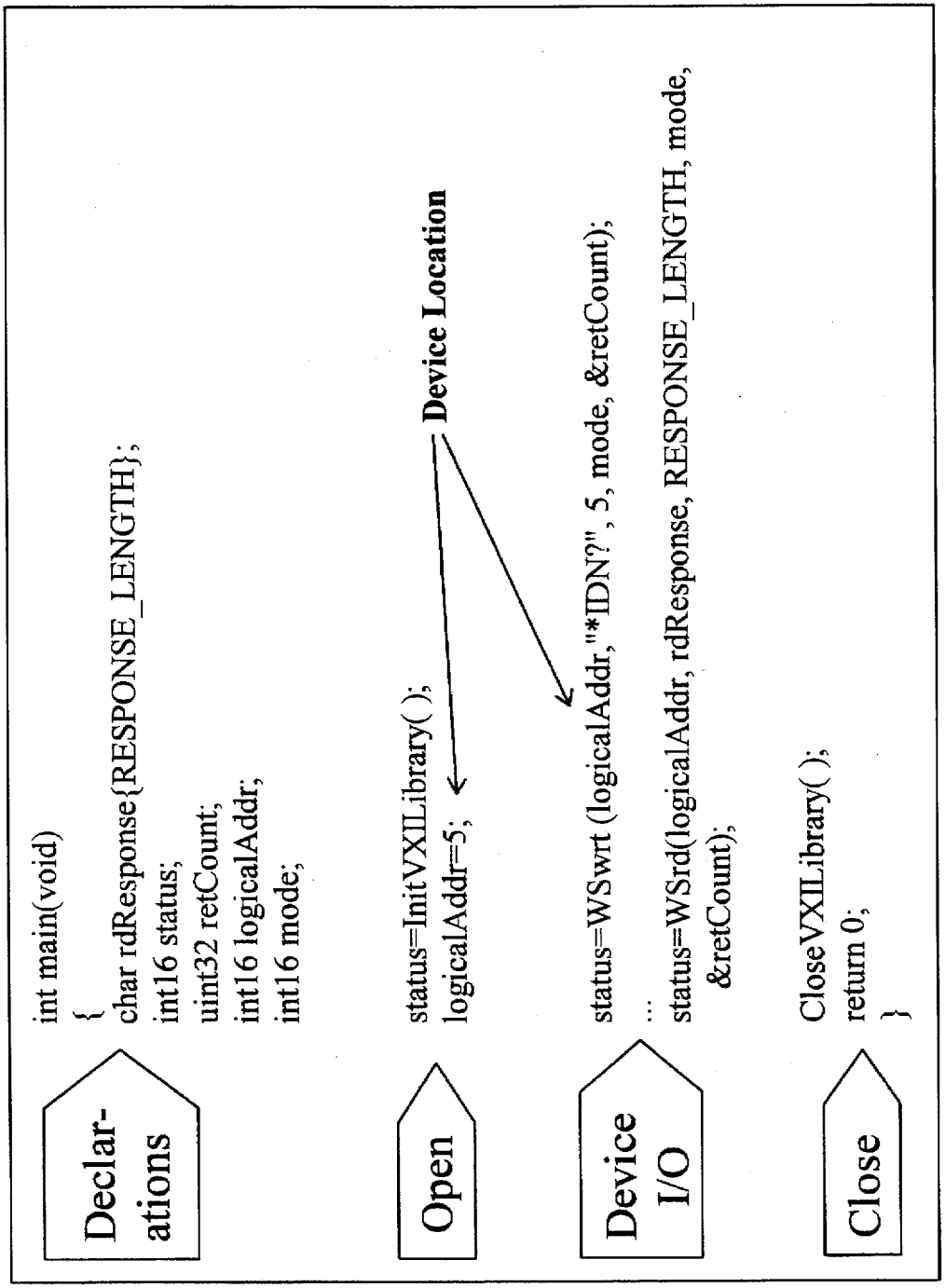
FIG. 38 illustrates a non-VISA C language application for a message based VXI instrument.

Referring now to FIGS. 37 and 38, two examples of how message-based instruments have been programmed in the past are shown. The first example in FIG. 37 shows a sample Non-VISA, C language application for a GPIB message-based instrument, while the second example in FIG. 38 shows a sample non-VISA, C language application for a VXI message-based instrument. From these examples, it is clear that both types of instruments have generally been programmed in the past using the same approach. Each example program has a declarations section, an open section, an I/O or main operational section, and a close section, as shown.

Calling the open function of an I/O control library causes the I/O control library to initialize any hardware necessary to communicate with the instrument. In addition, it may assign a unique software handle to the instrument, or it may leave it to the user to use a unique handle for each instrument. This handle, which is returned as an output parameter if it is assigned automatically by the open function, is simply a variable which contains a reference to data that the GPIB or VXI I/O control software requires to perform operations with the specified instrument. Subsequent calls to other functions in the I/O control library require this handle as an input parameter so that each function knows which particular instrument is being controlled when it is called at different times. A single program, for example, will typically be controlling numerous instruments in an application, and the unique handles ensure that the I/O library functions always know which particular instrument is being controlled at a given time. If a multi-tasking environment is used, the responsibility of the I/O control software is even greater because multiple programs can control multiple instruments.

In the GPIB example illustrated in FIG. 37, calling the open function causes the GPIB I/O control software to determine the GPIB address of the instrument, perform a device level initialization of the instrument, and return a unique software handle associated with that particular instrument to the users application program. With this approach, each individual instrument must be opened one at a time with individual calls to the open function. In the VXI example shown in FIG. 38, calling the open function causes the VXI I/O control software to perform an interface-level initialization of the VXI system. In this example, this particular VXI I/O control library only requires the user to call the open function one time at the beginning of the application program. In addition, the open function in this example does not return a software handle for the instrument. Rather, since each VXI instrument is required to be at a unique logical address in the system, this library simply allows the programmer to use the VXI logical address of the instrument as an input parameter to the subsequent calls to the I/O control library.

In the device I/O sections of code for both the GPIB and VXI examples, the calls to the I/O control library serve the same basic purpose: send a string to the instrument and read back a response. The differences between the GPIB and the VXI examples occur in the names of the functions as well as in the way that the parameters are handled. In the VXI case, for example, the function calls require an additional mode parameter to qualify the way that the transfer should take place in the VXI environment.

In the close section of the examples, the user's program may be required to call an I/O library function to close the instrument. This close function instructs the I/O control library to free the GPIB or VXI resources used by the I/O control library to communicate with the instrument. In the case of GPIB, the GPIB I/O control library keeps the data structures in memory for the duration of the system (it is a small fixed amount), and all of the instruments are closed when the system shuts down. In the case of this VXI example, the VXI I/O control library requires that an explicit close operation be performed either by the application or by the system itself.

Two key points shown by these examples are, first, the user's programs in both examples have the same basic flow of control and basic methodology for communicating with a message-based instrument. Second, while the user's programming approach and the methodology is the generally the same, the different GPIB and VXI I/O control libraries used in these examples each have their own unique needs (e.g. addressing, transfer mechanisms such as mode parameters, and closing needs). These differing needs become much more apparent as the unique features of the different interface capabilities of GPIB versus VXI are used (e.g. memory mapping, register-based control, or hardware triggering in VXI).

Up to this point in time, the majority of users and applications have been comfortable using two separate I/O control libraries for GPIB and VXI in the same system. Most VXI systems to date have used both GPIB and VXI instruments. For this reason, many end users who are experienced at programming GPIB instruments have not generally seen a need to learn, nor have been willing to accept a new way of programming GPIB in order to add a few VXI instruments in their existing systems. Rather, these users are comfortable using a separate VXI I/O control library designed to work alongside their existing GPIB I/O library. Other VXI users, however, do see a long-term benefit in programming VXI and GPIB with the same I/O library. Even these users, however, certainly do not want to be prevented from using their existing GPIB software in their future systems.

As instrumentation systems grow in sophistication and take advantage of multiple types of instruments, it is important to have a common, unified I/O library for programming all instruments. A VISA system according to the present invention provides such a common, unified I/O control library for the future, while also providing a migration path for software written in the past using previous I/O libraries.

Programming Using a VISA System According to the Present Invention

Having examined an example of how message-based instruments have traditionally been programmed using separate I/O control libraries for GPIB and VXI, aspects of programming instruments using a VISA system are now discussed. This section uses the same examples used above, except using the VISA I/O library of the present invention. In addition, this section expands the scope of the examples to cover more diverse environments (such as register-based environments).

1. VISA Message-Based Example

Figure 39:
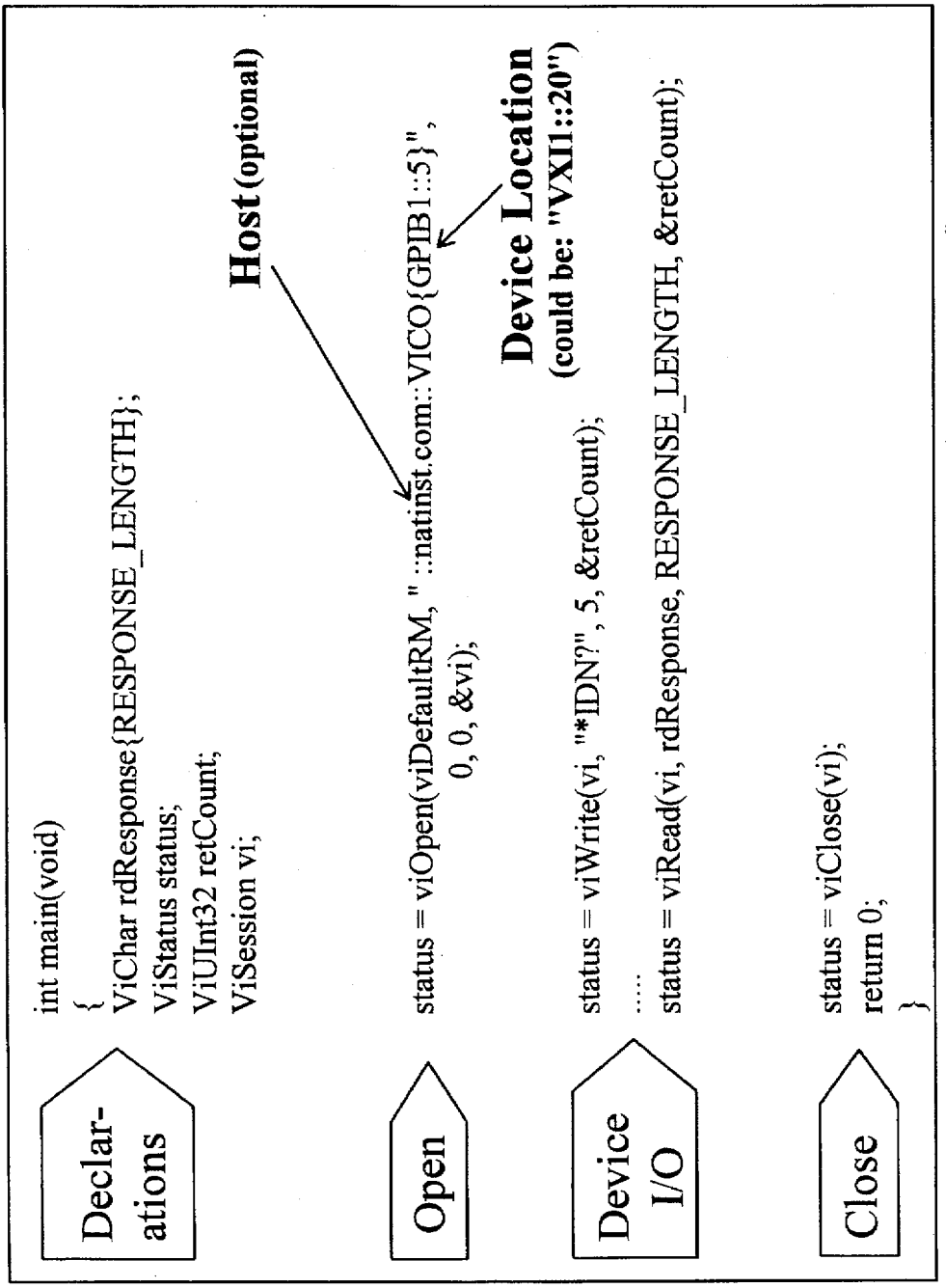
FIG. 39 illustrates a VISA C language-type application for a message based instrument.

Referring now to FIG. 39, the example used above in FIG. 37 is shown for a VISA system. This example shows a C language-type application for a message-based instrument. This example uses a C language-type binding to help clarify the differences between the examples. As shown in the VISA example of FIG. 39, each of the sections (declarations, open, device I/O, and close) have been unified and simplified.

Within the declarations section, it is noted that all of the defined types are consistent VISA-defined data types (as defined earlier in this disclosure). This helps in many ways. First, all handles to all instruments can be used in the same way. Second, defining the basic data types (such as a 32-bit integer to be a ViUInt32) provides the user's program an easy way of moving from one type of computer platform to another with only a simple re-compile. Without this, problems with basic data type inconsistencies exist.

In the open section, only a single operation is required for each instrument-viOpen(). The string passed into viOpen() uses as string grammar defined above. This grammar allows for the opening of interfaces, devices, and even parts of interfaces or devices of all types. It is noted that in the example, "GPIB1::5" could have simply been changed to "VXI1::20" to change from a GPIB device to a VXI device (the part of the string "VICO" refers to VICO). In addition, the grammar for the open string allows for the initialization of particular details on how the user prefers that the communication to the instrument be performed. This is equivalent to the mode parameter in the call WSrd() in the non-VISA, VXI example. This initialization can be done in the open string or by an operation common to all devices in a VISA system by setting an appropriate attribute.

In the device I/O section, it is noted that the syntax is very consistent. Parameters of differing types and reasons are no longer required. In the close section, a simple, one parameter close function, viClose(), is required that is consistent regardless of the interface.

2. VISA Register-Based Example

Figure 40:
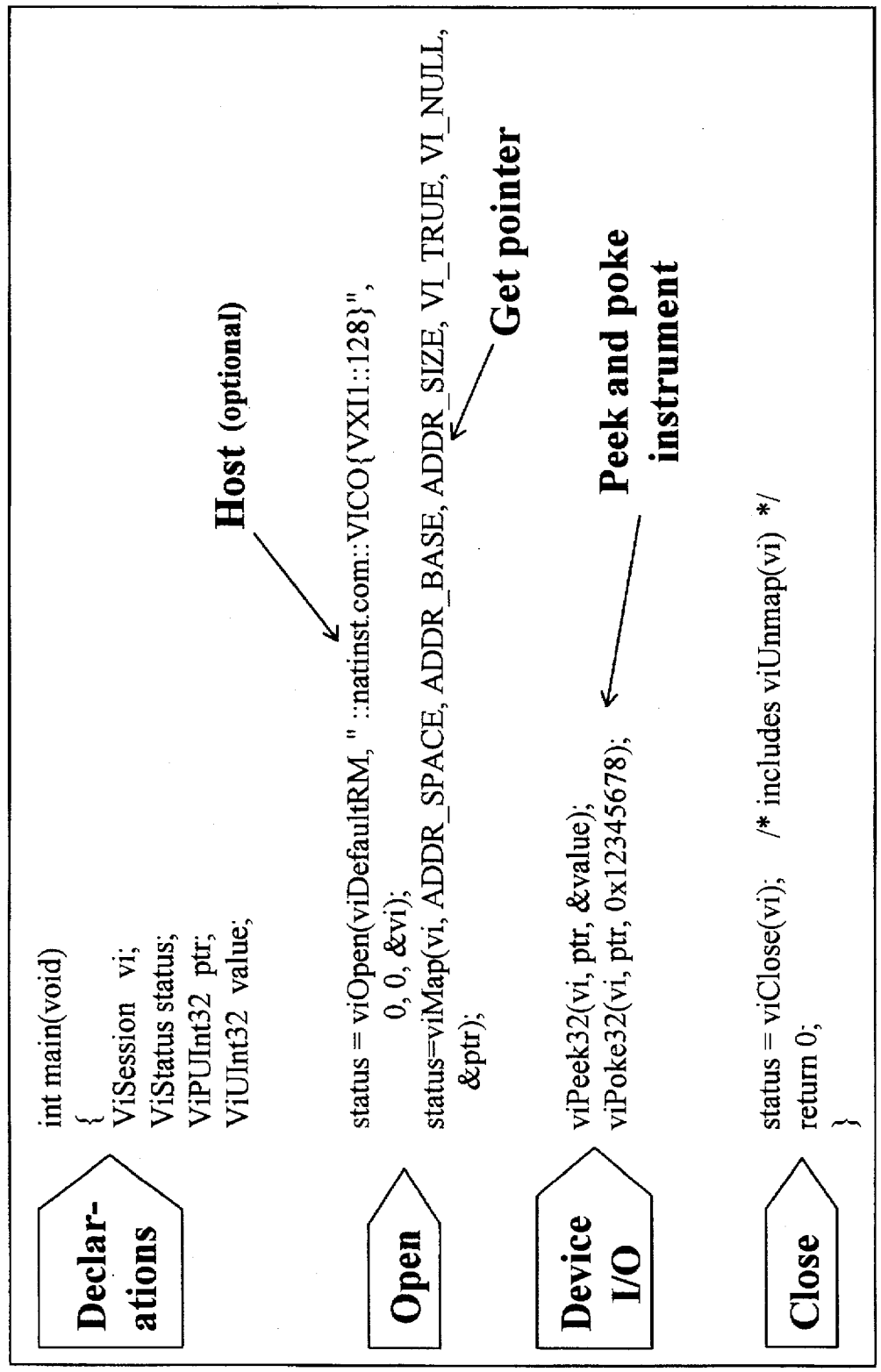
FIG. 40 illustrates a VISA C language-type application for a register based instrument.

When the capabilities beyond the simple message-based instruments used in these examples are examined, differences between existing software interfaces vary greatly. A VISA system, however, uses a common methodology and model to handle many different types of environments. Referring now to FIG. 40, this example illustrates the setup and programming of a register-based instrument in a VISA system. Again, the code used in this example is C-like and not intended to be the actual C bindings of VISA operations.

As with the previous examples, the user's application program comprises four main sections: declarations, open, device I/O and close. This example focuses on the open and device I/O sections since the declarations and close section have been covered above.

In order to perform low-level register-based operations, the open section of a VISA application requires access to a Low Level Access resource for a particular interface with reference to a particular instrument. This is performed automatically in the open call based on the specified instrument. Once access to a Low Level Access resource is gained, a viMap() operation is invoked. The viMap() operation creates a local address space on the local controller which directly maps to the address space of the instrument. The mapped region can have many attributes associated with it, examples including the range of the instrument's address space to access, and the mode in which to access the instrument (e.g. privilege or non-privilege). Once the access to the instrument has been mapped, I/O to and from the instrument's registers can now take place. This is performed using simple peek and poke operations.

In addition to the Low Level Access resource, a VISA system also provides a more encapsulated memory access resource, the High Level Access resource. The High Level Access resource provides operations like block moves and wholly contained peek/poke operations (operations which do not require a mapping call).

VISA Event Example

As discussed above, a VISA system includes a standard event handling mechanism. An event in a VISA system is any asynchronous occurrence that the VISA I/O control library can generate or process. There are two main modes of operation of this standard event mechanism called event queuing and event callbacks. The following two examples are intended to be simple examples contrasting these different types of event handling methods. FIG. 41 illustrates a sample VISA, C language-type application which illustrates event queuing features of the present invention. FIG. 42 illustrates a sample VISA, C language-type application which illustrates event callback features of the present invention.

Referring now to FIG. 41, for event queuing, the emphasis is placed on the ability for the application to have the VISA system keep track of events as they occur and store this information on an internal VISA queue which the application can then access at a later time. As shown in the example, this process requires two basic steps after a session is opened to a device. This first step is to notify the VISA Resource Manager 140 to begin queuing up events of particular types. This is done with the viEnableEvent() operation specifying VI_QUEUE as a mode of operation. In this example, VI_EVENT_SERVICE_REQ specifies to listen to device level service request events (e.g. SRQ on the GPIB). The second step occurs at the point when the application wishes to query the VISA system about currently pending events. This querying may be done using the viWaitOnEvent() operation. viWaitOnEvent() allows the application to wait for a specified time for an event to enter the queue. A time of zero specifies to return immediately whether events exist on the queue or not.

Referring now to FIG. 42, for event callbacks the emphasis is placed on the ability for the application to have the VISA system invoke user supplied operations at the time that an event occurs. As shown in this example, this process requires three basic steps. The first step is to create a user-defined event handler that can handle the desired event (s) to be passed from the VISA system to the application. In the example, this is the function SRQHandlerFunc(). This function is written just like any other application function. A prototype of the definition of all event callbacks called viEventHandler() was discussed above and can be found in chapter 3 of Appendix 1. The second step is to notify the VISA system about the function created in the first step. This is done via a viSetAttribute() operation. This operation logs the address of the function to invoke when an event occurs. The final step is to notify the VISA system to begin invoking the callback whenever the desired event(s) occur. This is done with the viEnableEvent() operation specifying VI_HNDLR as a mode of operation. In this example, VI_EVENT_SERVICE_REQ specifies to listen to device-level service request events. At this point, whenever a request for service event occurs, the user-defined callback is invoked.

As a general tool for both the queuing and callback event handling mechanisms of a VISA system, the operation viDisableEvent() can be invoked at any time to suspend or terminate the reception of events altogether. In some situations, it may be desirable to suspend callbacks for a period of time without losing events. In this case, when the application has already been enabled for callbacks, the user can use the viEnableEvent() operation specifying VI_SUSPEND_HNDLR to temporarily suspend callbacks. This causes events to be queued on an internal event callback queue, which is not the same queue used for the queueing mechanism. When callbacks are re-enabled via viEnableEvent() specifying VI_HNDLR, the user-defined callback is invoked once for every pending event on the queue. Using this method guarantees that no events are lost by the application.

DEVELOPER OF RESOURCES

As mentioned above, in addition to a client using a VISA system to create VISA applications, a developer can use a VISA system to develop or add resources to a VISA system. A new resource created by a developer can either use existing resources much the way a client uses resources as described above (a use relationship), or a new resource can receive or inherit functionality from other resources while adding additional functionality. In other words, in developing a new resource, a developer can either use existing resources within his new resource, or the developer can incorporate functionality (the interface) from existing resource classes, if resource classes exist that include functionality that the developer desires to use. Thus, the various resources provided in a VISA system can be used in new resources or incorporated into new resources to develop higher level instrument control applications, which can also be created as resources. These new resources can then serve as building blocks to create even higher level resources.

For example, if a user desired to create a resource that embodies the concept of a voltmeter, such as a Hewlett-Packard GPIB voltmeter, the user could develop a resource which used existing resources, i.e., included operations on existing instrument control resources, to accomplish the function. Alternatively, the user could develop a new resource that incorporated functionality from one or more existing resources. In the first case where the user creates the resource by using existing resources, for example, the user would start with a viOpen operation on the instrument and then might include a Read Volt operation to the instrument which is implemented using the Write Resource, i.e., the operation viWrite "read volt" and then a viRead operation using the Read Resource to obtain a response from the instrument. The second case where the user develops a resource that incorporates functionality from other resources involves the method described below Referring now to FIG. 43, a flowchart diagram illustrating operation when a developer develops a new resource within a VISA system that incorporates functionality from other resources is shown. In developing a new resource, the developer will first have defined the type of functionality which he desires to implement. In step 402 the developer determines if any available classes provide capabilities which are desired for use, i.e., if any of the current resources within the VISA system provide desired functionality which can be incorporated by the resource which the developer desires to create. If there are classes available from which the developer desires to incorporate functionality in step 404, referred to as base classes, then in step 410 the developer defines a class for the specific instrument or instrument type for which he is developing the resource. This step also includes inheriting or incorporating from the base class the functional application programming interface, i.e., the attributes, operations, and events from the base resource class. The user also develops the necessary code in addition to the incorporated code from the base class in order to implement the resource. When this operation has completed, the computer system is directed to perform steps 202–212 in FIG. 27, and operation would begin as shown at "A" of FIG. 27 where new resource classes have been added to the VISA system.

If in step 404 it is determined that there are no classes for which the developer desires to incorporate functionality, then in step 406 the developer defines a class that embodies the concept of the resource which is desired to be created. In other words, the developer creates code which defines and implements the attributes, operations, and events which are desired to be implemented within the resource. In step 408 the developer registers the class with the VISA system, i.e., with the VISA Resource Manager. Operation then advances to step 410 where the developer defines a class for the specific instrument to which the resource is being created. In the preferred embodiment, new resources are created using the SOM object developer toolkit available from IBM.

A resource can be created that is specific to a particular instrument, such as a Hewlett-Packard GPIB voltmeter, or a resource can be created that embodies each of the various types of capabilities for a particular type of instrument, referred to as an instrument class specific type resource. Such a resource is referred to as an instrument class specific resource because the resource is not specific to any one instrument, i.e., is not specific to an HP volt meter, but rather is specific to a class of instruments, i.e., any volt meter. In effect, an instrument class specific type resource defines a common way of handling the instrument. For example, if an instrument class specific type resource has been developed for a volt meter, then the particular implementation of the volt meter is irrelevant and it does not matter that on one instrument, the actual command sent is read volt and on the other one it is "R Volt" and another implementation involves reading registers, etc. The interface merely displays an instrument class specific type resource referred to as "read volt" and how this read volt operation is actually implemented inside the resource is irrelevant. Therefore, a resource can be created which is specific to a particular type of instrument but which is independent of manufacturer or I/O interface.

Once a number of instrument class specific resources have been created, the developer can then create even higher level resources that encapsulate all of the instrument class specific resources that have been created.

For example, in one embodiment of a VISA system, the client applications or resources, such as instrument drivers, that are available within the system appear on the screen as objects or icons, depending upon the particular instruments available in the instrumentation system. The user may then combine various resources to create virtual instruments. For example, if the instrumentation system includes a digital oscilloscope resource class and a logic analyzer resource class, the user could use the digital oscilloscope and the logic analyzer to create a mixed mode signal analyzer. The user could combine the oscilloscope resource and the logic analyzer resource by simply drawing the relationship on the screen and then writing the higher level application in any standard programming language. Further, a VISA system according to the present invention can be used with existing applications software, such as LabVIEW from National Instruments to create higher level virtual instruments.

CONCLUSION

As discussed above, the present invention utilizes a device resource independence approach which differs from the top down interface independence approach used by others. One key difference between the device resource independence method of the present invention and the top down approach is that an instrumentation system with device resource independence is controlled by the user from the point of view of the individual capabilities of the devices themselves. In the interface-independent approach, the view is on the commonality of capabilities and control of the interfaces that control these devices. A key problem with the interface-independent model is that programmers create applications to control instrumentation systems from the point of view of the physical devices, not the interfaces that are connected to them. The programmer should be concerned only with the individual capabilities of the device itself—not with the interface type, how it supports individual features, or its proximity.

To illustrate the benefits of the device resource independent method of the present invention, it is helpful to consider an example of controlling a register-based device. This device could be controlled over the memory bus of either a VXI system or the AT bus of a computer. However, because memory mapping of registers does not make sense for GPIB and Serial data control methods, control of this device could not be included in the core functions of a pure top down interface-independent model. Both the VXI memory accesses and the AT memory accesses would have to remain in interface-specific areas with interface-specific function calls. With the device resource independence method of the present invention, the commonality of interfaces is irrelevant, and the focus is on the commonality of device capabilities. With device resource independence, the common capabilities of devices are grouped on a capability-by-capability basis.

The benefits of the device resource independence method of the present invention for controlling instrumentation systems vs. the top down interface independence method are as follows. First, even though interface independence allows some of the control of the system to be made truly interface independent, the device resource independence method of the present invention provides that the features common to any devices are made independent, not just the features that are common to the interfaces. Thus, with device resource independence, the programmer sees the system from the point of view of the devices, rather than the interface. Also, each feature that is common to a device but not to an interface is given independence. In interface independence, independence tends to be limited to message-based communication.

Device resource independence also allows common services to be layered on top of many more device capabilities, because more commonality exists. Further, device resource independence allows many elements to be the same regardless of I/O interface type. Thus, not only is the open/close mechanism the same, but so are the means for configuring devices/resources, locating device capabilities, setting device capability attributes, and managing the device resources in general.

In addition, with device resource independence, interrupt handling is greatly simplified and is not fused into one general event trapping mechanism as with interface independence. With device resource independence, the interrupt handling method is the same but can be treated separately for different types of events.

Device resource independence provides benefits when porting applications from systems having devices with similar capabilities. With interface independence, this is limited mainly to messaging independence. The device resource independence model is based on individual device capabilities and is not restricted to the previous decisions made about the divisions of interface capabilities. With device resource independence, breaking down device capabilities into their smallest, logical divisions makes it possible to individually manage each device capability. Management capabilities include allocating, deallocating, locking, handling events, controlling attributes, and so on. This capability is not restricted to the sum total of the capabilities of the core functionality across interfaces or devices.

Therefore, the device resource independence model provides a significant number of benefits over the prior art top-down interface design. The main benefits stem from the fact that the model views the system from the point of view of the individual device capabilities, thus providing the ability to control and manage each of these capabilities independently and group them in any combination achieves the greatest possible flexibility and independence.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. An instrumentation system for controlling one or more instruments, wherein the instrumentation system comprises:

a computer system including a central processing unit and memory;

one or more instruments coupled to the computer system;

at least one input/output interface coupled between the computer system and said instruments, wherein the at least one input/output interface type used in said instrumentation system comprises one or more of the group consisting of VXI, GPIB, and serial;

a plurality of instrument control resource classes stored in the memory of the computer system which provide functionality for controlling instrument device capabilities of said one or more instruments;

a plurality of instrument control resources stored in the memory of the computer system for controlling instrument device capabilities of said one or more instruments, wherein said plurality of instrument control resources inherit functionality from said plurality of instrument control resource classes, wherein said plurality of instrument control resources are based on the at least one input/output interface and said one or more instruments comprised in said instrumentation system;

a resource manager stored in the memory of the computer system for providing user control, communication and access to said plurality of instrument control resources, wherein said resource manager maintains a data structure comprising information on said instrument control resources; and an instrumentation control program stored in the memory of the computer system using one or more of said plurality of instrument control resources, wherein said instrumentation control program controls the instrumentation system, wherein said instrumentation control program executes regardless of said input/output interface type used in said instrumentation system.

2. The instrumentation system of claim 1, wherein said plurality of instrument control resource classes comprise a first number of common resource classes which have commonality with two or more input/output interface types, and a second number of specific resource classes which control features specifically for a single type of input/output interface.

3. The instrumentation system of claim 1, further comprising:

at least one common resource template stored in the memory of the computer system comprising interface functions used in controlling and communicating with said plurality of instrument control resources, wherein said plurality of instrument control resources inherit functionality from said common resource template, wherein said common resource template does not include instrumentation-specific interface functions.

4. The instrumentation system of claim 1, wherein said plurality of instrument control resources comprise:
- a read resource for reading values from the one or more instruments;
- a write resource for writing values to the one or more instruments;
- a trigger resource for triggering the one or more instruments;
- a poll resource for polling the one or more instruments; and
- a clear resource for clearing the one or more instruments.

5. The instrumentation system of claim 4, wherein said plurality of instrument control resources further comprise:
- a format resource for formatting values provided to the one or more instruments;
- one or more access resources for providing register level access to the one or more instruments;
- a device command resource for providing commands to the one or more instruments; and
- a status/service request resource for requesting services, and for detecting requests for service and procuring status information.

6. The instrumentation system of claim 4, wherein said plurality of instrument control resources further comprise:
- a plurality of GPIB specific resources for performing GPIB specific operations on the one or more instruments.

7. The instrumentation system of claim 4, wherein said plurality of instrument control resources further comprise:
- a plurality of VXI specific resources for performing VXI specific operations on the one or more instruments.

8. The instrumentation system of claim 4, wherein said plurality of instrument control resources further comprise:
- a plurality of serial specific resources for performing serial specific operations on the one or more instruments.

9. The instrumentation system of claim 1,
wherein said instrumentation control program includes an open instruction which specifies one or more of said plurality of instrument control resources;
wherein said resource manager comprises:
- means for determining the location of said one or more of said plurality of instrument control resources specified in said open instruction;
- means for creating one or more sessions with said one or more of said plurality of instrument control resources;
- means for providing one or more identifiers to said instrument control program corresponding to said one or more sessions.

10. The instrumentation system of claim 9, wherein said instrumentation control program further comprises:
- means for invoking operations on said one or more of said plurality of instrument control resources, wherein said invoked operations cause said resources executing on said computer system to control at least one of said one or more instruments.

11. The instrumentation system of claim 9, wherein said at least one input/output interface has one or more types;
wherein said plurality of instrument control resources are based on said one or more types of the at least one input/output interface and said one or more instruments comprised in said instrumentation system.

12. The instrumentation system of claim 1, wherein each of said plurality of resources includes one or more operations, one or more attributes, and one or more events.

13. The instrumentation system of claim 1, wherein at least a subset of said plurality of instrument control resources each control individual capabilities of said one or more instruments.

14. The instrumentation system of claim 1, wherein said VXI, GPIB, and serial input/output interface types comprise possible input/output interface types used in said instrumentation system, wherein said instrumentation control program executes independent of which one or more of a plurality of said possible input/output interface types is used in said instrumentation system.

15. A computer-implemented method for creating a program for controlling an instrumentation system, wherein the instrumentation system comprises a computer system and one or more instruments coupled to the computer system, wherein the instrumentation system further includes at least one input/output interface coupled between the computer system and said instruments, wherein the input/output interface type used in said instrumentation system comprises one or more of the group consisting of VXI, GPIB, and serial, the method comprising:
- providing a plurality of instrument control resource classes stored in the memory of the computer system which provide functionality for controlling instrument device capabilities of said one or more instruments;
- generating a plurality of instrument control resources for controlling instrument device capabilities of said one or more instruments, wherein said generating includes said plurality of instrument control resources inheriting functionality from said plurality of instrument control resource classes, wherein said generating further comprises storing said plurality of instrument control resources in the memory of the computer system, wherein said plurality of instrument control resources are generated based on the at least one input/output interface and said one or more instruments comprised in said instrumentation system;
- providing a resource manager stored in the memory of the computer system for providing user control, communication and access to said plurality of instrument control resources;
- constructing an instrumentation control program which uses one or more of said plurality of instrument control resources to control the instrumentation system, wherein said constructing is in response to user input; and
- said instrumentation control program executing to control the instrumentation system, wherein said instrumentation control program executes regardless of said input/output interface type used in said instrumentation system.

16. The method of claim 15,
wherein said providing said plurality of instrument control resource classes comprises providing a first number of common resource classes which have commonality with two or more input/output interface types, and a second number of specific resource classes which control features specifically for a single type of input/output interface.

17. The method of claim 15, further comprising:

providing at least one common resource template comprising interface functions used in controlling and communicating with said plurality of instrument control resources;

said plurality of instrument control resources inheriting functionality from said common resource template, wherein said common resource template does not include instrumentation-specific interface functions.

18. The method of claim 15, wherein said providing said plurality of instrument control resources comprises providing:

a read resource for reading values from the one or more instruments;

a write resource for writing values to the one or more instruments;

a trigger resource for triggering the one or more instruments;

a poll resource for polling the one or more instruments; and a clear resource for clearing the one or more instruments.

19. The method of claim 18, wherein said providing said plurality of instrument control resources further comprises providing:

a format resource for formatting values provided to the one or more instruments;

one or more access resources for providing register level access to the one or more instruments;

a device command resource for providing commands to the one or more instruments; and a status/service request resource for requesting services, and for detecting requests for service and procuring status information.

20. The method of claim 18, wherein said generating said plurality of instrument control resources further comprises generating a plurality of GPIB specific resources for performing GPIB operations on the one or more instruments.

21. The method of claim 18, wherein said generating said plurality of instrument control resources further comprises generating a plurality of VXI specific resources for performing VXI operations on the one or more instruments.

22. The method of claim 18, wherein said generating said plurality of instrument control resources further comprises generating a plurality of serial specific resources for performing serial operations on the one or more instruments.

23. The method of claim 15, wherein said instrumentation control program includes an open instruction which specifies one or more of said plurality of instrument control resources, the method further comprising:

said resource manager determining the location of said one or more of said plurality of instrument control resources specified in said open instruction;

said resource manager creating one or more sessions with said one or more of said plurality of instrument control resources; and said resource manager providing one or more identifiers to said instrument control program corresponding to said one or more sessions.

24. The method of claim 23, further comprising:

said instrumentation control program invoking operations on said one or more of said plurality of instrument control resources; and said one or more of said plurality of instrument control resources executing on said computer system to control at least one of said one or more instruments in response to said invoked operations.

25. The method of claim 15, further comprising:

executing said instrumentation control program to control said instrumentation system;

wherein said executing comprises:

receiving an open instruction which specifies one or more of said plurality of instrument control resources;

determining the location of said one or more of said plurality of instrument control resources specified in said receiving an open instruction;

creating one or more sessions with said one or more of said plurality of instrument control resources; and providing one or more identifiers to said instrument control program corresponding to said one or more sessions.

26. The method of claim 15, wherein said at least one input/output interface has one or more types;

wherein said generating generates said plurality of instrument control resources based on said one or more types of the at least one input/output interface and said one or more instruments comprised in said instrumentation system.

27. The method of claim 26, further comprising:

determining the input/output interface types and instruments comprised in said instrumentation system;

wherein said generating said plurality of instrument control resources comprises utilizing said plurality of resource classes and said determined input/output interface types and instrument types to create said plurality of instrument control resources.

28. The method of claim 15, further comprising:

registering said plurality of instrument control resources with said resource manager after said generating said plurality of instrument control resources and after said providing said resource manager.

29. The method of claim 15, wherein said computer system communicates with said instruments through a type of input/output interface, the method further comprising:

executing said instrumentation control program to control said instrumentation system, wherein said instrumentation control program executes regardless of said input/output interface type used in said instrumentation system.

30. The method of claim 15, wherein each of said plurality of instrument control resources includes one or more operations, one or more attributes, and one or more events.

31. The method of claim 15, wherein at least a subset of said plurality of instrument control resources each control individual capabilities of said one or more instruments.

32. The method of claim 15, wherein said VXI, GPIB, and serial input/output interface types comprise possible input/output interface types used in said instrumentation system, wherein said instrumentation control program executes independent of which one or more of a plurality of said possible input/output interface types is used in said instrumentation system.

33. An instrumentation system for controlling one or more instruments, wherein the instrumentation system comprises:

a computer system including a central processing unit and memory;

one or more instruments coupled to the computer system;

at least one input/output interface coupled between the computer system and said instruments, wherein the at least one input/output interface type used in said instrumentation system comprises VXI, GPIB, serial, or data acquisition;

a plurality of instrument control resource classes stored in the memory of the computer system which provide functionality for controlling instrument device capabilities of said one or more instruments;

a plurality of instrument control resources stored in the memory of the computer system for controlling instrument device capabilities of said one or more instruments, wherein said plurality of instrument control resources inherit functionality from said plurality of instrument control resource classes, wherein said plurality of instrument control resources are based on the at least one input/output interface and said one or more instruments comprised in said instrumentation system;

a resource manager stored in the memory of the computer system for providing user control, communication and access to said plurality of instrument control resources, wherein said resource manager maintains a data structure comprising information on said instrument control resources; and an instrumentation control program stored in the memory of the computer system using one or more of said plurality of instrument control resources, wherein said instrumentation control program controls the instrumentation system, wherein said instrumentation control program executes regardless of said input/output interface type used in said instrumentation system.

34. An instrumentation system for controlling one or more instruments, wherein the instrumentation system comprises:

a computer system including a central processing unit and memory;

one or more instruments coupled to the computer system, wherein said one or more instruments includes at least one GPIB instrument;

at least one input/output interface coupled between the computer system and said one or more instruments, wherein said at least one input/output interface includes a GPIB interface;

a plurality of instrument control resource classes stored in the memory of the computer system which provide functionality for controlling instrument device capabilities of said one or more instruments;

a plurality of instrument control resources stored in the memory of the computer system for controlling instrument device capabilities of said one or more instruments, wherein said plurality of instrument control resources inherit functionality from said plurality of instrument control resource classes, wherein said plurality of instrument control resources are based on the at least one input/output interface and said one or more instruments comprised in said instrumentation system, wherein said plurality of instrument control resources includes one or more GPIB specific resources for performing GPIB operations on the at least one GPIB instrument;

a resource manager stored in the memory of the computer system for providing user control, communication and access to said plurality of instrument control resources, wherein said resource manager maintains a data structure comprising information on said instrument control resources; and an instrumentation control program stored in the memory of the computer system using one or more of said plurality of instrument control resources, wherein said instrumentation control program controls the instrumentation system, wherein said instrumentation control program executes regardless of said input/output interface type used in said instrumentation system.

35. The instrumentation system of claim 34, wherein said plurality of instrument control resource classes comprise a first number of common resource classes which have commonality with two or more input/output interface types, and a second number of specific resource classes which control features specifically for a single type of input/output interface.

36. The instrumentation system of claim 34, further comprising:

at least one common resource template stored in the memory of the computer system comprising interface functions used in controlling and communicating with said plurality of instrument control resources, wherein said plurality of instrument control resources inherit functionality from said common resource template, wherein said common resource template does not include instrumentation-specific interface functions.

37. The instrumentation system of claim 34, wherein said input/output interface type used in said instrumentation system comprises VXI, GPIB, or serial.

38. The instrumentation system of claim 37, wherein said plurality of instrument control resources further comprise:

a plurality of VXI specific resources for performing VXI operations on the one or more instruments.

39. The instrumentation system of claim 37, wherein said plurality of instrument control resources further comprise:

a plurality of serial specific resources for performing serial operations on the one or more instruments.

40. The instrumentation system of claim 34, wherein said plurality of instrument control resources comprise:

a read resource for reading values from the one or more instruments;

a write resource for writing values to the one or more instruments;

a trigger resource for triggering the one or more instruments;

a poll resource for polling the one or more instruments; and a clear resource for clearing the one or more instruments.

41. The instrumentation system of claim 40, wherein said plurality of instrument control resources further comprise:

a format resource for formatting values provided to the one or more instruments;

one or more access resources for providing register level access to the one or more instruments;

a device command resource for providing commands to the one or more instruments; and a status/service request resource for requesting services, and for detecting requests for service and procuring status information.

42. The instrumentation system of claim 34, wherein said instrumentation control program includes an open instruction which specifies one or more of said plurality of instrument control resources;

wherein said resource manager comprises:

means for determining the location of said one or more of said plurality of instrument control resources specified in said open instruction;

means for creating one or more sessions with said one or more of said plurality of instrument control resources;

means for providing one or more identifiers to said instrument control program corresponding to said one or more sessions.

43. The instrumentation system of claim 42, wherein said instrumentation control program further comprises:

means for invoking operations on said one or more of said plurality of instrument control resources, wherein said invoked operations cause said resources executing on said computer system to control at least one of said one or more instruments.

44. The instrumentation system of claim 42, wherein said at least one input/output interface has one or more types;

wherein said plurality of instrument control resources are based on said one or more types of the at least one input/output interface and said one or more instruments comprised in said instrumentation system.

45. The instrumentation system of claim 34, wherein at least a subset of said plurality of instrument control resources each control individual capabilities of said one or more instruments.

46. The instrumentation system of claim 34, wherein the at least one input/output interface type used in said instrumentation system comprises VXI, GPIB, serial, or data acquisition.

47. The instrumentation system of claim 34, wherein the at least one input/output interface type used in said instrumentation system comprises VXI, GPIB, or serial;

wherein said VXI, GPIB, and serial input/output interface types comprise possible input/output interface types used in said instrumentation system, wherein said instrumentation control program executes independent of which one or more of a plurality of said possible input/output interface types is used in said instrumentation system.

48. An instrumentation system for controlling one or more instruments, wherein the instrumentation system comprises:

a computer system including a central processing unit and memory;

one or more instruments coupled to the computer system, wherein said one or more instruments includes at least one VXI instrument;

at least one input/output interface coupled between the computer system and said one or more instruments, wherein said at least one input/output interface includes a VXI interface;

a plurality of instrument control resource classes stored in the memory of the computer system which provide functionality for controlling instrument device capabilities of said one or more instruments;

a plurality of instrument control resources stored in the memory of the computer system for controlling instrument device capabilities of said one or more instruments, wherein said plurality of instrument control resources inherit functionality from said plurality of instrument control resource classes, wherein said plurality of instrument control resources are based on the at least one input/output interface and said one or more instruments comprised in said instrumentation system, wherein said plurality of instrument control resources includes one or more VXI specific resources for performing VXI operations on the at least one VXI instrument;

a resource manager stored in the memory of the computer system for providing user control, communication and access to said plurality of instrument control resources, wherein said resource manager maintains a data structure comprising information on said instrument control resources; and an instrumentation control program stored in the memory of the computer system using one or more of said plurality of instrument control resources, wherein said instrumentation control program controls the instrumentation system, wherein said instrumentation control program executes regardless of said input/output interface type used in said instrumentation system.

49. The instrumentation system of claim 48, wherein said plurality of instrument control resource classes comprise a first number of common resource classes which have commonality with two or more input/output interface types, and a second number of specific resource classes which control features specifically for a single type of input/output interface.

50. The instrumentation system of claim 48, further comprising:

at least one common resource template stored in the memory of the computer system comprising interface functions used in controlling and communicating with said plurality of instrument control resources, wherein said plurality of instrument control resources inherit functionality from said common resource template, wherein said common resource template does not include instrumentation-specific interface functions.

51. The instrumentation system of claim 48, wherein said input/output interface type used in said instrumentation system comprises VXI, GPIB, or serial.

52. The instrumentation system of claim 51, wherein said plurality of instrument control resources further comprise:

a plurality of GPIB specific resources for performing GPIB operations on the one or more instruments.

53. The instrumentation system of claim 51, wherein said plurality of instrument control resources further comprise:

a plurality of serial specific resources for performing serial operations on the one or more instruments.

54. The instrumentation system of claim 48, wherein said plurality of instrument control resources comprise:

a read resource for reading values from the one or more instruments;

a write resource for writing values to the one or more instruments;

a trigger resource for triggering the one or more instruments;

a poll resource for polling the one or more instruments; and a clear resource for clearing the one or more instruments.

55. The instrumentation system of claim 54, wherein said plurality of instrument control resources further comprise:

a format resource for formatting values provided to the one or more instruments;

one or more access resources for providing register level access to the one or more instruments;

a device command resource for providing commands to the one or more instruments; and a status/service request resource for requesting services, and for detecting requests for service and procuring status information.

56. The instrumentation system of claim 48, wherein said instrumentation control program includes an open instruction which specifies one or more of said plurality of instrument control resources;

wherein said resource manager comprises:

means for determining the location of said one or more of said plurality of instrument control resources specified in said open instruction;

means for creating one or more sessions with said one or more of said plurality of instrument control resources;

means for providing one or more identifiers to said instrument control program corresponding to said one or more sessions.

57. The instrumentation system of claim 56, wherein said instrumentation control program further comprises:

means for invoking operations on said one or more of said plurality of instrument control resources, wherein said invoked operations cause said resources executing on said computer system to control at least one of said one or more instruments.

58. The instrumentation system of claim 56, wherein said at least one input/output interface has one or more types;

wherein said plurality of instrument control resources are based on said one or more types of the at least one input/output interface and said one or more instruments comprised in said instrumentation system.

59. The instrumentation system of claim 48, wherein at least a subset of said plurality of instrument control resources each control individual capabilities of said one or more instruments.

60. The instrumentation system of claim 48, wherein the at least one input/output interface type used in said instrumentation system comprises VXI, GPIB, serial, or data acquisition.

61. The instrumentation system of claim 48, wherein the at least one input/output interface type used in said instrumentation system VXI, GPIB, or serial, wherein said VXI, GPIB, or serial input/output interface types comprise possible input/output interface types used in said instrumentation system;

wherein said instrumentation control program executes independent of which one or more of a plurality of said possible input/output interface types is used in said instrumentation system.

62. An instrumentation system for controlling one or more instruments, wherein the instrumentation system comprises:

a computer system including a central processing unit and memory;

one or more instruments coupled to the computer system, wherein the one or more instruments includes at least one serial instrument;

at least one input/output interface coupled between the computer system and said one or more instruments, wherein said at least one input/output interface includes a serial interface;

a plurality of instrument control resource classes stored in the memory of the computer system which provide functionality for controlling instrument device capabilities of said one or more instruments;

a plurality of instrument control resources stored in the memory of the computer system for controlling instrument device capabilities of said one or more instruments, wherein said plurality of instrument control resources inherit functionality from said plurality of instrument control resource classes, wherein said plurality of instrument control resources are based on the at least one input/output interface and said one or more instruments comprised in said instrumentation system, wherein said plurality of instrument control resources includes one or more serial specific resources for performing serial operations on the at least one serial instrument;

a resource manager stored in the memory of the computer system for providing user control, communication and access to said plurality of instrument control resources, wherein said resource manager maintains a data structure comprising information on said instrument control resources; and an instrumentation control program stored in the memory of the computer system using one or more of said plurality of instrument control resources, wherein said instrumentation control program controls the instrumentation system, wherein said instrumentation control program executes regardless of said input/output interface type used in said instrumentation system.

63. The instrumentation system of claim 62, wherein said plurality of instrument control resource classes comprise a first number of common resource classes which have commonality with two or more input/output interface types, and a second number of specific resource classes which control features specifically for a single type of input/output interface.

64. The instrumentation system of claim 62, further comprising:

at least one common resource template stored in the memory of the computer system comprising interface functions used in controlling and communicating with said plurality of instrument control resources, wherein said plurality of instrument control resources inherit functionality from said common resource template, wherein said common resource template does not include instrumentation-specific interface functions.

65. The instrumentation system of claim 62, wherein said input/output interface type used in said instrumentation system comprises VXI, GPIB, or serial.

66. The instrumentation system of claim 65, wherein said plurality of instrument control resources further comprise:

a plurality of VXI specific resources for performing VXI operations on the one or more instruments.

67. The instrumentation system of claim 65, wherein said plurality of instrument control resources further comprise:

a plurality of GPIB specific resources for performing GPIB operations on the one or more instruments.

68. The instrumentation system of claim 62, wherein said plurality of instrument control resources comprise:

a read resource for reading values from the one or more instruments;

a write resource for writing values to the one or more instruments;

a trigger resource for triggering the one or more instruments;

a poll resource for polling the one or more instruments; and a clear resource for clearing the one or more instruments.

69. The instrumentation system of claim 68, wherein said plurality of instrument control resources further comprise:

a format resource for formatting values provided to the one or more instruments;

one or more access resources for providing register level access to the one or more instruments;

a device command resource for providing commands to the one or more instruments; and a status/service request resource for requesting services, and for detecting requests for service and procuring status information.

70. The instrumentation system of claim 62,
wherein said instrumentation control program includes an open instruction which specifies one or more of said plurality of instrument control resources;
wherein said resource manager comprises:
  means for determining the location of said one or more of said plurality of instrument control resources specified in said open instruction;
  means for creating one or more sessions with said one or more of said plurality of instrument control resources;
  means for providing one or more identifiers to said instrument control program corresponding to said one or more sessions.

71. The instrumentation system of claim 70, wherein said instrumentation control program further comprises:
  means for invoking operations on said one or more of said plurality of instrument control resources, wherein said invoked operations cause said resources executing on said computer system to control at least one of said one or more instruments.

72. The instrumentation system of claim 70, wherein said at least one input/output interface has one or more types;
wherein said plurality of instrument control resources are based on said one or more types of the at least one input/output interface and said one or more instruments comprised in said instrumentation system.

73. The instrumentation system of claim 62, wherein at least a subset of said plurality of instrument control resources each control individual capabilities of said one or more instruments.

74. The instrumentation system of claim 62, wherein the at least one input/output interface type used in said instrumentation system comprises VXI, GPIB, serial, or data acquisition.

75. The instrumentation system of claim 62, wherein the at least one input/output interface type used in said instrumentation system comprises VXI, GPIB, or serial;
  wherein said VXI, GPIB, and serial input/output interface types comprise possible input/output interface types used in said instrumentation system, wherein said instrumentation control program executes independent of which one or more of a plurality of said possible input/output interface types is used in said instrumentation system.

76. A computer-implemented method for creating a program for controlling an instrumentation system, wherein the instrumentation system comprises a computer system and one or more instruments coupled to the computer system, wherein the instrumentation system further includes at least one input/output interface coupled between the computer system and said instruments, wherein the input/output interface type used in said instrumentation system comprises VXI, GPIB, serial, or data acquisition, the method comprising:
  providing a plurality of instrument control resource classes stored in the memory of the computer system which provide functionality for controlling instrument device capabilities of said one or more instruments;
  generating a plurality of instrument control resources for controlling instrument device capabilities of said one or more instruments, wherein said generating includes said plurality of instrument control resources inheriting functionality from said plurality of instrument control resource classes, wherein said generating further comprises storing said plurality of instrument control resources in the memory of the computer system, wherein said plurality of instrument control resources are generated based on the at least one input/output interface and said one or more instruments comprised in said instrumentation system;
  providing a resource manager stored in the memory of the computer system for providing user control, communication and access to said plurality of instrument control resources;
  constructing an instrumentation control program which uses one or more of said plurality of instrument control resources to control the instrumentation system, wherein said constructing is in response to user input; and
  said instrumentation control program executing to control the instrumentation system, wherein said instrumentation control program executes regardless of said input/output interface type used in said instrumentation system.

77. A computer-implemented method for creating a program for controlling instrumentation system, wherein the instrumentation system comprises a computer system and one or more instruments coupled to the computer system, wherein the instrumentation system further includes at least one input/output interface coupled between the computer system and said instruments, wherein the at least one input/output interface includes a GPIB interface, the method comprising:
  providing a plurality of instrument control resource classes stored in the memory of the computer system which provide functionality for controlling instrument device capabilities of said one or more instruments;
  generating a plurality of instrument control resources for controlling instrument device capabilities of said one or more instruments, wherein said generating includes said plurality of instrument control resources inheriting functionality from said plurality of instrument control resource classes, wherein said generating further comprises storing said plurality of instrument control resources in the memory of the computer system, wherein said plurality of instrument control resources are generated based on the at least one input/output interface and said one or more instruments comprised in said instrumentation system, wherein said generating said plurality of instrument control resources includes generating one or more GPIB specific resources for performing GPIB operations on the one or more instruments;
  providing a resource manager stored in the memory of the computer system for providing user control, communication and access to said plurality of instrument control resources;
  constructing an instrumentation control program which uses one or more of said plurality of instrument control resources to control the instrumentation system, wherein said constructing is in response to user input; and
  said instrumentation control program executing to control the instrumentation system, wherein said instrumentation control program executes regardless of said input/output interface type used in said instrumentation system.

78. A computer-implemented method for creating a program for controlling an instrumentation system, wherein the instrumentation system comprises a computer system and one or more instruments coupled to the computer system, wherein the instrumentation system further includes at least one input/output interface coupled between the computer system and said instruments, wherein the at least one input/output interface includes a VXI interface, the method comprising:
- providing a plurality of instrument control resource classes stored in the memory of the computer system which provide functionality for controlling instrument device capabilities of said one or more instruments;
- generating a plurality of instrument control resources for controlling instrument device capabilities of said one or more instruments, wherein said generating includes said plurality of instrument control resources inheriting functionality from said plurality of instrument control resource classes, wherein said generating further comprises storing said plurality of instrument control resources in the memory of the computer system, wherein said plurality of instrument control resources are generated based on the at least one input/output interface and said one or more instruments comprised in said instrumentation system, wherein said generating said plurality of instrument control resources includes generating one or more VXI specific resources for performing VXI operations on the one or more instruments;
- providing a resource manager stored in the memory of the computer system for providing user control, communication and access to said plurality of instrument control resources;
- constructing an instrumentation control program which uses one or more of said plurality of instrument control resources to control the instrumentation system, wherein said constructing is in response to user input; and
- said instrumentation control program executing to control the instrumentation system, wherein said instrumentation control program executes regardless of said input/output interface type used in said instrumentation system.

79. A computer-implemented method for creating a program for controlling an instrumentation system, wherein the instrumentation system comprises a computer system and one or more instruments coupled to the computer system, wherein the instrumentation system further includes at least one input/output interface coupled between the computer system and said instruments, wherein the at least one input/output interface includes a serial interface, the method comprising:
- providing a plurality of instrument control resource classes stored in the memory of the computer system which provide functionality for controlling instrument device capabilities of said one or more instruments;
- generating a plurality of instrument control resources for controlling instrument device capabilities of said one or more instruments, wherein said generating includes said plurality of instrument control resources inheriting functionality from said plurality of instrument control resource classes, wherein said generating further comprises storing said plurality of instrument control resources in the memory of the computer system, wherein said plurality of instrument control resources are generated based on the at least one input/output interface and said one or more instruments comprised in said instrumentation system, wherein said generating said plurality of instrument control resources includes generating one or more serial specific resources for performing serial operations on the one or more instruments;
- providing a resource manager stored in the memory of the computer system for providing user control, communication and access to said plurality of instrument control resources;
- constructing an instrumentation control program which uses one or more of said plurality of instrument control resources to control the instrumentation system, wherein said constructing is in response to user input; and
- said instrumentation control program executing to control the instrumentation system, wherein said instrumentation control program executes regardless of said input/output interface type used in said instrumentation system.

80. An instrumentation control system, comprising:
- a computer system including a central processing unit and memory;
- at least one instrument coupled to said computer system, wherein the at least one instrument couples to the computer system through one or more of a plurality of possible input/output (I/O) interface types, wherein said plurality of possible input/output (I/O) interface types for coupling said at least one instrument to said computer system comprise VXI, GPIB, or serial;
- a plurality of instrument control resource classes stored in the memory of the computer system which provide functionality for controlling instrument device capabilities of said at least one instrument;
- a plurality of instrument control resources stored in the memory of the computer system for controlling instrument device capabilities of said at least one instrument, wherein said plurality of instrument control resources inherit functionality from said plurality of instrument control resource classes, wherein said plurality of instrument control resources are based on the at least one input/output interface and said at least one instrument comprised in said instrumentation system;
- a resource manager stored in the memory of the computer system for providing user control, communication and access to said plurality of instrument control resources, wherein said resource manager maintains a data structure comprising information on said instrument control resources; and
- an instrumentation control program stored in the memory of the computer system using one or more of said plurality of instrument control resources, wherein said instrumentation control program controls the instrumentation system, wherein said instrumentation control program is operable to control the at least one instrument independent of two or more of said plurality of possible input/output (I/O) interface types for coupling said instrument to said computer system.

81. The instrumentation control system of claim 80, wherein said instrumentation control program is operable to control the at least one instrument independent of two or more of said plurality of possible input/output (I/O) interface types for coupling said instrument to said computer system without any modifications to said instrumentation control program.

82. The instrumentation control system of claim 80, wherein said two or more of said plurality of possible input/output (I/O) interface types for coupling said at least one instrument to said computer system comprises a subset of all of the possible input/output (I/O) interface types for coupling said at least one instrument to said computer system.

83. The instrumentation system of claim 80,
wherein said plurality of instrument control resource classes comprise a first number of common resource classes which have commonality with two or more input/output interface types, and a second number of specific resource classes which control features which are specific to one or more, but not all, of said input/output interface types.

84. The instrumentation system of claim 80, further comprising:
at least one common resource template stored in the memory of the computer system comprising interface functions used in controlling and communicating with said plurality of instrument control resources, wherein said plurality of instrument control resources inherit functionality from said common resource template, wherein said common resource template does not include instrumentation-specific interface functions.

85. The instrumentation system of claim 80, wherein said plurality of instrument control resources further comprise:
a plurality of VXI specific resources for performing VXI operations on the at least one instrument.

86. The instrumentation system of claim 80, wherein said plurality of instrument control resources further comprise:
a plurality of GPIB specific resources for performing GPIB operations on the at least one instrument.

87. The instrumentation system of claim 80, wherein said plurality of instrument control resources further comprise:
a plurality of serial specific resources for performing serial operations on the at least one instrument.

88. The instrumentation system of claim 80, wherein said plurality of instrument control resources comprise:
a read resource for reading values from the at least one instrument;
a write resource for writing values to the at least one instrument;
a trigger resource for triggering the at least one instrument;
a poll resource for polling the at least one instrument; and
a clear resource for clearing the at least one instrument.

89. The instrumentation system of claim 88, wherein said plurality of instrument control resources further comprise:
a format resource for formatting values provided to the at least one instrument;
one or more access resources for providing register level access to the at least one instrument;
a device command resource for providing commands to the at least one instrument; and
a status/service request resource for requesting services, and for detecting requests for service and procuring status information.

90. The instrumentation system of claim 80,
wherein said instrumentation control program includes an open instruction which specifies one or more of said plurality of instrument control resources;
wherein said resource manager comprises:
means for determining the location of said one or more of said plurality of instrument control resources specified in said open instruction;
means for creating one or more sessions with said one or more of said plurality of instrument control resources;
means for providing one or more identifiers to said instrument control program corresponding to said one or more sessions.

91. The instrumentation system of claim 90, wherein said instrumentation control program further comprises:
means for invoking operations on said one or more of said plurality of instrument control resources, wherein said invoked operations cause said resources executing on said computer system to control said at least one instrument.

92. The instrumentation system or claim 90, wherein said at least one input/output interface has one or more types;
wherein said plurality of instrument control resources are based on said one or more types of the at least one input/output interface and said at least one instrument comprised in said instrumentation system.

93. The instrumentation system of claim 80, wherein at least a subset of said plurality of instrument control resources each control individual capabilities of said at least one instrument.

94. The instrumentation system of claim 80, wherein said VXI, GPIB, and serial input/output interface types comprise possible input/output interface types used in said instrumentation system, wherein said instrumentation control program executes independent of which one or more of a plurality of said possible input/output interface types is used in said instrumentation system.

95. An instrumentation control system, comprising:
a computer system including a central processing unit and memory;
at least one instrument coupled to said computer system, wherein the at least one instrument couples to the computer system through one or more of a plurality of possible input/output (I/O) interface types, wherein said plurality of possible input/output (I/O) interface types for coupling said at least one instrument to said computer system comprise VXI, GPIB, serial, or data acquisition;
a plurality of instrument control resource classes stored in the memory of the computer system which provide functionality for controlling instrument device capabilities of said at least one instrument;
a plurality of instrument control resources stored in the memory of the computer system for controlling instrument device capabilities of said at least one instrument, wherein said plurality of instrument control resources inherit functionality from said plurality of instrument control resource classes, wherein said plurality of instrument control resources are based on the at least one input/output interface and said at least one instrument comprised in said instrumentation system;
a resource manager stored in the memory of the computer system for providing user control, communication and access to said plurality of instrument control resources, wherein said resource manager maintains a data structure comprising information on said instrument control resources; and
an instrumentation control program stored in the memory of the computer system using one or more of said plurality of instrument control resources, wherein said instrumentation control program controls the instrumentation system, wherein said instrumentation control program is operable to control the at least one instrument independent of two or more of said plurality of possible input/output (I/O) interface types for coupling said instrument to said computer system.

96. An instrumentation system for controlling one or more instruments, wherein the instrumentation system comprises:
a computer system including a central processing unit and memory;

at least one instrument coupled to said computer system, wherein said at least one instrument includes at least one GPIB instrument;

at least one input/output interface coupled between the computer system and said at least one instrument, wherein the at least one instrument couples to the computer system through one or more of a plurality of possible input/output (I/O) interface types, wherein said at least one input/output interface includes a GPIB interface;

a plurality of instrument control resource classes stored in the memory of the computer system which provide functionality for controlling instrument device capabilities of said at least one instrument;

a plurality of instrument control resources stored in the memory of the computer system for controlling instrument device capabilities of said at least one instrument, wherein said plurality of instrument control resources inherit functionality from said plurality of instrument control resource classes, wherein said plurality of instrument control resources are based on the at least one input/output interface and said at least one instrument comprised in said instrumentation system, wherein said plurality of instrument control resources include GPIB specific resources for performing GPIB operations on the at least one GPIB instrument;

a resource manager stored in the memory of the computer system for providing user control, communication and access to said plurality of instrument control resources, wherein said resource manager maintains a data structure comprising information on said instrument control resources; and an instrumentation control program stored in the memory of the computer system using one or more of said plurality of instrument control resources, wherein said instrumentation control program controls the instrumentation system, wherein said instrumentation control program is operable to control the at least one instrument independent of two or more of said plurality of possible input/output (I/O) interface types for coupling said at least one instrument to said computer system.

97. The instrumentation control system of claim 96, wherein said instrumentation control program is operable to control the at least one instrument independent of two or more of said plurality of possible input/output (I/O) interface types for coupling said instrument to said computer system without any modifications to said instrumentation control program.

98. The instrumentation control system of claim 96, wherein said two or more of said plurality of possible input/output (I/O) interface types for coupling said at least one instrument to said computer system comprises a subset of all of the possible input/output (I/O) interface types for coupling said at least one instrument to said computer system.

99. The instrumentation system of claim 98, wherein said input/output interface type used in said instrumentation system comprises VXI, GPIB, or serial.

100. The instrumentation system of claim 96, wherein said plurality of instrument control resource classes comprise a first number of common resource classes which have commonality with two or more input/output interface types, and a second number of specific resource classes which control features which are specific to one or more, but not all, of said input/output interface types.

101. The instrumentation system of claim 96, further comprising:

at least one common resource template stored in the memory of the computer system comprising interface functions used in controlling and communicating with said plurality of instrument control resources, wherein said plurality of instrument control resources inherit functionality from said common resource template, wherein said common resource template does not include instrumentation-specific interface functions.

102. The instrumentation system of claim 96, wherein said plurality of instrument control resources further comprise:

a plurality of VXI specific resources for performing VXI operations on the at least one instrument.

103. The instrumentation system of claim 96, wherein said plurality of instrument control resources comprise:

a read resource for reading values from the at least one instrument;

a write resource for writing values to the at least one instrument;

a trigger resource for triggering the at least one instrument;

a poll resource for polling the at least one instrument; and a clear resource for clearing the at least one instrument.

104. The instrumentation system of claim 103, wherein said plurality of instrument control resources further comprise:

a format resource for formatting values provided to the at least one instrument;

one or more access resources for providing register level access to the at least one instrument;

a device command resource for providing commands to the at least one instrument; and a status/service request resource for requesting services, and for detecting requests for service and procuring status information.

105. The instrumentation system of claim 96, wherein at least a subset of said plurality of instrument control resources each control individual capabilities of said at least one instrument.

106. The instrumentation system of claim 96, wherein VXI, GPIB, and serial input/output interface types comprise possible input/output interface types used in said instrumentation system, wherein said instrumentation control program executes independent of which one or more of a plurality of said possible input/output interface types is used in said instrumentation system.

107. An instrumentation system for controlling one or more instruments, wherein the instrumentation system comprises:

a computer system including a central processing unit and memory;

at least one instrument coupled to said computer system, wherein said at least one instrument includes at least one VXI instrument;

at least one input/output interface coupled between the computer system and said at least one instrument, wherein the at least one instrument couples to the computer system through one or more of a plurality of possible input/output (I/O) interface types, wherein said at least one input/output interface includes a VXI interface;

a plurality of instrument control resource classes stored in the memory of the computer system which provide functionality for controlling instrument device capabilities of said at least one instrument;

a plurality of instrument control resources stored in the memory of the computer system for controlling instrument device capabilities of said at least one instrument, wherein said plurality of instrument control resources inherit functionality from said plurality of instrument control resource classes, wherein said plurality of instrument control resources are based on the at least one input/output interface and said at least one instrument comprised in said instrumentation system, wherein said plurality of instrument control resources includes one or more VXI specific resources for performing VXI operations on the at least one VXI instrument;

a resource manager stored in the memory of the computer system for providing user control, communication and access to said plurality of instrument control resources, wherein said resource manager maintains a data structure comprising information on said instrument control resources; and an instrumentation control program stored in the memory of the computer system using one or more of said plurality of instrument control resources, wherein said instrumentation control program controls the instrumentation system, wherein said instrumentation control program is operable to control the at least one instrument independent of two or more of said plurality of possible input/output (I/O) interface types for coupling said at least one instrument to said computer system.

108. The instrumentation control system of claim 107, wherein said instrumentation control program is operable to control the at least one instrument independent of two or more of said plurality of possible input/output (I/O) interface types for coupling said instrument to said computer system without any modifications to said instrumentation control program.

109. The instrumentation control system of claim 107, wherein said two or more of said plurality of possible input/output (I/O) interface types for coupling said at least one instrument to said computer system comprises a subset of all of the possible input/output (I/O) interface types for coupling said at least one instrument to said computer system.

110. The instrumentation system of claim 109, wherein said input/output interface type used in said instrumentation system comprises VXI, GPIB, or serial.

111. The instrumentation system of claim 107,
wherein said plurality of instrument control resource classes comprise a first number of common resource classes which have commonality with two or more input/output interface types, and a second number of specific resource classes which control features which are specific to one or more, but not all, of said input/output interface types.

112. The instrumentation system of claim 107, further comprising:
at least one common resource template stored in the memory of the computer system comprising interface functions used in controlling and communicating with said plurality of instrument control resources, wherein said plurality of instrument control resources inherit functionality from said common resource template, wherein said common resource template does not include instrumentation-specific interface functions.

113. The instrumentation system of claim 107, wherein said plurality of instrument control resources further comprise:

a plurality of GPIB specific resources for performing GPIB operations on the at least one instrument.

114. The instrumentation system of claim 107, wherein said plurality of instrument control resources comprise:
a read resource for reading values from the at least one instrument;
a write resource for writing values to the at least one instrument;
a trigger resource for triggering the at least one instrument;
a poll resource for polling the at least one instrument; and
a clear resource for clearing the at least one instrument.

115. The instrumentation system of claim 114, wherein said plurality of instrument control resources further comprise:
a format resource for formatting values provided to the at least one instrument;
one or more access resources for providing register level access to the at least one instrument;
a device command resource for providing commands to the at least one instrument; and
a status/service request resource for requesting services, and for detecting requests for service and procuring status information.

116. The instrumentation system of claim 107, wherein at least a subset said plurality of instrument control resources each control individual capabilities of said at least one instrument.

117. The instrumentation system of claim 107, wherein VXI, GPIB, and serial input/output interface types comprise possible input/output interface types used in said instrumentation system, wherein said instrumentation control program executes independent of which one or more of a plurality of said possible input/output interface types is used in said instrumentation system.

118. An instrumentation system for controlling one or more instruments, wherein the instrumentation system comprises:
a computer system including a central processing unit and memory;
at least one instrument coupled to said computer system, wherein said at least one instrument includes at least one serial instrument;
at least one input/output interface coupled between the computer system and said at least one instrument, wherein the at least one instrument couples to the computer system through one or more of a plurality of possible input/output (I/O) interface types, wherein said at least one input/output interface includes a serial interface;
a plurality of instrument control resource classes stored in the memory of the computer system which provide functionality for controlling instrument device capabilities of said at least one instrument;
a plurality of instrument control resources stored in the memory of the computer system for controlling instrument device capabilities of said at least one instrument, wherein said plurality of instrument control resources inherit functionality from said plurality of instrument control resource classes, wherein said plurality of instrument control resources are based on the at least one input/output interface and said at least one instrument comprised in said instrumentation system, wherein said plurality of instrument control resources includes one or more serial specific resources for performing serial operations on the at least one serial instrument;

a resource manager stored in the memory of the computer system for providing user control, communication and access to said plurality of instrument control resources, wherein said resource manager maintains a data structure comprising information on said instrument control resources; and an instrumentation control program stored in the memory of the computer system using one or more of said plurality of instrument control resources, wherein said instrumentation control program controls the instrumentation system, wherein said instrumentation control program is operable to control the at least one instrument independent of two or more of said plurality of possible input/output (I/O) interface types for coupling said at least one instrument to said computer system.

119. The instrumentation control system of claim 118, wherein said instrumentation control program is operable to control the at least one instrument independent of two or more of said plurality of possible input/output (I/O) interface types for coupling said instrument to said computer system without any modifications to said instrumentation control program.

120. The instrumentation control system of claim 118, wherein said two or more of said plurality of possible input/output (I/O) interface types for coupling said at least one instrument to said computer system comprises a subset of all of the possible input/output (I/O) interface types for coupling said at least one instrument to said computer system.

121. The instrumentation system of claim 120, wherein said input/output interface type used in said instrumentation system comprises VXI, GPIB, or serial.

122. A computer-implemented method for creating a program for controlling an instrumentation system, wherein the instrumentation system comprises a computer system and one or more instruments coupled to the computer system, wherein the instrumentation system further includes at least one input/output interface coupled between the computer system and said one or more instruments, wherein the one or more instruments couple to the computer system through one or more of a plurality of possible input/output (I/O) interface types, wherein said plurality of possible input/output (I/O) interface types for coupling said one or more instruments to said computer system comprises VXI, GPIB, or serial; the method comprising:

providing a plurality of instrument control resource classes stored in the memory of the computer system which provide functionality for controlling instrument device capabilities of said one or more instruments;

generating a plurality of instrument control resources for controlling instrument device capabilities of said one or more instruments, wherein said generating includes said plurality of instrument control resources inheriting functionality from said plurality of instrument control resource classes, wherein said generating further comprises storing said plurality of instrument control resources in the memory of the computer system, wherein said plurality of instrument control resources are generated based on the at least one input/output interface and said one or more instruments comprised in said instrumentation system;

providing a resource manager stored in the memory of the computer system for providing user control, communication and access to said plurality of instrument control resources;

constructing an instrumentation control program which uses one or more of said plurality of instrument control resources to control the instrumentation system, wherein said constructing is in response to user input; and said instrumentation control program executing to control the instrumentation system, wherein said instrumentation control program is operable to control the one or more instruments independent of two or more of said plurality of possible input/output (I/O) interface types for coupling said instrument to said computer system.

123. The method of claim 122, wherein said instrumentation control program is operable to control the one or more instruments independent of two or more of said plurality of possible input/output (I/O) interface types for coupling said one or more instruments to said computer system without any modifications to said instrumentation control program.

124. The method of claim 122, wherein said two or more of said plurality of possible input/output (I/O) interface types for coupling said one or more instruments to said computer system comprises a subset of all of the possible input/output (I/O) interface types for coupling said one or more instruments to said computer system.

125. The method of claim 122,
wherein said providing said plurality of instrument control resource classes comprises providing a first number of common resource classes which have commonality with two or more input/output interface types, and a second number of specific resource classes which are specific to one or more, but not all, of said input/output interface types.

126. The method of claim 122, further comprising:

providing at least one common resource template comprising interface functions used in controlling and communicating with said plurality of instrument control resources;

said plurality of instrument control resources inheriting functionality from said common resource template, wherein said common resource template does not include instrumentation-specific interface functions.

127. The method of claim 122, wherein said providing said plurality of instrument control resources comprises providing:

a read resource for reading values from the one or more instruments;

a write resource for writing values to the one or more instruments;

a trigger resource for triggering the one or more instruments;

a poll resource for polling the one or more instruments; and a clear resource for clearing the one or more instruments.

128. The method of claim 127, wherein said providing said plurality of instrument control resources further comprises providing:

a format resource for formatting values provided to the one or more instruments;

one or more access resources for providing register level access to the one or more instruments;

a device command resource for providing commands to the one or more instruments; and a status/service request resource for requesting services, and for detecting requests for service and procuring status information.

129. The method of claim 122, wherein said providing said plurality of instrument control resources further comprises providing a plurality of GPIB specific resources for performing GPIB operations on the one or more instruments.

130. The method of claim 122, wherein said providing said plurality of instrument control resources further comprises providing a plurality of VXI specific resources for performing VXI operations on the one or more instruments.

131. The method of claim 122, wherein said providing said plurality of instrument control resources further comprises providing a plurality of serial specific resources for performing serial operations on the one or more instruments.

132. The method of claim 122, wherein said instrumentation control program includes an open instruction which specifies one or more of said plurality of instrument control resources, the method further comprising:

said resource manager determining the location of said one or more of said plurality of instrument control resources specified in said open instruction;

said resource manager creating one or more sessions with said one or more of said plurality of instrument control resources; and said resource manager providing one or more identifiers to said instrument control program corresponding to said one or more sessions.

133. The method of claim 132, further comprising:

said instrumentation control program invoking operations on said one or more of said plurality of instrument control resources; and said one or more of said plurality of instrument control resources executing on said computer system to control at least one of said one or more instruments in response to said invoked operations.

134. The method of claim 122, further comprising:

executing said instrumentation control program to control said instrumentation system;

wherein said executing comprises:

receiving an open instruction which specifies one or more of said plurality of instrument control resources;

determining the location of said one or more of said plurality of instrument control resources specified in said receiving an open instruction;

creating one or more sessions with said one or more of said plurality of instrument control resources; and providing one or more identifiers to said instrument control program corresponding to said one or more sessions.

135. The method of claim 122, wherein said at least one input/output interface has one or more types;

wherein said generating generates said plurality of instrument control resources based on said one or more types of the at least one input/output interface and said one or more instruments comprised in said instrumentation system.

136. The method of claim 135, further comprising:

determining the input/output interface types and instruments comprised in said instrumentation system;

wherein said generating said plurality of instrument control resources comprises utilizing said plurality of resource classes and said determined input/output interface types and instrument types to create said plurality of instrument control resources.

137. The method of claim 122, further comprising:

registering said plurality of instrument control resources with said resource manager after said generating said plurality of instrument control resources and after said providing said resource manager.

138. The method of claim 122, wherein said computer system communicates with said instruments through said at least one input/output interface, the method further comprising:

executing said instrumentation control program to control said instrumentation system, wherein said instrumentation control program executes independent of said input/output interface type used in said instrumentation system.

139. The method of claim 122, wherein each of said plurality of instrument control resources includes one or more operations, one or more attributes, and one of more events.

140. The method of claim 122, wherein at least a subset of said plurality of instrument control resources each control individual capabilities of said one or more instruments.

141. The method of claim 122, wherein said VXI, GPIB, and serial input/output interface types comprise possible input/output interface types used in said instrumentation system, wherein said instrumentation control program executing to control the instrumentation system comprises the instrumentation control program executing independent of which one or more of a plurality of said possible input/output interface types is used in said instrumentation system.

142. A computer-implemented method for creating a program for controlling an instrumentation system, wherein the instrumentation system comprises a computer system and one or more instruments coupled to the computer system, wherein the instrumentation system further includes at least one input/output interface coupled between the computer system and said one or more instruments, wherein the one or more instruments couple to the computer system through one or more of a plurality of possible input/output (I/O) interface types, wherein said plurality of possible input/output (I/O) interface types for coupling said one or more instruments to said computer system comprise VXI, GPIB, serial, or data acquisition; the method comprising:

providing a plurality of instrument control resource classes stored in the memory of the computer system which provide functionality for controlling instrument device capabilities of said one or more instruments;

generating a plurality of instrument control resources for controlling instrument device capabilities of said one or more instruments, wherein said generating includes said plurality of instrument control resources inheriting functionality from said plurality of instrument control resource classes, wherein said generating further comprises storing said plurality of instrument control resources in the memory of the computer system, wherein said plurality of instrument control resources are generated based on the at least one input/output interface and said one or more instruments comprised in said instrumentation system;

providing a resource manager stored in the memory of the computer system for providing user control, communication and access to said plurality of instrument control resources;

constructing an instrumentation control program which uses one or more of said plurality of instrument control resources to control the instrumentation system, wherein said constructing is in response to user input; and said instrumentation control program executing to control the instrumentation system, wherein said instrumentation control program is operable to control the one or more instruments independent of two or more of said plurality of possible input/output (I/O) interface types for coupling said instrument to said computer system.

143. A computer-implemented method for creating a program for controlling an instrumentation system, wherein the instrumentation system comprises a computer system and one or more instruments coupled to the computer system, wherein the instrumentation system further includes at least one input/output interface coupled between the computer system and said one or more instruments, wherein the one or more instruments couple to the computer system through one or more of a plurality of possible input/output (I/O) interface types, wherein said at least one input/output includes a GPIB interface, the method comprising:

provide a plurality of instrument control resource classes stored in the memory of the computer system which provide functionality for controlling instrument device capabilities of said one or more instruments;

generating a plurality of instrument control resources for controlling instrument device capabilities of said one or more instruments, wherein said generating includes said plurality of instrument control resources inheriting functionality from said plurality of instrument control resource classes, wherein said generating further comprises storing said plurality of instrument control resources in the memory of the computer system, wherein said plurality of instrument control resources are generated based on the at least one input/output interface and said one or more instruments comprised in said instrumentation system, wherein said generating includes generating one or more GPIB specific resources for performing GPIB operations;

providing a resource manager stored in the memory of the computer system for providing user control, communication and access to said plurality of instrument control resources;

constructing an instrumentation control program which uses one or more of said plurality of instrument control resources to control the instrumentation system, wherein said constructing is in response to user input; and said instrumentation control program executing to control the instrumentation system, wherein said instrumentation control program is operable to control the one or more instruments independent of two or more of said plurality of possible input/output (I/O) interface types for coupling said instrument to said computer system.

144. The method of claim 143, wherein said instrumentation control program is operable to control the one or more instruments independent of two or more of said plurality of possible input/output (I/O) interface types for coupling said one or more instruments to said computer system without any modifications to said instrumentation control program.

145. The method of claim 143, wherein said two or more of said plurality of possible input/output (I/O) interface types for coupling said one or more instruments to said computer system comprises a subset of all of the possible input/output (I/O) interface types for coupling said one or more instruments to said computer system.

146. The method of claim 143, wherein the at least one input/output interface type used in said instrumentation system comprises VXI, GPIB, serial, or data acquisition.

147. A computer-implemented method for creating a program for controlling an instrumentation system, wherein the instrumentation system comprises a computer system and one or more instruments coupled to the computer system, wherein the instrumentation system further includes at least one input/output interface coupled between the computer system and said one or more instruments, wherein the one or more instruments couple to the computer system through one or more of a plurality of possible input/output (I/O) interface types, wherein said at least one input/output includes a VXI interface, the method comprising:

providing a plurality of instrument control resource classes stored in the memory of the computer system which provide functionality for controlling instrument device capabilities of said one or more instruments;

generating a plurality of instrument control resources for controlling instrument device capabilities of said one or more instruments, wherein said generating includes said plurality of instrument control resources inheriting functionality from said plurality of instrument control resource classes, wherein said generating further comprises storing said plurality of instrument control resources in the memory of the computer system, wherein said plurality of instrument control resources are generated based on the at least one input/output interface and said one or more instruments comprised in said instrumentation system, wherein said generating includes generating one or more VXI specific resources for performing VXI operations;

providing a resource manager stored in the memory of the computer system for providing user control, communication and access to said plurality of instrument control resources;

constructing an instrumentation control program which uses one or more of said plurality of instrument control resources to control the instrumentation system, wherein said constructing is in response to user input; and said instrumentation control program executing to control the instrumentation system, wherein said instrumentation control program is operable to control the one or more instruments independent of two or more of said plurality of possible input/output (I/O) interface types for coupling said instrument to said computer system.

148. The method of claim 147, wherein said instrumentation control program is operable to control the one or more instruments independent of two or more of said plurality of possible input/output (I/O) interface types for coupling said one or more instruments to said computer system without any modifications to said instrumentation control program.

149. The method of claim 147, wherein said two or more of said plurality of possible input/output (I/O) interface types for coupling said one or more instruments to said computer system comprises a subset of all of the possible input/output (I/O) interface types for coupling said one or more instruments to said computer system.

150. The method of claim 147, wherein the at least one input/output interface type used in said instrumentation system comprises VXI, GPIB, serial, or data acquisition.

151. A computer-implemented method for creating a program for controlling an instrumentation system, wherein the instrumentation system comprises a computer system and one or more instruments coupled to the computer system, wherein the instrumentation system further includes at least one input/output interface coupled between the computer system and said one or more instruments, wherein the one or more instruments couple to the computer system through one or more of a plurality of possible input/output (I/O) interface types, wherein said at least one input/output includes a serial interface, the method comprising:

providing a plurality of instrument control resource classes stored in the memory of the computer system which provide functionality for controlling instrument device capabilities of said one or more instruments;

generating a plurality of instrument control resources for controlling instrument device capabilities of said one or more instruments, wherein said generating includes said plurality of instrument control resources inheriting functionality from said plurality of instrument control resource classes, wherein said generating further comprises storing said plurality of instrument control resources in the memory of the computer system, wherein said plurality of instrument control resources are generated based on the at least one input/output interface and said one or more instruments comprised in said instrumentation system, wherein said generating includes generating one or more serial specific resources for performing serial operations;

providing a resource manager stored in the memory of the computer system for providing user control, communication and access to said plurality of instrument control resources;

constructing an instrumentation control program which uses one or more of said plurality of instrument control resources to control the instrumentation system, wherein said constructing is in response to user input; and said instrumentation control program executing to control the instrumentation system, wherein said instrumentation control program is operable to control the one or more instruments independent of two or more of said plurality of possible input/output (I/O) interface types for coupling said instrument to said computer system.

152. The method of claim 151, wherein said instrumentation control program is operable to control the one or more instruments independent of two or more of said plurality of possible input/output (I/O) interface types for coupling said one or more instruments to said computer system without any modifications to said instrumentation control program.

153. The method of claim 151, wherein said two or more of said plurality of possible input/output (I/O) interface types for coupling said one or more instruments to said computer system comprises a subset of all of the possible input/output (I/O) interface types for coupling said one or more instruments to said computer system.

154. The method of claim 151, wherein the at least one input/output interface type used in said instrumentation system comprises VXI, GPIB, serial, or data acquisition.

155. A computer-readable storage media for operating in an instrumentation system, the instrumentation system comprising a computer system including a central processing unit, one or more instruments coupled to the computer system, and at least one input/output interface coupled between the computer system and the instruments, wherein the at least one input/output interface type used in the instrumentation system includes one or more of the group comprising VXI, GPIB, and serial, wherein the computer-readable storage media includes a substrate having a physical configuration representing data, the storage media comprising:

a plurality of instrument control resource classes comprised on the storage media which provide functionality for controlling instrument device capabilities of said one or more instruments;

a plurality of instrument control resources comprised on the storage media for controlling instrument device capabilities of said one or more instruments, wherein said plurality of instrument control resources inherit functionality from said plurality of instrument control resource classes, wherein said plurality of instrument control resources are based on the at least one input/output interface and said one or more instruments comprised in said instrumentation system;

a resource manager comprised on the storage media for providing user control, communication and access to said plurality of instrument control resources, wherein said resource manager maintains a data structure comprising information on said instrument control resources; and an instrumentation control program comprised on the storage media using one or more of said plurality of instrument control resources, wherein said instrumentation control program controls the instrumentation system, wherein said instrumentation control program executes regardless of said input/output interface type used in said instrumentation system.

156. The computer-readable storage media of claim 155, wherein said plurality of instrument control resource classes comprise a first number of common resource classes which have commonality with two or more input/output interface types, and a second number of specific resource classes which control features specifically for a single type of input/output interface.

157. The computer-readable storage media of claim 155, further comprising:

at least one common resource template comprised on the storage media comprising interface functions used in controlling and communicating with said plurality of instrument control resources, wherein said plurality of instrument control resources inherit functionality from said common resource template, wherein said common resource template does not include instrumentation-specific interface functions.

158. The computer-readable storage media of claim 155, wherein said plurality of instrument control resources comprise:

a read resource for reading values from the one or more instruments;

a write resource for writing values to the one or more instruments;

a trigger resource for triggering the one or more instruments;

a poll resource for polling the one or more instruments; and a clear resource for clearing the one or more instruments.

159. The computer-readable storage media of claim 158, wherein said plurality of instrument control resources further comprise:

a format resource for formatting values provided to the one or more instruments;

one or more access resources for providing register level access to the one or more instruments;

a device command resource for providing commands to the one or more instruments; and a status/service request resource for requesting services, and for detecting requests for service and procuring status information.

160. The computer-readable storage media of claim 155, wherein said plurality of instrument control resources further comprise:

a plurality of GPIB specific resources for performing GPIB specific operations on the one or more instruments.

161. The computer-readable storage media of claim 155, wherein said plurality of instrument control resources further comprise:

a plurality of VXI specific resources for performing VXI specific operations on the one or more instruments.

162. The computer-readable storage media of claim 155, wherein said plurality of instrument control resources further comprise:
   a plurality of serial specific resources for performing VXI specific operations on the one or more instruments.

163. The computer-readable storage media of claim 155, wherein said instrumentation control program includes an open instruction which specifies one or more of said plurality of instrument control resources;
   wherein said resource manager comprises:
      means comprised on the storage media for determining the location of said one or more of said plurality of instrument control resources specified in said open instruction;
      means comprised on the storage media for creating one or more sessions with said one or more of said plurality of instrument control resources;
      means comprised on the storage media for providing one or more identifiers to said instrument control program corresponding to said one or more sessions.

164. The computer-readable storage media of claim 163, wherein said instrumentation control program further comprises:
   means comprised on the storage media for invoking operations on said one or more of said plurality of instrument control resources, wherein said invoked operations cause said resources executing on said computer system to control at least one of said one or more instruments.

165. The computer-readable storage media of claim 163, wherein said at least one input/output interface has one or more types;
   wherein said plurality of instrument control resources are based on said one or more types of the at least one input/output interface and said one or more instruments comprised in said instrumentation system.

166. A computer-readable storage media for operating in an instrumentation system, the instrumentation system comprising a computer system including a central processing unit, one or more instruments coupled to the computer system, and at least one input/output interface coupled between the computer system and the one or more instruments, wherein the one or more instruments couple to the computer system through one or more of a plurality of possible input/output (I/O) interface types, wherein said plurality of possible input/output (I/O) interface types for coupling said at least one instrument to said computer system include one or more from the group comprising: VXI, GPIB, and serial; wherein the computer-readable storage media includes a substrate having a physical configuration representing data, the storage media comprising:
   a plurality of instrument control resource classes comprised on the storage media which provide functionality for controlling instrument device capabilities of said one or more instruments;
   a plurality of instrument control resources comprised on the storage media for controlling instrument device capabilities of said one or more instruments, wherein said plurality of instrument control resources inherit functionality from said plurality of instrument control resource classes, wherein said plurality of instrument control resources are based on the at least one input/output interface and said one or more instruments comprised in said instrumentation system;
   a resource manager comprised on the storage media for providing user control, communication and access to said plurality of instrument control resources, wherein said resource manager maintains a data structure comprising information on said instrument control resources; and
   an instrumentation control program comprised on the storage media using one or more of said plurality of instrument control resources, wherein said instrumentation control program controls the instrumentation system, wherein said instrumentation control program is operable to control the at least one instrument independent of two or more of said plurality of possible input/output (I/O) interface types for coupling said instrument to said computer system.

167. The computer-readable storage media of claim 166, wherein said plurality of instrument control resource classes comprise a first number of common resource classes which have commonality with two or more input/output interface types, and a second number of specific resource classes which control features specifically for a single type of input/output interface.

168. The computer-readable storage media of claim 166, further comprising:
   at least one common resource template comprised on the storage media comprising interface functions used in controlling and communicating with said plurality of instrument control resources, wherein said plurality of instrument control resources inherit functionality from said common resource template, wherein said common resource template does not include instrumentation-specific interface functions.

169. The computer-readable storage media of claim 166, wherein said plurality of instrument control resources comprise:
   a read resource for reading values from the one or more instruments;
   a write resource for writing values to the one or more instruments;
   a trigger resource for triggering the one or more instruments;
   a poll resource for polling the one or more instruments; and
   a clear resource for clearing the one or more instruments.

170. The computer-readable storage media of claim 169, wherein said plurality of instrument control resources further comprise:
   a format resource for formatting values provided to the one or more instruments;
   one or more access resources for providing register level access to the one or more instruments;
   a device command resource for providing commands to the one or more instruments; and
   a status/service request resource for requesting services, and for detecting requests for service and procuring status information.

171. The computer-readable storage media of claim 166, wherein said plurality of instrument control resources further comprise:
   a plurality of GPIB specific resources for performing GPIB specific operations on the one or more instruments.

172. The computer-readable storage media of claim 166, wherein said plurality of instrument control resources further comprise:
   a plurality of VXI specific resources for performing VXI specific operations on the one or more instruments.

173. The computer-readable storage media of claim 166, wherein said plurality of instrument control resources further comprise:

a plurality of serial specific resources for performing VXI specific operations on the one or more instruments.

174. The computer-readable storage media of claim 166, wherein said instrumentation control program includes an open instruction which specifies one or more of said plurality of instrument control resources;

wherein said resource manager comprises:

means comprised on the storage media for determining the location of said one or more of said plurality of instrument control resources specified in said open instruction;

means comprised on the storage media for creating one or more sessions with said one or more of said plurality of instrument control resources;

means comprised on the storage media for providing one or more identifiers to said instrument control program corresponding to said one or more sessions.

175. The computer-readable storage media or claim 174, wherein said instrumentation control program further comprises:

means comprised on the storage media for invoking operations on said one or more of said plurality of instrument control resources, wherein said invoked operations cause said resources executing on said computer system to control at least one of said one or more instruments.

176. The computer-readable storage media of claim 174, wherein said at least one input/output interface has one or more types;

wherein said plurality of instrument control resources are based on said one or more types of the at least one input/output interface and said one or more instruments comprised in said instrumentation system.

177. A computer-implemented method for creating a program for controlling an instrumentation system, wherein the instrumentation system comprises a computer system and one or more instruments coupled to the computer system, wherein the instrumentation system further includes at least one input/output interface coupled between the computer system and said one or more instruments, wherein the one or more instruments couple to the computer system through one or more of a plurality of possible input/output (I/O) interface types, wherein said plurality of possible input/output (I/O) interface types for coupling said one or more instruments to said computer system comprises VXI, GPIB, or serial; the method comprising:

providing a plurality of instrument control resource classes stored in the memory of the computer system which provide functionality for controlling instrument device capabilities of said one or more instruments;

generating a plurality of instrument control resources for controlling instrument device capabilities of said one or more instruments, wherein said generating includes said plurality of instrument control resources inheriting functionality from said plurality of instrument control resource classes, wherein said generating further comprises storing said plurality of instrument control resources in the memory of the computer system, wherein said plurality of instrument control resources are generated based on the at least one input/output interface and said one or more instruments comprised in said instrumentation system;

providing a resource manager stored in the memory of the computer system for providing user control, communication and access to said plurality of instrument control resources;

wherein said plurality of instrument control resources and said resource manager are usable to construct an instrumentation control program to control the instrumentation system, wherein said instrumentation control program is executable to control the instrumentation system, wherein said instrumentation control program is operable to control the one or more instruments independent of two or more of said plurality of possible input/output (I/O) interface types for coupling said instrument to said computer system.

* * * * *

UNITED STATES PATENT AND TRADEMARK OFFICE
CERTIFICATE OF CORRECTION

PATENT NO. : 5,724,272

DATED : March 3, 1998

INVENTOR(S) : Mitchell et al.

It is certified that error appears in the above-identified patent and that said Letters Patent is hereby corrected as shown below:

Claim 116, col. 122, line 26, please delete "subset" and substitute "subset of".

Signed and Sealed this

Fifth Day of May, 1998

Attest:

Attesting Officer

BRUCE LEHMAN

Commissioner of Patents and Trademarks